US010430702B2

(12) United States Patent
Butler et al.

(10) Patent No.: US 10,430,702 B2
(45) Date of Patent: Oct. 1, 2019

(54) RF TAG NETWORK CONNECTIVITY THROUGH GATEWAY FACILITY

(71) Applicant: TEGO, INC., Waltham, MA (US)

(72) Inventors: Timothy P. Butler, Brookline, MA (US); David Puleston, Duluth, GA (US); Javier Berrios, Trumbull, CT (US); Robert W. Hamlin, Monroe, CT (US); Leonid Mats, Bay Harbor Islands, FL (US); Steven Benoit, Walpole, MA (US)

(73) Assignee: TEGO, INC., Waltham, MA (US)

( * ) Notice: Subject to any disclaimer, the term of this patent is extended or adjusted under 35 U.S.C. 154(b) by 0 days.

(21) Appl. No.: 15/805,724

(22) Filed: Nov. 7, 2017

(65) Prior Publication Data

US 2018/0068211 A1 Mar. 8, 2018

Related U.S. Application Data

(63) Continuation of application No. 15/427,175, filed on Feb. 8, 2017, now Pat. No. 9,842,290, which is a
(Continued)

(51) Int. Cl.
*G06K 19/07* (2006.01)
*G06K 19/073* (2006.01)
(Continued)

(52) U.S. Cl.
CPC ....... *G06K 19/0723* (2013.01); *G06K 7/0008* (2013.01); *G06K 7/10366* (2013.01);
(Continued)

(58) Field of Classification Search
CPC ............. G06K 19/0723; G06K 19/073; G06K 19/07309; G06K 7/0008; G06K 7/10366; G07C 5/008
See application file for complete search history.

(56) References Cited

U.S. PATENT DOCUMENTS 3,619,568 A 11/1971 Taplin
4,167,625 A 9/1979 Smith
(Continued)

FOREIGN PATENT DOCUMENTS

CN 201673518 U 12/2010
EP 1111557 A2 6/2001
(Continued)

OTHER PUBLICATIONS 12848183.5, "European Application Serial No. 12848183.5, Extended European Search Report dated Jul. 2, 2015", Tego, Inc., 4 Pages.
(Continued)

*Primary Examiner* — Omeed Alizada
(74) *Attorney, Agent, or Firm* — GTC Law Group PC & Affiliates

(57) ABSTRACT

In embodiments of the present disclosure improved capabilities are described for a method and system for a radio frequency (RF) tag configured to communicate with a network through a gateway facility, the RF tag comprising (i) an RF and analog block for receiving and transmitting an RF signal, (ii) a data processing and controller block for digital information processing, (iii) a memory store, and (iv) a communication facility, wherein the RF tag is at least in part powered by an external RF signal received by the RF and analog block, and wherein the communication facility transfers data from the RF tag to the gateway facility or transfers data from the gateway facility to the RF tag.

19 Claims, 37 Drawing Sheets

Related U.S. Application Data continuation of application No. 14/987,353, filed on Jan. 4, 2016, now Pat. No. 9,594,998, which is a continuation of application No. 14/599,070, filed on Jan. 16, 2015, now Pat. No. 9,361,568, which is a continuation-in-part of application No. 13/671,323, filed on Nov. 7, 2012, now Pat. No. 8,988,223, and a continuation-in-part of application No. 12/629,955, filed on Dec. 3, 2009, now Pat. No. 8,390,456, and a continuation-in-part of application No. 12/393,863, filed on Feb. 26, 2009, now Pat. No. 8,242,911, and a continuation-in-part of application No. 11/926,033, filed on Oct. 28, 2007, now Pat. No. 8,279,065, and a continuation-in-part of application No. 11/609,277, filed on Dec. 11, 2006.

(60) Provisional application No. 61/556,359, filed on Nov. 7, 2011, provisional application No. 61/182,776, filed on Jun. 1, 2009, provisional application No. 61/238,430, filed on Aug. 31, 2009, provisional application No. 61/031,590, filed on Feb. 26, 2008, provisional application No. 61/119,595, filed on Dec. 3, 2008, provisional application No. 60/915,838, filed on May 3, 2007, provisional application No. 60/868,107, filed on Dec. 1, 2006, provisional application No. 60/803,612, filed on May 31, 2006, provisional application No. 60/803,610, filed on May 31, 2006, provisional application No. 60/749,645, filed on Dec. 9, 2005.

(51) Int. Cl.
*H04L 29/08* (2006.01)
*G06K 7/00* (2006.01)
*G06K 7/10* (2006.01)
*G07C 5/00* (2006.01)

(52) U.S. Cl.
CPC ..... *G06K 19/073* (2013.01); *G06K 19/07309* (2013.01); *G07C 5/008* (2013.01); *H04L 67/04* (2013.01); *H04L 67/1097* (2013.01); *H04L 67/12* (2013.01); *G07C 5/006* (2013.01)

(56) References Cited

U.S. PATENT DOCUMENTS

| | | |
|---|---|---|
| 4,417,204 A | 11/1983 | Dehmel et al. |
| 5,561,702 A | 10/1996 | Lipp |
| 5,565,858 A | 10/1996 | Guthrie |
| 5,566,335 A | 10/1996 | Nash et al. |
| 5,631,863 A | 5/1997 | Fechner et al. |
| 5,838,059 A | 11/1998 | Inoue et al. |
| 5,972,156 A | 10/1999 | Brady et al. |
| 5,972,164 A | 10/1999 | Caropreso et al. |
| 6,111,780 A | 8/2000 | Bertin |
| 6,177,860 B1 | 1/2001 | Cromer et al. |
| 6,249,227 B1 | 6/2001 | Brady et al. |
| 6,285,285 B1 | 9/2001 | Mongrenier et al. |
| 6,317,028 B1 | 11/2001 | Valiulis et al. |
| 6,489,883 B1 | 12/2002 | Iiyama et al. |
| 6,615,175 B1 | 9/2003 | Gazdzinski et al. |
| 6,693,539 B2 | 2/2004 | Bowers et al. |
| 6,809,952 B2 | 10/2004 | Masui |
| 6,820,208 B2 | 11/2004 | Hoshino et al. |
| 6,861,954 B2 | 3/2005 | Levin et al. |
| 6,879,257 B2 | 4/2005 | Hisano et al. |
| 6,992,592 B2 | 1/2006 | Gilfix et al. |
| 7,030,761 B2 | 4/2006 | Bridgelall et al. |
| 7,078,761 B2 | 7/2006 | Wang et al. |
| 7,271,727 B2 | 9/2007 | Steeves |
| 7,339,476 B2 | 3/2008 | Macurek et al. |
| 7,490,766 B2 | 2/2009 | Auchinleck |
| 7,545,256 B2 | 6/2009 | O'Toole et al. |
| 7,843,032 B1 | 11/2010 | Khieu et al. |
| 7,847,697 B2 | 12/2010 | Banerjee et al. |
| 8,242,907 B2 | 8/2012 | Butler et al. |
| 8,242,908 B2 | 8/2012 | Butler et al. |
| 8,242,911 B2 | 8/2012 | Moore et al. |
| 8,248,238 B2 | 8/2012 | Butler et al. |
| 8,248,239 B2 | 8/2012 | Butler et al. |
| 8,253,567 B2 | 8/2012 | Butler et al. |
| 8,269,630 B2 | 9/2012 | Butler et al. |
| 8,279,065 B2 | 10/2012 | Butler et al. |
| 8,284,055 B2 | 10/2012 | Butler et al. |
| 8,294,579 B2 | 10/2012 | Butler et al. |
| 8,325,011 B2 | 12/2012 | Butler et al. |
| 8,368,541 B2 | 2/2013 | Moore et al. |
| 8,390,456 B2 | 3/2013 | Puleston et al. |
| 8,421,630 B2 | 4/2013 | Butler et al. |
| 8,433,879 B1 | 4/2013 | Pollack et al. |
| 8,474,726 B2 | 7/2013 | Finn |
| 8,482,385 B2 | 7/2013 | Brumer et al. |
| 8,558,699 B2 | 10/2013 | Butler et al. |
| 8,941,470 B2 | 1/2015 | Butler et al. |
| 8,947,233 B2 | 2/2015 | Butler et al. |
| 8,988,223 B2 | 3/2015 | Puleston et al. |
| 9,076,526 B2 | 7/2015 | Chung |
| 9,117,128 B2 | 8/2015 | Mats et al. |
| 9,361,568 B2 | 6/2016 | Butler et al. |
| 9,390,362 B2 | 7/2016 | Butler et al. |
| 9,405,950 B2 | 8/2016 | Mats et al. |
| 9,418,263 B2 | 8/2016 | Butler et al. |
| 9,424,447 B2 | 8/2016 | Puleston et al. |
| 9,430,732 B2 | 8/2016 | Mats et al. |
| 9,465,559 B2 | 10/2016 | Butler et al. |
| 9,471,821 B2 | 10/2016 | Mats et al. |
| 9,542,577 B2 | 1/2017 | Butler et al. |
| 9,594,998 B2 | 3/2017 | Butler et al. |
| 9,710,682 B2 | 7/2017 | Butler et al. |
| 9,842,290 B2 | 12/2017 | Butler et al. |
| 9,858,452 B2 | 1/2018 | Butler et al. |
| 9,953,193 B2 | 4/2018 | Butler et al. |
| 2002/0167397 A1 | 11/2002 | Eroglu et al. |
| 2003/0017804 A1 | 1/2003 | Heinrich et al. |
| 2003/0052176 A1 | 3/2003 | Nozawa et al. |
| 2003/0052787 A1 | 3/2003 | Zerhusen et al. |
| 2003/0095042 A1 | 5/2003 | Ebata et al. |
| 2003/0151511 A1 | 8/2003 | Duncan et al. |
| 2003/0167207 A1 | 9/2003 | Berardi et al. |
| 2004/0046643 A1 | 3/2004 | Becker et al. |
| 2004/0074975 A1 | 4/2004 | Gundlach et al. |
| 2004/0082296 A1* | 4/2004 | Twitchell, Jr. ......... G06Q 10/06 455/41.2 |
| 2004/0129769 A1 | 7/2004 | Kovach |
| 2004/0145474 A1 | 7/2004 | Schmidtberg et al. |
| 2004/0189493 A1 | 9/2004 | Estus et al. |
| 2004/0215350 A1 | 10/2004 | Roesner |
| 2004/0263319 A1 | 12/2004 | Huomo |
| 2005/0035860 A1 | 2/2005 | Taylor et al. |
| 2005/0052282 A1 | 3/2005 | Rodgers et al. |
| 2005/0162256 A1 | 7/2005 | Kinoshita |
| 2005/0164684 A1 | 7/2005 | Chen et al. |
| 2005/0164864 A1 | 7/2005 | Kasuga et al. |
| 2005/0212675 A1 | 9/2005 | Green et al. |
| 2005/0223286 A1 | 10/2005 | Forster |
| 2005/0228959 A1 | 10/2005 | D'albore et al. |
| 2005/0234785 A1 | 10/2005 | Burman et al. |
| 2005/0237198 A1 | 10/2005 | Waldner et al. |
| 2005/0241146 A1 | 11/2005 | Hamburgen et al. |
| 2005/0242957 A1 | 11/2005 | Lindsay et al. |
| 2005/0246094 A1 | 11/2005 | Moscatiello |
| 2005/0248454 A1 | 11/2005 | Hanson et al. |
| 2006/0027646 A1 | 2/2006 | Haberler et al. |
| 2006/0038724 A1 | 2/2006 | Tikhov et al. |
| 2006/0071793 A1 | 4/2006 | Pesavento |
| 2006/0080819 A1 | 4/2006 | Mcallister |
| 2006/0091196 A1 | 5/2006 | Durham et al. |
| 2006/0092742 A1 | 5/2006 | Paillet et al. |
| 2006/0114102 A1 | 6/2006 | Chang et al. |
| 2006/0133175 A1 | 6/2006 | Gutnik et al. |

(56) References Cited

U.S. PATENT DOCUMENTS

| | | |
|---|---|---|
| 2006/0164212 A1 | 7/2006 | Roz et al. |
| 2006/0169771 A1 | 8/2006 | Brookner et al. |
| 2006/0187039 A1 | 8/2006 | Bui et al. |
| 2006/0192653 A1 | 8/2006 | Atkinson et al. |
| 2006/0214772 A1 | 9/2006 | Hsieh et al. |
| 2006/0244568 A1 | 11/2006 | Tong et al. |
| 2006/0262626 A1 | 11/2006 | Lin et al. |
| 2006/0267731 A1 | 11/2006 | Chen |
| 2006/0279412 A1 | 12/2006 | Holland et al. |
| 2006/0280149 A1 | 12/2006 | Kuhl et al. |
| 2006/0288246 A1 | 12/2006 | Huynh |
| 2007/0008140 A1 | 1/2007 | Saarisalo et al. |
| 2007/0016381 A1 | 1/2007 | Kamath et al. |
| 2007/0024447 A1 | 2/2007 | Burnside et al. |
| 2007/0060075 A1 | 3/2007 | Mikuteit |
| 2007/0063920 A1 | 3/2007 | Shionoiri et al. |
| 2007/0066224 A1 | 3/2007 | d'Hont et al. |
| 2007/0075139 A1 | 4/2007 | Hammond et al. |
| 2007/0080788 A1 | 4/2007 | Manley et al. |
| 2007/0082613 A1 | 4/2007 | Cox |
| 2007/0085688 A1 | 4/2007 | Zhu et al. |
| 2007/0095615 A1 | 5/2007 | Spector |
| 2007/0096881 A1 | 5/2007 | Pillai et al. |
| 2007/0109116 A1 | 5/2007 | Burr |
| 2007/0152829 A1 | 7/2007 | Lindsay et al. |
| 2007/0159330 A1 | 7/2007 | Chakraborty et al. |
| 2007/0176782 A1 | 8/2007 | Mohalik et al. |
| 2007/0182578 A1 | 8/2007 | Smith |
| 2007/0194936 A1 | 8/2007 | Hoshina et al. |
| 2007/0210923 A1 | 9/2007 | Butler et al. |
| 2007/0222610 A1 | 9/2007 | Tagato et al. |
| 2007/0236338 A1 | 10/2007 | Maruyama et al. |
| 2007/0279277 A1 | 12/2007 | Kuramoto et al. |
| 2008/0123430 A1 | 5/2008 | Yen et al. |
| 2008/0150698 A1 | 6/2008 | Smith et al. |
| 2008/0157928 A1 | 7/2008 | Butler et al. |
| 2008/0164975 A1 | 7/2008 | Butler et al. |
| 2008/0164977 A1 | 7/2008 | Butler et al. |
| 2008/0180249 A1 | 7/2008 | Butler et al. |
| 2008/0186137 A1 | 8/2008 | Butler et al. |
| 2008/0186138 A1 | 8/2008 | Butler et al. |
| 2008/0186139 A1 | 8/2008 | Butler et al. |
| 2008/0186180 A1 | 8/2008 | Butler et al. |
| 2008/0211630 A1 | 9/2008 | Butler et al. |
| 2008/0218354 A1 | 9/2008 | Lorentz et al. |
| 2008/0252459 A1 | 10/2008 | Butler et al. |
| 2009/0058601 A1 | 3/2009 | Balachandran et al. |
| 2009/0131548 A1 | 5/2009 | Muratoglu et al. |
| 2009/0207026 A1 | 8/2009 | Banerjee et al. |
| 2009/0218891 A1 | 9/2009 | McCollough et al. |
| 2009/0237217 A1 | 9/2009 | Ohkubo et al. |
| 2009/0261953 A1 | 10/2009 | Kang et al. |
| 2009/0289776 A1 | 11/2009 | Moore et al. |
| 2010/0011211 A1 | 1/2010 | Anemikos et al. |
| 2010/0051703 A1 | 3/2010 | Kobae et al. |
| 2010/0060456 A1 | 3/2010 | Forster et al. |
| 2010/0085165 A1 | 4/2010 | Villa et al. |
| 2010/0119264 A1 | 5/2010 | Yamaguchi et al. |
| 2010/0134257 A1 | 6/2010 | Puleston et al. |
| 2010/0134293 A1 | 6/2010 | Fujishiro et al. |
| 2010/0156606 A1 | 6/2010 | Gold |
| 2011/0006900 A1 | 1/2011 | Nyffeler et al. |
| 2011/0012736 A1 | 1/2011 | Potyrailo et al. |
| 2011/0133903 A1 | 6/2011 | Alsafadi |
| 2011/0147467 A1 | 6/2011 | Choi et al. |
| 2011/0156873 A1 | 6/2011 | Choi et al. |
| 2011/0168789 A1 | 7/2011 | Kobayashi et al. |
| 2012/0025985 A1 | 2/2012 | Bolander et al. |
| 2012/0025988 A1 | 2/2012 | Harada |
| 2012/0133490 A1 | 5/2012 | Downie et al. |
| 2012/0169468 A1 | 7/2012 | Berrios et al. |
| 2012/0169469 A1 | 7/2012 | Berrios et al. |
| 2012/0169474 A1 | 7/2012 | Berrios et al. |
| 2012/0182123 A1 | 7/2012 | Butler et al. |
| 2012/0200389 A1 | 8/2012 | Solomon |
| 2012/0206243 A1 | 8/2012 | Butler et al. |
| 2012/0217307 A1 | 8/2012 | Martin et al. |
| 2012/0223149 A1 | 9/2012 | Kato et al. |
| 2012/0261479 A1 | 10/2012 | Moore et al. |
| 2012/0273577 A1 | 11/2012 | Kim et al. |
| 2012/0319823 A1* | 12/2012 | Butler .................. G06K 7/0008 340/10.1 |
| 2013/0084803 A1 | 4/2013 | Hall et al. |
| 2013/0105571 A1 | 5/2013 | Biset et al. |
| 2013/0121057 A1 | 5/2013 | Le Neel et al. |
| 2013/0126364 A1 | 5/2013 | Masin et al. |
| 2013/0176115 A1 | 7/2013 | Puleston et al. |
| 2013/0200162 A1 | 8/2013 | Dokai et al. |
| 2013/0334139 A1 | 12/2013 | Blickhan et al. |
| 2014/0103117 A1 | 4/2014 | Takeuchi et al. |
| 2014/0133941 A1 | 5/2014 | Matsumoto et al. |
| 2014/0138448 A1 | 5/2014 | Lee et al. |
| 2014/0197951 A1 | 7/2014 | Savarese et al. |
| 2014/0203915 A1 | 7/2014 | Puleston et al. |
| 2014/0229387 A1 | 8/2014 | Chow et al. |
| 2014/0235364 A1 | 8/2014 | Savarese et al. |
| 2014/0266621 A1 | 9/2014 | Jones et al. |
| 2014/0292490 A1 | 10/2014 | Butler et al. |
| 2015/0022358 A1 | 1/2015 | Huang |
| 2015/0061840 A1 | 3/2015 | Butler et al. |
| 2015/0129666 A1 | 5/2015 | Butler |
| 2015/0130593 A1 | 5/2015 | Mats |
| 2015/0235121 A1 | 8/2015 | Bibl et al. |
| 2015/0302234 A1 | 10/2015 | Mats et al. |
| 2015/0324681 A1 | 11/2015 | Mats et al. |
| 2016/0048709 A1 | 2/2016 | Butler et al. |
| 2016/0048712 A1 | 2/2016 | Butler et al. |
| 2016/0117583 A1 | 4/2016 | Butler et al. |
| 2016/0210084 A1 | 7/2016 | Butler et al. |
| 2016/0239696 A1 | 8/2016 | Mats et al. |
| 2016/0314327 A1 | 10/2016 | Butler et al. |
| 2016/0321480 A1 | 11/2016 | Hamlin et al. |
| 2017/0061174 A1 | 3/2017 | Butler et al. |
| 2017/0147915 A1 | 5/2017 | Butler et al. |
| 2017/0270323 A1 | 9/2017 | Butler et al. |
| 2018/0204029 A1 | 7/2018 | Butler et al. |
| 2018/0277241 A1 | 9/2018 | Hamlin et al. |

FOREIGN PATENT DOCUMENTS

| | | |
|---|---|---|
| EP | 1460548 A1 | 9/2004 |
| EP | 1626364 A2 | 2/2006 |
| EP | 1760640 A1 | 3/2007 |
| EP | 1850289 A1 | 10/2007 |
| EP | 1887581 A1 | 2/2008 |
| EP | 1921570 A2 | 5/2008 |
| EP | 1958172 A2 | 8/2008 |
| EP | 2147399 A1 | 1/2010 |
| EP | 2208390 A2 | 7/2010 |
| EP | 2368235 A1 | 9/2011 |
| FR | 2908541 A1 | 5/2008 |
| GB | 2231419 | 11/1990 |
| GB | 2348986 | 10/2000 |
| GB | 2425690 | 11/2006 |
| JP | 59135600 A | 9/1984 |
| JP | 09167217 A | 6/1997 |
| JP | 10289976 A | 10/1998 |
| JP | 13024413 A | 1/2001 |
| JP | 2001167241 A | 6/2001 |
| JP | 2001187611 A | 7/2001 |
| JP | 200283277 | 3/2002 |
| JP | 2002334310 A | 11/2002 |
| JP | 2003086698 A | 3/2003 |
| JP | 2002164507 A | 6/2003 |
| JP | 2003271903 A | 9/2003 |
| JP | 2004021351 A | 1/2004 |
| JP | 2004151968 A | 5/2004 |
| JP | 2005190386 A | 7/2005 |
| JP | 2005259121 A | 9/2005 |
| JP | 2005310128 A | 11/2005 |
| JP | 200624102 A | 1/2006 |
| JP | 2006259956 A | 9/2006 |
| JP | 2007109216 A | 4/2007 |
| JP | 2009521740 | 6/2009 |

(56) References Cited

FOREIGN PATENT DOCUMENTS

| | | |
|---|---|---|
| JP | 2010535365 | 11/2010 |
| JP | 2011516933 | 5/2011 |
| KR | 20090005598 | 1/2009 |
| WO | 2001094016 A1 | 12/2001 |
| WO | 2003026724 A1 | 4/2003 |
| WO | 2005001744 A2 | 1/2005 |
| WO | 2006045395 A1 | 5/2006 |
| WO | 2007023213 A2 | 3/2007 |
| WO | 2007065747 A1 | 6/2007 |
| WO | 2007068002 A2 | 6/2007 |
| WO | 2007068002 A3 | 2/2008 |
| WO | 2008137806 A1 | 11/2008 |
| WO | 2009058778 A2 | 5/2009 |
| WO | 2009058778 A8 | 5/2009 |
| WO | 2009058778 A3 | 6/2009 |
| WO | 2009058778 A9 | 8/2009 |
| WO | 2010065688 A1 | 6/2010 |
| WO | 2011048234 A1 | 4/2011 |
| WO | 2011157750 A2 | 12/2011 |
| WO | 2013064741 A1 | 5/2013 |
| WO | 2013070747 A1 | 5/2013 |
| WO | 2015172053 A1 | 11/2015 |
| WO | 2016054177 A1 | 4/2016 |
| WO | 2016115424 A1 | 7/2016 |
| WO | 2016115424 A9 | 7/2016 |
| WO | 2016054177 A9 | 1/2017 |
| WO | 2017008000 A1 | 1/2017 |

OTHER PUBLICATIONS

Dalton, et al., "Using RFID Technologies to Reduce Blood Transfusion Errors", White Paper by Intel Corporation, Autentica, Cisco Systems, and San Raffaele Hospital,, Sep. 2005, pp. 1-8.
PCT/US2015/029938, "International Application Serial No. PCT/US2015/029938, International Search Report and Written Opinion dated Jul. 31, 2015", 15.
PCT/US2015/029938, "International Application Serial No. PCT/US2015/029938, International Preliminary Report on Patentability and Written Opinion dated Nov. 17, 2016", Tego, Inc., 12 Pages.
PCT/US2015/053172, "International Application Serial No. PCT/US2015/053172 International Search Report and Written Opinion dated Feb. 23, 2016", Tego, Inc., 14 pages.
PCT/US2015/053172, "International Application Serial No. PCT/US2015/053172, International Preliminary Report on Patentability and Written Opinion dated Apr. 13, 2017", Tego, Inc., 10 Pages.
PCT/US2016/013535, "International Application Serial No. PCT/US2016/013535, International Preliminary Report on Patentability and Written Opinion dated Jul. 27, 2017", Tego, Inc., 12 Pages.
PCT/US2016/013535, "International Application Serial No. PCT/US2016/013535, International Search Report and Written Opinion dated Apr. 29, 2016", Tego, Inc., 21 Pages.
PCT/US2016/041477, "International Application Serial No. PCT/US2016/041477, International Search Report and Written Opinion dated Sep. 22, 2016", Tego, Inc., 10 pages.
08843431.1, "Extended European Search Report and Written Opinion, for European Application No. 08843431.1 dated Oct. 4, 2011", 6 pages.
09831087.3, "European Application Serial No. 09831087.3, Extended European Search Report dated Feb. 24, 2014", Tego Inc., 8 Pages.
U.S. Appl. No. 11/609,277, "U.S. Appl. No. 11/609,277, Final Office Action dated Jan. 6, 2010", 14 pages.
U.S. Appl. No. 11/609,277, "U.S. Appl. No. 11/609,277, Non-Final Office Action dated Mar. 5, 2009", 10 pages.
U.S. Appl. No. 11/877,932, "U.S. Appl. No. 11/877,932, Non-Final Office Action dated Aug. 31, 2010", 11 pages.
U.S. Appl. No. 11/877,932, "U.S. Appl. No. 11/877,932, Non-Final Office Action dated Jun. 14, 2011", 13 pages.
U.S. Appl. No. 11/877,932, "U.S. Appl. No. 11/877,932 , Non-Final Office Action dated May 7, 2009", 8 pages.
U.S. Appl. No. 11/877,932, "U.S. Appl. No. 11/877,932, Final Office Action dated Jan. 25, 2010", 12 pages.
U.S. Appl. No. 11/877,943, "U.S. Appl. No. 11/877,943, Non-Final Office Action dated Sep. 9, 2010", 14 pages.
U.S. Appl. No. 11/877,943, "U.S. Appl. No. 11/877,943, Non-Final Office Action dated May 29, 2009", 7 pages.
U.S. Appl. No. 11/877,943, "U.S. Appl. No. 11/877,943, Non-Final Office Action dated Jun. 9, 2011", 14 pages.
U.S. Appl. No. 11/877,943, "U.S. Appl. No. 11/877,943, Final Office Action dated Jan. 21, 2010", 11 pages.
U.S. Appl. No. 11/923,185, "U.S. Appl. No. 11/923,185, Non-Final Office Action dated Apr. 18, 2011", 15 pages.
U.S. Appl. No. 11/923,185, "U.S. Appl. No. 11/923,185, Non-Final Office Action dated Jul. 26, 2010", 14 pages.
U.S. Appl. No. 11/923,185, "U.S. Appl. No. 11/923,185, Non-Final Office Action dated Jun. 10, 2009", 7 pages.
U.S. Appl. No. 11/923,185, "U.S. Appl. No. 11/923,185, Final Office Action dated Dec. 10, 2009", 10 pages.
U.S. Appl. No. 11/923,565, "U.S. Appl. No. 11/923,565, Non-Final Office Action dated Jul. 21, 2010", 12 pages.
U.S. Appl. No. 11/923,565, "U.S. Appl. No. 11/923,565, Final Office Action dated Dec. 8, 2009", 10 pages.
U.S. Appl. No. 11/923,565, "U.S. Appl. No. 11/923,565, Non-Final Office Action dated Apr. 18, 2011", 11 pages.
U.S. Appl. No. 11/923,565, "U.S. Appl. No. 11/923,565, Non-Final Office Action dated Jun. 11, 2009", 7 pages.
U.S. Appl. No. 11/923,577, "U.S. Appl. No. 11/923,577, Non-Final Office Action dated Jun. 10, 2009", 8 pages.
U.S. Appl. No. 11/923,577, "U.S. Appl. No. 11/923,577, Final Office Action dated Dec. 28, 2009", 11 pages.
U.S. Appl. No. 11/926,033, "U.S. Appl. No. 11/926,033, Non Final Office Action dated Jul. 22, 2009", 9 pages.
U.S. Appl. No. 11/926,033, "U.S. Appl. No. 11/926,033, Non-Final Office Action dated May 13, 2011", 15 pages.
U.S. Appl. No. 11/926,033, "U.S. Appl. No. 11/926,033, Non-Final Office Action dated Aug. 17, 2010", 14 pages.
U.S. Appl. No. 11/926,033, "U.S. Appl. No. 11/926,033, Final Office Action dated Jan. 21, 2010", 11 pages.
U.S. Appl. No. 11/926,040, "U.S. Appl. No. 11/926,040, Non Final Office Action dated Oct. 5, 2009", 12 pages.
U.S. Appl. No. 11/926,043, "U.S. Appl. No. 11/926,043, Non-Final Office Action dated Sep. 29, 2009", 10 pages.
U.S. Appl. No. 11/926,045, "U.S. Appl. No. 11/926,045, Non Final Office Action dated Aug. 5, 2009", 8 pages.
U.S. Appl. No. 11/926,050, "U.S. Appl. No. 11/926,050, Non-Final Office Action dated Jul. 7, 2009", 8 pages.
U.S. Appl. No. 12/393,863, "U.S. Appl. No. 12/393,863, Non-Final Office Action dated Mar. 26, 2010", 15 pages.
6846556.6, "Extended European Search Report and Written Opinion, for European Application No. 6846556.6, dated Aug. 31, 2011", 9 pages.
8769286.9, "Extended European Search Report and Written Opinion, for European Application No. 8769286.9, dated Apr. 5, 2011", 4 pages.
ATA, "Chapter 9—Automated ID and Data Capture", Air Transport Association of America, Inc., Revision 2013.1, 209 pages.
PCT/US06/61882, "International Application Serial No. PCT/US06/061882, International Search Report and Written Opinion dated Dec. 18, 2007", Tego Inc., 12 pages.
PCT/US06/61882, "International Application Serial No. PCT/US06/61882, International Preliminary Report on Patentability dated Dec. 18, 2007", Tego Inc., 6 pages.
PCT/US08/62581, "International Application Serial No. PCT/US08/62581, International Search Report and Written Opinion dated Sep. 26, 2008", 9 pages.
PCT/US08/81455, "International Application Serial No. PCT/US08/81455, International Search Report and Written Opinion dated Apr. 29, 2009", 11 pages.
PCT/US09/66485, "International Application Serial No. PCT/US09/66485, Search Report and Written Opinion dated Mar. 16, 2010", 14 pages.

(56) References Cited

OTHER PUBLICATIONS

PCT/US2012/063922, "International Application Serial No. PCT/US2012/063922, International Preliminary Report on Patentability and Written Opinion dated May 22, 2014", Tego Inc., dated May 22, 2014, 10 Pages.
PCT/US2012/063922, "International Application Serial No. PCT/US2012/063922, International Search Report and Written Opinion dated Mar. 20, 2013", Tego Inc., 7 pages.
15789884.2, "European Application Serial No. 15789884.2, Extended European Search Report dated Nov. 14, 2017", Tego, Inc., 7 Pages.
15847501.2, "European Application Serial No. 15847501.2, Extended European Search Report dated Jun. 6, 2018", Tego, Inc., 7 pages.
EP16737936.1, "European Application Serial No. 16737936.1, Extended European Search Report dated Aug. 24, 2018", Tego, Inc., 7 pages.
PCT/US2016/041477, "International Application Serial No. PCT/US2016/041477, International Preliminary Report on Patentability and Written Opinion dated Jan. 18, 2018", Tego, Inc., 9 Pages.

\* cited by examiner

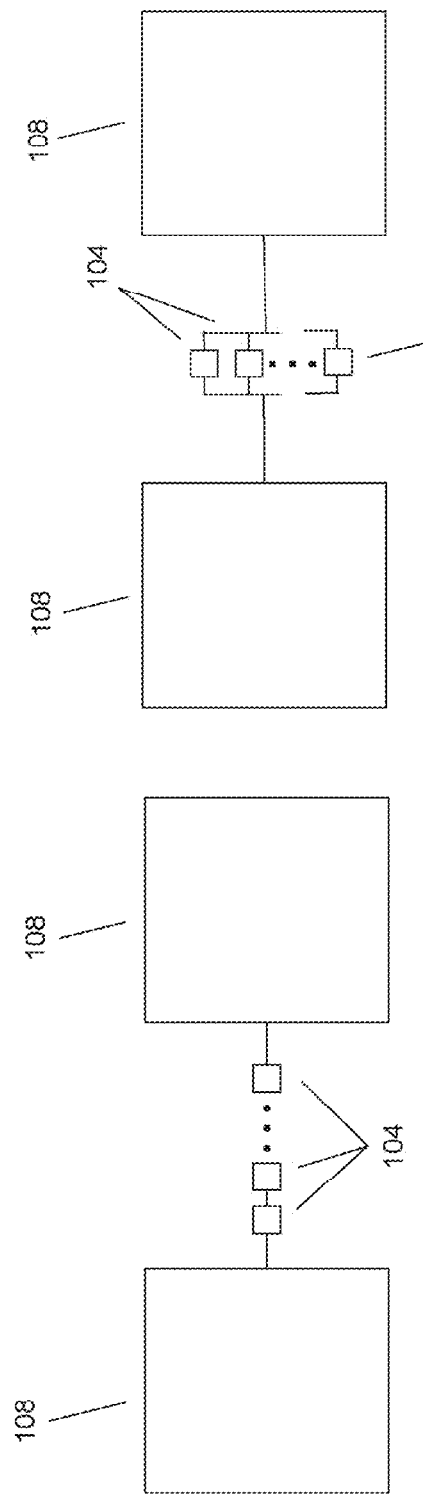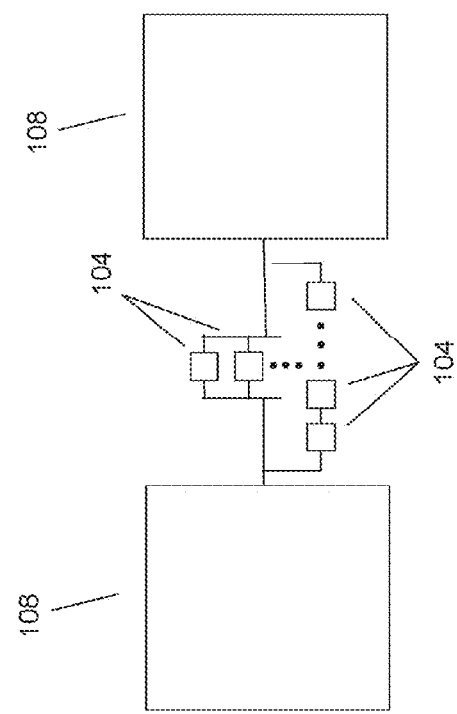

RF TAG NETWORK CONNECTIVITY THROUGH GATEWAY FACILITY

CROSS-REFERENCE TO RELATED APPLICATIONS

This application is a continuation of U.S. patent application Ser. No. 15/427,175 filed Feb. 8, 2017.

U.S. patent application Ser. No. 15/427,175 is a continuation of U.S. patent application Ser. No. 14/987,353 filed Jan. 4, 2016, now U.S. Pat. No. 9,594,998.

U.S. patent application Ser. No. 14/987,353 is a continuation of U.S. patent application Ser. No. 14/599,070, filed Jan. 16, 2015, now U.S. Pat. No. 9,361,568.

U.S. patent application Ser. No. 14/599,070 is a continuation-in-part of U.S. patent application Ser. No. 13/671,323, filed Nov. 7, 2012, now U.S. Pat. No. 8,988,223, and which claims the benefit of U.S. Provisional Patent Application Ser. No. 61/556,359, filed on Nov. 7, 2011.

U.S. patent application Ser. No. 13/671,323 is a continuation-in-part of U.S. patent application Ser. No. 12/629,955, filed Dec. 3, 2009, now U.S. Pat. No. 8,390,456, and which claims the benefit to U.S. Provisional Patent Application Ser. No. 61/182,776 filed Jun. 1, 2009 and U.S. Provisional Patent Application Ser. No. 61/238,430 filed Aug. 31, 2009.

U.S. patent application Ser. No. 12/629,955 is a continuation-in-part of U.S. patent application Ser. No. 12/393,863, filed Feb. 26, 2009, now U.S. Pat. No. 8,242,911, and which claims the benefit of U.S. Provisional Patent Application Ser. No. 61/031,590 filed Feb. 26, 2008 and U.S. Provisional Patent Application Ser. No. 61/119,595 filed Dec. 3, 2008.

U.S. patent application Ser. No. 12/393,863 is a continuation-in-part of U.S. patent application Ser. No. 11/926,033, filed Oct. 28, 2007, now U.S. Pat. No. 8,279,065, and U.S. patent application Ser. No. 11/609,277, filed Dec. 11, 2006.

U.S. patent application Ser. No. 11/926,033 claims the benefit of U.S. Provisional Patent Application Ser. No. 60/915,838 filed May 3, 2007.

U.S. patent application Ser. No. 11/609,277 claims the benefit of U.S. Provisional Patent Application Ser. No. 60/868,107 filed Dec. 1, 2006; U.S. Provisional Patent Application Ser. No. 60/803,612 filed May 31, 2006; U.S. Provisional Patent Application Ser. No. 60/803,610 filed May 31, 2006; and U.S. Provisional Patent Application Ser. No. 60/749,645 filed Dec. 9, 2005.

All of the above patent applications and patents are hereby incorporated herein by reference in their entirety.

BACKGROUND

Field

This invention relates to Radio Frequency Identification (RFID) tags, and more specifically to methods and systems for storing information in the memory of a RFID tag where the memory is capable of surviving harsh environments.

Description of the Related Art

Radio-frequency identification (RFID) is a wireless non-contact technology for the storing and transfer of information for the purposes of automatically identifying and tracking tags attached to objects. However, RFID tags are susceptible to ionizing radiation, and so are limited in use in some fields, such as medical, sterilization, aerospace, and the like. These fields would greatly benefit from a RFID tag that was not susceptible to ionizing radiation, such as for tracking information of samples, components, patients, and the like. Therefore a need exists for RFID tags that have memories and memory configurations that are able to maintain data integrity through such environments.

SUMMARY

Disclosed herein include embodiments for a system and method for a radio frequency identification (RFID) tag comprising a memory, the memory comprising a plurality of one time programmable (OTP) non-volatile memory locations for storing data, wherein the plurality of OTP non-volatile memory locations are configured to emulate a hardened memory system that retains data stored in the OTP non-volatile memory locations, wherein the data stored is retained through exposure of the RFID tag to an ionizing radiation exposure, where the memory of the present disclosure has been shown to withstand ionizing radiation exposure with an intensity level equal to or greater than 25 kGy. Further, the OTP non-volatile memory locations may be operable through the exposure of the RFID tag to the ionizing radiation exposure. Ionizing radiation may be from gamma radiation, electron beam radiation, and the like. In embodiments, the plurality of OTP non-volatile memory locations may be configured as redundant memory, where data written to at least a first of the plurality of OTP non-volatile memory locations is redundantly written to a second of the plurality of OTP non-volatile memory locations, and where the data is read from the second of the plurality of OTP non-volatile memory locations in the event that the first of the plurality of OTP non-volatile memory locations is determined to be damaged. The plurality of OTP non-volatile memory locations may be configured to emulate at least one multiple time programmable (MTP) memory location for storing the data. For instance, the plurality of OTP memory locations may be configured to provide a write depth of N for the at least one MTP memory location, where each of the N number of the plurality of OTP memory locations provides a single write location for an RFID interrogator write operation to the at least one MTP memory location, and where a pointer is automatically incremented to a next of the N number of the plurality of OTP memory locations as a result of the RFID interrogator write operation and in preparation for a subsequent RFID interrogator write operation.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 9AA shows an embodiment of how RFID tags may be connected to antennas in a series configuration via a super strap.

FIG. 9AB shows an embodiment of how RFID tags may be connected to antennas in a parallel configuration via a super strap.

FIG. 9AC shows an embodiment of how RFID tags may be connected to antennas in a series-parallel configuration via a super strap.

DETAILED DESCRIPTION

Figure 1:
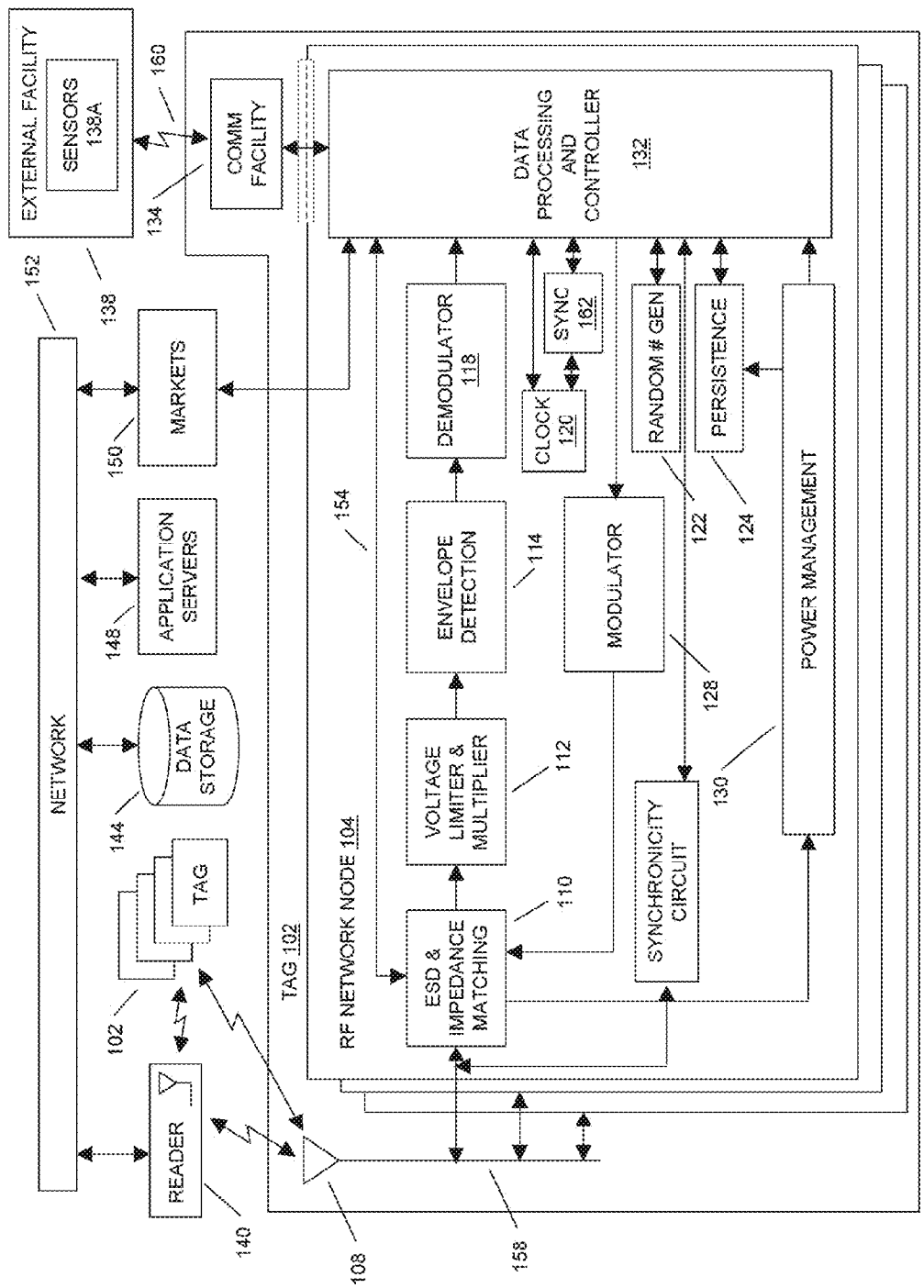
FIG. 1 shows a schematic of the RFID tag system and associated systems.

In aspects of the systems and methods described herein, a radio frequency identification (RFID) tag may use multiple RF network nodes (e.g. radio microchips) to communicate information to a RFID reader, a network, other RFID network nodes, or the like. The communication of the information may be provided to the RFID reader using at least one antenna, using a communication facility, using both the at least one antenna and the communication facility, or the like.

In aspects of the systems and methods described herein, each of the multiple RF network nodes may include radio frequency circuits, digital circuits, memory storage, communication facilities, and the like for storing and transmitting information to RFID readers, networks, other RFID tags, markets, applications, data stores, and the like. The RFID tag may include circuitry for inter RF network node communication that may provide RF network node redundancy, increased functionality, improved connectivity to the reader, increased RFID tag memory, RFID tag memory management, and the like.

In embodiments, the RF network node redundancy may provide for a more robust RFID tag that may provide greater resistance to damage, greater capability to work in harsh environments, functionality and memory when damaged, or the like. RF network node redundancy may support a protocol of one RF network node providing a backup to another RF network node. For example, if one RF network node is damaged, another RF network node may assume the role of the damaged RF network node.

In embodiments, the increase RFID tag functionality may be provided by the inter RF network node communication. On the multiple RF network node RFID tag, the different RF network nodes may provide different functionality to the RFID tag. For example, one of the RF network nodes may provide memory management while another RF network node may provide encryption capabilities. In an embodiment, there may be a master RF network node that may coordinate the capabilities that the different RF network nodes may provide.

Aspects of the systems and methods described herein may provide for improved connectivity with the RFID reader. By using multiple antennas and multiple RF network nodes, the RFID tag may be able to communicate using different frequencies, may be able to adjust the impedance of the RF network node for an improved signal quality, may have an increased range of transmission, or the like. By communicating with multiple frequencies, the RFID tag may be able to select a frequency that provides an advantageous transmission characteristic for different environments such as liquids and metals. The RFID tag may be able to select one of the available antennas that may provide the best impedance match to the RFID tag and RF network nodes. The impedance match may provide a clearer transmission signal from the RFID tag to the RFID reader.

In an embodiment, the multiple RF network node RFID tag reflecting or broadcasting at the same time may improve the signal strength. The improved signal strength may increase the RF amplitude that may increase the range of the RF signal. The increased signal strength may be particularly advantageous when the tag is applied to an item that contains a liquid. The liquid may absorb radio waves, and the increased signal strength may allow the signal to reflect or broadcast farther despite the presence of a liquid.

In an embodiment, the multiple RF network node RFID tag reflecting or broadcasting together may improve the signal clarity. The simultaneous reflecting or broadcasting of a plurality of RF network nodes may provide a more rapid RF transition similar to a square wave. The rapid RF transition may allow the signal to be received faster by the reader. In an embodiment, less expensive readers may be used because the RF signal may be clearer. In an embodiment, the clearer signal may be important when the RFID tag is on a metal object that tends to reflect the RF signal.

Aspects of the systems and methods described herein may provide for increased memory for the RFID tag. Using the inter RF network node connectivity, the memory for the multiple RF network nodes may be managed to provide expanded memory, redundant memory, distributed memory, or the like. For example, if each of four RF network nodes has 8 Kb of memory, the memory of all four RF network nodes may be combined to provide a total memory for the RFID tag of 32 Kb. In another example, the four RF network nodes may provide redundant memory where all four of the RF network nodes store the same information.

Aspects of the systems and methods described herein may provide for interfacing with external sensors. The sensors may provide information such as temperature, humidity, acceleration, gas levels, smoke, heat, or the like. The RFID tag may read the sensors and the information may be saved to the RFID tag, the RFID tag may provide the stored sensor information to the reader on the next read request. The sensor information may be used by the RFID tag to calculate freshness of a product, the environment in which a product is stored, the handling history of a product, or the like.

Aspects of the systems and methods described herein may provide for inter-RFID tag communication using a communication facility that may include a gateway facility. Using the gateway facility, the RFID tag may be able to communicate to a network, to other network capable devices, to other network capable RFID tags, or the like. The inter-RFID tag communication may allow the RFID tags to provide redundant information between RFID tags. Additionally, the RFID tags may be able to communicate information from one RFID tag to another RFID tag to form a tag network that may be similar to a mesh network where information may be transmitted using a number of different routes.

In an embodiment, the cost of producing the RFID tag 100 may be reduced because the RF network node may not require precise placement on an antenna lead. Placement machinery may be expensive and the placement sequence may be time-consuming, both of which may result in increased RFID tag cost. The RF network nodes as described herein may be randomly placed on the antenna lead.

In an embodiment, smaller RF network nodes may be used because non-precise placement is more easily performed. Smaller RF network nodes may be less expensive. By contrast, machinery used at present to place RF network nodes may not be able to place the smallest available RF network nodes.

The increased capabilities of the multiple RF network node RFID tag may provide increased capabilities for markets to track materials, track products, track employees, track patients, provide security, and the like. For example, the increased memory capabilities of the multiple RF network node RFID tag may allow for the storage of tracking information through a distribution system. At each point in the distribution system the RFID tag may receive and transmit information to and from the reader.

In another market example, the increased RFID tag memory may allow the storage of patient information that may be read to determine if the patient is to receive a certain medicine. The RFID tag may contain enough increased memory to store all of the patient's medicine information, surgical history, medical history, and the like that may aid in the proper administering of medications. For example, a nurse may use a portable reader to read the patient information and medicine information to assure that the medicine is appropriate for the patient.

In another example, the multiple RF network node RFID tags may store security information that may determine if a person may enter a room, building, facility, or the like. The RFID tag may store personal information, security access information, record location information to track the movements of the person within a facility, or the like. Throughout this disclosure the phrase "such as" means "such as and without limitation". Throughout this disclosure the phrase "for example" means "for example and without limitation".

Referring to FIG. 1, an embodiment of the RFID tag 102 and associated interfaces, facilities, markets, and applications is shown. Features of the depicted embodiment are directed to optimizing certain interfaces that are shown in FIG. 1. As would be understood in the art, for example, an interface between an antenna 108 and an RF network node 104 may be susceptible to electrostatic discharge (ESD), a sudden and momentary electric current that may flow when an excess of electric charge finds a path to an object at a different electrical potential, such as ground, power, or the like. The term may often be used in electronics and other industries to describe momentary unwanted currents that may cause damage to electronic equipment. The antenna 108 may be a source of such accumulated charge, which may lead to electrostatic discharge into the electronics of a RFID tag 102. In embodiments, there may be an ESD and impedance matching 110 components as a part of a RF and Analog block 302 that reduce the accumulation of charge that may lead to ESD, reduce the effects of ESD, protect against ESD, or the like.

It would be further understood in the art, as another example, that the interface between the antenna 108 and the RF network node 104 may be susceptible to impedance mismatch due to changes in the antenna 108 configurations, changes in the environment, changes in electrical properties of components, or the like. Impedance matching may attempt to make the output impedance of a source, the antenna 108 for instance, equal to the input impedance of the load to which it is ultimately connected, the input to the RF network node 104 for instance. Impedance matching is usually implemented in order to maximize the power transfer and minimize reflections from the load. The concept of impedance matching may be applied when energy is transferred between a source and a load. Sometimes the term "impedance matching" may be used more generally to mean "choosing impedances that work well together" instead of "making two impedances complex conjugate". The more general interpretation includes impedance bridging, where the load impedance may be much larger than the source impedance. Bridging connections may be used to maximize the voltage transfer, rather than the power transfer.

In embodiments, the RF network node 104 may contain the ESD and impedance matching 110 functional block. The ESD and impedance matching 110 functional block may include multiple switch elements to connect or disconnect impedance components such as capacitors, inductors, resisters, and combinations thereof. State control of these switches may determine the impedance match between the antenna 108 and the RF network node 104. The setting of these switches may be controlled by analog or digital circuit configurations. In embodiments, impedance matching control may be performed automatically to tune the impedance match by analog circuitry upon reception of a carrier wave, with impedance matching implemented in the RF and analog block 302 of the RF network node 104. The impedance match from tuning the impedance matching may increase the power level received from the antenna. In embodiments, there may be too much power being delivered to the RF network node 104, and the circuit may need to be de-tuned (mismatched impedance) to reduce the received power. Detuning may be performed if voltages exceed the operating supply voltage, to ensure that circuitry connected to the supply derived from the RF power is not damaged. In an embodiment, the detuning mechanism may serve as a voltage limiter to the RF network node 104 circuitry. In embodiments, control of the impedance matching in the ESD and impedance matching 110 functional block may provide a way to increase received power by tuning to improve the impedance match, or protecting the circuitry on the RF network node 104 from high input voltages by detuning the impedance match.

In embodiments, impedance matching may be controlled digitally by combinatorial logic, sequential logic, a program subroutine, or the like and may be implemented after the power to the RF network node 104 has stabilized and a data processing and controller block 132 has been powered up. The digital control for impedance matching may be alterable though programming internal to the RF network node 104, or externally through read/write capabilities of the RF network node 104. Digital control is described in more detail below.

In embodiments, implementation of impedance matching between the antenna 108 and the RF network node 104 may provide a way to automatically adjust to initial conditions upon power up due to a received modulated carrier from a reader 140. This automatic adjustment to impedance matching may improve the chances for the RFID tag 102 to communicate with the reader 140 when distance, environment, materials, or the like, would otherwise limit the initiation of such communication. In embodiments, implementation of impedance matching between the antenna 108 and the RF network node 104 may provide a way to systematically adjust impedance matching to maintain maximum received power or voltage. This systematic adjustment may allow for compensation from impedance mismatches resulting from changes in environment, such as moisture, proximate conductors such as metals or liquids, or the like. The ability of the RFID tag 102 to adjust impedance matching may allow the RFID tag 102 to operate more reliably under changing environmental and product usage conditions.

Another embodiment of impedance matching may be dynamic impedance matching. Dynamic impedance matching may include adjusting the center frequency sent by the reader and received by the RFID tag 102, dynamically adjusting the capacitance of the RFID tag 102 to match the impedance of the object to which the RFID tag 102 is attached, to match the impedance of the environment where the RFID tag 102 may be operating, or the like. Depending on the type of object on which the RFID tag 102 is attached (e.g. water or metal) or the operating conditions, different center frequencies may perform better than others. For example, in the US, the RFID tag center frequency may be 915 MHZ, but if the RFID tag 102 is attached to a case of water, the RFID tag 102 communication may be improved using a different center frequency.

In an embodiment, the center frequency may be determined by programmable tuning of the RFID tag 102 center frequency. Programmable tuning of the RFID tag 102 center frequency may be accomplished by a user transmitting a digital word from a reader 140 that represents the new frequency with which the reader 140 and RFID tag 102 combination will communicate. The RFID tag 102 may receive the digital word and may change the center frequency with which the RFID tag 102 may receive reader signals. In an embodiment, the digital word may be modified by the reader 140 and/or the RFID tag 102 until a center frequency is established that provides for the optimum communication frequency. In an embodiment, the center frequency digital word may be initiated by a user using a reader 140 interface. The user may initiate the center frequency digital word based on the object on which the RFID tag 102 is attached, based on the environment in which the RFID tag 102 is operating, or the like.

In an embodiment, the programmable tuning of the frequency may be combined with an RFID tag 102 power meter (e.g. the power meter is described in more detail herein) to determine the optimum center frequency. For example, the user may transmit a digital word representing a starting center frequency. The RFID tag 102 may adjust the receiving center frequency and the power meter may measure the power difference between the original center frequency and the new center frequency based on the received digital word. The power meter readings may be compared and a new frequency digital word may be determined based on the change in the RFID tag 1021 received signal strength. In an embodiment, the reader 140 and RFID tag 102 may continue the adjusting of the center frequency until the optimum center frequency is determined. As may be understood, the center frequency adjustment process may be used to adjust to the optimum center frequency for the object on which the RFID tag is attached.

In an embodiment, in coordination to optimizing the center frequency, the impedance match of the RFID tag 102 to the antenna may be dynamically adjusted using a bank of variable capacitors (varactor). In an embodiment, the dynamic impedance adjustment may be performed separately from the center frequency optimization, in parallel with the center frequency optimization, in series with the center frequency optimization, in response to a request from the reader 140, in request from the RFID tag 102, or the like. In an embodiment, the varactor capacitance may be adjusted based on a voltage: in the case of the RFID tag 102 the voltage may be an actual voltage measured by the power meter, a power meter predicted voltage, or the like.

As one example of dynamic impedance matching, a digital word representing a new center frequency may be sent by the reader 140, the digital word may have been determined by a user. The RFID tag 102 may receive the digital word and may use the word to adjust the center frequency used by the RFID tag. The power meter may measure the change in the received signal strength and may adjust the impedance match with the antenna 108 by adjusting the varactors. Once the impedance has been adjusted, the power meter may again measure the received signal strength and a new digital word may be determined to again adjust the center frequency to optimize the received signal strength. This sequence of adjusting the digital word, adjusting the impedance with varactors, and determining a new digital word may continue until an optimum center frequency is determined. It should be understood that there may be many different sequence processes for dynamically adjusting the impedance using the digital word and varactors and this example is used for illustration purposes only and should not be considered as the only method of optimizing the center frequency.

In embodiments, the RF network node 104 may contain a voltage limiter and multiplier 112 functions that boost the voltage of the incoming modulated carrier, while limiting the voltage of the boosted signal to a predetermined maximum value. The voltage limiter and multiplier 112 function may include a pre-multiplier stage, an intra-multiplier, an RF power limiter, a voltage limiter, a current limiter, an overvoltage limiter, and the like. The boost in the voltage may be a multiplying factor, such as times three, times five, times eight, or the like. In embodiments, the output of the multiplier may produce voltages of 5 volts or greater. Additionally, the operational circuitry of the RF network node 104 may be of a technology that may be damaged if exposed to a voltage in excess of a specified maximum voltage, for instance 2 volts. The voltage limiter may be required to limit the voltage to this circuitry to a voltage that is less than this specified maximum voltage, for instance 1.8 volts. In embodiments, the voltage limiter and multiplier 112 may condition signals received from the ESD and impedance matching 110 circuitry, and may provide output to an envelope detection circuitry 114, as shown in FIG. 1.

FIG. 1 shows an embodiment of a boosted and limited modulated carrier passing from the voltage limiter and multiplier 112, on to the envelope detection 114 block and a demodulator 118 block. At the output of the voltage limiter and multiplier 112, the signal's power may be boosted and limited, but still in the form of a modulated carrier. In embodiments, the received modulated carrier may be amplitude-shift key (ASK) modulated, a form of modulation, which represents digital data as variations in the amplitude of a carrier wave. In embodiments, the received modulated carrier may be single side-band (SSB), double side-band (DSB) ASK, Phase-Reversal Amplitude Shift Keying (PR-ASK), or modulated by other modulation schemes, such as phase-shift keying (PSK), frequency-shift keying (FSK), quadrature amplitude modulation (QAM), or the like.

The modulated carrier may require the envelope detection 114 prior to demodulation. In embodiments, the envelope detector 114 may be a simple system, such as a diode and a low-pass filter, or it may include a more complex circuit configuration. In addition, the envelope detection block 114 may have a mean-detector, which detects the mean value of the envelope and compares this output to the output of the envelope detector 114 to determine whether the signal is a 1 or a 0. In embodiments, the envelope detector 114 block may also provide other detection modes, for instance, the envelope detector 114 block may provide for a synchronous detection mode. Synchronous detectors may be considerably more complex than envelope detectors. A synchronous detector may, for example, consist of a phase locked loop and multiplier circuits. In a synchronous detector mode, multiplying the modulated carrier by a sine wave that is phase locked to the incoming carrier may be involved in the demodulation. As shown in FIG. 1, however, the envelope detection 114 functional block may represent any pre-demodulation technique, and is not meant to be limited to any particular circuitry that may be referred to as envelope detection.

In FIG. 1, the demodulator 118 functional block may include the circuitry for performing the final demodulation of the incoming modulated carrier waveform received by the RF network node 104. Demodulation is the act of removing the modulation from the incoming analog signal. For instance, to demodulate an AM signal, the signal may be passed through a diode rectifier. The amplitude variation may then integrate into the original modulating signal. Each modulation technique requires its own unique method for demodulation, and the demodulator 118 shown in FIG. 1 is meant to represent the circuitry for the demodulation technique employed in certain embodiments. In embodiments, the modulation technique used in the demodulator 118 may be any modulation technique known to the art, such as ASK, PSK, FSK, QAM, or the like.

Certain embodiments may employ the ability to change the modulation technique as a way to improve system performance. For instance, the system may change the order of a QAM scheme in order to increase a reception parameter, such as raising the QAM order to increase the bit rate when the RFID tag 102 is close to the reader 140, lowering the QAM order to improve bit-error-rates when the RFID tag 102 is at an increased distance from the reader 140, and the like. By accommodating various modulation schemes, the RFID tag 102 may be able to improve its data rate and/or its operable range from the reader 140.

As shown in FIG. 1, the output of the demodulator 118 may then converted to a digital signal and presented to the data processing and controller 132 functional block for command processing, as discussed herein. When command processing is complete, any required command response and/or data return message to the reader 140 or the other RFID tags 102 may be sent from the data processing and controller 132 to a modulator 128 for signal conditioning prior to transmission. As in the case of the demodulator 118, the modulator 128 may use a plurality of modulation schemes in communication with the reader 140 or the other RFID tags 102. In embodiments, the return modulation scheme may be PSK, a digital modulation scheme that conveys data by changing, or modulating, the phase of the carrier wave. The carrier wave for transmission of the modulated command response may be the backscattered carrier wave received from the reader 140. That is, the RFID tag 102 may not require a carrier source generated within the RFID tag 102.

As shown in FIG. 1, the output of the modulator 128 may be sent to the ESD and impedance matching 110 functional block. In addition to the impedance matching performed between the antenna 108 and the RF network node's 104 internal circuitry to improve transmission, the ESD and impedance matching 110 block may provide a way of switching in an impedance element, such as a capacitor or inductor, in order to purposely provide impedance mismatching. This technique may be associated with the modulation of the outgoing signal, and may be implemented to change the imaginary part of the input impedance. PSK may offer the advantages of continuously available power with respect to ASK. In embodiments, the modulation technique used in the modulator 128 may be any modulation technique known to the art, such as ASK, PSK, FSK, QAM, or the like.

In addition to the antenna 108 to the demodulator 118 communication path, and the modulator 128 to the antenna 108 communications path with the reader 140 and the other RFID tags 102, the RF network nodes 104 may communicate with each other through a common antenna connection 158. To facilitate this, a communications path between the data processing and controller 132 and the antenna(s) 108 may be implemented by way of an inter-node interface 154, as shown in FIG. 1. The inter-node interface 154 may connect the data processing and controller 132 to the common antenna connection 158 through the ESD and impedance matching 110 block. The connection of the inter-node interface 154 to the common antenna connection 158 may be a direct connection or through circuit elements within the ESD and impedance matching 110 block.

In embodiments, the plurality of RF network nodes 104 connected together via the common antenna connection 158 may provide a distributed functionality for the RFID tag 102 with a master RF network node 104 coordinating the functionality of the other RF network nodes 104 on the RFID tag 102. The distributed functionality may include combined memory locations, separate multiple memory locations, secure memory locations, public memory locations, multiple frequencies, selective power reduction, encryption, decryption, and the like. The interconnection of data processing and controller 132 blocks of the different RF network nodes 104 on the RFID tag 102 may significantly increase the overall functionality, flexibility, modularity, and/or redundancy of the RFID tag 102.

In embodiments, the RFID tag 102 may operate as a device that is passive, semi-passive, or active. These terms may refer to whether there is a source of power internal to the RFID tag 102 or not. The passive RFID tag 102 may not have an internal power supply. In the case of the passive RFID tag 102, minute electrical currents induced in the antenna 108 by the incoming radio frequency signal may provide just enough power for the RFID tag's 102 circuitry in the RFID tag 102 to power up and operate. Therefore, the passive RFID tag 102 may not have a power supply, but may still have a power management 130 block. FIG. 1 shows one embodiment of the interfaces between the power management 130 block of the RF network node 104, and other function blocks within the RF network node 104. Prior to any portion of the RF network node 104 being powered, the antenna 108 may receive the reader's 140 transmitted carrier wave. This incoming signal may be fed to the power management 130 block through the ESD and impedance matching 110 block in order to extract, or harvest, the power of the carrier wave. The power management 130 block may then rectify and filter the incoming carrier wave to establish a stable supply of power to the rest of the RF network node 104. The power management 130 circuitry may be required to regulate the output voltage to the rest of the RF network node 104, which may vary significantly depending on the EM field value of the received carrier wave.

In embodiments, the power management 130 may provide power to functional blocks within the RF network node 104 at different times. For instance, power may be supplied to the RF and analog block 302 prior to power supplied to the data processing and controller block 132, power may be supplied to a clock 120 prior to the rest of the RF and analog block 302, power may be supplied for bias circuitry prior to control circuitry, and the like. In embodiments, power management 130 may provide logical signals to the RF network node 104 functional blocks to indicate the state of power readiness, such as a power-on reset (POR) signal, a power available signal, a power too low signal, and the like. These logical signals may better enable the proper power-up sequence within the RF network node 104. In addition, the power management 130 control and status signals may allow for conservation of power during the RFID tag 102 operations in order to extend the operational time, increase the amount of circuitry powered in order to increase the available functionality of the RF network node 104, or the like. The power management 130 may include not only a means of harvesting power for use in the RF network node 104, but also provide logic and control of power-up sequences and power conservation modes.

In embodiments, the multiple RF network nodes 104 on the RFID tag 102 may share power. Shared power may provide for equal power distributed amongst the different RF network nodes 104, different power distributed amongst the different RF network nodes 104, control of the power used by the different RF network nodes 104, or the like. In embodiments, distributed control of the power management 130 block may be implemented in a plurality of ways, such as the master RF network node 104 controlling the power distribution amongst the different RF network nodes 104 of the RFID tag 102, the different network nodes 104 of the RFID tag 102 collectively monitoring and controlling power distribution, and the like. The algorithm for control of the distributed power management 130 may be stored into the memory of the RF network nodes 104. In embodiments, distributed control of power management 130 amongst the different RF network nodes 104 of the RFID tag 102 may better enable the RFID tag 102 to manage functional resources on the RFID tag 102. This may allow the RFID tag 102 to dynamically redirect the RFID tag's 102 functionality to accommodate the changing demands from commands received, market needs, redundancy management, link quality, or the like.

Harvested power from the incoming carrier wave may drop below the threshold power for a short time after the carrier wave from the reader 140 has interrogated the tag. In an embodiment, the short period of time may range from microseconds to seconds. During this transition to insufficient power, the power management 130 block may communicate this event with a voltage too low signal. Information stored in volatile memory, and all volatile control states, may be lost after power transitions below a minimum voltage. Certain information, stored in memory or in control states, may be critical to future communications and operations. An example of such critical information may be the contents of a flag register, indicating the operational or sequential states of an ongoing process or assignments. Power may terminate too quickly for this information to be stored into non-volatile memory before power is lost. The systems and methods described herein may provide for a persistence 124 circuit that may enable selective memory cells to maintain their memory states for short periods in the absence of power supplied by the incoming carrier wave. The short period for which memory states may be maintained may be 10 ms, 100 ms, 1 second, 5 seconds, or the like. The memory cells that reside within the persistence 124 circuit may function much like a capacitor, holding the charge of the memory cell briefly, until stable power is re-established. In embodiments, the persistence 124 circuit may better allow the RFID tags 102 to maintain continuity in operations and functionality in the presence of brief disruptions of carrier wave transmission from the reader 140.

In an embodiment, the multi RF network node 104 RFID tag 102 may be able to harvest power and backscatter information to the reader simultaneously. The RF network nodes 104 may coordinate the backscattering of information to the reader and harvesting power by selecting at least one RF network node 104 to backscatter information while at least one RF network node 104 harvest power from the incoming RF signal from the reader. For example, in a four RF network node 104 RFID tag 102, one RF network node 104 may be selected to backscatter the information to the reader while three RF network nodes 104 harvest power from the incoming RF signal. In an embodiment, the RF network nodes 104 selected to backscatter or harvest power may be determined by the orientation of the RFID tag 102 to the reader. In an embodiment, the RF network nodes 104 may coordinate which node will backscatter and which node will harvest power. Additionally, the RF network nodes 104 selected to perform either backscattering or harvesting may differ for each RFID tag 102 read. In this manner the RFID tag 102 may be able to harvest all the available power from the incoming RF signal while also backscattering information to the reader. The result of the simultaneous backscattering and power harvesting may be extended power and time available to the RFID tag 102 for data computing, data storing, data transmitting, and the like.

Depending on the reader signal strength, the amount of power harvested by the RFID tag 102, the command transmitted by the reader, or the like, the power management 130 may schedule the power up of RF network nodes 104 to receive power during a read cycle. By scheduling RF network nodes 104, the power management 130 may power a RF network node, may not power an RF network node, may power an RF network node for a short period, may partly power an RF network node, or the like. For example, if the reader 140 signal is weak and therefore less power is harvested, the power management 130 may only power a portion of the RF network nodes. In an embodiment, the power management 130 may coordinate with the data processing controller 132 to determine which RF network nodes 104 are required to provide a response and then may only power the required RF network nodes 104. In another example, the command from the reader 140 may not require all the RF network nodes 104 to complete a certain task and the power management 130 may not power RF network nodes 104 that are not required to complete the response to the reader. The result of scheduling the RF network node power up may be to conserve the power consumed by the RFID tag 102 to allow for the required power and time to complete the reader 140 command.

In another embodiment, the RFID tag 102 RF network nodes 104 may share the harvested power. In an embodiment, the harvested power may be pooled in a power storage facility that may have a common connection between the all the RF network nodes 104. In an embodiment, the power storage facility may be a set of capacitors, a battery, a combination of capacitors and a battery, or the like that may be connected to the common connection, as power is harvested the power storage facility may receive and store the power. For power sharing, the individual RF network nodes 104 may determine the amount of power required to execute the current reader command requirement and may share power received from the power storage facility with the other RF network nodes 104. For example, if the current command is a write operation and the RF network node 104 memory is full, the RF network node 104 may determine that it cannot execute the write command and may share it's available power with the other RF network nodes 104.

In an embodiment, the RF network node 104 power sharing may be a method of the RF network node 104 determining that power is not required by the RF network node 104 and the RF network node 104 being isolated from the power storage facility. In an embodiment, the sharing of power may be enabled by the setting of switches within the RF network node 104, setting switches within the power management 130, or the like, to isolate RF network nodes 104 from the power storage facility and connect RF network nodes 104 that require power to the power storage facility.

In an embodiment, the power required by an RF network node 104 may vary during the duration of a reader 140 command and therefore the power shared by the RF network node 104 may change. For example, the request from the reader 140 may request both a read and write of information to the RFID tag 102. During the read operation, one of the RF network nodes may require power and may receive power from the power storage facility. But during the write portion of the command, the same RF network node 104 memory may be full and therefore the RF network node 104 may not participate in the write operation and may share power with the other RF network nodes 104 by being isolated from the power storage facility. It should be understood that during a reader 140 command cycle, RF network nodes 104 may be switched on or off a plurality of times to share power with the RF network nodes 104 that require power.

In support of power harvesting, RF network node 104 power scheduling, and RF network node 104 power sharing, a method of power metering may be implemented to accurately measure the amount of power being received from reader signal. Accurate and timely incoming power measurement may be important to the operation of the RFID tag 102. For example, if the reader signal is in decline, the RFID tag 102 may not receive enough power to complete a write cycle. In this situation, the RFID tag 102 may determine to wait for the next reader cycle to start the write cycle of the reader 140 command. In another example, based on the amount of power measured by the power meter, the RFID network nodes may use power scheduling, power sharing, or the like to extend the amount of time the available power can be used by the RFID tag 102.

In an embodiment, the power meter may provide power information to both the reader 140 and the RFID tag 102. In the case of the reader 140, the power meter may provide incoming power information back to the reader 140. The reader 140 may use the power information to determine if the current read cycle needs to be extended, to determine if another read cycle needs to be preformed, determine if the reader power needs to be increased, or the like. In an embodiment, the reader may be able to record a series of power meter power measurements to determine RFID tag power profile rate of change. The power profile may be used to determine if the read cycle is continued, if the read cycle is repeated, if the reader 140 power is increased, or the like. The power profile may be used to predict how much power the RFID tag 102 may receive and may be used to make determinations of operations that can be completed with the remaining power.

In the case of the RFID tag, the power meter may provide power profile rate of change information, current power information, or the like to the RFID tag 102. The power information provided by the power meter may allow the RFID tag 102 to determine if an operation can be completed, if an operation should be started, if an operation should be canceled, or the like. In an embodiment, based on the power meter reading, the RFID tag 102 may transmit information to the reader 140 requesting extension of the current read cycle, requesting an additional read cycle, requesting increased reader 140 transmitted power, or the like. The power profile may be used to predict how much power the RFID tag 102 may receive and may be used to make determinations of operations that can be completed with the actual or predicted remaining power. For example, the next operation may be a data write and the RFID tag may determine if the write operation can be started with the predicted amount of power to be received. If the write operation cannot be completed with the predicted amount of power, the RFID tag 102 may request the reader to extend the current read cycle, request an additional read cycle, request increased reader 140 transmitted power, or the like.

In an embodiment, to provide accurate power readings from the reader 140 signal, the RFID tag 102 power meter may include a flash analog to digital (AD) converter associated with the antenna 108. By placing the flash AD converter near the antenna 108, the incoming signal power may be measured as the reader 140 signal is received by the RFID tag 102. In an embodiment, an algorithm may be used to determine the amount of power that can be created by the RFID tag 102 from the received signal.

In embodiments, the data processing and controller 132 on the RFID tag 102 may include digital circuitry that requires the clock 120 oscillator. The systems and methods described herein may provide for the clock 120 circuit as part of the RF and analog block 302. The frequency of the clock 120 may be a selectable value, such as 1 MHz, 3 MHz, 6 MHz, or the like. In embodiments the clock 120 oscillator may be specific frequency and configuration, such as a 1.92 MHz starved ring oscillator, or other frequency and configuration that meets the needs of the RF network node 104 and associated external interfaces. In embodiments, the clock 120 oscillator may require a specific oscillator frequency in order to provide for accurate detection, reception, and transmission of data. In embodiments, the variation of the clock's 120 oscillator frequency may be highly accurate, such as +/−2.5% variation during backscatter. The presence of the highly accurate clock 120 oscillator may better provide for reliable internal RF network node 104 functionality and communications via interfaces external to the RF network node 104. In embodiments, the clock 120 and data may not be synchronized between the RF network nodes 104 on the RFID tag 102.

In embodiments, the synchronization circuit 162 may calibrate may synchronize the RF network nodes 104. Synchronization 162 may be related to synchronizing the phase of clock 120 oscillators on a plurality of RF network nodes 104. For example, a synchronization signal may be sent from a master RF network node 104, the reader 140, another RFID tag 102, or the like, to synchronize all targeted RF network node 104 clock 120 oscillators. Calibration may be related to the adjustment of the clock 120 oscillator's frequency on the plurality of RF network nodes 104. Calibrating the clock 120 oscillator of each RF network node 104 to a common clock 120 oscillator may be accomplished by transmitting a calibration signal among the plurality of RF network nodes 104. The calibration signal may be transmitted from each RF network node 104 onto the inter-node communications interface 154 and simultaneously received by all RF network nodes 104.

In embodiments, the data processing and controller 132 may include a routine for establishing which of the plurality of RF network nodes 104 on the RFID tag 102 is to act as the master, this protocol is described herein. The implementation of the protocol may require the use of a random number provided to the routine running via the data processing and controller 132. In embodiments, a random number generator 122 may supply the random number to the data processing and controller 132.

The random number generator 122 may be a computational or physical device designed to generate a sequence of numbers or symbols that lack any pattern, i.e. appear random. Software-based routines for random number generation 122 are widely used, but may fall short of this goal, though they may meet some statistical tests for randomness intended to ensure that they do not have any easily discernible patterns. There are two principal methods used to generate random numbers. One may measure a physical phenomenon that is expected to be random, and then compensate for possible biases in the measurement process. The other may use computational algorithms that produce long sequences of apparently random results, which are in fact determined by a shorter initial seed or key. The latter type is often referred to as a pseudo-random number generator.

The physical random number generator 122 may be based on an essentially random atomic or subatomic physical phenomenon, whose randomness may be traced to the laws of quantum mechanics. Examples of such phenomena include radioactive decay, thermal noise, shot noise, clock drift, and the like. In an embodiment, clock drift may act as the random physical source from which the random number may be generated. Clock drift may ultimately be related to component differences, design differences, behavior changes caused by component aging, configuration and set up differences, or the like. In embodiments, a plurality appropriately adjusted ring of oscillators may be employed that are summed by exclusive- or logic to generate the random number from the drift of the oscillators. Further, a logical enable signal may be provided to initiate or terminate the action of the random number generator 122. Although clock drift represents an example of a configuration for generating the random number, it may be understood that any configuration known to the art to generate the required random number may be employed.

In embodiments, the data processing and controller 132 may be a digital portion of the RF network node 104 that functions as a central data processing facility for command decoding, execution, and response; a logical control facility for state related functions; a memory storage facility for the storage of short and long term data in volatile or non-volatile memory; a program storage and execution facility for software-based control of operational execution and market specific applications; a data interface controller; and the like. In embodiments, the data processing and controller 132 may provide the function of central processing unit for the RF network node 104, possessing program storage, combinatorial and sequential logic, data bus interfaces, and the like. In embodiments, the flexibility of the RF network node 104 to accommodate a plurality of market functions may be partly associated with the data processing and controller 132.

In embodiments, the data processing and controller 132 receives and transmits commands and data through a plurality of interfaces, including the demodulator 118, the modulator 128, the ESD and impedance matching 110 block, a communications facility 134, and the like, as shown in FIG. 1. The data processing and controller 132 may be responsible for command decoding, encoding, encrypting, decrypting, execution, storing, and the like. A command may be an instruction, where an instruction is a form of communicated information that is both command and explanation for how an action, behavior, method, or task may be begun, completed, conducted, or executed. In embodiments, the data processing and controller 132 may receive commands or instruction through the demodulator 118 interface; decode the command; execute the command using internal storage, logic, external interfaces, or the like, to the data processing and controller 132; gather requested data, action responses, sensor readings, communications, or the like, directed by the command; and transmit responses, telemetry, status, or the like, by way of the modulator 128 interface. In embodiments, command and response may also be via the direct RF network node 104 interface to other RF network nodes 104 on the RFID tag 102.

In an embodiment, an RFID tag 102 or RFID network node 104 may include the method and system of interpreting commands from the RFID reader 140. In an embodiment, the amount of the RF network node 104 execution code required to execute the RFID reader 140 commands may be reduce by the RF network node 104 generically processing commands sent by the RFID reader 140 to the RFID tag 102. In an embodiment, the RFID reader 140 commands may contain a number of associated parameters for the execution of the RFID reader 140 command. An RF network node 104 generic processor may be used to divide the command into its individual parameters for processing by the RF network node 104. In an embodiment, the RF network node 104 may recognize the RFID reader 140 command by the parameters associated with the command. For example, the RFID reader 140 may transmit a command with the parameters operation code, memory bank, delay, and the like. The RF network node 104 may recognize the RFID reader 140 command as a memory read command by these associated parameters. The RF network node 104 may execute the overall RFID reader 140 command by executing code associated with the individual parameters. In an embodiment, the master RF network node 104 may break the RFID reader 140 command code into parameters and execute the parameters or may request other RF network nodes 104 on the RFID tag 102 to process all or some of the parameters. The master RF network node 104 may transmit information to the RFID reader 140 based on the returns of the individually executed parameters. In an embodiment, the RF network node 104 may selectively execute the RFID reader 140 command; based on the command's role in the RFID tag 102; the RFID tag 1102 may be able to execute any RFID reader 140 command, but may not execute all of the RFID reader 140 commands received. In an embodiment, by reducing the RFID reader 140 command code into generic parameters, the RFID network node 104 execution code may be reduced and may result in the RF network node 104 size being significantly reduced. Additionally, there may be an increase in the RF network node 104 functionality by executing RFID reader 140 commands using only the individual parameters to execute the entire RFID reader 140 command.

In embodiments, the data processing and controller 132 on a RFID tag 102 may support command encryption. Encryption may be a process of encoding information in such a way that only a processing device with the encryption key may decode it. The systems and methods described herein may utilize various systems of encryption, including symmetric-key encryption, public-key encryption, digital certificates, and the like. In symmetric key encryption, each of the RFID tags 102 may have a key that is used to encrypt or decrypt a packet of information. In symmetric key encryption, each of the RFID tags 102 utilizing the encryption scheme may require the key to communicate. In public-key encryption, a combination of a private key known only to the RFID tag 102, and a public key given by the RFID tag 102 to any interface device attempting communication, is used in the encryption design. Digital certificates utilize a third independent source, often referred to as a certificate authority, in the encryption design. In embodiments, any encryption process known to the art may be used in implementing a secure communications design. The implementation of an encryption scheme within the communications design of an embodiment of the invention may provide greater reliability of operation, as well as secure processing of the market implementation. In embodiments, encryption may be utilized in any communications external to the RFID tag 102, such as the RFID tag 102 to the reader 140, the RFID tag 102 to the RFID tag 102, the RFID tag 102 to external facilities 138, and the like.

In embodiments, the data processing and controller 132 may support proprietary command protocols that may be specific to the systems and methods described herein, specific to a market 150 application, specific to a geographic location, or the like. The data processing and controller 132 may also support the international standard EPCglobal UHF class 1 generation 2 (Gen2) for the use of RFID tags. The Gen2 standard specifies protocols for the RFID tag 102 air interfaces, the protocol for exchanging information between the RFID tag 102 and the reader 140.

Figure 1A:
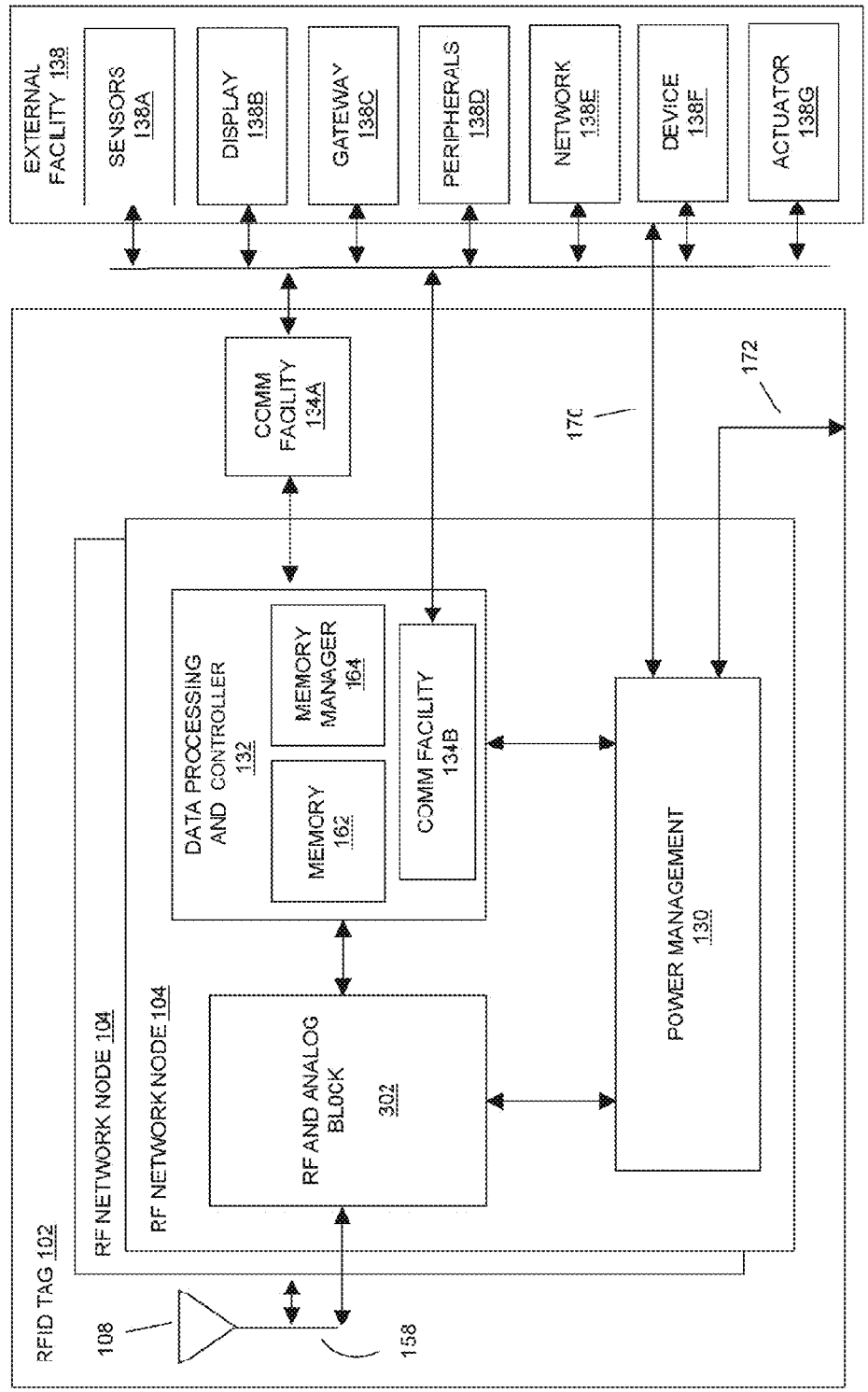
FIG. 1A shows a block diagram embodiment showing major components of an RFID tag.

Referring to FIG. 1A, in embodiments the communications facility 134 may be a communications facility 134B that is part of the data processing and controller 132 on the RF network node 104, a communications facility 134A on the RFID tag 102 in communication with the data processing and controller 132, or both. The communications facility 134 may interface with a plurality of external facilities 138, such as sensors 138A, displays 138B, a gateway 138C, a peripheral 138D, a network 138E, a device 138F, an actuator 138G, and the like. The communications facility 134 may utilize a serial interface to communicate with external facilities 138, such as an $I^2C$ bus, an SMBus, a PMBus, an SPI bus, a 1-wire bus, and the like. For instance, an $I^2C$ bus (Inter-Integrated Circuit bus) is a multi-master serial computer bus that may be used to communicate between the data processing and controller 132 and low speed external facilities 138. The SMBus (System Management Bus) represents a subset of $I^2C$ that defines stricter electrical and protocol conventions, where many $I^2C$ systems incorporate policies and rules from SMBus. The PMBus (Power Management Bus) is a further variant of the SMBus which is targeted at digital management of power supplies. Like SMBus, it is a relatively slow speed two wire communications protocol based on $I^2C$. Unlike either of those standards, it defines a substantial number of domain-specific commands rather than just saying how to communicate using commands defined by the reader. The 1-Wire bus is similar in concept to $I^2C$, but with lower data rates and longer range. The SPI Bus (Serial Peripheral Interface bus) is a synchronous serial data link standard that operates in full duplex mode, and is sometimes referred to as a "four wire" serial bus, contrasting with three, two, and one wire serial buses. One skilled in the art will appreciate that there are a large variety of serial buses that may be used by the invention in communicating with external facilities 138, including non-standard interfaces, and so the list and description provided herein should not be taken as limiting in any way.

In embodiments, the RFID tag 102 may act as the master on the communications bus, where the external facility 138 would act as the slave. Alternately, the external facility 138 may act as the master and the RFID tag 102 the slave. For instance, the RFID tag 102 may act as a slave to a sensor 138A and automatically store historical records of sensor activity. In embodiments, one way to implement this could be to have the RFID tag be considered a serial bus slave, such as an $I^2C$ bus slave, and an external sensor act as the bus master. The external sensor, being the master, may then initiate data transfers, and sensor information that ends up as raw data in the RFID tag slave device. In embodiments, another way to implement this could be to have the RFID tag 102 automatically store the sensor data as a history record in a memory structure similar to an ATA container. In embodiments, the RFID tag 102 may not be using the raw address received from the serial bus to write to that location in memory but instead may be keeping track of previously written records and putting new data in the proper location. Later on, when an interrogator comes along, it may use the table of contents in memory to know if any of the history records are of interest. This design could also be flexible enough to format the memory based on data contents. For example, the bus master might send an address along with 16 bytes of data. The data may have actually come from a plurality of different sensors and could be split into different records, or into a single record with identifiers for each piece of data. In embodiments, compression schemes may also be utilized, such as standard schemes or application specific schemes, to compress the sensor data before storing it in memory.

In embodiments, the communication facility 134 interface to external facilities 138 may support the implementation of a broad range of applications, such as sensor tags, display tags, smartcards, medical uses, and the like. For instance a sensor tag may store temperature, stress, or any other information accumulated by a sensor. For instance, sensors linked to RFID tags may have many military applications, ranging from recording storage conditions of materials, calibrations for equipment, storage of usage information of equipment, and the like. For example, it may be necessary to keep track of how many times a tank has fired a round through its barrel, and that after a set number of firings the barrel may have to be replaced. In this instance, the present invention may combine with a sensor on a tank gun barrel to count how many times its fired, such as through sensing the temperature, where the sensor downloads the information to the tag 102 via the communications facility 134, as described herein. In another instance the communications facility 134 may allow the present invention to be integrated into smart-commerce applications, such as smart cards. For example, smartcards may utilize the present invention in the smart card to automate or make it easier to write information to a smart card, e.g. Bank card. The serial bus associated with the communication may then be burned so that information could not be changed. In another instance the communications facility 134 may allow the present invention to be used in medical applications, such as using the tag 102 in combination with a medical testing system that would download the test results into the tag for later reading.

In embodiments, the present invention may be used in conjunction with a display 138B, such as an 'electronic paper' display, e-ink display, liquid crystal display (LCD), thin-film transistor display (TFT), organic light-emitting diode display (OLED), nano-crystal displays, and the like. In embodiments, a display 138B may be a stand-alone output display or a display module, where the display module may include other functions, such as display driver electronics, control functions, and the like, in addition to the output display. In embodiments, the present invention may be able to store and send information to a display 138B that is powered by an external source (i.e. not powered through the tag 102), supplied power from the tag 102 to change the displayed information and where the display 138B requires no power to hold display information, and the like. For example, electronic paper, also called e-paper, is a display technology designed to mimic the appearance of ordinary ink on paper. Unlike a conventional flat panel display, which uses a backlight to illuminate its pixels, electronic paper reflects light like ordinary paper and is capable of holding text and images indefinitely without drawing electricity, while allowing the image to be changed later. To build e-paper, several different technologies exist, some using plastic substrate and electronics so that the display is flexible. E-paper may be considered more comfortable to read than conventional displays. This may be due to the stable image, which does not need to be refreshed constantly, the wider viewing angle, and the fact that it uses reflected ambient light. One example of e-paper technology is e-ink, a technology that requires ultra-low power consumption. The principal components of electronic ink are millions of tiny microcapsules, about the diameter of a human hair. In one incarnation, each microcapsule contains positively charged white particles and negatively charged black particles suspended in a clear fluid. When a negative electric field is applied, the white particles move to the top of the microcapsule to become visible to the reader. This makes the surface appear white at that location. At the same time, an opposite electric field pulls the black particles to the bottom of the microcapsules where they are hidden. By reversing this process, the black particles appear at the top of the capsule, which now makes the surface appear dark at that location. To form an E Ink electronic display, the ink is printed onto a sheet of plastic film that is laminated to a layer of circuitry. The circuitry forms a pattern of pixels that can then be controlled by a display driver. These microcapsules are suspended in a liquid "carrier medium" allowing them to be printed using existing screen printing processes onto virtually any surface, including glass, plastic, fabric and even paper. In embodiments, the present invention may be used in conjunction with an electronic paper display, where the tag 102 may provide power to the display 138B when information is updated, but where the display 138B does not require power to maintain the displayed output. One skilled in the art can appreciate that the combination of the present invention and electronic paper technology may enable a variety of applications, such as human readable labels (i.e. without the aid of an RFID reader) where the tag 102 holds information to be displayed and where the tag 102 may have that information updated resulting in a change to the displayed information. In embodiments, the updating of the information may come from an update provided through an RFID reader, a second tag 102, an external facility 138, and the like. In embodiments, the present invention's memory capabilities, as described herein, may provide a greater amount of data storage to be made available to the display application than would be otherwise available.

In embodiments, the present invention used in conjunction with a display 138B, such as with an electronic paper display, may be used to replace tags such as paper tags, metal plate tags, and the like. For instance, electronics equipment may need to be tagged to carry information such as part and manufacturing data, modifications, updates, part number, inspection data, calibration data, safety data, and the like. In embodiments, applications of the present invention to providing human readable tag 102 labels may include tags for avionics equipment, where the amount of information to store on the label may require the large memory capabilities of the present invention as described herein. For example, companies like Boeing and Airbus may benefit from a high memory RFID to keep track of maintenance events, equipment configuration, and the like. The present invention may provide a solution where previously relatively static plates or labels are replaced by a reprogrammable display 138B attached to the asset for purposes including the tracking of identification, configuration, maintenance, calibration and other information. In embodiments, the present invention may use a changeable display 138B in lieu of metal plate tags, paper label, and the like, where the display 138B may be changed by electronic means by direct contact, magnetic fields, electromagnetic waves, and the like, to provide new information. The display 138B may be used in combination with RFID label data such as an electronic product code or unique identifier. The display 138B may be used in combination with a high memory RFID tag 102 that records pertinent changes to the tagged item. The display 138B may use power to change the display 138B as provided by an RFID reader, by an integrated battery, by an energy storage device, by fuel cells, by capacitors, as harvested from external power sources (e.g. via temperature gradients, light receptors, etc), by direct electrical connection from another device, and the like. In embodiments, the display 138B may have the dimensions, materials, and configuration that are configured to allow for efficient performance of an RFID antenna within the device. The thickness of the tag display 138B may be increased beyond typical practice in order to allow for operation when mounted on metal. A dielectric material may be used so as to provide tuning for the antenna or to reduce the thickness of the device. In embodiments, the antenna may be based on a dipole, a slot antenna, a monopole, and the like. The antenna may be configured for operation capacitively or inductively using near-field physics. The display 138B may include a bar-code including 1D and 2D barcodes. The display 138B may include changeable configuration information. In embodiments, programmability or re-programmability of the tag 102 associated with the display 138B may derivative from fixed or hand-held solutions. The display 138B may be synchronized with a database in some manner. The display 138B may be in combination with a contact memory button, with real time location functionality, and the like. The display 138B may be used in reusable applications such as transportation totes, tagged pallets, and the like. The display 138B may have an interface between RFID tag 102 and display 138B that is serial in nature, as described herein, to minimize pin-outs.

In embodiments the present invention may provide power 170 to or from external facilities 138, as well as from other outside sources 172 (e.g. battery power) to enable a flexible power scheme to a wide range of RFID applications. For example, the RFID tag 102 could provide power 170 to an external facility 138 to provide a fully passive battery free operation, have power supplied from the external facility 138 to provide higher power applications, have power supplied from an external source through the external power interface 172 to provide an active or semi-active solution, and the like. In embodiments, the present invention may provide power to an external facility 138 even when the only source of power is the RFID reader 140. That is, an external facility 138 may be powered when the RFID tag 102 is operating as a passive tag.

In embodiments, the data processing and controller 132 may provide memory for the storage of commands, command tables, the RFID tag 102 health and status information, data, program storage, register information, encryption keys, control states, and other uses of digital memory known to the art. The data processing and controller 132 may utilize a plurality of memory 162 technologies, including random access memory (RAM), static RAM, dynamic RAM, read only memory (ROM), program read only memory (PROM) electrically erasable (EEPROM), flash memory, and the like, including other volatile or non-volatile memory technologies known to the art. In embodiments, the data processing and controller 132 may manage the memory 162 with a memory manager 164, where the memory manager 164 may manage not only memory 162 on its own RF network node 104, but on other RF network nodes 104, such as when its own RF network node 104 is a master RF network node 104

In embodiments, memory located within the data processing and controller 132 may be partitioned, segmented, blocked, and the like, into a plurality of functional areas, including areas that are public, private, encoded, volatile, non-volatile, shared, distributed, and the like. An example of a public area of memory may be a portion of memory that is readable by unsecured facilities, such as public readers; portable public readers; other RFID tags 102 with public storage; and the like. An example of a private area of memory may be a portion of memory that is only readable by secured facilities, such as market specific readers 140, application specific readers 140, company private facilities, and the like. Private areas of memory may also be encoded to increase security or the level of privacy afforded by a secure portion of memory.

In embodiments, memory located on the RF network nodes 104 on the RFID tag 102 may be shared, distributed, common, or the like. An example of a shared memory may be memory on the RF network nodes 104 that may be shared by the other RF network nodes 104, accessed by the other RF network node 104 data processing and controllers 132, made available to the other RF network nodes 104, or the like. An example of distributed memory may be memory utilized by one RF network node's 104 data processing and controllers 132 across one or more other RF network nodes 104 resident on the same RFID tag 102. An example of common memory may be memory areas on the RF network nodes 104 that are made available to the other RF network nodes 104, such that the memory is available for common use by all of the RF network nodes 104. Because of the inter-node interface 154 made available through the RFID tags' 102 common antenna connection 158, memory across the RFID tag 102 may be utilized in a plurality of ways amongst the RF network nodes 104 on the RFID tag 102. The ability of these systems and methods to communicate directly from the RF network node 104 to the RF network node 104 may enable a plurality of memory use configurations. These various memory configurations may provide significantly greater memory storage, which may in turn allow for greater functionality and the market 150 capability.

In embodiments, the data processing and controller 132 may function as a memory manager, such as for the management of memory that is shared, distributed, common, or the like. An example of memory managing shared memory may be having the master RF network node 104 acting as the memory manager. In this instance, the master RF network node 104 may set up partitions or boundaries in the extended memory space available across the plurality of the RF network nodes 104 resident on the RFID tag 102. The master RF network node 104 may also allocate which of the RF network nodes 104 have access to certain areas of shared memory, arbitrate between the RF network nodes 104 when there is contention for the same memory space, alter memory allocations and resources as processing requirements change, and the like. Similar memory management activities may be utilized for distributed or common memory, where the master RF network node 104 may control memory allocations and access.

In embodiments, areas of memory may require authentication verification to gain access, where different areas of memories require unique authentications. For example, there may be three areas of memory, one public, one private, and one private-encrypted. The public area of memory may not require any authentication to gain access. The private area of memory may require some form of authentication, perhaps a password or the like. The private-encrypted area of memory may require some form of authentication, as well as some form of encryption key to gain access. In embodiments, the ability to block off segments of memory into a plurality of sizes, uses, markets 150, access, encryption, and the like, in combination with the ability share memory across the RF network node 104 boundaries may better enable the RFID tag 102 to be used in a variety of markets 150.

In embodiments, memory may be utilized to process data intelligently. For instance, rather than being limited to storing and transmitting raw data to the reader 140 or the other RFID tags 102, the RF network node 104 may perform processing steps on the raw data, and store this post-processed data in memory for subsequent transmission. An example of this may be the conversion of raw sensor 138A data, such as a voltage level, and performing post-processing to convert this raw voltage level into a temperature value. Calibration tables may also be resident in memory, and available for use in the conversion to temperature value, based upon the characteristics of the sensors 138 interfaced to the particular RF network node 104. In embodiments, conversion or calibration values may be transmitted to the RFID tag 102 memory, or stored in the RFID tag 102 at the time of manufacture. There may be different conversion and calibration values for each of the sensors 138, and so a data table may exist in memory for this purpose. The ability of the RFID tag 102 to perform intelligent data processing may decrease the processing requirements of the reader 140 or other communicating RFID tags 102, which may enable the use of simpler reader 140 facilities, such as portable readers 140, or enabling reduced post-processing, such as simpler RFID tag 102 to RFID tag 102 data processing, or the like.

Referring to FIG. 1A, a depiction of a block diagram embodiment with major components of an RFID tag is shown. In an embodiment, the data processing and controller 132 may be responsible for processing the information received from the RF and analog block 302. The processing may include analytical work on the data such as calculations, conversions, encryption, decryption, searching, storing information to memory 162, receiving information from memory 162, or the like. The memory 162 may be a continuous memory, partitioned memory, or the like where the information received from the RF and analog block 302 and the data processing and controller 132 may be stored. In an embodiment, the memory 162 may be one time programmable memory (OTP), many time programmable memory (MTP), a combination of OTP and MTP memory, or the like.

In an embodiment, information stored on the RFID tag 102 may be searched. The search may be at the request of the reader 140, as part of a process on the RFID tag 102, or the like. Because of the limited amount of power with which an RFID tag 102 has to perform a requested task, RFID tag searching may be designed to consume the least amount of power. The RFID tag 102 search may include a look-up table, content addressable memory (CAM), brute force search of all memory locations, bit matching, or the like.

In the example of a content table, there may be a look-up table that may store the location of certain information. The location information stored in the content table may be a pointer to certain memory locations, a pointer to memory regions, a pointer to fixed allocated memory words, a pointer to dynamic allocated words, or the like. For example, the content table may store information on an objects current name and price information is stored. When a request is received for the objects price, the search sequence may be to look up the information location in the content table and the content table my point directly to the price memory location. The content table may be search using word matching, brute force, binary matching, or the like. It should be understood that the content table may use many different methods to find memory information and this example is not to be considered the only method of finding information using a content table.

An RFID tag 102 search may also be performed with CAM where the entire memory content is searched for the desired information. Using CAM, information within memory may be indexed by content and using CAM the index may be searched to retrieve a memory pointer that points to the information within the memory. For example a phone book may be set up in content addressable memory where a name look up is performed. The name may be found in the indexed content where a pointer may point to the memory location of the name and the same memory location may include additional information related to the name such as a phone number, address information, or the like.

In an embodiment, a binary CAM may be used in a tag memory search. In binary CAM, all the memory is matched to a binary search term using the binary numbers 1 and 0. The binary CAM may include a comparator to compare the search word to the word found in memory. The binary CAM search may return a first match, all matches, or the like.

In an embodiment, a ternary CAM may also be used. The ternary CAM may add a third character called "don't cares" where the binary search term may be masked with a character for binary numbers that are not important to the search. For example, the search may be on the word "10XX11", where the "X" is the masking character, and the ternary CAM search may return matching words "100011", 100111", "101011", and "101111". The binary CAM and ternary CAM searches may be considered a parallel simultaneous search of all memory locations. The binary and ternary CAM may require low levels of power because instead of reading memory locations, a hardware parallel lookup that can be performed quickly and with less power.

In an embodiment, in addition to content look-up tables and CAM searches, there may be specialized application specific data organization that may allow very quick data searches on an RFID tag 102. In one embodiment, an application specific data organization may locate information in specific memory locations for rapid retrieval of information. Data organizations that look to specific memory locations may be considered non-search searches because a full memory search is not required to find the information required. In an embodiment, there may be a number of different methods that a non-search may be executed such as a content table storing the location of specific information, information stored in specific memory locations, memory information indexed in a certain order, and the like.

In an embodiment, another method of finding information on an RFID tag 102 may be using a table of contents within the memory. The table of contents may divide the RFID tag 102 memory into regions of memory that contain certain types of memory, then a pointer or series of pointers may point to these memory regions. In an embodiment, the table of contents may be combined with other searching methods to find information. For example, a search may use the table of contents to narrow a search to a particular region of memory and then use a binary CAM search to locate the particular information. An example of information searching may be in the aviation industry. An RFID tag 102 may be associated with an aircraft component and may record and store the archival history of the component. The component RFID tag 102 may store information related to manufacturing, flight cycles, maintenance, and the like. In searching for information, the table of contents may be used to find the memory region containing the desired information, such as maintenance history, and then may user a binary CAM search to locate the specific information required. In an embodiment, the table of contents may be organized for each type of application for which the RFID may be used.

In an embodiment, the memory 162 may include OTP memory. For use on multiple RF network node 104 RFID tags 102, the OTP memory may provide benefits such as high memory density, fast access times, field programmability, low programming voltage, short programming times, MTP emulation (eMTP), the ability to mask ROM, scalability, wide I/O bus capability, redundancy, security, energy efficiency, or the like. The multiple RF network node 104 may be able to coordinate the OTP memory associated with multiple RF network nodes 104 using the communication bus among the RF network nodes 104. In an embodiment, the OTP memory may be implemented differently depending on the use of the RFID tag 102. For example, the OTP may be divided into at least one memory word or may be divided into segments that may include more than one memory word, but may represent one memory address. The organization of the words and segments may provide for one time writing of information to the word memory or information may be written more than once to segments that may contain multiple word storage. The multiple word storage for the segment memory may be considered the depth of writing. In other words, the segment may provide for information to be written to the same storage word address for the number (depth) of words associated with the segment. Segment depth will be described in more detail below. In the multiple RF network node 104 RFID tag 102, the OTP memory may be on some of the RF network nodes 104 or all the RF network nodes 104. Each RF network node 104 may provide control of the OTP memory that may be on the RF network node 104. Additionally, all of the OTP memory of the individual RF network nodes 104 may be coordinated by a master RF network node, or in a distributed manner without a master node. Furthermore, the OTP memory may be coordinated as a single memory store, coordinated as redundant memory stores, coordinated as separate memory stores, or the like depending on the requirements of the RFID tag 102.

In an embodiment, the OTP memory may be a write once memory where information may be written to the OTP memory only once, but may be read many times. Information may be written to the OTP memory while on the wafer, prior to when the RFID tag 102 is associated to an object, after the RFID tag 102 is associated to an object, or the like. For example, information may be written to the OTP memory at a manufacturer before or as the RFID tag 102 is associated with an object to provide information on the object such as a part number, a serial number, pricing information, manufacturing information, quality information, or the like. In another example, an enterprise may purchase RFID tags 102 without stored information and may apply information to the RFID tag 102 after the RFID tag 102 has been associated with an object at the enterprise such as object location, object price information, storage information, date information, delivery information, or the like.

In an embodiment, the OTP memory may be implemented as a single memory store, as a redundant memory store, as a combination of single and redundant memory stores, separate memory stores, or the like. The OTP memory may be divided into smaller memory stores to be used as redundant memory where the RF network node 104 may store the same information in more than one of the smaller memory stores. For example, an 8K OTP memory may be divided into two redundant 4K OTP memory stores, and when information is stored to the OTP memory, the same information may be stored to both of the 4K memory stores. This may provide a redundant memory system that may allow retrieval of the stored information even if there is a failure of one of the memory stores. It may be understood by one skilled in the art that the OTP memory may be configured in a number of different ways consistent with the present invention.

In an embodiment, the OTP memory may be configured as a write once memory where the manufacturer, enterprise, or other user of the RFID tag 102 may store information to the available OTP storage space. In this embodiment, the OTP memory may only be able to receive information once; the information may be written to the OTP memory starting at the beginning of the storage location and may be sequentially written to the end of the information to be stored. This method of OTP memory may be useful for storing information such as a part number, serial number, pricing information, and the like.

In an embodiment, different locations of the OTP memory may be assigned to different information. For example, part number information may be assigned memory locations 1-7 and serial number information may be assigned memory locations 8-14. In an embodiment, there may be an end of file indicator, end of record indicator, record pointer, or the like to define the end of a certain memory location. For example, at the end of storage location 7, there may be an end of record pointer to indicate that this is the end of the part number information. Using this storage method, the part number may be stored at one time and the serial number may be stored at another time on the same OTP memory. In an embodiment, the data processing and controller 132 may be programmed as to which information is to be stored in certain locations of the OTP memory and as to the management of storing the proper information to the assigned memory locations.

In an embodiment, using this method, the data processing and controller 132 may store the different available memory locations in a configuration table to define where information is to be stored. In an embodiment, the RFID tags 102 may be industry-specific, where the data processing and controller 132 may be programmed to assign information to certain OTP memory locations. For example, a retail store RFID tag 102 may store part number, serial number, and pricing information to different locations on the OTP memory, with the pricing information being written once the object and RFID tag 102 are received in the retail store. In another example, the aviation industry may store part number, serial number, and FAA required information to the OTP memory; for example, the FAA information may be written to the RFID tag 102 over the life cycle of the aviation component to a different set of locations within the OTP memory. It may be understood by one skilled in the art that there may be many different types of information stored to OTP memory using this information writing protocol.

In another embodiment, the OTP memory may emulate MTP (eMTP) memory by providing a protocol to write information to the same RFID tag 102 memory location more than once. In MTP memory, information may be written to the same memory location more than once, but OTP may only be capable of writing information in a certain memory location once. To emulate MTP memory, the OTP memory may have more than one memory word related to the storage address for the same information. In an embodiment, the information may be stored in a section of memory called a segment and the segment may have a plurality of memory words associated to it for storing written information more than once. In this manner, the information may be considered being written to a virtual memory location. The information may be virtually written to the segment while the information is actually written to the physical location of one of the memory words in the segment. For example, in storing an object's price to eMTP memory, the segment storing the price may have a number of memory words in which to write the price. The first time the price is written to the segment, the price may be written to the first word associated to the segment. With the writing of the price information to the first segment word, it may be recorded within the segment that the first segment word contains the pricing information. A different price may be written to the same segment a second time, this second price may be written to the second word in the segment, and it may be recorded with the segment that the second word contains the last written pricing information. Therefore, when there is a read request for the pricing information, the pricing segment may be read to determine that the second word has the latest price. It should be understood that the segment may have a plurality of memory words associated to it and information may be written to the segment for as many times as there are words associated with the segment. For example, if the segment has four associated words, then information may be written to the segment four times before the segment is considered full and cannot be written to again. However, there may be additional segments that may be dynamically allocated should the pricing information change again. Dynamically allocated segments may be allocated on demand, when the previous segment has been completely written to and the pricing information changes once again. Dynamic allocation of memory will be further described below.

In another embodiment, MTP memory may also be used to store all the RFID tag 102 data. The data stored within the MTP memory may be information that may be written more than once. For example, a retail store may change the price of an item many times over the time the item is on a shelf; this information may be written to MTP memory. In this case, the changes in price may be written either to the same MTP memory location every time the price is updated on the RFID tag 102 or to a different MTP memory location.

In another embodiment, the data processing and controller 132 may incorporate both OTP and MTP memory for saving information to the RFID tag 102. Among other things, the MTP memory may be used to store address information about the OTP segments within a table; the address information may be stored in variables within the MTP table. The MTP table variables may be written an unlimited number of times to track the address information of the OTP segments. As new information is written to the next OTP word memory, the MTP table may be updated with the memory word address information. Using MTP memory to store the OTP segment memory address information may allow the use of a small amount of MTP memory to track large amounts of OTP memory segments by storing segment information within the MTP table using multiple writes to the same table variable. For example, in the aviation industry, as new FAA information is received by the RFID tag 102, the data processing and controller 132 may determine the next OTP segment to store the information, store the segment address information into the MTP table variable, and then store the new information in the correct storage location within the OTP memory.

Information within the OTP memory may be burned in and may not require an electrical charge to maintain the stored information. This may allow the multiple RF network node 104 RFID tag 102 to manage the power on the RFID tag 102 using the power management 130. The power to the OTP memory may be managed based on the type of command received by the RFID tag 102, based on where the information is stored, or the like. For example, if the RFID tag 102 command does not require a memory recall or memory storage, the power management 130 may not power the OTP memory. In another example, depending on where information is stored within the OTP memory, the power management 130 may only power a portion of the OTP memory. Additionally, since the OTP memory is burned in, power may not be required to maintain the information stored within the OTP memory and therefore may not require initial powering to store information, periodic powering to maintain the stored memory, or the like.

Figure 1B:
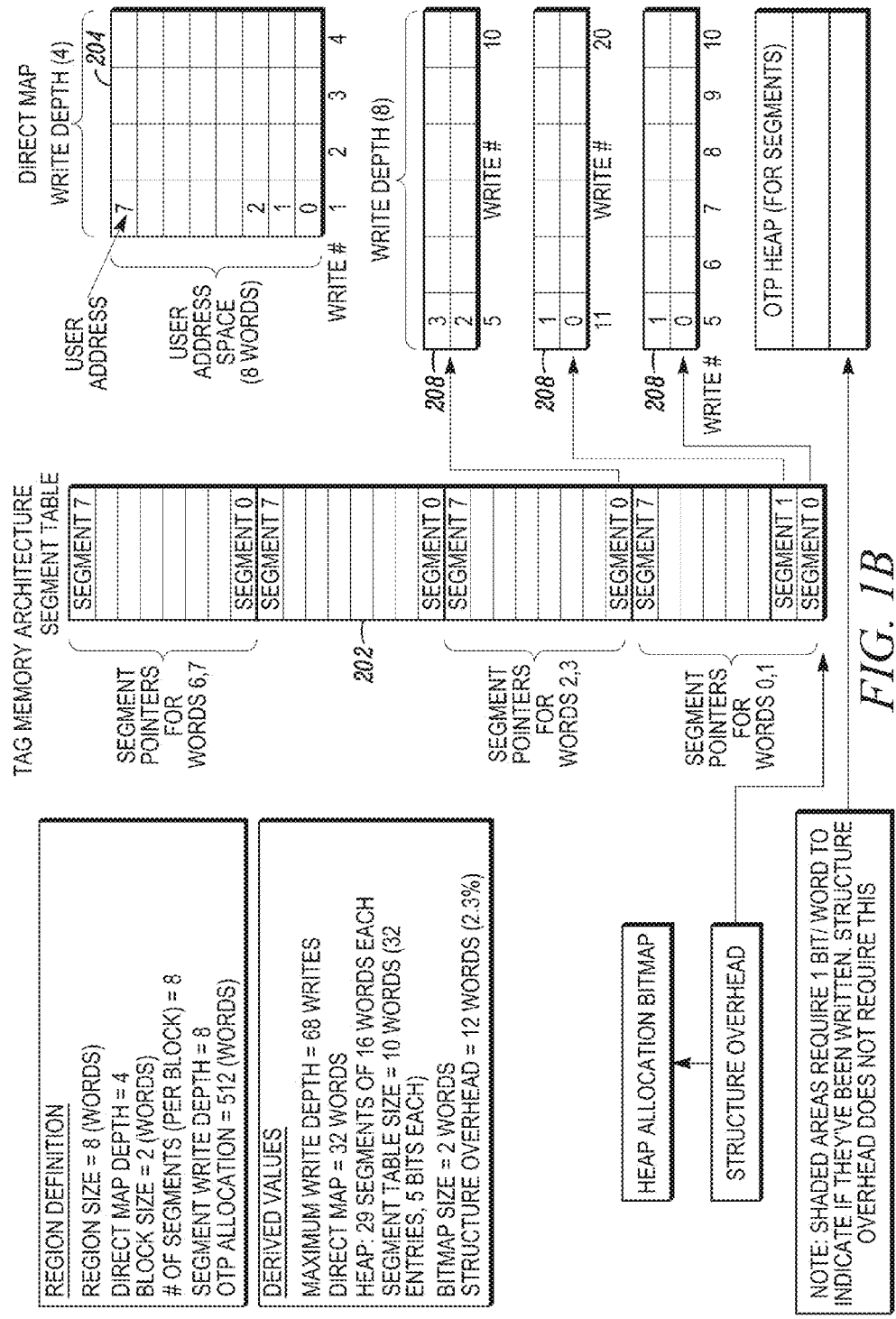
FIG. 1B shows an embodiment of storing information within OTP memory using a segment table and data maps is shown.

Referring to FIG. 1B, an embodiment of storing information within OTP memory using a segment table 202 and data maps (204 and 208) is shown. In an embodiment, the segment table 202 may store pointers (addresses) for data stored in the data maps (204 and 208). The segment table may be implemented as OTP memory, MTP memory, a combination of OTP memory and MTP memory, eMTP memory, or the like. As OTP memory, there may be a set number of available pointers to point to the next memory writing position, point to existing information in a memory position, or the like. In an embodiment, the segment table 202 may be divided into a number of segments to store pointer information and the segments may be grouped into sets of segments for pointing to information within the data maps (204 and 208); the number of segments within a segment group may be dependent on the organization of the data maps (204 and 208). As new information is written to a data map (204 and 208) the next segment within a segment group may be written with a pointer to the new information.

In an embodiment, the data maps (204 and 208) may be organized as direct maps 204 and segment maps 208. In an embodiment, direct maps 204 may be data locations that may be intended to contain certain information. In an embodiment, the direct maps 204 may be used by the owner of the RFID tag 102 to write owner information to particular memory locations within the direct map 204; the direct map 204 may be divided into data addresses that may be used to store the certain types of data the owner may save to the RFID tag 102. For example, the owner of the tag may be an aviation enterprise that may write maintenance information to the RFID tag 102 and may require a certain number of data addresses to store this information. For this example, there may be direct map 204 data addresses for each of the saved maintenance records. In an embodiment, each data address within the direct maps 204 may be used to store certain types of data. In embodiments, data may span more than one data address, data may be a portion of a data address, or the like.

In another embodiment, the data addresses of the direct map 204 may be used to emulate MTP (eMTP) memory by allowing information to be written to each direct map address more than once. In this case, each data address may have a plurality of associated memory words to store information in OTP memory. As shown in FIG. 1B, there are four memory words for each of the eight direct map 204 data addresses. The number of memory words that are associated to a direct map address may be considered the direct map write depth. For example, in the direct map 204 of FIG. 1B, the write depth is four. With a write depth of four, information may be written to each direct map memory address four times before the memory address is considered full. For example, the first time information is written to a certain memory address, the information may be written to memory word one. If new information is required to be written to the same direct map 204 memory address, the next information may be written to memory word two. Writing to the next write location for a particular memory address may continue until the last memory write word is filled with information. In FIG. 1B direct map 204, four data words are shown for each user address, it should be understood by someone knowledgeable in the art that there may be any number of user addresses and data words for information storage. Additionally, it should be understood that there may be a variable number of data words for the addresses within a direct map 204 where some addresses have different write depths from other addresses. For example, addresses 1-10 may have a write depth of four and addresses 11-20 may have a write depth of six. In an embodiment, there may be an algorithm to determine what is the next available direct map 204 word to which information is to be written and the most recent written direct map 204 word from which to read the information.

In an embodiment, the segment maps 208 may be used for storage of any information that may be written to the RFID tag 102. Similar to the direct map 204, the segment maps 208 may contain an individual element of data, data may span more than one data block, data may be a portion of a data block, data may be stored using the set write depth of the memory address, data may be stored using a variable write depth, or the like. In FIG. 1B segment map 208, six data words are shown for each address, it should be understood by someone knowledgeable in the art that there may be any number of addresses and data words for information storage.

In an embodiment, the segment map 208 may use a fixed write depth, a variable write depth, a combination of fixed and variable write depths, or the like. In an embodiment, a fixed write depth may include each segment in the segment table 202 associated to a fixed number of memory words to store information. As shown in FIG. 1B, the segment table 202 has a fixed write depth of six memory words. As information is written to the segment, the next OTP memory word is used to store the new information. Once the segment has been written to for the six memory words, that memory segment may be considered full. It should be understood that while one segment may be considered full, other segments within the segment table may have memory words that have not yet been written and therefore are not considered full.

In another embodiment, the segment map 208 OTP memory may use a variable write depth. In an embodiment, as a segment is considered full because all of the segment words have been written, memory words from other segments that have not been written may be associated to the full segment address. For example, if the six memory words associated with a first segment are all written, a second segment, and associated memory words, may be used to continue storing information to the first segment. In the segment map configuration shown in FIG. 1B, this may then provide the first segment with twelve memory words to store information. As more information is stored to the first segment, additional other segments containing unused memory words may be associated to the first segment to continue storing information to the first segment and therefore increasing the write depth of the first segment. In an embodiment, a memory protocol may be used for the variable write depth to associate the first segment with additional segments. In an embodiment, the first segment may use all of the second segment words, may use some of the second segment words, or the like. In an embodiment, if some of the second segment words are used by the first segment, the write depth of the second memory may be reduced to account for the information written from the first segment and the write depth for the first segment may be increased.

In an embodiment, instead of predefined fixed segments and fixed memory word locations, the OTP memory may dynamically allocate segments, dynamically allocate memory word allocations, dynamically allocate segments and memory word allocations, or the like.

In an embodiment, dynamically allocating memory words to segments may include predefined segments within the segment table 202 that do not have associated memory words. In an embodiment, there may be a plurality of memory words defined within an OTP memory space that may be dynamically allocated to a segment as the segment requires additional memory words. The number of memory words may be related to the amount of memory available and the size of the memory words. In an embodiment, as information is stored to the segment, the segment may be allocated a memory word from the plurality of defined memory words. In an embodiment, a plurality of memory words may be allocated to a segment. In an embodiment, the segments within the segment table 202 may have different numbers of memory words allocated. For example, using the dynamically allocated memory words, a first segment may have ten memory words allocated and a second segment may have two memory words allocated. The dynamic allocation of memory words may continue until all of the predefined memory words have been allocated to segments.

In an embodiment, dynamically allocating segments may include adding the segment to the segment table 202 as previously undefined information is added to the OTP memory. In an embodiment, initially, the segment table 202 may be without defined segments. As new information write requests are made to the OTP memory, the new segment may be created and added to the segment table 202. As the new segment is added to the segment table 202, memory words may be allocated to the segment as a fixed memory word allocation or the memory words may be dynamically allocated as described above.

In an embodiment, the dynamic allocation of segments and word memory may be implemented as a combination of MTP and OTP memory or may be implemented as only OTP memory. An example of using a combination of MTP and OTP memory may be to implement the segment address table 202 as MTP memory and the memory words using OTP memory. This configuration may allow the unlimited rewriting of segment address information to the MTP memory to track the OTP word that is storing the latest information in the OTP word memory.

In an embodiment, all of the RFID tag 102 memory may be implemented using only OTP memory. Both the segment table 202 and the word memory may be implemented using only OTP memory. As previously described, OTP memory may be used to store information into word memory that is allocated to a segment within the segment table 202. In this configuration, the segment table 202 may also be implemented using OTP memory, the segment table 202 allocation may be fixed or dynamic. In using OTP for the segment table 202, the next segment may be determined by using a bit map, deducing the next address by counting the number of segments already allocated, or some other address tracking method. In the case of the bit map, setting a bit to 0 or 1 for each segment address allocated may map the allocated segment and may be used to determine the next segment. In the case of deducing the segment, the number of segments already written may be counted during the write operation to determine the next address for a segment. In an embodiment, the choice of which method to use to determine the next segment may be the method requiring the least number of reads to determine the next segment.

An example of using a bit map for determining the next segment may include determining the number of the segments to allocate by counting the bits in the segment table 202, storing the segment number in the segment table 202, writing the bit in the segment bitmap that corresponds to the segment, writing the data and bit into the new segment, and the like.

In an embodiment, when storing information to the segment and/or the word memory, special considerations may be used to account for the available power to store the information. In an embodiment, if the power level is above a certain power threshold, the writing operation may proceed, but if the power level is below the power threshold, the writing operation may not proceed. In an embodiment, there may be specific algorithms for writing information to the RFID tag 102 to allow for recovery from the power level transitioning to a level below the threshold during a write operation to properly write all the information or to allow a recovery point from the interrupted write operation. In an embodiment, a verification bit may be written as part of the information write process to provide an indication if the write process completed and the stored information is correct. In an embodiment, the verification bit may be written after the information is written, the verification bit may be written before the information is written, or the like.

Figure 1C:
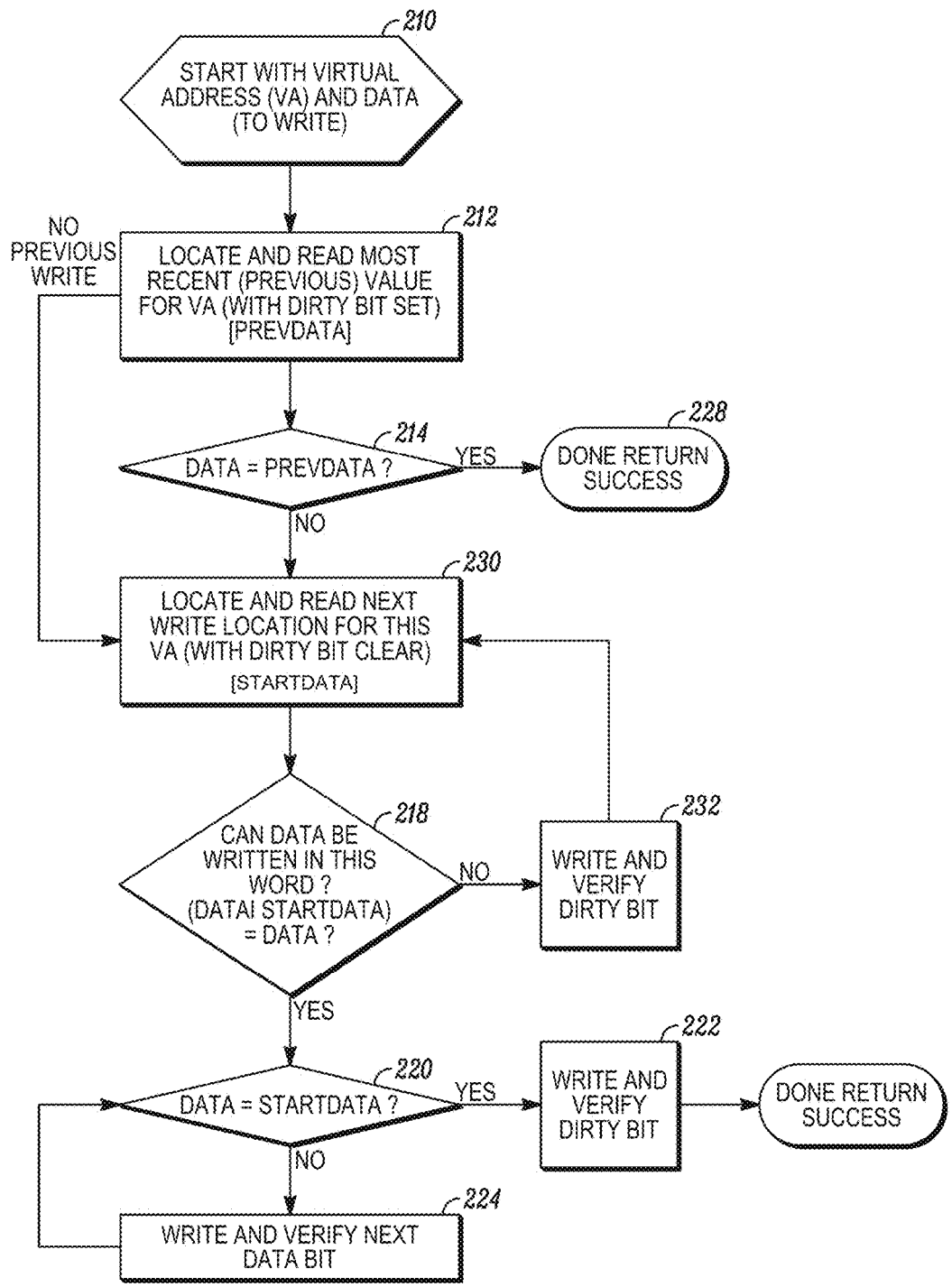
FIG. 1C shows a flow chart embodiment of a write algorithm that may allow for recovery from a low or no power situation during a write operation.

In an embodiment, the flow chart on FIG. 1C shows a careful write algorithm that may allow for recovery from a low or no power situation during a write operation. The first step 210 may be to start with a virtual address and data to write. The next step 212 may be to determine the most recent address that may have the verification bit set, the verification bit may indicate that the previous write completed successfully. There may be a decision step 214 to determine if the new data is the same as the previous data. If so, no additional processing steps may be needed and the process may be done 228. If the data is different from the previous data, there may be a locate and read step 230 to determine the next write location for the data. There may be another decision step 218 to verify that data can be written to the new address and word memory. If not, another memory location (additional write depth) must be used to store the new data and a bit is written to the new address 232. This test also allows recovery from a power failure during a write operation if this same write operation was left incomplete due to a previous power failure. There may be a test to determine if the entire word has been written 220. If the entire word has not been written, the step 224 may be to write the next data bit to the word memory (assuming the data is written one bit at a time). The last step 222 may be to set the verification bit to indicate the write operation of step 222 was complete.

Again referring to FIG. 1B, in an embodiment, the RFID tag 102 memory may be implemented using both fixed allocation of memory and dynamic allocation of memory. In this memory configuration, the dynamically allocated memory may be implemented as any of the previously described methods such as fixed segments with dynamically allocated memory words, dynamically allocated segments with fixed allocation of memory words, dynamically allocated segments with dynamically allocated memory words, or the like. The use of both the fixed and dynamically allocated memory may provide for information writing flexibility by allowing for users to write previously undefined information to the RFID tag 102 and to have a fixed amount of memory allocated to structured writes of information. In an embodiment, one implementation of the memory on the RFID tag 102 may include first writing to the dynamic memory and writing to the fixed memory second. A characteristic of dynamically allocated memory may be a level of uncertainty of the amount of remaining memory that results from the flexibility of the type of information that may be written to the dynamic memory. Using the dynamic memory, users may save information that may be of varying lengths and various numbers of records and therefore may use up the dynamic memory at an unpredictable rate. An advantage of implementing writing to dynamic memory before writing to fixed memory may be once the dynamic memory becomes full, and writing to the fixed memory begins, the RFID tag 102 may return a message to the user that there is a certain amount of memory remaining to be written. Since the fixed memory has a structured set amount of memory, with every information write to the RFID tag 102, the RFID tag 102 may be able to return the amount of memory remaining for additional writes. For example, after a write to the RFID tag 102, the RFID tag 102 may return the total amount of memory remaining, the remaining write depth of the virtual address to which information was just written, or the like.

In an embodiment, the RFID tag 102 may implement both OTP and MTP memory to provide different types of memory regions within the RFID tag 102, the different memory regions may provide different memory characteristics to the RFID tag 102. In embodiments, a combination of the OTP and MTP memory may be used on all the RF network nodes 104, some RF network nodes 104 may use only OTP memory and some RF network nodes 104 may use only MTP memory, or any other combination of OTP and MTP memory on the RF network nodes 104. The combined OTP and MTP memories may be coordinated to provide read and write capabilities to all of the different regions of memory, all the memory regions may be accessed on the RFID tag 102 during the same read/write cycle. In embodiments, the different regions of memory may include unlimited writing regions, limited writing regions, once write regions, or the like.

In an embodiment, MTP memory may be used to provide the unlimited writing regions of the RFID tag 102. In an embodiment, the MTP memory may be allocated to some or all of the RF network nodes 104 and may be coordinated by the RF network node 104 architecture to appear as a continuous memory space to the user. The use of the MTP memory may allow unlimited writing to all the MTP memory locations for the life cycle of the RFID tag 102.

In an embodiment, OTP memory may be used to provide the limited writing regions of the RFID tag 102. In an embodiment, the OTP may use any of the above described OTP and eMTP memory allocation methods such as direct mapping, segment mapping, fixed memory word allocation, dynamic word allocation, dynamic segment allocation, or the like. In an embodiment, the limited write region may be implemented using only OTP memory, MTP and OTP memory, or the like.

In an embodiment, OTP memory may be used to provide the once write writing regions of the RFID tag 102. In an embodiment, the OTP memory may be organized into individual memory locations that may allow information to be written once to the individual memory location, but read many times. In an embodiment, the once write regions may be used to save information that should not be changed during the life cycle of the RFID tag 102. For example, it may be advantageous to save a part number or serial number of an object that the RFID tag 102 is associated with to prevent this information from being over written during the life cycle of the RFID tag 102. In an embodiment, the once write region may provide a form of write protection for information stored within the once write region.

In an embodiment, the segment table 202 may store pointer information for the segment maps 208 for an individual RF network node 104, for a plurality of RF network nodes 104, or the like. In an embodiment, the segment table 202 may store pointer information for redundant memory, distributed memory, public memory, private memory, or the like.

In an embodiment, an OTP memory location may be written to more than once. Information may be written to the OTP memory where the information does not change often, for counters, or the like. In an embodiment, there may be a protocol for storing new data in an OTP memory location that may already contain data. For example, a counter may use the same numbers over time and the numbers that may have previously been used may be written to again with the same number. A portion of the direct maps 204 or segment maps 208 may be dedicated to a counter and the data blocks reused, as the counter is incremented. In another example, the same information may be written a number of different times (e.g. a product name), the information may be checked to determine if the information has been previously stored before storing the new information.

While many of the embodiments disclosed herein involve multi node configurations, it should be understood that the OTP, MTP, and eMTP memory described herein may be used in single RF network node 102 or single radio chip RFID tags 102 where the single RF network node or radio chip may have OTP, MTP, eMTP memory individually or in combination. Additionally, the OTP, MTP, eMTP memory described herein may also be used in non-RFID tag technologies for memory storage. For instance, memory may be used in a mode where data stored in OTP memory on the tag is accessible through an interface other than through an RF interrogator 140, such as when a external facility 138 is connected to the communication interface 160 of the communications facility 134 or serial bus 158, and the external facility powers the tag and accesses the memory. In this mode, power may be provided to the tag by the connected external facility, where both power and data lines are provided between the tag and the external facility, somewhat akin to a USB interface. In this way, the tag provides memory to the external device as an extended memory. For example, an external facility may be a stand-alone computing device (computer, mobile device, smart phone, display, and the like), a networked computing device, and the like, being provided memory facilities on the tag that may be accessed as an extended memory through the computing device. Alternately, power may be provided through an RFID interrogator, but where data is exchanged between the tag and the external facility. For example, an RFID interrogator may RF illuminate the tag to provide power to the tag, the tag provides power to the external facility, and then data is exchanged between the tag and the external facility (such as data provided from the tag to the external facility or from the external facility to the tag).

In an embodiment, a single RF network node 104 RFID tag 102 may include OTP memory and may store information within the OTP memory.

In an embodiment, a single RF network node 104 RFID tag 102 may include OTP and MTP memory and may store information within the OTP and MTP memory.

In an embodiment, a single RF network node 104 RFID tag 102 may include OTP memory as a one time write memory to emulate MTP memory.

In an embodiment, a single RF network node 104 RFID tag 102 may include OTP memory, where the OTP memory may use multiple words to store information.

In an embodiment, a single RF network node 104 on an RFID tag 102 may coordinate OTP memory within the single RF network node 104 RFID tag 102.

In an embodiment, an RFID tag 102 may include a single RF network node 104 and may coordinate OTP memory using segment tables and direct mapping of data related to the segment tables.

In an embodiment, an RFID tag 102 may include a single RF network node 104 and may coordinate an OTP direct map using an MTP segment table.

In an embodiment, a single RF network node 104 RFID tag 102 may write information to OTP memory using a fixed write depth.

In an embodiment, a single RF network node 104 RFID tag 102 may write information to OTP memory using a variable write depth.

In an embodiment, a single RF network node 104 RFID tag 102 may coordinate dynamic allocation of OTP memory.

In an embodiment, a single RF network node 104 RFID tag 104 may use an algorithm to determine if a memory write has completed and may recover if the write did not complete.

In an embodiment, an RFID tag 102 that includes OTP memory may be used for archiving data over long periods of time, such as days, months, years or the like. The archiving of data may include the permanent storing of information within the non-volatile memory, such as OTP memory, of the RFID tag 102. For example, in the aviation industry there may be requirements to maintain data for up to twenty years. As previously described, when new information may be written to OTP memory. In using OTP memory to store information existing information may be maintained within a memory word and the new information to be stored may be written to a new memory word, leaving the original information on the RFID tag. In an embodiment, the saving of the original information and storing new additional data may provide data history that may be used as archive information where both the new and old information may be retrieved, viewed, read, transmitted to an external network, or the like. In one embodiment, there may be an interface with the RFID tag 102 where the user may be able to view the archived information.

As previously described, the original and new information may be stored in fixed allocated OTP memory, dynamically allocated OTP memory, or the like. The different write depth memory systems may be used to store archived information on the RFID tag 102. For example, a fixed write depth memory may be provided for a fixed amount of memory archiving while dynamically allocated memory may have a variable amount of archiving that may only be limited by the amount of memory available on the RFID tag 102.

Additionally, using OTP memory as archiving memory may provide a hardened memory system that resists environmental changes to the stored memory information such as chemical, vibration, temperature, thermal shock, electromagnetic pulse, humidity, mechanical shock, autoclave, magnetic (e.g., degaussing fields), e-beam, ionizing radiation (e.g., x-rays, gamma rays, cosmic radiation), and the like. For example, radiation hardened memory, as understood in the art, is one that is able to retain and/or operate through an exposure to a level of ionizing radiation. Since OTP memory information is burned into the RFID tag (e.g., with fuse or anti-fuse OTP technologies) the information is non-volatile and may be resistant to environmental changes to memory, such as to ionizing radiation. The RFID tag may have OTP memory locations arranged in a manner that allows the RFID tag to have an addressable memory store that withstands radiation exposure. For instance, as described herein, a plurality of OTP memory locations may be configured into an emulated multiple-time programmable (eMTP) memory location, where since the OTP memory locations comprising the eMTP memory location are radiation hardened memory locations, the eMTP memory thus becomes an emulated radiation hardened multiple-time programmable memory. Ionizing radiation is only one example of an environment that the OTP, and by extension eMTP, memory locations may be 'hardened' against, as described herein.

In addition to the hardened aspects of the archive OTP memory resistance to environmental influences, the RFID tag 102 may include a start-up memory test to determine the availability of memory for storage or if memory locations may have received damage that might affect the OTP memory. In an embodiment, if a blank memory location is determined to be damaged, the damaged memory locations may be marked to not receive additional information. In another embodiment, if a memory that contains information is determined to be damaged, the RFID tag 102 may attempt to move the information from the damaged locations to non-damaged locations within the RFID tag 102. In another embodiment, information may have been originally stored in a redundant memory location, and when information in a primary location is found to be damaged, the redundant memory location may be accessed. For example, when an RFID interrogator attempts to read the primary location, the RFID may provide the RFID interrogator with the information from the redundant location. In addition, information from the redundant memory location may then be written to at least one further, additional memory location that is available, providing further redundancy in the event of damage to the redundant memory location. In embodiments, the data itself may not be provided in a redundant location, but rather the data is redundantly encoded (e.g., Hamming code, BCH code, Golay code), where the encoding of the data is stored in redundant locations. In embodiments, as described herein, memory may be included on a single RFID node, multiple RF network nodes, multiple RFID tags, and the like. For instance, primary memory may be included on one of a plurality of RF network nodes, and redundant memory included on a second of a plurality of RF network nodes. In another embodiment, the primary and redundant memory may be on the same RFID node.

Test data reveals that an OTP-based RFID tag having the characteristics of embodiments as described herein may withstand harsh environments, including maintaining access performance (e.g., read range), data integrity, writability, and the like, through various changes in environmental conditions. RFID tags that are able to withstand harsh environments may expand the use of RFID tags into industries and information applications that have not previously been available using traditional RFID tags. This is especially true when a plurality of OTP memories are configured into an eMTP memory location as described herein, thus creating an MTP-based RFID tag that is capable of withstanding harsh environments. Industries that may benefit from RFID tags capable of withstanding harsh environments may include the life sciences, nuclear, aerospace, oil and gas industries, and the like. For example, an RFID tag that can maintain data integrity through a high ionizing radiation event may be used to store information, and tagged to, life science samples undergoing a sterilization process. These tags may also be used for lower intensity but longer exposure applications, such as in aerospace where a component may be tracked for 30 years of high altitude flights in low elevated, but accumulating gamma radiation exposure.

Tables 1 through 4 present test data with respect to radiation environments for OTP-based RFID tags of the present invention, including different packaging configurations, such as inlay type tags, flexible tags, and the like. A number of corresponding off-the-shelf EEPROM-based RFID tags were tested as a point of reference, where EEPROM tags offer the convenience of re-write capability, but at the cost of not being very resistant to harsh environments.

With respect to testing protocols, all samples were initialized with random data to fill the RFID memory banks. In addition, the OTP samples were written with OTP data and the accessible MTP data as allowed. Each part was swept over the UHF frequency range (860-960 MHz) to establish the baseline performance. After each environmental exposure the samples were scanned to validate memory integrity and determine deviation in the required minimum RF power required to reflect data. The results represent an average of 3 samples for each condition. Samples were mounted to either aluminum or polymethylmethacrylate based on individual product specifications and recommendations and were interrogated across the frequency range 860-960 MHz using a standard off-the-shelf reader and antenna. A test rig was built to ensure that the before and after sweeps were collected at the same distance in the same environment.

Radiation resistance is a challenging environment for RFID tags. In general, electronic devices are largely insensitive to low levels of radiation over the course of their service, such as from background radiation at the surface of the Earth. However, some industry applications require much higher radiation tolerance, such as in the medical fields (e.g. surgical products and medical devices requiring sterilization, equipment usage tracking, disposable item tracking) where the intensity is substantially greater than background radiation; food preparation and manufacturing (e.g., mixing and handling equipment, shipping and storage containers, long-term storage containers, sterilizing an environment with tagged foods, packages and containers in place, tracking foods through the supply chain), bio technology, food storage (e.g., tanks), space (e.g., satellite components, spacecraft), power production (e.g., nuclear power, hybrid power plants, solar), science (e.g., biotech, physics research), health care (e.g., dental imaging, CT scanning, MM imaging, UV treatments, radiation treatment, imaging diagnosis), military and first responder applications (e.g., equipment exposure to radiation), military (e.g., tracking equipment and exposure through deployment), transportation (e.g., aerospace), and the like. Other applications may require more moderate radiation intensity over the short term, but require higher dose requirements over the long term, such as in aerospace, medical equipment, hospital patient care, and the like. For example, the challenge for the aerospace environment goes above and beyond traditional electronics for two reasons: the need to maintain data integrity while in service at higher altitudes and the need to maintain this data for 30 years. Testing included exposure to two sources of radiation that can be accurately determined and controlled to simulate long-term exposures, electron-beam and gamma-rays.

Electron-beam (e-beam) radiation is used in a variety of applications from polymer processing to pest control. Free electrons are the result of either ionizing radiation from multiple sources or engineered using cathode ray tubes. Various dosages of E-beam radiation were examined for both effects of data retention (Table 1) and post exposure IC functionality (write-ability, Table 2). OTP tags of the embodiments described herein survived all dosages tested for both data integrity and IC functionality, where results were reported on a pass/fail (P/F) basis. Corresponding EEPROM tags failed at all dosages tested.

TABLE 1

E-beam effects on data integrity

| | E-Beam Dose | | | | |
|---|---|---|---|---|---|
| | 10 kGy | 25 kGy | 50 kGy | 100 kGy | 200 kGy |
| EEPROM tag | F | F | F | F | F |
| OTP tag | P | P | P | P | P |

Note:
MTP memory residing on the OTP tag types began experiencing errors at 25 kGy

TABLE 2

E-beam effects on writability

| | E-Beam Dose | | | | |
|---|---|---|---|---|---|
| | 10 kGy | 25 kGy | 50 kGy | 100 kGy | 200 kGy |
| EEPROM tag | F | F | F | F | F |
| OTP tag | P | P | P | P | P |

Gamma ray radiation is used in a variety of applications from moderate intensity, long-term exposure for aircraft, to high intensity exposure for sterilization procedures in the life sciences. These high-energy events have the potential to interact or couple with charge-based devices to damage circuitry. For screening purposes, samples were subjected to gamma radiation and checked for effects of data retention (Table 3) and post exposure IC functionality (write-ability, Table 4). The OTP tags of the embodiments herein survived all radiation levels for both data retention and IC functionality. EEPROM tags failed at all radiation levels above 2.5 kGy.

TABLE 3

Gamma radiation effects on data integrity

| | E-Beam Dose | | | | | | |
|---|---|---|---|---|---|---|---|
| | 2.5 kGy | 5 kGy | 10 kGy | 25 kGy | 50 kGy | 100 kGy | 200 kGy |
| EEPROM tag | P | F | F | F | F | F | F |
| OTP tag | P | P | P | P | P | P | P |

Note:
MTP memory residing on the OTP tag types began experiencing errors at 25 kGy

TABLE 4

Gamma radiation effects on writability

| | E-Beam Dose | | | | | | |
|---|---|---|---|---|---|---|---|
| | 2.5 kGy | 5 kGy | 10 kGy | 25 kGy | 50 kGy | 100 kGy | 200 kGy |
| EEPROM tag | P | F | F | F | F | F | F |
| OTP tag | P | P | P | P | P | P | P |

From these results, it follows that using OTP-type memory in RFID tags having the characteristics of embodiments as described herein minimizes the risk of data loss and corruption for ionizing radiation.

Other environments that may involve factors that are harsh or difficult for a typical RFID tag include corrosive and chemical environments, high temperature environments (e.g., military desert deployments), data centers (e.g., on hot components), solar modules, automotive interiors/exteriors), high temperature manufacturing environments (e.g., crystal growth, sintering, melting), high water content environments (e.g., shipping beverages and foods involving water), and the like.

In embodiments, archiving of information on multiple RF network node 104 RFID tags 102 may be used for aviation history, medical instrument history, medical patient history, vehicle maintenance history, food history, security history, pharmaceutical history, personal identification history, and the like.

In an embodiment, the combined memory of the RFID tag 102 may be organized with more than one memory method. For example, one memory location may use a fixed write depth while another memory location may use variable write depth. The way in which the RFID tag 102 memory is allocated may be determined by the type of information the RFID tag 102 is storing and the memory usage may vary from one RFID tag to another RFID tag. In an embodiment, the memory may be allocated as the information is stored to the RFID tag 102, when the RFID tag 102 is associated to an object, when information is first written to the RFID tag 102, or the like.

In an embodiment, the RFID tag memory organization may be stored in a configuration table on the RFID tag. In embodiments, the configuration table may be stored on a single RF network node 104, stored across multiple RF network nodes 104, or the like. The configuration table may store and manage data related to the organization of the RFID tag 102 memory such as types of memory, memory regions, word depth writing type (e.g. fixed or variable), and the like. In an embodiment, the configuration data may be considered metadata for the data writing type regions of the RFID tag 102. In an embodiment, the configuration table may be fixed or dynamic. For example, with a fixed configuration table, the table may be written with the configuration of the available memory and may not be changed during the life of the RFID tag 102. A dynamic configuration table may be able to have different memory allocations written to it over time as the memory is allocated. For example variable word depth is used on the RFID tag 102 and as additional word depths are made available to memory, the new memory region for the variable depth memory may be stored to the configuration table.

Referring again to FIG. 1, in embodiments, the data processing and controller 132 may support a digital adjustment of the impedance match between the antenna 108 and the circuitry of the RF network node 104. The ESD and impedance matching 110 functional block may include multiple switch elements to turn on or off. In embodiments, the data processing and controller 132 may include a function that results in switch elements being turned on or off. In embodiments, the data processing and controller 132 may determine the number of switch elements to turn on or off in the ESD and impedance matching 110 block. The data processing and controller 132 may send more than one control command for the adjustment of the ESD and impedance matching 110 block. For example, the data processing and controller 132 may read the value of a parameter associated with the strength of the received signal from the reader 140, and the data processing and controller 132 may send a command to adjust the switch settings of the ESD and impedance matching 110 block. This procedure may continue until a maximum value for the parameter is reached. Another example may be the data processing and controller 132 sending a command to adjust the switch settings of the ESD and impedance matching 110 block after each read attempt by the reader 140.

In embodiments, the data processing and controller 132 may support the reader 140 control of impedance matching. The reader 140 may have an algorithm to receive the RFID tag 102 transmissions, measure the strength of the response, calculate a command function, and resend the read signal with the command function. The command function may be a command to adjust the impedance and resend the data. The command function may be received by the data processing and controller 132, which may create the control command to be sent to the ESD and impedance matching 110 block to turn switch elements on or off to match the impedance of the antenna 108. An improved impedance match may result in the improved strength of the RFID tag 102 on the second return signal. In embodiments, the process of the reader 140 sending a read request, and a function command to adjust the impedance, may be repeated until an acceptable reception level is achieved.

In embodiments, the data processing and controller 132 may support communications from one RF network node 104 to another RF network node 104 across the inter-node interface 154 and the RFID tag's 102 common antenna connection 158 as will be described in FIG. 5B. The inter-node interface 154 may connect to the common antenna connection 158 through the RF network node's 104 ESD and impedance matching block 110. The common antenna connection 158 may connect all of the RF network nodes 104 of the RFID tag 102, as well as the RFID tag's 102 antenna(s) 108, together. Data may be transferred across these connections from one data processing and controller 132 to another. The data processing and controller 132 of each of the RF network nodes 104 may include a transmitter and receiver in support of this interface. Transmission across this interface may be accomplished by modulating the DC level of the signal on the common antenna interconnection 158 by using an inverter with a high resistance at its output that is connected to the interface. In this way, the DC level may be modified (AM modulation). In embodiments, the data rate across the inter-node interface 154 may be at a relatively low rate, such as 75 kHz, 100 kHz, 150 kHz, or the like, as compared with the HF and UHF frequencies of the reader's 140 carrier wave.

The configuration for the inter-node interface 154 and the common antenna connection 158 may be any one of a plurality of interface interconnections known to the art, such as a series bus, a parallel bus, a series daisy-chain, and the like. In embodiments, the interconnection of the inter-node interface 154 and the common antenna connection 158 may be made through the ESD and impedance matching block 110. Communications across the inter-node interface 154 may occur simultaneously with, or exclusive from, transmissions to and from the reader 140 or other tags. In embodiments, capacitance on the common antenna connection 158 may be such that the communication's bandwidth remains sufficient for both the low frequency of inter-node interface communications, a frequency of 100 kHz for instance, and the higher carrier frequency of the reader 140, a frequency of 900 MHz for instance.

In embodiments, the data processing and controller 132 may have an internal data bus 530 that enables communication within the data processing and controller 132. This internal data bus 530 may provide a direct data path between processing elements, memory, registers, arithmetic units, and the like. The internal data bus 530 may provide buffered data paths between the data processing and controller 132 and functional blocks that are external to the data processing and controller 132, such as the random number generator 122, the persistence 124 circuit, the modulator 128, the demodulator 118, the communications facility 134, and the like.

In embodiments the master RF network node 104 may control the communication's path between the RF network nodes 104, which includes the internal data bus 530, the inter-node interface 154, and the common antenna connection 158. The master RF network node 104 may utilize this collective communications path for a plurality of cross-RF network node 104 functions, such as shared or distributed memory, shared or distributed processing, redundancy management, master RF network node 104 protocols, or the like.

In embodiments, the data processing and controller 132 may include programming, logic, and/or memory in support of a function for determining which of the RF network nodes 104 may be the master RF network node 104 on the RFID tag 102. The master RF network node 104 determination may occur each time the RFID tag 102 is powered up. Alternately, the master RF network node 104 assignment, once established, may be maintained during brief interruptions in power by storing the assignment logic state in the persistence 124 circuitry, described herein. Assignment of the RF network node 104 as master or slave may also be stored in memory, where memory may be volatile for use during operations, or non-volatile for use over multiple operational, power on/off periods. The data processing and controller 132 function, that performs the selection of the master RF network node 104, may utilize the random number generator 122. The data processing and controller 132 may control the random number generator 122 by providing a logical enable signal, generate a random number signal, read a random number signal, or the like. There may be a data interface between the random number generator 122 and the data processing and controller 132, which may be a serial or parallel interface. In embodiments, the interface may be a serial interface, reading an exclusive- or of the multiple oscillators running in the random number generator 122.

Figure 2:
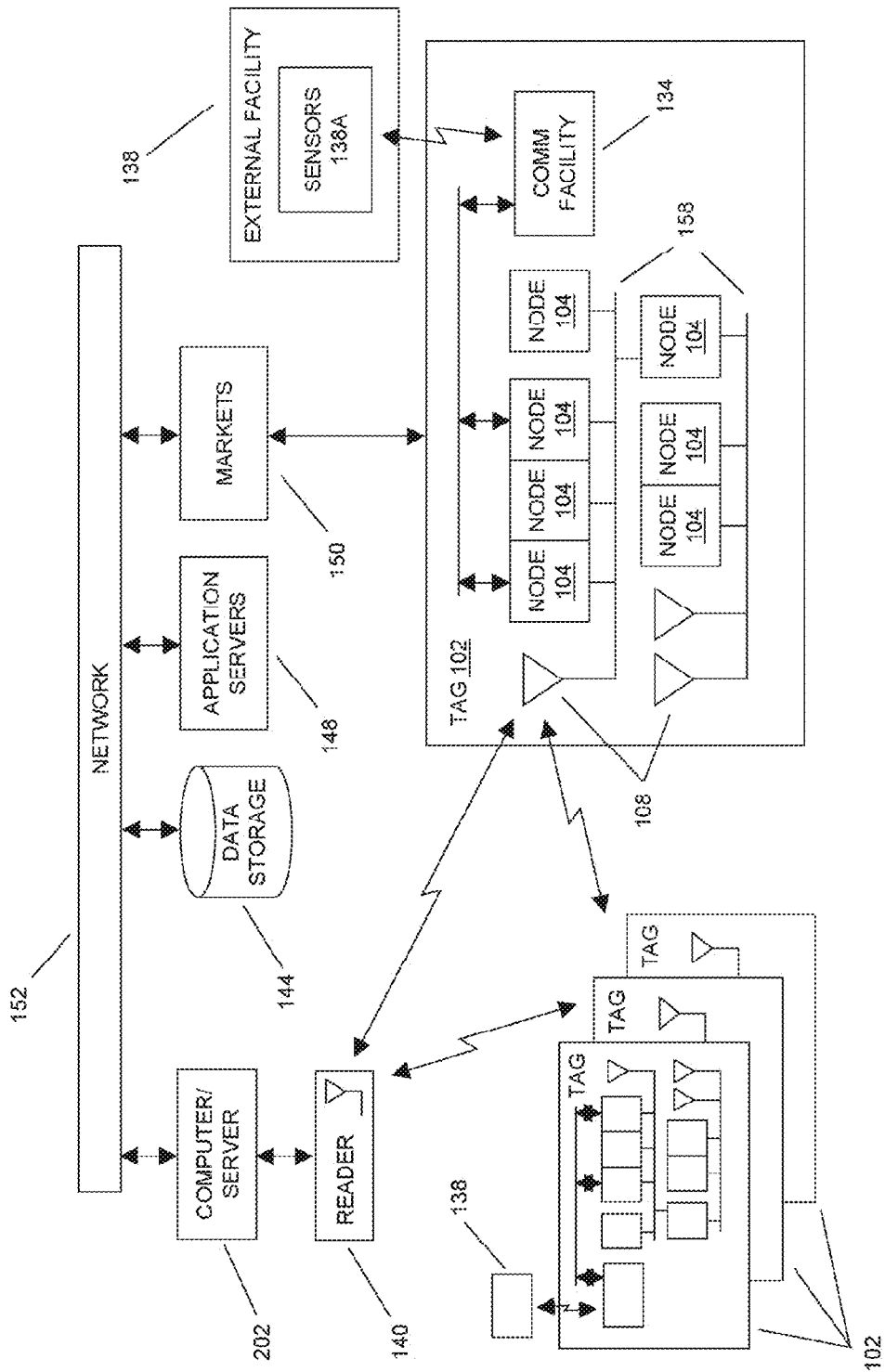
FIG. 2 shows a schematic of the overall RFID tag communication system.

In embodiments the reader 140 may be connected to computer device 202 (as shown in FIG. 2). The computer device 202 may be a server, a desktop computer, a laptop computer, a tablet computer, a handheld computer, a smart device (e.g. a smart phone), or the like. Additionally, the computer device 202 may be connected to a network 152 for support of additional functionality that may include data storage 144, an application server 148, the markets 150, or the like. In an embodiment, the network 152 may be a LAN, WAN, peer-to-peer network, intranet, Internet, or other network system.

The computer device 202 may provide support to the reader 140 by providing the commands for the reader 140 to transmit to the RFID tags 102. The computer device 202 may be used as a temporary store for the information received by the reader 140 from the RFID tags 102 to which the reader 140 is communicating. The temporary store of the computer device 202 may aggregate the RFID tag 102 information until all the information is transmitted, then the information may be transmitted to the network 152. The computer device 202 may transmit the information to the data storage 144, the application 148, the market 150; may make the information available for the data storage 144, the application 148, the market 150 to retrieve as needed; or may separate the aggregated information into individual information for the data storage 144, the application 148, the market 150.

The data storage 144 may include a data storage medium (e.g. disk drives and memory), computer devices, servers, or the like. The data storage 144 may be for an individual enterprise to store information from the reader 140, storing information for a plurality of enterprises from the reader 140, or the like. In an embodiment, the application servers 148 and the markets 150 may store and retrieve information from the data storage 144.

The application servers 148 may be used to aggregate information from the reader 140 over the network 152 for an individual enterprise, for a plurality of enterprises, of entire markets 150, or the like. The application servers 148 may receive or retrieve raw information from the reader 140 and computer device 202 and perform information conversion, information aggregation, information segregation, or the like that may be used for reporting, alerting, or the like. For example, the application server 148 may aggregate the movement information of a product from the plurality of readers 140 over the products distribution system. The application server 148 may create an aggregated report on the total movement of the product from the start of the distribution to its present location. Additionally, the application server 148 may send out an alert to an enterprise if it is determined that a product has remained at a single location longer that is necessary. For example, where the product may be a perishable product and is required to be delivered to a market within a certain time period, the application server 148 may provide an alert that the delivery is being held up at a particular location so the enterprise may intervene to ensure its timely delivery.

As depicted in FIG. 1, markets 150 may include entire segments of the economy such as food management, retail general merchandise, retail service stations, retail physical plants, retail hotel and resorts, restaurant food service, employee identification, security systems, airline services, marine and shipping, office systems, communication systems, public event services, and the like. It would furthermore be apparent to someone skilled in the art that the RFID tags 102 as described herein may be used in many different markets and that this list is not to be considered as a limiting list; instead, any markets where the RFID tags 102 as described herein may be used are to be considered consistent with the systems and methods described herein. An exemplary set of markets 150 will be described further herein. In an embodiment, markets 150 may access the network 152 to receive information, retrieve information, transmit information, or the like. In embodiments, markets 150 may retrieve or receive information from the application servers 148, data storage 144, computer devices 202, readers 140, or the like. In embodiments, markets 150 may use the data storage 144 or application servers 148 to aggregate, separate, collect, or the like data from the reader 140 or the markets 150 may perform their own information aggregation, information separation, information collection, or the like. Markets 150 may also transmit information to the computer devices 202, readers 140, and application servers 144. For example, a market 150 may transmit information to the reader 140 to retrieve certain information from an object when the reader 140 reads the objects RFID tag 102.

FIG. 2 shows schematically the overall architecture of the RFID tag 102, and how it may interact with the surrounding system. In embodiments, the RFID tag 102 may include the plurality of RF network nodes 104, the plurality of antennas 108, the common antenna connection 158 that ties RF network nodes 104 together and to the antenna(s) 108, the inter-node interface 154 that enables communication between the RF network nodes 104, the communications facility 134, a gateway interface 160 between the communications facility 134 and the external sensors 138, and the like. The RFID tags 102 may communicate externally with the reader 140, with other RFID tags 102 by way of the RFID tag's 102 antennas 108, or with the external sensors 138 by way of the RFID tag's 102 communication's facility 134. The RF network nodes 104 may also communicate internally with each other across the signal interface, which may include the inter-node interface 154 and the common antenna connection 158, connecting the RF network nodes 104 to each other and to the RFID tag's antenna(s) 108. In addition, the markets 150 being served by the RFID tags 102 may have a connection into the RF network node's 104 data processing and controller 132 by way of embedded market 150 application specific logic, programming, memory, or the like.

Figure 3:
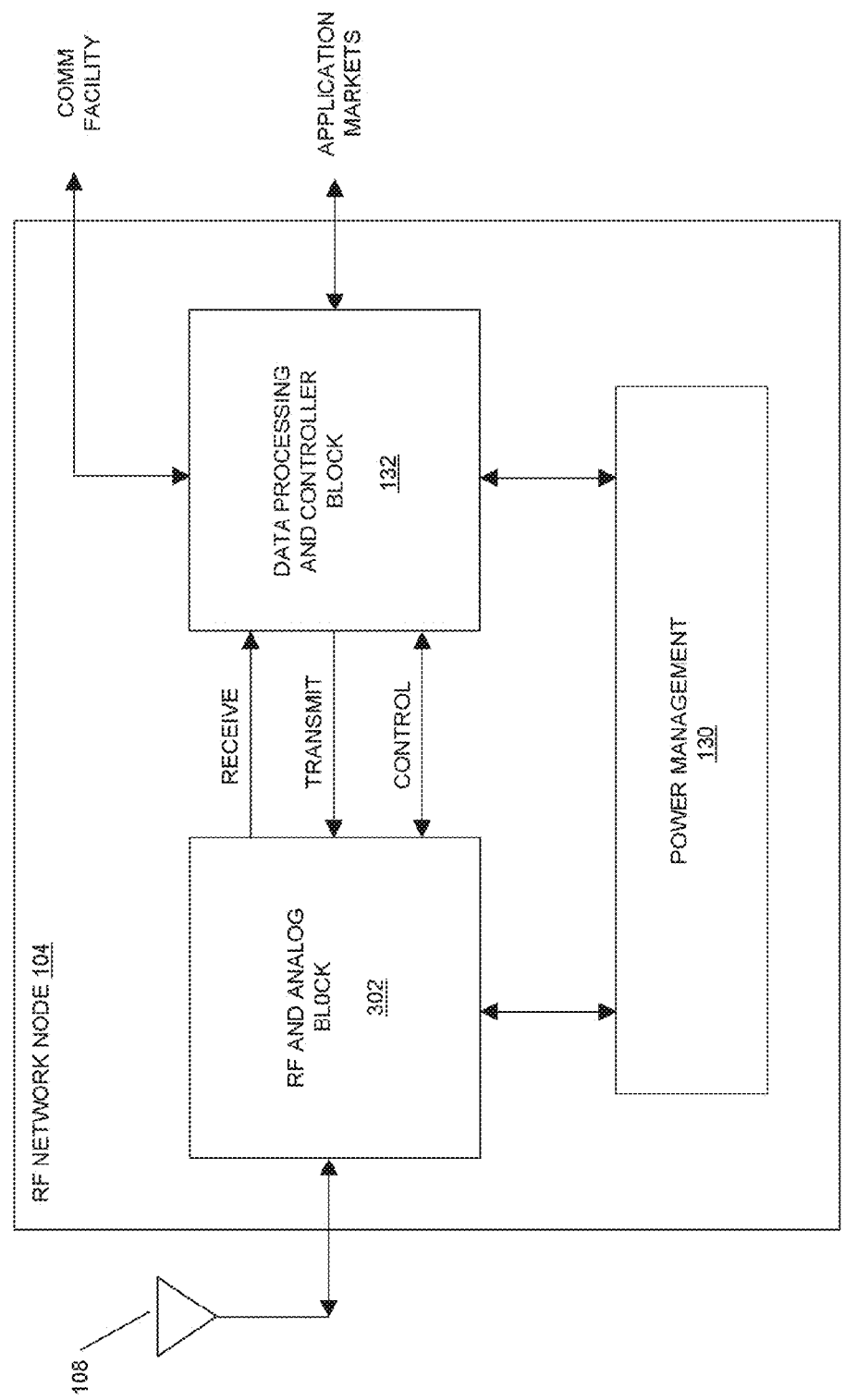
FIG. 3 shows a block diagram schematic of an RF network node.

FIG. 3 shows an embodiment of the overall architecture of the RF network node 104. In embodiments, the RF network node 104 may be represented by three functional blocks: the RF and analog 302 block, the data processing and controller 132 block, and the power management 130 block. External interfaces to these functional blocks within the RF network node 104 may include the antenna 108, the communications facility 134, markets 150, and the like. In embodiments, the external interface to the markets 150 may not be a direct physical connection, but may instead represent an application connection that may be realized at the device programming and/or configuration stage, at the manufacture of the device, or as a part of operational reading and writing from non-volatile memory (e.g. EEPROM or Flash memory for instance) through the antenna 108, and on through the reader 140 and the network 152 to the markets 150. In embodiments, the interface to the communications facility 134 may be an analog interface, a serial or parallel digital interface, or any signal communications interface known to the art. In embodiments, the communications facility 134 may be a gateway for a plurality of external facilities 138 that are described herein.

FIG. 3 further depicts the internal communication paths between the three functional blocks, including transmit, receive, and control signals between the RF and analog block 302 and the data processing and controller block 132, as well as power and control signals between the power management 130 and the RF and analog 302 and the data processing and controller 132 blocks. In embodiments, a typical operation for the RFID tag 102 with the plurality of RF network nodes 104 may be the reception and execution of a command from the reader 140. Upon reception of a continuous RF carrier wave from the reader 140, the RF network nodes 104 may extract power from the impinging RF carrier wave to supply power to the RF network node 104. Extracting power from the impinging RF carrier is also referred to as harvesting power from the RF carrier. Maximizing the harvested power from the RF carrier wave may be achieved by providing the optimum impedance match between the antenna 108 and the RF network node 104. In embodiments, the impedance matching may be a dynamic process controlled through analog or digital circuit applications.

Figure 4:
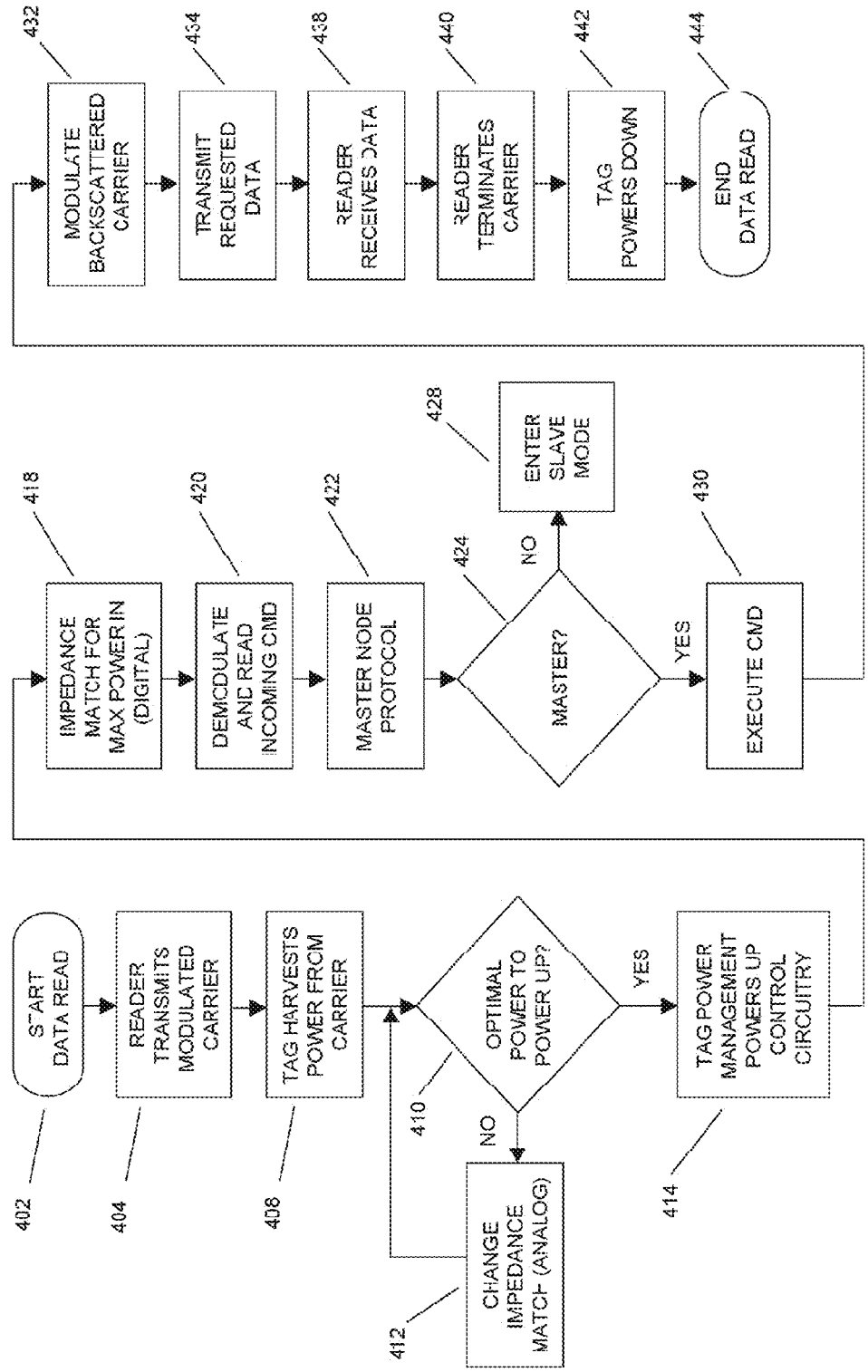
FIG. 4 shows a schematic flow chart of a typical communication between a reader and an RFID tag.

FIG. 4 provides a flow chart depicting one possible scenario for the RFID tag 102 receiving and executing a generic command from the reader 140, as previously described with reference to FIG. 1. The flow graph begins with the start of a data read 402 sequence, where the reader transmits a modulated carrier 404 to the RFID tag 102 within range. The antenna 108 receives the carrier wave, and power from the carrier wave is rectified and filtered in the power management 130 block at sequence 408. The power management block 130 circuitry may sense whether there is sufficient power to power up 410 circuitry within the RF network node 104. If not, there may be analog circuitry that changes an impedance match 412 between the receiving circuitry and the antenna 108 until sufficient power levels are achieved. When there is sufficient power, the power management 130 block powers up circuitry 414 in the RF and analog block 302 and the data processing and controller block 132. Once there is sufficient power to power up the circuitry on the RF network node 104, there may be a step where the data processing and controller block 132 executes a routine for impedance matching to adjust for maximum power 418. Once optimum impedance matching has been achieved, the incoming signal may be demodulated in the RF and analog block 302, and a digitally converted command is read 420 by the data processing and controller block 132.

In the RFID tag 102 where there is more than one RF network node 104, as described above with reference to FIG. 2, a protocol 422 to select the master RF network node 104 may be utilized to determine which RF network node 104 may be the master 424 for the execution of command and control of the received commands. If at least one of the RF network nodes 104 is determined to not be the master, it may enter a slave mode 428. If the RF network node 104 is determined to be the master, a received command may be executed 430 by the master RF network node 104. After command execution, the response to the command may be formatted by the data processing and controller 132 block and sent to the RF and analog block 302 to be modulated 432 and transmitted 434 to the reader 140. When the reader 140 receives the data 438, the reader 140 may terminate the transmitted carrier wave 440, which in turn may remove the source of power from the RFID tag 102. The RFID tag 102 may then power down 442. The data read sequence may then be ended 444. It should be understood that this flow graph, representing one possible sequence that may be executed by the RFID tag 102, is provided as a representative routine to illustrate the operability of some of the major functional blocks of the RFID tag 102, and is not meant to limit the functional capabilities of the RFID tag 102, as illustrated by embodiments described herein.

In the above protocol, the first RFID tag 102 component to be physically acted upon may be the antenna 108. However, as shown in FIG. 2, there may be multiple RFID tags 102, each with multiple antennas 108. One antenna 108 may be connected to multiple RF network nodes 104; multiple antennas 108 may be connected to a single RF network node 104 or to multiple RF network nodes 104; one antenna 108 may be connected to one RF network node 104 or multiple RF network nodes 104, while another antenna 108, on the same tag 102, may be connected to a separate RF network node 104 or multiple RF network nodes 104. In the case where there is more than one antenna 108 connected to the RF network node 104, or multiple RF network nodes 104, the RFID tag 102 may select which antenna 108 is to be used in communications. In addition, different antennas 108 may be optimized for different frequencies, such as one antenna 108 operating at high frequency (HF) while another antenna 108 is operating at ultra high frequency (UHF), very high frequency (VHF), or the like. The individual antenna 108 may also be capable of receiving and transmitting signals on different frequencies. The antennas 108 may be transmitting and receiving with the reader 140 or other RFID tags 102. In embodiments, if the ESD and impedance matching 110 scheme utilizes capacitive impedance, the antennas 108 may need to have positive real impedance for best results.

Figure 5A:
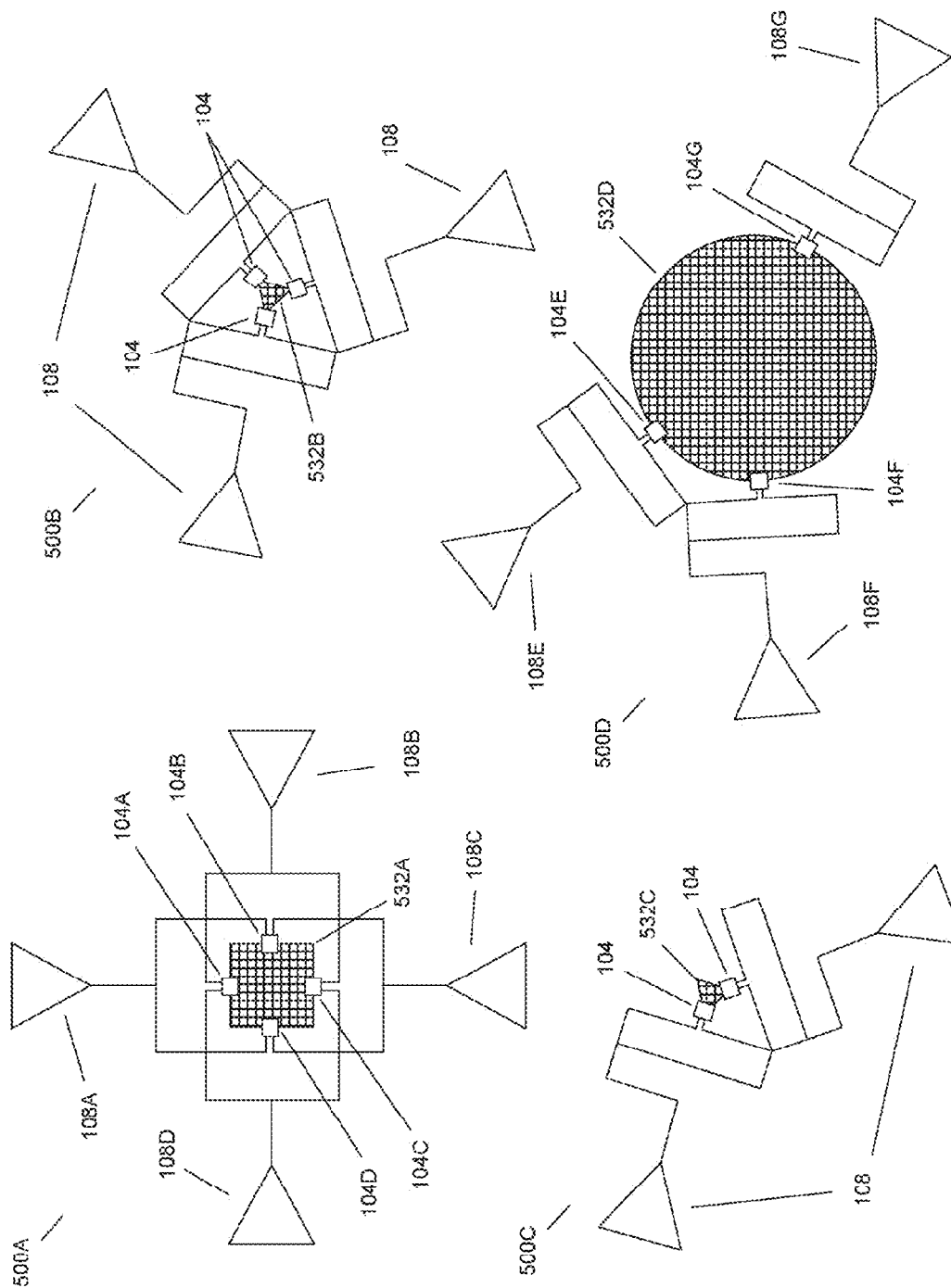
FIG. 5A shows an embodiment of the electrical reference ground interconnection configuration.

In embodiments, the connection of multiple antennas 108 with multiple RF network nodes 104 may be associated with an electrical reference ground 532. FIG. 5A shows four antenna interconnection configurations 500A-D of a plurality of possible combinations of antennas 108 and RF network nodes 104. For example, FIG. 5A shows an antenna interconnection configuration 500A where four antennas 108 are interconnected with four RF network nodes 104. In embodiments, each antenna 108 may be connected to an RF network node 104, as well as connected to the other antennas 108 and other RF network nodes 104. Further, power may be received primarily by the antenna 108 most directly associated with the RF network node, or may be shared amongst the interconnected RF network nodes 104. For example, energy received by the antenna 108A may be primarily used by the RF network node 104A, or may be shared by some or all of the interconnected RF network nodes 104A-D. In an embodiment, for each of the four antenna interconnection configurations 500A-D, there may be a third connection point on the RF network node 104, in addition to the two antenna 108 connection points, connected to the common electrical reference ground 532. The common electrical reference ground 532 may provide the electrical reference for power and signals on and between the RF network nodes 104, and thus provide a common electrical reference ground 532 for multiple RF network nodes 104 on the RFID tags 102.

In embodiments, each antenna 108 may be paired with a specific RF network node 104. An antenna 108/RF network node 104 pair may be interconnected with other antenna 108/RF network node 104 pairs, or may be separate. For example, the antenna interconnection configuration 500D shows two antenna 108E-F/RF network nodes 104E-F connected together, and one antenna 108G/RF network node 104G separate. In embodiments, antenna 108/RF network node 104 pairs that are connected together may share power. For instance, the antenna 108E/RF network 104E pair is connected to antenna 108F/RF network 104F pair, and there may be circuitry on the RF network node 104 that enables them to share, or redirect, power received by the antennas 108E-F to the associated RF network nodes 104E-F. In embodiments, the sharing circuitry may include a method to logically- or the connections from multiple antennas 108 to the RF network node 104. Further, this sharing circuitry may provide a method to reduce the amount of power received by a given RF network node 104.

The embodiments shown in the antenna interconnection configurations 500A-D show examples that include one antenna 108 for each RF network node 104. In embodiments, other configurations may include one antenna 108 for a plurality of RF network nodes 104, a plurality of antennas 108 for each RF network node 104, or other configuration ratio of antenna 108 to RF network node 104; there may be many different configurations for a plurality of antenna 108/RF network node 104 combinations. A person skilled in the art may understand that the may be other antenna 108 and RF network node configurations. The embodiments shown are provided as examples of antenna 108/RF network node 104 configurations and should not be considered limiting.

Figure 5B:
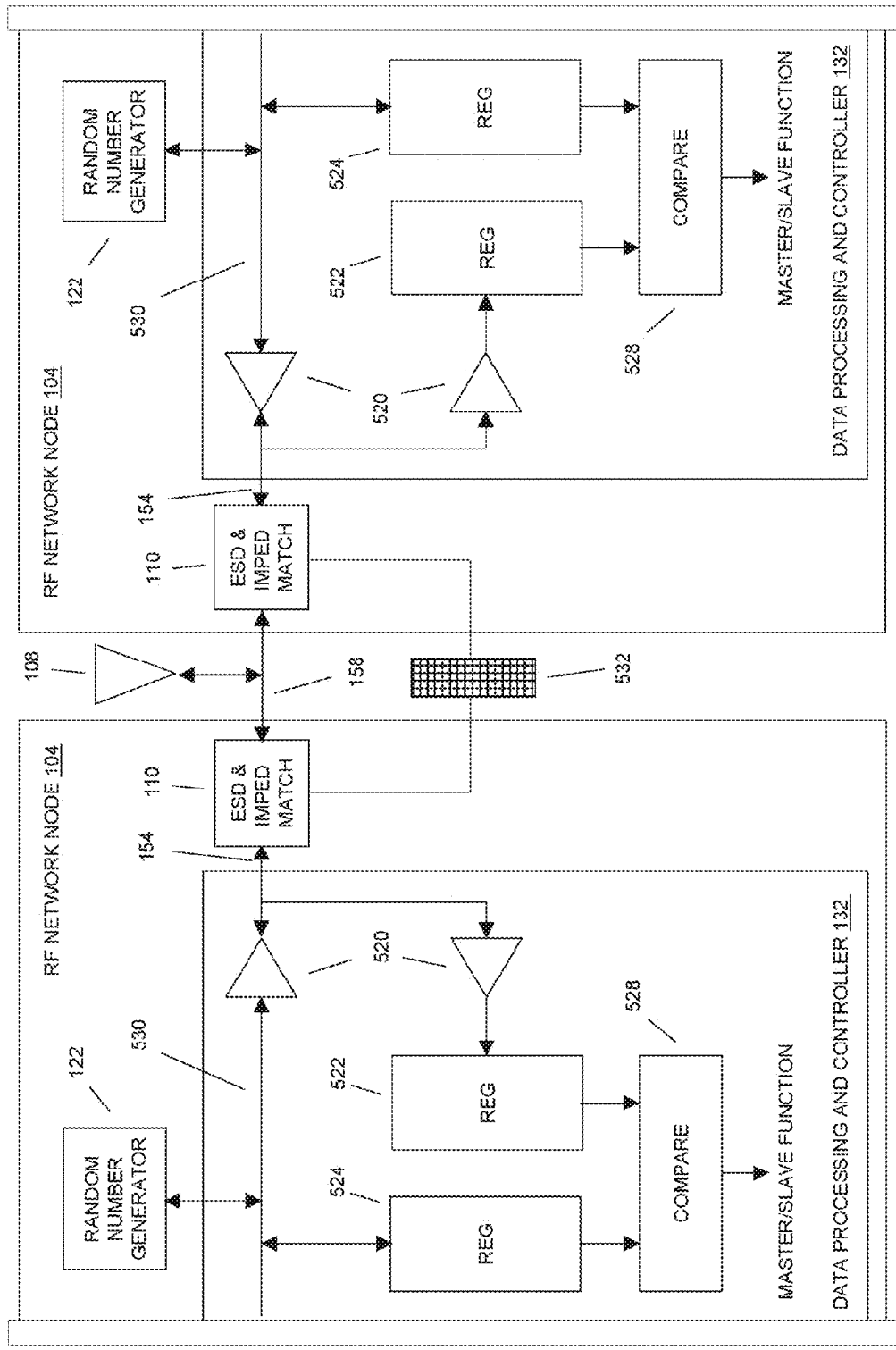
FIG. 5B shows an embodiment of inter-RF network node communication.

FIG. 5B shows the interconnection between the ESD and impedance matching 110 circuitry of two RF network nodes 104. In embodiments, the ESD and impedance matching 110 circuitry may include three connections, two connections that include the common antenna connection 158, and one connection to the common electrical ground 532. In embodiments, the common antenna connection 158 may provide a path for power received from the antenna 108 to the RF network node 104, a path for reader 140 to/from RF network node 104 communications, a path for RFID tag 102 to RFID tag 102 communications, a path for RF network node 104 to RF network node 104 communications, and the like. In embodiments, the common electrical ground 532, connected to all the RFID tag's 102 RF network nodes 104, may provide the electrical ground reference for these power and communications interconnections.

In embodiments, the RF network node 104 may utilize the inter-node interface 154, and the associated common antenna connection 158, in the communication with other RF network nodes 104 during execution of the master RF network node 104 determination function, as previously described with reference to FIG. 2. An embodiment of the RF network node 104 using the random number generator 122, the inter-node interface 154, and associated logic, is shown in FIG. 5B. Upon initial power up of the RF network nodes 104 on the RFID tag 102, and after impedance matching has been achieved, the RF network nodes 104 may each read a value from their random number generator 122, and write the value into a memory register 524. Additionally, the RF network nodes 104 may present the value from the random number generator 122 to the inter-node interface 154 through a buffered 520 output. In embodiments, the RF network nodes 104 may be performing this function at different times, as described herein, where the first RF network node 104 to present a random number onto the inter-node interface 154 may get its value written into a bus register 522 of all the RF network nodes 104 on the RFID tag 102.

With the first RF network node's 104 random number written into the bus register 522, and each of the RF network nodes 104 eventually writing its own random number into its memory register 524, as depicted in FIG. 5B, the RF network node 104 may now determine if it is the master RF network node 104. Each of the RF network nodes 104 may compare 528 the contents of the memory register 524 and the bus register 522. If the values in the RF network node's 104 memory register 524 and the bus register 522 are the same, then it may be selected as the master. If not, it may be a slave. In the case where two or more of the RF network nodes 104 are simultaneously writing their random number out onto the inter-node interface 154, the value written into the bus registers 522 of all of the participating RF network nodes 104 may be a combination of all the random number values placed on the inter-node interface 154, and thus represent neither of the RF network node's 104 value from its random number generator 122. In this instance, no RF network node 104 may be immediately selected to be the master RF network node 104, and other protocols, described herein, may be required to resolve the mismatch of the random number on the bus registers 522. It may be understood that these examples illustrate only one of a plurality of hardware/software configurations to implement the master RF network node 104 determination function, and that other implementations will be understood by one skilled in the art.

In embodiments, described with reference to FIGS. 1 and 2, the master RF network node 104 may provide configuration management for the RFID tag 102, such as switching the antennas 108, switching the antenna 108 frequency, configuring the communications facility 134, and the like. Configuration management may be dictated by external control, via commanding through the reader 140 interface or from another RF network node 104. Configuration management may be self directed by the master RF network node 104, through programming, through stored tables in memory, or the like. Configuration management may be associated with redundancy management, where the master RF network node 104 may be configuring the RFID tag 102 to maintain an optimum operational configuration.

In embodiments, described with reference to FIGS. 1 and 2, the data processing and controller 132 may provide for redundancy management of the elements within its own RF network node 104, and for the RF network nodes 104 and the antennas 108 on the RFID tag 102, as well as for other RFID tags 102. The master RF network node 104 may execute redundancy management. A plurality of elements may be managed with respect to redundancy, such as individual RF network node 104 functional blocks such as an oscillator 120, the random number generator 122, the persistence circuit 124, memory, and the like, or the RFID tag 102 elements such as the antennas 108 and the communication facility 134. Redundancy management may also extend to other RFID tags 102 in the area.

In embodiments, described with reference to FIGS. 1 and 2, the master RF network node 104 may provide for redundancy management of the plurality of RF network nodes 104 on the RFID tag 102. The RF network nodes 104 may be assigned redundant roles at the time of manufacture; during operations, as failures are encountered; changed over time; or the like. The master RF network node 104 may systematically store functional memory in multiple locations, on the multiple RF network nodes 104, in preparation of eventual RF network node 104 failures on the RFID tag 102. In the event of the RF network node 104 failure, the master RF network node 104 may reconfigure the RFID tag 102 functionality to work around the failure. Such reconfiguration may lead to a restoration of full functionality, lead to a transition back to full functionality, lead to degraded functionality, or the like. The master RF network node 104 may assign one of the secondary, or slave, RF network nodes 104 as a backup to the master RF network node 104, which may assume the role of the master RF network node 104 in the event of a failure of the primary master RF network node 104. In embodiments, the master RF network node 104 may report failures to the reader 140 that may access the RFID tag 102. In embodiments, the RFID tag's 102 functionality may be reduced by the failure, and this reduction in functionality may be reported to the reader 140 that accesses the RFID tag 102. The ability of the RFID tag 102 to self-monitor, manage redundancy, and report failures, may improve the reliability of the device, especially in harsh environments that are prone to causing physical damage to the RFID tags 102.

Moreover, in an embodiment, the depicted RFID tag 102 may be able to report the status of the RF network nodes 104 in the RFID tag 102. This may allow for advance notice of a potential permanent disablement of the RFID tag 102, which can be then used to take appropriate remedial actions. For example, the RFID tag 102 may contain four RF network nodes 104, but two may have become damaged and the remaining two RF network nodes 104 may be providing redundant functionality or memory; the damaged RF network nodes 104 may reduce the overall functionality of the RFID tag 102. The RFID tag 102 may communicate in a transmission to the reader 140 that there are damaged RF network nodes 104 and that the RFID tag 102 functionality may be reduced. This may provide advance notice to replace the RFID tag 102 to restore full functionality and information recording.

In embodiments, the master RF network node 104 may provide for redundancy management of the antennas 108 resident on the RFID tag 102. The master RF network node 104 may monitor performance characteristics of all the antennas 108 on the RFID tag 102, such as received signal strength, impedance, transmitted signal strength as reported back from the reader 140, and the like. The master RF network node 104 may select the antennas 108 that may be performing best, and report a status of the antenna 108 performance to the reader 140.

In embodiments, the master RF network node 104 may provide the RFID tag 102 with functional redundancy to guard against the possibility of an entire RFID tag 102 failing, or degrading below an acceptable functional level. To accommodate this, the master RF network nodes 104 from different RFID tags 102 may communicate with each other, and provide functional redundancy of their operational memory space. Further, the master RF network nodes 104 may periodically communicate with nearby RFID tags 102 to assess the health of these RFID tags 102. In the event that one of these communications were to fail, or indicated reduced functionality, the next RF network node 104 may take over the operations previously assigned to the failed RFID tag 102.

In embodiments, the data processing and controller 132 may provide for the logging of transactional information, such as commands received, actions taken, sensors 138 read, processes completed, and the like. Logging of the transactional information may be recorded in memory as a running table, time-tagged, priority-tagged, subject-tagged, and the like. The transactional information may be searched, sorted, or read in association with tagged information. A dump of the transactional log may be initiated by command, performed periodically, performed each time the RFID tag 102 is powered, and the like. The logged transactional information may be monitored and compared to standard parameters, and actions taken, or status provided, if those parameters are met, not met, exceeded, or the like. The ability to log the transactional information may enable the market 150 applications to better monitor the activity of the RFID tag 102.

The data processing and controller 132, as depicted in FIGS. 1 and 2, may provide the gateway interface 160 to the sensors 138 through the communications facility 134. In embodiments, the interface between the data processing and controller 132 and the communications facility 134 may be associated with a buffered 520 connection to the data processing and controller 132 internal bus 530, as shown in FIG. 5B. The interface between the communications facility 134 and the sensors 138 may support a plurality of electrical interface types, including serial digital, parallel digital, analog, voltage source, current source, differential, or the like. The communications facility 134 may be associated with the sensor 138A signal conversion from serial digital to parallel digital, parallel digital to series digital, analog to digital, digital to analog, or the like. The sensors 138 may be any of a plurality of transducers, such as temperature, humidity, motion, CO, CO2, moisture, smoke, pressure, light, vibration, and the like. Although FIGS. 1 and 2 both refer to the communications facility 132 interfacing with sensors 138, it is understood that sensors 138 is a general term, and may also include a plurality of external facilities and interfaces, such as external memory and USB, Ethernet, WiFi, Zigbee, and the like, interfaces. The ability of the RFID tag 102 to interface with the sensors 138 may significantly increase its market 150 functionality and usefulness.

In an RFID tag 102 that contains multiple RF network nodes 104, as depicted in FIG. 2, certain embodiments may involve the determination of a master RF network node 104 to coordinate the activities of the other RF network nodes 104 on the RFID tag 102. In an embodiment, the master RF network node 104 may manage the RFID tag 102 distributed memory, manage the redundancy of the RF network nodes 104, receiving information from the reader 140, transmitting information to the reader 140, or the like. In an embodiment, the RF network nodes 104 may have a communication connection that permits the individual RF network nodes 104 to communication information. Once a master RF network node 104 has been determined, the other RF network nodes 104 may act as slave RF network nodes 104 to the master RF network node 104.

Figure 5C:
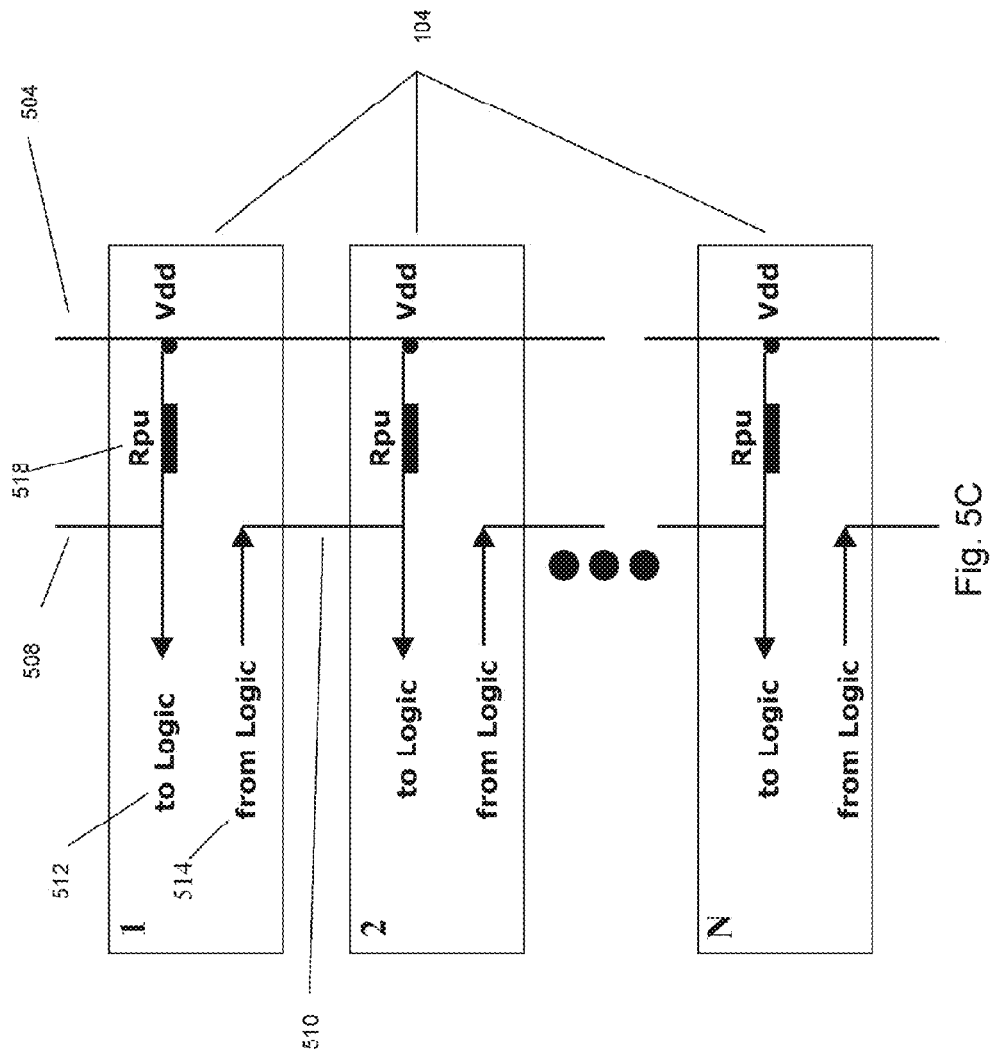
FIG. 5C shows a system for determining a master RFID network nodes among a plurality of RFID network nodes.

In an embodiment, there may be a number of configurations of RF network node 104 connections that would provide for the determination of a master RF network node 104, such as a serial connection between RF network nodes 104, a parallel connection between RF network nodes 104, an antenna connection between the RF network nodes 104, or the like. In an embodiment, the connection between the RF network nodes 104 may be implemented by individual RF network nodes 104 connected with leads, physically connected RF network nodes 104 combined into a single larger RF network node, or the like. FIG. 5C relates to the determination of a master RF network node 104 in either a serial or parallel connection of the RF network nodes 104; the RF network nodes 104 may be connected by leads or may be physically connected. The master RF network node 104 may control the function of all the RF network nodes 104 of the RFID tag 102. The master RF network node 104 may determine the memory locations for certain data, the broadcast time slot for the RF network nodes, additional function connections, and the like.

In an embodiment, the functions of the RFID tag 102 may be controlled by a single RF network node 104 (master RF network node 104) within the RFID tag 102. In embodiments, the master RF network node 104 may be any of the individual RF network nodes 104 within the RFID tag 102. As discussed further below, there may be a selection protocol for determining which individual RF network nodes 104 may become the master RF network node 104.

In an embodiment, a plurality of RF network nodes 104 may be connected together in a serial or parallel manner; FIG. 5C shows an embodiment of a serial connection.

Referring to FIG. 5C, an exemplary protocol for determination of a master RF network node 104 in a multiple RF network node 104 RFID tag 102 may be described. In the depicted embodiment, there may be a number N of individual RF network nodes 104 in the RFID tag 102. In this embodiment, all of the N RF network nodes 104 may contain identical functional capabilities. A protocol for determining which RF network node 104 may become the master RF network node 104 may involve the following steps. First, each individual RF network node 104 receives a logical setting from the previous individual RF network node 104. All of the individual RF network nodes 104 may be connected by a common power lead 504. All of the individual RF network nodes 104 may also contain a logical lead 510 that may be connected to the previous individual RF network node 104 or may be connected to another logical RF network node 104 or another function network node. In the depicted embodiment, each individual RF network node 104 within the RFID tag 102 may sense from its logical input lead 510 if there is an open or closed circuit on the lead 510 connection.

According to this protocol, if the logic lead 510 is open it may indicate that a previous RF network node 104 is not the master RF network node 104. The open logic lead 510 may indicate to a next RF network node 104 that it should attempt to function as the master RF network node 104. An open logic lead 510 may indicate that the RF network node 104 may be the first RF network node 104 in the line or that the previous RF network node 104 may be incapable of acting as the master RF network node 104. Any particular RF network node 104 may not be capable of being the master because of damage to the RF network node 104, damage to the lead 510, not programmed to be the master RF network node 104, or the like.

According to this protocol, if the logic lead 510 is closed, it may indicate that the previous RF network node 104 is the master RF network node 104 and that the next RF network node 104, and additional RF network nodes 104, should act as slave RF network nodes 104 to any commands transmitted by the master RF network node 104. In an embodiment, the closed logic lead 510 setting between two RF network nodes 104 may be communicated to the other RF network nodes 104. For example, if the logical lead 510 is closed between the first and second RF network nodes 104, the closed logical lead setting may be transmitted to a third RF network node 104 and all the other RF network nodes 104 on the RFID tag 102.

In an embodiment, the determination of which RF network node 104 is the master RF network node 104 may cascade down all N RF network nodes 104 until a master RF network node 104 is determined or that no RF network node 104 is determined to be a master RF network node 104. In an embodiment, the determination whether a first RF network node 104 is to become the master RF network node 104 may be determined in the logic 512 of the first RF network node 104. If the first RF network node 104 is capable of functioning as a master RF network node 104, the logic 514 of the RF network node 104 may close the logic lead 510 circuit to the second RF network node 104 to indicate that it is the master RF network node 104. If the first RF network node 104 is not able to function as the master RF network node 104, the logic lead 510 circuit may remain open, indicating that the next RF network node 104 in line should attempt to be the master RF network node 104. In this manner, the master determination process may proceed to each RF network node 104 in the RFID tag 102 until a master RF network node 104 has been determined.

In an embodiment, this process may be considered a fail-safe master RF network node 104 selection method because each RF network node 104 in the RFID tag 102 may be capable of being the master RF network node 104. In an embodiment, as long as one RF network node 104 is functional, a master RF network node 104 may be determined.

In an embodiment, in addition to the common power 504 and logic leads 510 between the RF network nodes 104, there may be other connections as described below in FIG. 20 such as other functional connections, serial bus connections, parallel bus connections, or the like. In an embodiment, the determination of the master RF network node 104 may be substantially the same in these connection methods.

Figure 8:
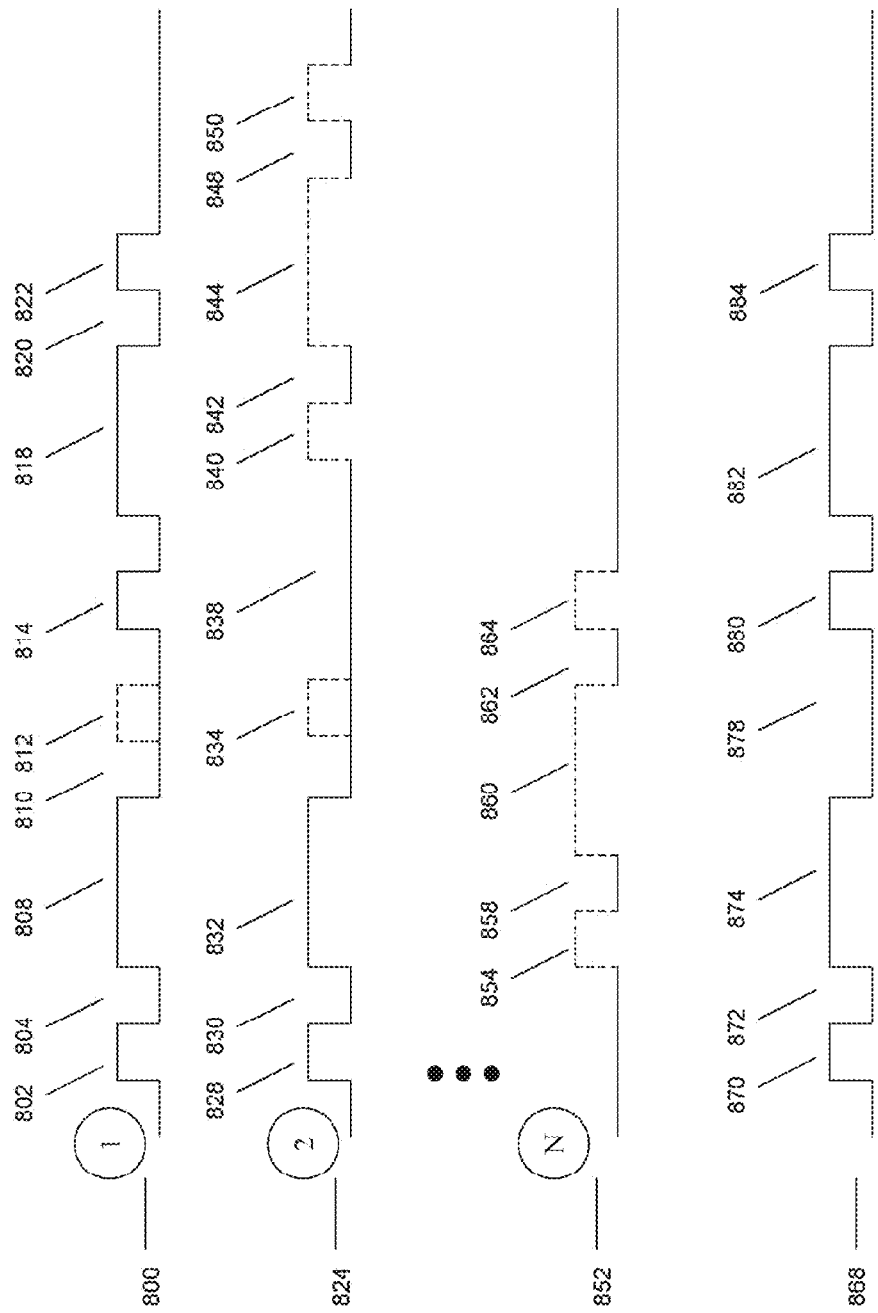
FIG. 8 shows an embodiment of the communication protocol for master node communication collisions.

Another embodiment of a master RF network node determination in a multiple RF network node sub-system is shown on FIG. 7A, FIG. 7B, and FIG. 8. An arbitration and synchronization protocol in a RF network node multi-RF network node environment may be used to control the operation of non-attached RF network nodes on the same RFID tag. The master RF network node may be selected through a process of sending a synchronization signal, transmitting a random number seed signal, transmitting a completion of the synchronization, and the like. The other non-master RF network nodes may use the transmitted random number seed signal for any functions the RF network nodes may require such as broadcast time slot determination.

As described above, there may be a plurality (i.e. two or more) of RF network nodes on an RFID tag (e.g. passive or active) connected to antenna leads of the RFID tag. The plurality of RF network nodes may be randomly placed on the antenna lead zone and may randomly connect to the antenna leads. In embodiments, not all of the RF network nodes applied to the antenna lead zone may make a connection to the antenna leads. In an embodiment, all of the RF network nodes on the RFID tag may be the same type of RF network node or there may be more than one RF network node type on the RFID tag. In an embodiment, the master RF network node may be any one of the RF network nodes on the RFID tag and the master RF network node may coordinate the transmissions and activities of the other RF network nodes on the RFID tag.

Figures 6, 7:
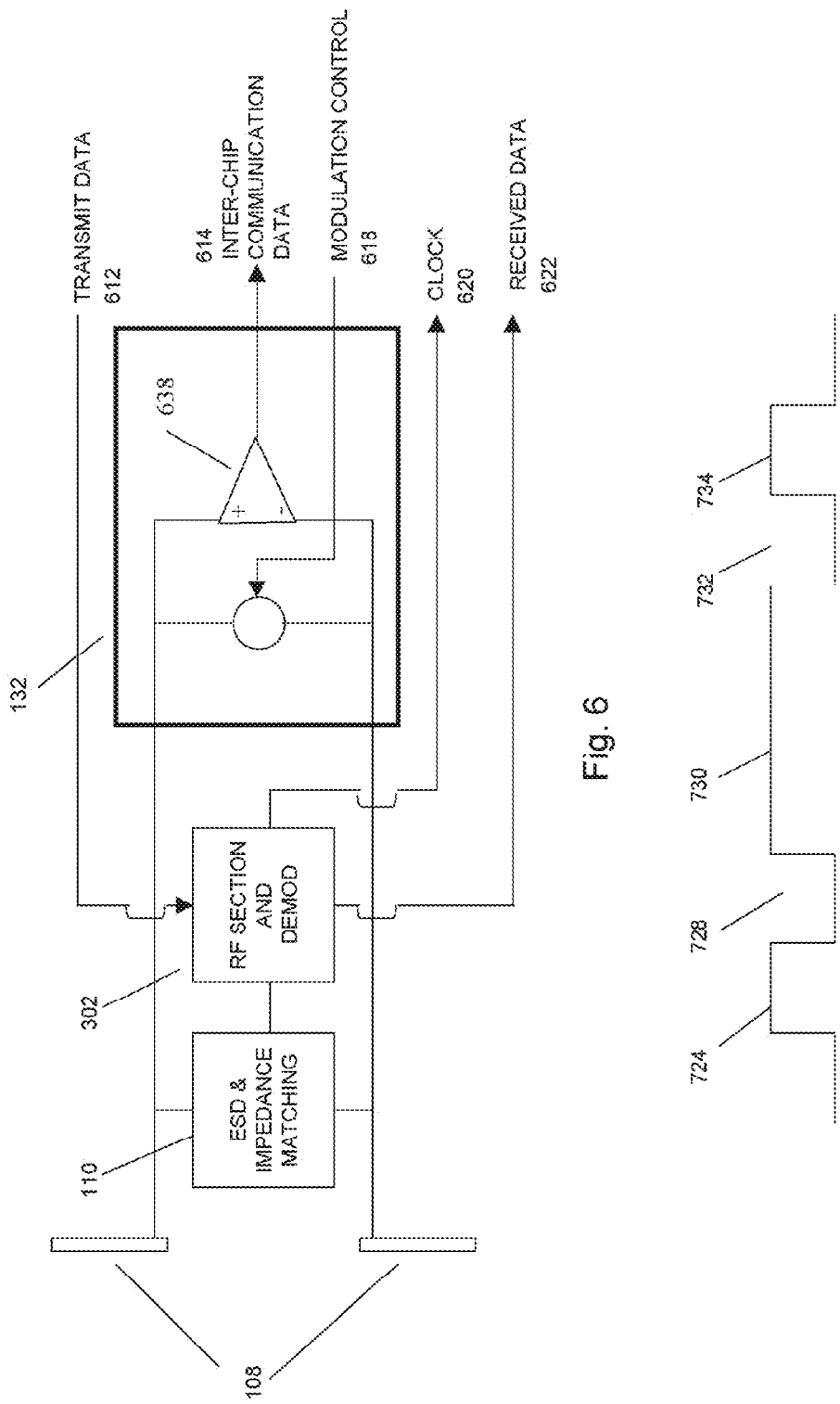
FIG. 6 is a schematic diagram for a circuit associated with an RFID tag system.
FIG. 7 shows an embodiment of a communication signal for determination of a master RF network node.

Another exemplary protocol for determining a master RF network node 104 may involve the individual RF network nodes 104 communicating using the antenna 108 as a communication bus. Referring to FIG. 6, an embodiment of a RF network node 104 connection to an antenna 108 as a communication bus for determination of a master RF network node 104 is shown. As previously described, there may be a plurality of RF network nodes 104 connected to a single or multiple antennas 108; the plurality of RF network nodes 104 may be able to communicate using the antenna 108. In an embodiment, any of the plurality of RF network nodes 104 on an RFID tag 102 may be a master RF network node. The antenna leads and the antenna 108 may provide a connection between each of the plurality of RF network nodes 104 and the antenna 108 may act as communication bus to the connected RF network nodes 104. In an embodiment, the plurality of RF network nodes 104 connected to the antenna 702 may use the antenna 108 as a communication path between the plurality of RF network nodes 104, thereby permitting the plurality of RF network nodes a method of inter-communication. The RF network nodes 104 may communicate data on the antenna bus to support RFID tag 102 capabilities such as coordinated data backscattering, improved signal strength, flexible data storage, security, reliability, power-efficient system, and the like. In an embodiment, because of the different communication frequencies used, the antenna 102 may be able to act as a communication bus between the plurality of RF network nodes 104 and broadcast information from the RFID tag 102 without the inter-RF network node communication interfering with the broadcast information.

In an embodiment, a RF network node 104 may include an ESD and impedance matching facility 110, an RF section and demodulation facility 302, an inter-RF network node communication circuit 132, and other logic circuits for data storage and transmission.

As previously described, the ESD and impedance matching facility 110 may provide electro-static protection for the RF network node 104 and impedance matching between the antenna 108 and RF network nodes 104. The impedance matching facility 110 may receive commands to switch elements on/off within the RF network node 104 to improve the impedance match between the antenna 108 and a RF network node 104.

As depicted in FIG. 6, the RF section and demodulation facility 302 may receive 622 and transmit 612 data for the RF network node 104 (not shown) to and from the antenna bus (not shown). The RF and demodulation facility 302 may demodulate the received data signal 622 from the antenna bus and may provide input to the RFID clock 620 for transmission timing of the RF network node 104 transmissions.

The inter-node communication circuit 132 may contain an amplifier 638 for the amplification of the received information; the amplified received information may be received information from the antenna bus. In an embodiment, the amplified information may be transmitted to a data processing unit that may be part of the RF network node 104, described in previous figures. In an embodiment, the inter-node communication functionality described herein may be included as part of the RF section and demodulation facility 302.

In an embodiment, as described in FIGS. 1 and 2, the plurality of RF network nodes 104 accessing the antenna bus may provide a distributed functionality for the RFID tag 102 with a master RF network node 104 coordinating the functionality of the other RF network nodes 104 on the RFID tag 102. The distributed functionality may include combined memory locations, separate multiple memory locations, secure memory locations, public memory locations, multiple frequencies, selective power reduction, encryption, decryption, and the like.

In an embodiment, the determination of a master RF network node on an RFID tag 102 may occur during the power up of the RFID tag. With reference to FIGS. 1 and 2, the power up may, for example, be in response to an RFID tag reader 140 requesting the RFID tag 102 to broadcast information. There may be a period of time during the RFID tag 102 power up that may be used for the determination of a master RF network node. In an embodiment, with each power up, a different RF network node 104 may be selected to become the master RF network node 104. In an embodiment, there may be a protocol sequence to determine which of the plurality of RF network nodes 104 would become the master RF network node 104.

Referring to FIG. 7, a simplified protocol sequence for determining a master RF network node is shown. In an embodiment, a RF network node 104, as described in FIG. 2, attempting to become a master RF network node may transmit information to the antenna bus such as a synchronization signal 724, wait periods 728 and 732, a random number seed 730, a complete signal 734, and the like. In an embodiment, during the RFID tag 102 power up, each RF network node 104 may attempt to transmit the random number seed 730 to the antenna bus for the other RF network nodes 104 to read. In an embodiment, the RF network nodes 108 may use the new random number seed 730 to determine functions such as transmission time slot for synchronization of operation, encryption, decryption, security, combined memory function, frequency selection or the like.

In an embodiment, the master RF network node transmission signal may consist of a plurality of equal time period signals for the transmission of information. For example, the time period for the synchronization signal 724, completion signal 734, and wait signals 728 and 732 may be of equal length. In an embodiment, as will be discussed in greater detail below; the synchronization signal may be used to indicate that a master RF network node is transmitting a random number seed 730. The random number seed signal 730 may be an integer multiplier of the time period of the equal time periods (e.g. start, completion, or wait). In an embodiment, this may provide for equal length time periods for the master RF network node transmission signal, the equal length period signal may provide for simple master RF network node transmission detection. The total master RF network node transmission signal length may be:

$$\text{TotalSignal period} M = T\text{Sync} + T\text{Wait}(\text{\# of Waits}) + T\text{Random Number} + T\text{Complete}$$

Where TPeriod=TSync=TWait=TComplete

And TRandom Number=TPeriod(# Random number bits)

In an embodiment, as shown above, the time period for the transmission of the random number seed 730 may be a period equal to any of the synchronization 724, wait 728 and 732, or complete 734 signals times the number of bits in the random number seed 730. Therefore, the random number seed 730 transmission period may be a multiple of any of the synchronization 724, wait 728 and 732, or complete 734 signal periods in the signal.

In an embodiment, the master RF network node transmission signal may be of a variable length.

In an embodiment, when an RFID tag 102 receives a power up signal, the plurality of RF network nodes 104 may attempt to become the master RF network node. With the power up signal, all of the RF network nodes 104 may attempt to transmit the synchronization signal 724; the individual RF network nodes 104 may transmit the synchronization signal 724 at a time determined by the random number. In an embodiment, the plurality of RF network nodes 104 may transmit their synchronization signals 724 in different time slots, therefore avoiding transmission collisions.

In an embodiment, when the first RF network node 104 transmits a synchronization signal 724, the remainder of the RF network nodes 104 on the RFID tag 102 may refrain from transmitting and may read the random number seed signal 730 that has been transmitted to the antenna bus. In a non-collision situation, only one RF network node 104 may transmit the synchronization start signal 724 to the antenna bus. Once one RF network node 104 has transmitted a synchronization signal 724, it may then transmit a random number seed 730 onto the antenna bus that the other RF network nodes 104 may then read. The other RF network nodes 104 may use this new random number to determine the transmission time slot for backscattering data or other RF network node 104 function.

In an embodiment, with all of the RF network nodes 104 using the same random number seed 730, all of the RF network nodes 104 may transmit their information at the same time or at a time determined by the use of the random number seed 730. In an embodiment, this may allow for the storage of the same information on the plurality of RF network nodes, coordination of information storage across a plurality of RF network nodes 104, or the like. In an embodiment, this may enable the plurality of RF network nodes 104 to act as a single large memory location with different RF network nodes 104 storing different information.

In an embodiment, there may be more than one type of RF network node 104 on the RFID tag 102; in this embodiment, each RF network node 104 may use the new random number seed 730 to transmit different information in different time slots. This may allow for the storage of different data across the more than one type of RF network node 104 thereby providing for distributed memory storage on the plurality of RF network nodes 104.

Referring now to FIG. 8, an embodiment of a communication protocol for arbitration and synchronization in a multiple RF network node 104 sub-system (depicted in more detail in FIG. 2) is shown. As shown in FIG. 8, collisions may occur when more than one RF network node 104 attempts to transmit a synchronization signal 724 at the same time. When the synchronization signal 724 is transmitted by more than one RF network node 104, all the other RF network nodes 104 may stop transmitting and wait for the complete signal 734.

A protocol may be advantageous to determine if the RF network nodes 104 that may transmit at the same time need to retransmit the random number for the determination of a master RF network node 104 (i.e. collision management). As part of the protocol, there may be a check sequence to verify that the transmitted random number seed 730 is not corrupt; the random number seed 730 may become corrupt if different random numbers were transmitted.

FIG. 8 shows an example of determination of a master RF network node 104 transmission when a collision has occurred and the protocol to correct the collision. In an embodiment illustrated by the sequences in FIG. 8, two or more RF network nodes 800 and 824 of the N RF network nodes 852 may signal the start of the synchronization cycle to indicate a master RF network node request. Any of the RF network nodes that have not attempted to transmit a synchronization signal may not transmit a synchronization signal and may wait for a complete signal from the final determined master RF network node 104.

As shown in FIG. 8, if a first RF network node 800 and a second RF network node 824 transmit a synchronization signal 802 and 828 and random number seed 808 and 832 at the same time, there may be a transmission collision. As depicted in this figure, other RF network nodes 852 that have not yet transmitted a synchronization signal 854 would then not transmit a synchronization signal 854, wait signals 858 and 862, random number seed 860, and complete signal 864 (all shown by dashed lines) until a complete signal has been transmitted to the antenna bus. In an embodiment, a complete signal may not be transmitted until all transmission collisions are resolved.

As depicted in FIG. 8, if there is a collision of the transmission from the first RF network node 800 and the second RF network node 824, the combined random number seeds 808 and 832 from the first RF network node 800 and the second RF network node 824 may collide on the antenna bus 868 and may become corrupt. In an embodiment, there may be a check sequence in each RF network node that transmits a random number seed to verify that the random number seed 874 on the antenna bus 868 matches the transmitted random number seed 808 and 832. In an embodiment, each RF network node that transmits a random number seed 808 and 832 may store the random number seed 808 and 832 in a storage location for comparison to the transmitted random number seed 808 and 832. In an embodiment, if the random number seeds 808 and 832 are transmitted at the same or different times, the resulting antenna bus 868 random number seed 874 may become corrupted and may not match the transmitted random number seeds 808 and 823.

As depicted in FIG. 8, if the antenna bus 868 random number seed 874 does not match the transmitted random number seed 808 and 832 the first RF network node 800 may not transmit the complete signal 812 and the second RF network node 824 may not transmit the complete signal 834 (both shown as dashed lines). In this case, the non-matching random number seeds may be an indication that there was a collision between at least two RF network nodes attempting to be the master RF network node.

In an embodiment, after the collision of the random number seeds, the first RF network node 800 and the second RF network node 824 may attempt to retransmit a second synchronization signal 814 and 840 and a second random number seed 818 and 844 at random times to avoid another transmission collision. For example, the second RF network node 824 may use a random wait time 838 before attempting to retransmit its second synchronization signal 840.

In the example of FIG. 8, the first RF network node 800 is shown re-transmitting the synchronization signal 814 before the second RF network node 824 synchronization signal 840. In an embodiment, this may cause the second RF network node 824 to not transmit the synchronization signal 840, random number seed 844, and complete signal 850 (all shown by dashed lines) because the first RF network node 800 transmitted the synchronization signal 814 first. The first RF network node 800 may then compare the transmitted random number seed 818 with the random number seed 882 on the antenna bus 868. If they are the same number, the first RF network node 800 may transmit the complete signal 822. In an embodiment, the transmission of a complete signal 822 to the antenna bus 868 may indicate to the other RF network nodes that a master has been determined and to use the random number seed 882 on the antenna bus 868 for control of any RF network node functions. In an embodiment, each of the other RF network nodes may receive and store each random number seed transmitted to the antenna bus. Once the other RF network nodes receive a complete signal 822, the other RF network nodes may retain the last received random number seed as the master RF network node random number seed.

In an embodiment, this sequence of transmitting a synchronization signal and random number seed, checking the transmitted random number seed for corruption, and re-transmitting as necessary may be repeated until the transmitted random number seed on the antenna bus 868 is not corrupted. The random number seed may be considered not corrupt if the antenna bus 868 random number seed 882 matches the transmitted random number seed 818. In an embodiment, a non-corrupted antenna bus 868 random number seed may indicate that a master RF network node has been selected.

In an embodiment, more than one master RF network node may be selected if more than one RF network node transmits the same random number seed at the same time. In an embodiment, the selection of more than one RF network node as a master RF network node may indicate that more than one RF network node transmitted the same random number seed at a synchronized time.

As a result of the above-described transmission by the first RF network node 800 and the second RF network node 824, the antenna bus 868 received signal may be as shown in FIG. 8. In an embodiment, the antenna bus 868 may receive a combined synchronization signal 870, wait time 872, and a combined random number seed 874 from the first RF network node 800 and the second RF network node 824. The random number seed 874 may have been a corrupt signal because of the random number seed 808 and 832 being transmitted at the same time. There may then be a random length wait time 878 while the first 800 and second 824 RF network nodes wait random times to retransmit their signals. In an embodiment, the antenna bus 868 may then receive the synchronization signal 880, random number seed 882, and complete signal 884 from the first RF network node to retransmit. As depicted in FIG. 8, the first RF network node 800 may transmit first.

In an embodiment, receiving the complete signal 884 on the antenna bus 868 may be an indication to the other RF network nodes that a master RF network node has been determined and the random number seed 882 on the antenna bus is to be used for any RF network node functions. In an embodiment, the determined master RF network node(s) may continue to operate as the master RF network node of the RFID tag for the length of the RFID tag 102 read. In an embodiment, a different RF network node may be selected as the master RF network node with the next power up sequence.

In another embodiment of a master RF network node 104 determination, all the RF network nodes 104 may operate as peers, and a discovery protocol may be used to assign a role to each of the nodes. The role assignment may provide a distinct number assignment to each RF network node 104, which may be used by the RF network node 104 to understand its role in becoming a master RF network node or a slave RF network node. In an embodiment, each RF network node 104 may include a table that may define the role of each RF network node 104 on the RFID tag 102. In an embodiment, the table may be the same for each RF network node 104, different for each RF network node 104, or the like. For example, the RFID tag 102 may include four RF network nodes. The table included with each RF network node may indicate that node two is to become the master RF network node and the other three RF network nodes 104 are to become slave RF network nodes. During power up, RF network node 104 two may become the master network node of the RFID tag 102. In an embodiment, the table may also include information of which RF network node 104 may be redundant to one of the other RF network nodes 104 in the situation where the RF network node 104 was to stop functioning.

Using one of the above described master RF network node determination protocols, it may be determined which RFID tag 102 RF network node is a master RF network node and which are the slave RF network nodes. In determining the master RF network node, the functions of the multiple RF network nodes 104 on an RFID tag 102 may be coordinated by a single RF network node 104 to provide increased functionality such as distributed memory, RF network node redundancy, multiple communication frequencies, multiple antenna interfacing, and the like. As previously described, any of the more than one RF network nodes 104 on the RFID tag 102 may become the master RF network node.

In an embodiment, the master RF network node may provide the interface function between the RFID tag 102 and the reader 140, inter RF network node 104 communication, memory management, redundant RF network node 104 protocol, or the like, as depicted in FIGS. 1 and 2. In an embodiment, with one RF network node 104 coordinating the functionality of the RFID tag 102, the multiple RF network node RFID tag 102 may appear as a single chip RFID tag to a standard RFID reader 140. The master RF network node may provide management of the RFID tag 102 functionality that may include coordination of all the RF network node 104 memories that may provide for increased amounts of accessible memory for a single RFID tag 102. In embodiments, coordination may be according to a network topology among RF network nodes, and may be associated with the inter-node interface 154, common antenna connection 158, communications facility 134, and the like. In embodiments, coordination may be through tag-to-tag communications 3008 as described herein. The network topology may be a ring network topology, a mesh network topology, a serial topology, a packet-based network topology, or the like, where 'topology' may refer to the configuration of a communication. In embodiments, the serial topology may utilize serial bus technologies and configurations described herein. As will be described below, the accessible memory may be accessed as combined memory, increased memory, a combination of combined and increased memory for redundancy, private memory, public memory, user memory, and the like.

In an embodiment, the slave RF network nodes (any of the non-master RF network nodes 104) may receive commands from the master RF network node to be executed. In an embodiment, as a slave, RF network node 104 may perform any function, command, memory request, or the like that may be transmitted from the master RF network node. In an embodiment, the slave RF network nodes may become specialized in functions that are performed. For example, the individual slave may provide the encryption, password protection, communication interface control, or the like for the master RF network node. Additionally, the slave RF network node may provide certain amounts of memory, types of memory (e.g. private, public), redundant memory, or the like that may be coordinated by the master RF network node.

In an embodiment, the RF network node 104 redundancy may be executed by either the master RF network node or slave network node. For example, if a slave RF network node was to become damaged and stop functioning, the master RF network node may determine the protocol for at least one other RF network node 104 providing redundant functionality, memory, or the like for the damaged slave. In another example, if the master RF network node was to become damaged and stop functioning, the slave RF network nodes may follow a protocol in determining which slave RF network node will become the master RF network node.

In an embodiment, referring to FIGS. 1 and 2, the RFID tag 102 may communicate with the RFID reader 140 using a single RF network node 104, using a single master RF network node 104, using a plurality of RF network nodes 104, or the like. Using the single transmitting RF network node 104, the single RF network node 104 may coordinate the information requested by the reader 140 from the other RF network nodes 104 that may be on the RFID tag 102. In an embodiment, the single RF network node 104 may receive the reader 140 request and, depending on the request, the single RF network node 104 may request information from the other RF network nodes 104 on the RFID tag. After all the information has been received from the other RF network nodes 104, the single RF network node 104 may transmit the requested information back to the reader 140.

Using a plurality of transmitting RF network nodes 104, some or all of the plurality of RF network nodes 104 may transmit the requested reader 140 information all at the same time, at different times, or the like. In one embodiment, the plurality of RF network nodes may transmit in ordered time slots to transmit individual parts of the total requested information in an ordered sequence back to the reader 140. In another embodiment, all the RF network nodes 104 may simultaneously transmit information to the reader 140. In an embodiment, the simultaneous transmission and ordered time slot transmission from the plurality of RF network nodes 104 may require a synchronizing of the plurality of RF network nodes 104.

Figure 9:
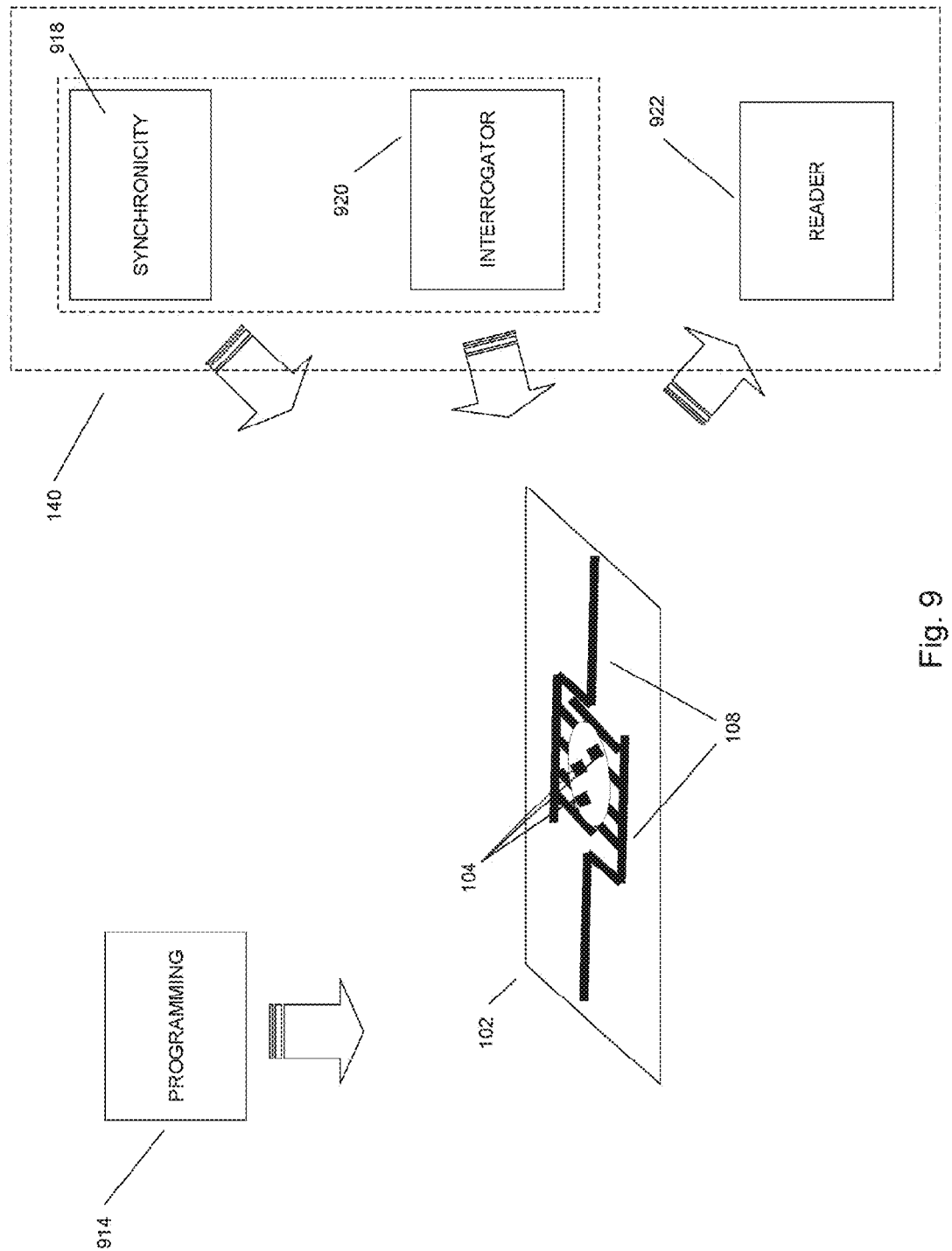
FIG. 9 shows a schematic of an improved RFID tag system.

In one embodiment, after the multiple RF network nodes 104 have been applied to the RFID tag 102, information related to the transmission protocol (e.g. as single or multiple RF network nodes) may be programmed into the RF network nodes 104. As shown in FIG. 9, the transmission protocol information may be programmed 914 to the RF network nodes 104. In an embodiment, the programming 914 may be the storing of the transmission protocol into the RF network node 104 non-volatile memory to be recalled during a read of the RFID tag 102. In an embodiment, the programming 914 may be performed by a reader 140 type device that is able to communicate with the RF network nodes and store the transmission protocol information within the RF network node 104 memory. In another embodiment, the transmission protocol may be part of the firmware or hardware of the RF network nodes 104 as part of the RF network node 104 manufacture. Therefore, the transmission protocol of the RFID tag 102 may be determined when the RF network nodes 104 are assembled to the RFID tag 102.

Referring to FIG. 9, an embodiment of the RFID tag 102 communicating with the reader 140 is shown. In embodiments, the reader 140 may communicate with the RFID tag 102 in different protocols, based on whether the RFID tag 102 is communicating with a single RF network node 104 or a plurality of RF network nodes 104. In an embodiment of communicating with a plurality of RF network nodes 104, the RFID tag 102 may communicate with the reader 140. The reader 140 may be a stand-alone device or may include a synchronicity device 918, an interrogator device 920, a reader device 922, or the like. In an embodiment, the process of reading the plurality of RF network nodes 104 may include sending a synchronicity signal and an interrogator signal, and the RFID tag 102 may respond by reflecting or broadcasting an RF signal containing the information stored in the RFID tag 102 memory.

In an embodiment, the synchronicity device 918 may send an RF signal that may initialize and synchronize the internal clocks of a plurality of RF network nodes 104. In certain embodiments, the RF network node 104 may not have a physical internal clock. In these embodiments, receipt of the synchronicity signal by the plurality of RF network nodes 104 may initiate a process within the plurality of RF network nodes 104 that may result in synchronization. In a situation where there are multiple RF network nodes 104 associated with an antenna 108, the plurality of RF network nodes 104 may receive the synchronicity signal and the synchronicity signal may initiate a substantially identical process within each RF network node 104. This may result in a substantially identical transmission of data from the multiple RF network nodes 104, for example. This step may allow all of the RF network nodes 104 to reflect or broadcast an RF signal at the same time and therefore reflect or broadcast as if there were one RF network node. As another example, the synchronicity may allow the plurality of RF network nodes 104 to transmit information in a timed sequence from each of the plurality of RF network nodes 104; in this manner, the reader 140 may receive information as if a single RF network node 104 transmitted it. In an embodiment, the synchronicity device 918 may be included in the RF network node 104. When the RF network node 104 is energized, a signal may be received from the interrogator device 920 or the reader device 922 to calibrate the RF network node 104, the calibration may initiate the logic and internal clock synchronization. In another embodiment, when the RF network node 104 is energized, the RF network node 104 may initiate a calibration sequence to initialize all the nodes in the RFID tag 102. This may include RF network node functionality configuration, clock frequencies, and the like.

In an embodiment, the interrogator device 920 may send an RF signal that may request the RFID tag 102 to reflect or broadcast its information stored in memory. For a passive RFID tag, the interrogator device 920 RF signal may also energize the RFID tag 102. In an embodiment, the interrogator device 920 may include the synchronicity device 918 and therefore may initialize the plurality of RF network nodes 104 and request information to be reflected or broadcast.

In an embodiment, the reader device 912 may receive reflected or broadcast information from the RFID tag 102. This information may relate to the item with which the RFID tag 102 is associated. The reader device 922 may listen for a certain frequency to be reflected or broadcast or may listen for a plurality of frequencies. The reader device 922 may be connected to a computer device (e.g. computer, server, or network) for aggregation of the received information.

In an embodiment involving communicating with a single master RF network node, the RFID tag 102 may communicate with the reader 140. The reader 140 may be a stand-alone device or may include the interrogator device 920, the reader device 922, or the like; the synchronicity device 918 may not be required when communicating to a master RF network node 104. As previous described with master RF network nodes, upon power-up, the slave RF network nodes may respond to the command request from the master RF network node.

In an embodiment, when communicating with a RFID tag 102 using a master RF network node 104, the interrogator device 920 may transmit an information request to the RFID tag 102. The plurality of RF network nodes 104 may power-up and determine which RF network node will become the master RF network node. Once the master RF network node has been determined, the master RF network node will receive the information request from the interrogator 920. In an embodiment, the master RF network node may coordinate any information that may be provided by the other RF network nodes on the RFID tag 102.

In an embodiment, once the master RF network node has received information required from the other RF network nodes 104, the master RF network node may transmit the requested information. Within the reader 140, the reader device 922 may receive the information. Once the information is received, it may be communicated to a connected computer, server, network, or the like.

As previously described, the RFID antenna 108 may provide the reflecting or broadcasting means for the RFID tag 102 by reflecting or broadcasting the signal generated by the RF network nodes 104 that may be connected to the antenna leads. The antenna 108 may be configured in various shapes such as a bar, loop, patch, or the like. The antenna leads may be used to connect the antenna 108 to the RF network nodes 104. The antenna leads may be in a configuration that may have the leads of a first half of the antenna in close proximity to a second antenna lead. The two antenna leads may be close enough to allow the leads on the RF network node 104 to make contact between the first antenna lead and the second antenna lead. The configuration of the two antenna leads may be of any shape as long as the space between the two leads may be bridged by the RF network node 104. The RF network node 104 may contain at least two external leads that may be connected to the antenna leads. The RF network node 104 leads may be configured on the RF network node 104 advantageously for bridging the space between the two antenna leads, for example on different sides of the RF network node 104.

The RF network node 104 may provide an information radio frequency signal, using the antenna 102, in response to an interrogator's 120 request. Upon the request from the interrogator 120, the RF network node 104 may reflect or broadcast information stored in the memory. The information previously may have been stored in the memory; the information may relate to the item to which the RFID tag 102 is attached. The RF network node 104 may reflect or broadcast at a set frequency that may be received by a particular reader 922 type.

Figure 10:
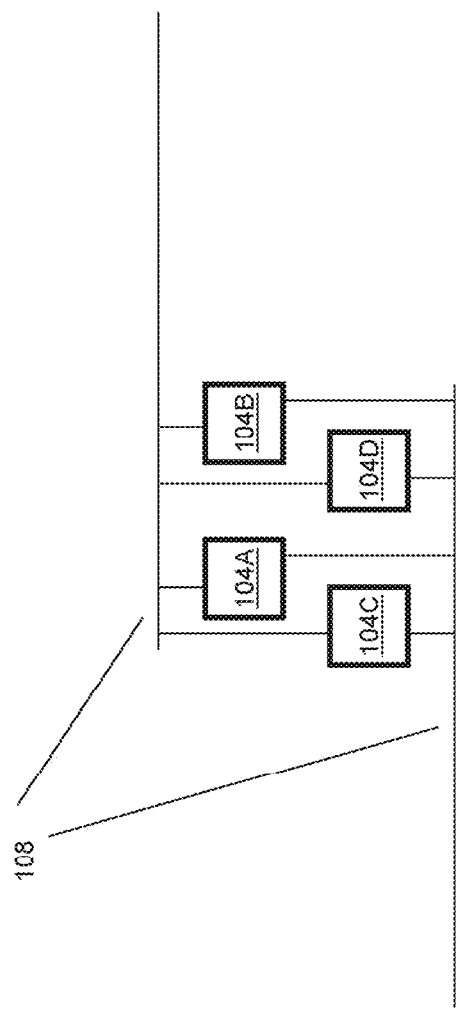
FIG. 10 shows a method of establishing redundancy in an RFID tag system.

Referring to FIG. 10, an embodiment of a schematic of four RF network nodes (104A, 104B, 104C, 104D) associated with an antenna 108 is shown. An aspect of the systems and methods described herein may involve more than one RF network node (104A, 104B, 104C, 104D) communicating and functioning as a single RFID tag 102. In an embodiment, redundancy may be achieved by at least one RF network node (104A, 104B, 104C, 104D) providing a backup to another RF network node (104A, 104B, 104C, 104D) that may have become damaged or has otherwise lost functionality. The backup may be either functional, where the backup RF network node provides the function of the damaged RF network node, or memory, where the RF network node provides a backup for the memory of the damaged RF network node (104A, 104B, 104C, 104D). For example, if RF network node 104A were to become damaged, one or more of the other RF network nodes (104B, 104C, 104D) may assume the function or memory of the damaged RF network node 104A. In an embodiment, there may be more than one method of determining which of the other RF network nodes (104B, 104C, 104D) will assume the function of the damaged RF network node 104A.

In an embodiment, the simplest method of redundancy may involve all of the RF network nodes (104A, 104B, 104C, 104D) having the same function and memory, so that, the RFID tag 102 will continue to function as long as one RF network node (104A, 104B, 104C, 104D) continues to function. In another embodiment, there may be RF network nodes (104A, 104B, 104C, 104D) that have different functions within the RFID tag 102. The different functions may include encryption, sensor reading, private memory, public memory, or the like. In an embodiment, the RF network nodes (104A, 104B, 104C, 104D), while having different functions, may have a common core of logic to allow one RF network node (104A, 104B, 104C, 104D) to perform the requirements of another RF network node (104A, 104B, 104C, 104D). In an embodiment, all of the RF network nodes (104A, 104B, 104C, 104D) may be identical, but during power up, the different RF network nodes may assume different roles on the RFID tag 102.

In the case of an RF network node (104A) being damaged, one of the other RF network nodes (104B, 104C, 104D) may be able to assume the role of the damaged RF network node (104A). In an embodiment, when an RF network node (104A) is damaged and another RF network node (104B, 104C, 104D) assumes the function of the damaged RF network node (104A), there may be a loss of some functionality of the RFID tag 102. In an embodiment, the function of the damaged RF network node (104A) may be assumed by more than one of the other RF network nodes (104B, 104C, 104D) to provide all the functionality of the damaged RF network node (104A). It should be understood by someone knowledgeable in the art that there may be many different configuration methods of one RF network node (104A, 104B, 104C, 104D) providing redundancy to another RF network node (104A, 104B, 104C, 104D).

In another embodiment, there may be a pre-assignment as to which RF network node (104A, 104B, 104C, 104D) becomes the redundant RF network node (104A, 104B, 104C, 104D) for another RF network node (104A, 104B, 104C, 104D). In an embodiment, the assignment of redundancy may be in the firmware of the RF network nodes (104A, 104B, 104C, 104D), in the data of the RF network nodes (104A, 104B, 104C, 104D), or the like. In this configuration, if an RF network node (104A, 104B, 104C, 104D) is damaged, there may be a pre-assigned replacement for the non-functioning RF network node (104A, 104B, 104C, 104D). For example, if one RF network node 104A is damaged it may be predetermined that a second RF network node 104B will provide the redundant function for the damaged RF network node 104A. It should be understood that there may be a series of pre-assigned redundancy for damaged RF network nodes (104A, 104B, 104C, 104D). The pre-assignment may provide for a single RF network node (104A, 104B, 104C, 104D) redundancy, a combination of RF network node (104A, 104B, 104C, 104D) redundancies, or the like. It should be understood that there may be a number of pre-assigned redundancy configurations that would be consistent with the systems and methods described herein.

In another embodiment, a communication protocol may determine which RF network node (104A, 104B, 104C, 104D) is to be the redundant RF network node (104A, 104B, 104C, 104D). In an embodiment, similar to the master RF network node communication described in FIG. 7 and FIG. 8, the remaining functional RF network nodes (104A, 104B, 104C, 104D) capable of being a redundant RF network node (104A, 104B, 104C, 104D) may transmit a signal to indicate that any one of them is available to replace the damaged RF network node (104A, 104B, 104C, 104D). In an embodiment, more than one RF network node (104A, 104B, 104C, 104D) may signal to become the redundant RF network node (104A, 104B, 104C, 104D) and a protocol of collision resolution may be used to determine which will be the redundant RF network node (104A, 104B, 104C, 104D). For example, two RF network nodes 104A and 104B may each attempt to signal to be the redundant RF network node. Following the signal protocol, each RF network node 104A and 104B may determine a time slot to send the redundant signal; the first to transmit the signal may become the redundant RF network node. In the case of both RF network nodes 104A and 104B signaling at the same time, a protocol may be employed to resolve the collision and retransmit the signal to determine which one becomes the redundant RF network node. In an embodiment, the resolution protocol may continue until it is determined which one of the RF network nodes 104A or 104B will become the redundant RF network node.

In an embodiment, the RFID tag 102 may be able to report the status of the RF network nodes (104A, 104B, 104C, 104D) in the RFID tag 102. This may allow for advance notice of a potential permanent disablement of the RFID tag 102, which can then provide the basis for appropriate remedial actions. For example, the RFID tag 102 may contain four RF network nodes (104A, 104B, 104C, 104D) but two may have become damaged and the remaining two RF network nodes are providing redundant functionality or memory. In this example, the damaged RF network nodes may reduce the overall functionality of the RFID tag 102. The RFID tag may communicate in a transmission to the reader 140 that there are damaged RF network nodes and that the RFID tag 102 functionality has been reduced. This may provide notice to replace the RFID tag to restore full functionality and information recording.

In a similar manner to the functional redundancy, the RF network node (104A, 104B, 104C, 104D) memory may also have a redundancy protocol. In an embodiment, the plurality of RF network nodes (104A, 104B, 104C, 104D) may create a distributed memory to be used in configurations such as redundant memory or increased memory to the RFID tag 102. The redundant memory configuration may have each of the more than one RF network nodes (104A, 104B, 104C, 104D) storing the same information, thereby providing a memory configuration that may maintain the RFID tag 102 information as long as one of the RF network nodes (104A, 104B, 104C, 104D) is operational. The increased memory configuration may access the individual RF network node (104A, 104B, 104C, 104D) memory as a single memory to store increased amounts of memory for the RFID tag 102. In an embodiment, either of these memory configurations may support public memory, private memory, encrypted memory, read once/write many, read/write, read only, or the like.

In an embodiment, each of the more than one RF network nodes (104A, 104B, 104C, 104D) may store the same memory information in the redundant memory configuration, so that on the same RFID tag 102, the same information may be stored on each of the individual RF network nodes (104A, 104B, 104C, 104D). In this redundant memory configuration, the RFID tag 102 information may be maintained as long as one of the RF network nodes (104A, 104B, 104C, 104D) continues to operate. In an embodiment, the redundant memory configuration may be used on components that operate in environmentally challenging locations such as high temperatures, high stress, or the like where there may be a possibility of the RFID tag 102 being damaged.

In an embodiment, the distributed memory may provide for increased memory where the memory of the more than one RF network nodes (104A, 104B, 104C, 104D) function as a combined single memory store, so that the memory may be the sum of all the RF network node (104A, 104B, 104C, 104D) memory. For example, if each of the RF network nodes (104A, 104B, 104C, 104D) have 8K of memory, the total memory of a four RF network node RFID tag 102 would be 32K of memory. In an embodiment, the increased memory RFID tag 102 may be used on components that are in a less stressful environment, where the RFID tag 102 is less likely to be damaged.

In another embodiment, the distributed memory may store a combination of data and metadata. In an embodiment, the RFID tag 102 may store data only until a reader reads the data. As part of the data read, the RFID tag 102 data may be cleared and metadata indicating an external network storage location of the data just read from the RFID tag 102 may be written to the RFID tag 102. In this manner, the RFID tag 102 may be able to record and store more data than would otherwise be possible with the limited amount of memory on the RFID tag 102. Over time, data recorded by the RFID tag 102 may be stored on an external data store with only metadata stored on the RFID tag 102.

An additional advantage to this memory configuration may be that data would not be lost if the RFID tag 102 were damaged and stopped functioning. In an embodiment, if the RFID tag 102 is damaged, it may be replaced with a new RFID tag 102 and the existing metadata loaded to the new RFID tag 102, thereby providing for continued data recording from the same component without a loss of data by means of the new RFID tag 102.

In an embodiment, the different memory configurations may be used individually or in combination to provide the memory configuration required for the RFID tag 102 type. For example, in a four RF network node (104A, 104B, 104C, 104D) RFID tag 102, two RF network nodes (104A, 104B) storing the same information may create redundant memory; this may be repeated for the other two RF network nodes (104C, 104D), with a final result of two sets of redundant RF network nodes (104A, 104B) and (104C, 104D). Additionally, the two sets of RF network nodes (104A, 104B) and (104C, 104D) may then be combined as increased memory for the RFID tag 102. This configuration may result in two sets of redundant increased memory for the RFID tag 102. It may be understood by one knowledgeable in the art that the RF network nodes (104A, 104B, 104C, 104D) may use in a number of different redundant and increased memory configurations.

In an embodiment, the RF network node memory configuration may be set in the hardware, firmware, software configured, or the like. In an embodiment, the memory configuration may be programmed into the RFID tag 102 when it is associated with a component.

In an embodiment, in either a redundant or increased memory configuration, the master RF network node may manage the memory of the RFID tag 102. As part of the hardware, firmware, software, or like configurations of the RFID tag 102, different parts of the RFID tag 102 memory may be assigned different read/write permissions. For example, there may be private memory, public memory, user memory, read only memory, write once/read many memory, read/write, and the like that may be used for different information dependent on the different entities that needed access to the information. In an embodiment, the master RF network node may manage the different memories, memory configurations, memory read types, and the like within the RFID tag 102. In an embodiment, the may be predetermined memory locations and memory allocations for the different types of memory within the RFID tag 102.

In an embodiment, public memory may be used for information that can be read may any entity or enterprise that is able to read the information from the RFID tag 102. For example, any enterprise along a distribution route for a product with an RFID tag 102 may be able to read the name and quantity information of the product. But only certain enterprises may be able to read the distribution history of the product, the owner information, serial number information, final delivery information, or the like. This information may be in private memory and may be encrypted, protected with a password, or the like.

In an embodiment, the RFID tag 102 may have user specific memory that only the owner of the product may access. The user memory may be structured or non-structured memory that may allow the user to write any information to these locations. The user memory may be encrypted, password protected, or the like.

In an embodiment, public, private, or user memory may be read only, write once/read many, read/write, or the like. In an embodiment, information in the read only memory may be written to the RFID tag 102 when the RFID tag 102 is initially associated with the object. This may be information that the owner of the object does not want to have replaced or lost during the life span of the object such as the object name, the object quantity, the object serial number, or the like.

In an embodiment, information in the write once/read many memory may be information that is added to the RFID tag 102 during the life span of the object. This may be information that the owner of the object does not want to have replaced or lost during the life span of the object. For example, the object may be in a distribution system. At each stop, change of transportation system, change of carrier, or the like that occurs during the distribution of the object, information may be written to the RFID tag 102 to provide a distribution history of the object. The owner of the object may want the distribution information written to the RFID tag 102 but may not want to have the information overwritten or erased because this information may provide a distribution history of the object. But, once the information is written to the RFID tag 102, the owner of the object may want to read the distribution information many times. In an embodiment, the write once\read many memory may be public, private, or user memory.

In an embodiment, information in the read/write memory may be information that is temporary information to the RFID tag 102 during the life span of the object. The read/write memory may be overwritten during the life span of the object and may be used to provide temporary information, information of the last state of the object, information containing the changing state of the object (e.g. changing weight), or the like. For example, the RFID tag 102 may be on a pallet that holds a number of identical objects. Every time an object is removed from the pallet, the number of objects remaining on the pallet may be revised in the read/write memory of the RFID tag 102. In this example, the read/write memory may be public, private, or user memory.

Figure 11:
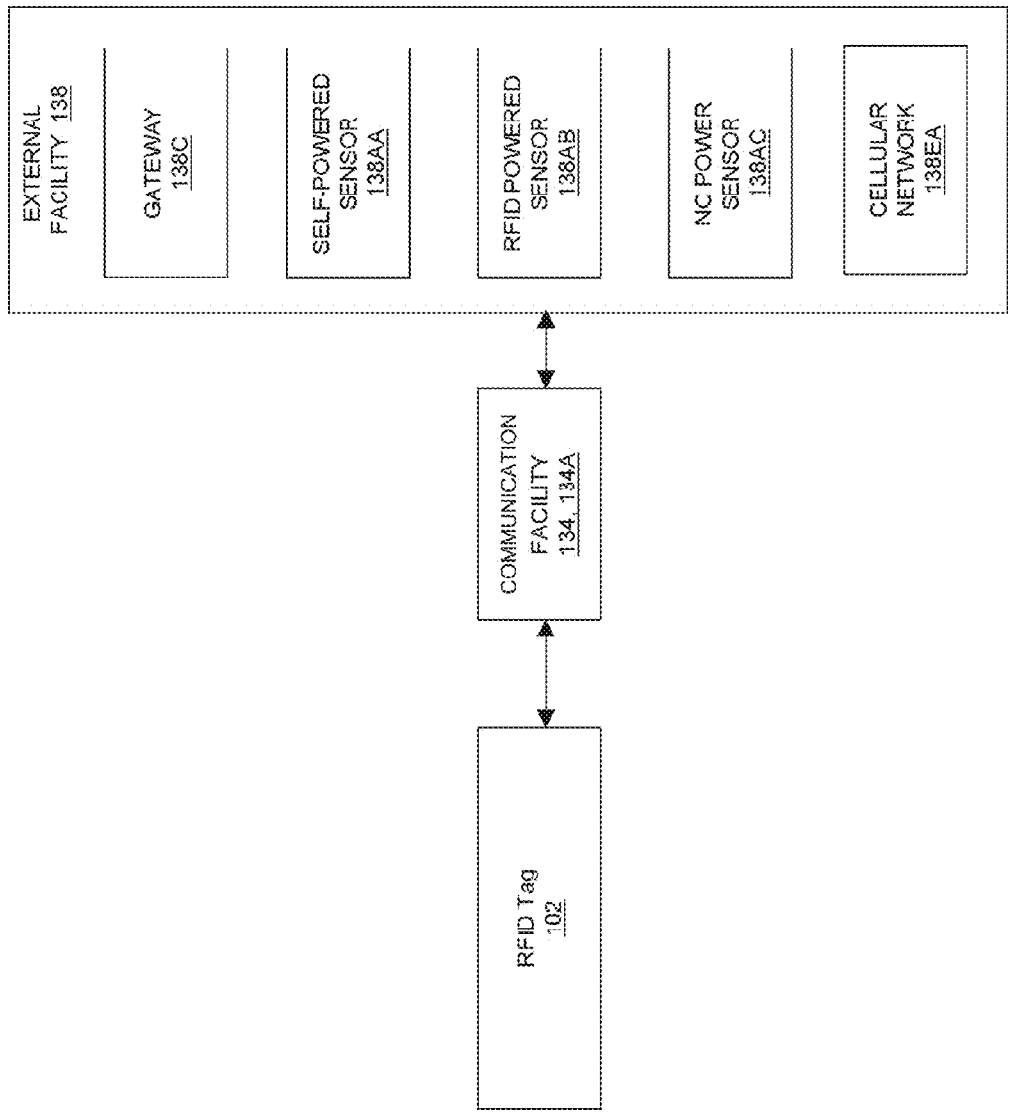
FIG. 11 shows a range of embodiments of RFID tag systems with sensor capabilities.

As previously described herein, the RFID tag 102 may include a communication facility 134 that may provide communication to external facilities 138, such as devices, networks, interfaces, or the like that are external to the RFID tag 102. Referring to FIG. 11, an embodiment is shown of the RFID tag 102 communicating with a plurality of sensors (138AA, 138AB, 138AC), a gateway facility 138C, and a cellular network 138EA. In an embodiment, the communication facility 134 may be connected to more than one external facility 138 at the same time. For example, the communication facility 134 may be connected to a self-powered sensor 138AA and a gateway facility 138C. This may allow the RFID tag 102 to read the self-powered sensor 1102 and communicate the reading to a network that may be connected to the gateway facility 138C.

In an embodiment the gateway facility 138C may provide communication to an external network that may include a LAN, a WAN, a peer-to-peer network, an intranet, an Intranet, or the like. In an embodiment, the connection between the gateway facility 138C and the communication facility 134 may be wired or wireless. The wireless connection may include WiFi, Bluetooth, wireless USB, ultra-wideband, or the like. In an embodiment, the gateway facility 138C may be able to transmit and receive information to and from the network. In an embodiment, by connection to a gateway facility 138C, the RFID tag 102 may be considered computer device on a network where information may be input and output. For example, as information is stored on the RFID tag 102 from a reader 140 or sensor (138AA, 138AB, 138AC), the stored information may be transmitted to the network using the communication facility 134 connected to the gateway facility 138C. Additionally, information may be stored on the RFID tag 102 from the network. For example, during a read cycle, the RFID tag 102 may check the connected gateway facility for any information that may be waiting to be transferred from the network.

In another embodiment, RFID tags 102 may be able to communicate with each other using the connected gateway facility 138C. In this embodiment, a group of RFID tags 102 may form an RFID tag 102 network where information may be communicated between the each other using the gateway facility 138C network connection. For example, in addition or instead of communicating information to the reader 140, when the RFID tag 102 is powered up by a reader 140 signal, the RFID tag 102 may communicate information to other RFID tags 102 using the gateway facility 138C. There may be more than one RFID tag 102 within an area that also have gateway facility 138C connections that may receive and transmit information to and from other RFID tags 102. The RFID tags 102 may be able to communicate any information stored within the RFID tag 102 memory using the gateway facility 138C. The inter RFID tag 102 communication may provide a method of data backup amoung the RFID tags 102, may provide an RFID tag 102 distributed memory, may provide an RFID tag 102 shared memory, or the like.

In an embodiment, the cellular network 138EA connection may provide another method of communicating information to a network. In certain situations, the RFID tag 102 may not be directly connected to a gateway facility 138C network but may have connectivity through the cellular network 138EA. The cellular network 138EA may provide the RFID tag 102 access to a cellular network provider and thereby access to a network for communicating the RFID tag 102 information. Similar to the gateway facility 138C connection, the RFID tag 102 may be able to transmit information to and from the cellular network 138EA as information is written to the RFID tag 102.

In an embodiment, the gateway facility 138C and cellular network 138EA connections may provide traceability of the RFID tag 102 throughout its life cycle. For example, as a product moves through a distribution system it may have a plurality of read cycles that may write information to the RFID tag 102. As the RFID tag 102 receives information, the RFID tag 102 may be able to communicate the new information through the gateway facility 138C or cellular network 138EA. In this manner, the information on the RFID tag 102 may be recorded and tracked from a remote location connected to the network. For example, the owner of the RFID tag 102 product may be able to track the progress of the product through the distribution system from the remotely connected location.

In an embodiment, the RFID tag 102 communication facility 134 may be connected to both the gateway facility 138C and the cellular network 138EA. Depending on the location of the RFID tag 102 when new information is written, the RFID tag 102 may select either the gateway facility 138C or cellular network 138EA to communicate the new information to the network. For example, in a more remote location, the cellular network 138EA may provide the network connection when the gateway facility may not have connectivity to a network.

In an embodiment, the RFID tag 102 may be able to connect to the network through the gateway facility 138C or cellular network 138EA during power up, at full power, or the like. In embodiments, the RFID tag 102 may be powered up by ambient electro-magnetic waves, by a reader signal, by an electro-magnet signal device, or the like. For example, the RFID tag 102 may power up every time there is an ambient electro-magnetic wave that is strong enough to provide power to the RFID tag 102. During any of the ambient wave power ups, the RFID tag 102 may attempt to communicate with the network using the gateway facility 138C or cellular network 138EA. In another example, there may be a device that periodically generates a signal that may power up the RFID tag 102 to communicate with the network.

In an embodiment, the sensors (138AA, 138AB, 138AC) may provide information such as temperature, humidity, stress, acceleration, or the like to the RFID tag 102. In an embodiment, the sensors (138AA, 138AB, 138AC) may be self-powered 138AA, RFID tag powered 138AB, require no power 138AC, or the like.

In an embodiment, the communication facility 134 may provide connectivity between the RFID tag 102 and the sensors (138AA, 138AB, 138AC). In embodiments, the communication facility 134 may be a direct interface, a serial interface, a parallel interface, a gateway interface, a network interface, or the like. In an embodiment, any of the interface types may be implemented as a wired or wireless connection. In an embodiment, the wireless connections may be a cellular connection, a WiFi connection, an infrared connection, a Bluetooth connection, wireless USB, ultra wideband, or the like. In an embodiment, the communication facility 134 may provide a connection to the sensors, a network, other RFID tags, or the like.

In an embodiment, the RFID tag 102 using a wireless communication interface 134, may be located remotely from the sensors (138AA, 138AB, 138AC). This may allow the RFID tag 102 to be in a location that may be less susceptible to damage and still collect data from a sensor (138AA, 138AB, 138AC) that may be in an environment that would be damaging to the RFID tag 102.

Additionally, using the communication facility 134, the RFID tag 102 may be able to communication with more than one sensor (138AA, 138AB, 138AC) using either a wired or wireless connection. In this embodiment, the RFID tag 102 may network a number of sensors together to collect and save the sensor information.

In an embodiment, the communication facility 134 may be a separate device from the RFID tag 102, part of the RFID tag 102, a combination of separate and part of the RFID tag 102, or the like.

In an embodiment, the RFID tag 102 may read the sensors (138AA, 138AB, 138AC) during power up, at full power, or the like. In embodiments, the RFID tag 102 may be powered up by ambient electro-magnetic waves, by a reader signal, by a electro-magnet signal device, or the like. For example, the RFID tag 102 may power up every time there is an ambient electro-magnetic wave that is strong enough to provide power to the RFID tag 102. During any of the ambient wave power ups, the RFID tag 102 may read the data from the sensors (138AA, 138AB, 138AC). In another example, there may be a device that periodically generates a signal that may power up the RFID tag 102 to read the sensors (138AA, 138AB, 138AC). In another example, the sensors (138AA, 138AB, 138AC) may contain memory for the sensor readings taken during a read using ambient waves and the RFID tag 102 may read the sensor stored data when the RFID tag 102 receives a reader 140 signal.

In an embodiment, the self-powered sensor 138AA may be powered by an external source such as AC power, DC power, battery power, or the like. Because of the constant power source, the self-powered sensor 138AA may continuously measure and provide data to the RFID tag 102. The RFID tag 102 may only read the continuously provided data when the RFID tag 102 is powered up.

In an embodiment, the RFID powered sensor 138AB may be powered only from the RFID tag 102. In an embodiment, when the RFID 102 is powered up, the RFID tag 102 may provide power to the RFID powered sensor 138AB. For example, the RFID tag 102 may power up from a received signal, the RFID tag 102 may send power to the RFID powered sensor 138AB, the RFID powered sensor 138AB may read data, and the RFID tag 1102 may then read and store the RFID powered sensor 138AB data.

In an embodiment, the no power sensor 138AC may not require any power to read data, and may instead wait for the RFID tag 102 to request data. For example, the RFID tag 102 may power up from a received signal, the RFID tag 102 may request data from the no power sensor 138AC, the no power sensor 138AC may read data, and the RFID tag 102 may then read and store the no power sensor 110 data.

It may be understood by someone knowledgeable in the art that there may be a number of different types of sensors (138AA, 138AB, 138AC) used individually or in combination with at least RFID tag 102.

In embodiments, there may be a number of methods of assembling the RF network nodes 104 as described herein to the RFID tag 102. The RF network nodes may be applied by mechanical direct placement, conductive ink transfer, thermal ink transfer, silkscreen, or the like. In an embodiment, non-precise RF network node 104 placement processes such as conductive ink transfer, thermal ink transfer, silkscreen, or the like may be applied to an area of the RFID tag 102 where there are antenna leads that are closely spaced. As depicted in FIG. 9, the antenna 108 may have connection leads; these leads may be of various designs that may provide for small gaps between the two antenna 108 halves. The small gap between the antenna 108 leads may allow the RF network node 104 leads to bridge the gap and make contact to both halves of the antenna 108. The two antenna 108 leads may branch into a plurality of leads; the plurality of leads of the two antennas 108 may be in close proximity in a certain area on the RFID tag 102. This certain area may be where the RF network nodes 104 are applied to the RFID tag 102. In embodiments, the gap between the leads may be small enough to allow the RF network node 104 to bridge the antenna 102 lead gap.

In embodiments, the mechanical direct placement method may include traditional chip placement such as flip-chip, direct attach, strap attach, PICA, and the like. Using the mechanical direct placement, the RF network node 104 may be place on a substrate using mechanical means. The mechanical direct placement method may be able to precisely place the RF network node 104 to the antenna 108 leads.

In embodiments, the RFID tag 102 may be assembled with the use of a super strap, where the super strap may be a substrate, carrier, interposer, and the like, with the function of packaging a system of integrated circuits (IC) chips. By providing a physical place holder for multiple IC chips, such as RFID nodes 104, RFID chips, sensors, memory and the like, several chips may be interconnected. These interconnections may be a network of series, parallel, series-parallel, and the like, between IC chips located on a super strap. For instance, FIG. 9AA shows a representation of how multiple ICs may be connected in a series configuration, FIG. 9AB how multiple ICs may be connected in a parallel configuration, and FIG. 9AC how multiple ICs may be connected in a series-parallel configuration. These three representative configurations are meant to illustrate the possible interconnections, and not to be limiting in any way. One skilled in the art will recognize that there are a wide variety of configurations for interconnecting multiple ICs. In embodiments, a super strap may provide convenience during manufacturing. In addition, it may provide design advantages for electrical and RF performance for a multi-node or composite type RFID tag. In embodiments, a use model of the super strap may be similar to a typical strap used in RFID tags.

In manufacturing, a super strap may improve the assembly time of a multi-node tag 102, where it may be manufactured prior to the attachment of the antenna 108 with a network of multiple chips. Although a super strap may carry multiple chips, there may be only a limited number of connections (e.g. only two connection points for a dipole antenna). Therefore, a typical high volume manufacturing process may maintain its production throughput by attaching just a single super strap to an antenna 108 at high speed. A super strap may provide improved electrical performance when connecting multiple ICs. For instance, the close proximity of the chips on a super strap may deliver the most desired positioning of the chips and thus lower electrical losses when sharing data or power between different IC chips.

In embodiments, the assembly of the RFID tag 102 may be performed by attaching an IC chip, such as RFID node(s) 104, RFID chip(s), to an antenna using a flip-chip assembly process. In some cases, an interposer, strap, super strap, and the like, may be used in conjunction with the assembly process. In practice, an IC chip may only have a small number of external connections, such as two to three external connections, implemented as pads, pins, and the like. As RFID chips incorporate more functionality, as is the case in various embodiments of the present invention, one may extrapolate scenarios where the input/output complexity of the devices creates a need for more external connections. For example, the present invention may be implemented in an application for driving an external facility 138 such as a display 138B as described herein, where the input/output demands of the external facility 138 may increase with the number of display segments, the size of the display, the technology of the display, the functionality of the display, and the like. As the number of external connections increases, a challenge may occur in terms of manufacturing complexity. For instance, a chip attach process may dictate minimums on pad spacing and other mechanical limits, translating into a possibility that the IC chip (die) size would need to increase in order to accommodate the assembly process limits. This may have the disadvantage of making the die more costly. Additionally, this may make the IC chip more vulnerable to mechanical damage in the course of assembly, such as in roll-to-roll processes. In embodiments, the present invention may accommodate the increased input/output demands of an external facility 138 without substantially increasing the input/output count of the IC chip by utilizing intermediate electronics between the IC chip and external facility 138. For example, an IC chip of the present invention may provide an RFID device ("IC chip") where the number of external interface signals to one or more external facilities 138 is minimized or reduced by the use of an external multiplexing and/or de-multiplexing arrangement, or other like intermediate electronics, so as to minimize the size of the chip or to provide other benefit. In embodiments, the IC chip may interface to the intermediate electronics via a serial bus, a time sequenced signal, a phase sequenced signal, and the like. The intermediate electronics may be implemented using printed electronics, printed in a roll-to-roll process and the like, attached in the same line as printing the intermediate electronics circuit. In embodiments, the intermediate electronics circuit may be implemented as conventional silicon based circuitry, attached in a roll-to-roll process, attached in the same line as attaching the multiplexing circuit. The intermediate electronics circuitry may interface to, or be present within, an external facility 138, such as a display 138B, a plurality of external facilities 138, and the like or any other external facility 138 as described herein. In embodiments, the IC chip may receive and/or transmit power from or to external facilities 138. In embodiments, the power signal itself may be used as a communications signal. In embodiments, the application of the intermediate electronics between the IC chip and the external facility 138 may be for any of the applications described herein.

In passive RFID tags 102, the maximum power transfer may be a critical factor in achieving the best performance in terms of operating (e.g. reading from and writing to) a tag. In order to facilitate the maximum power transfer, the input impedance of the IC chip may be matched to the corresponding antenna 108 input. In embodiments, a super strap may provide a desired flexibility in terms of matching multiple loads to a single antenna 108. Thus, the antenna 108 may better deliver power to all IC chips on a super-strap. A series, parallel, series-parallel, or the like interconnection configuration may provide for the most flexible way of controlling and achieving the desired impedance of a super strap (i.e. load). Depending on the interconnect configuration the impedance of a super strap may be controlled to achieve the desired value. For example, in the series connection there may be an improvement of the delivered voltage sharing amongst networked ICs. Whereas, in the parallel arrangement of the IC chips on the super strap, there may be an improvement of the delivered current sharing among networked ICs.

In an embodiment, the RF network node 104 may be placed using conductive inks. The RF network node 104 may be mixed into the conductive ink solution and deposited onto a RFID tag 102 substrate. The conductive ink applications may be an ink jet application, a spray application, a brush application, silkscreen application, or the like. In an embodiment, there may be a controlled density of RF network nodes 104 within the conductive ink solution that allows a certain number of RF network nodes 104 to be applied to the RFID tag 104 substrate with a certain volume of conductive ink. For example, if a spray process is used, a spray of a certain duration may yield a known amount of RF network nodes 104 being applied to the RFID tag 102 substrate.

Figure 12:
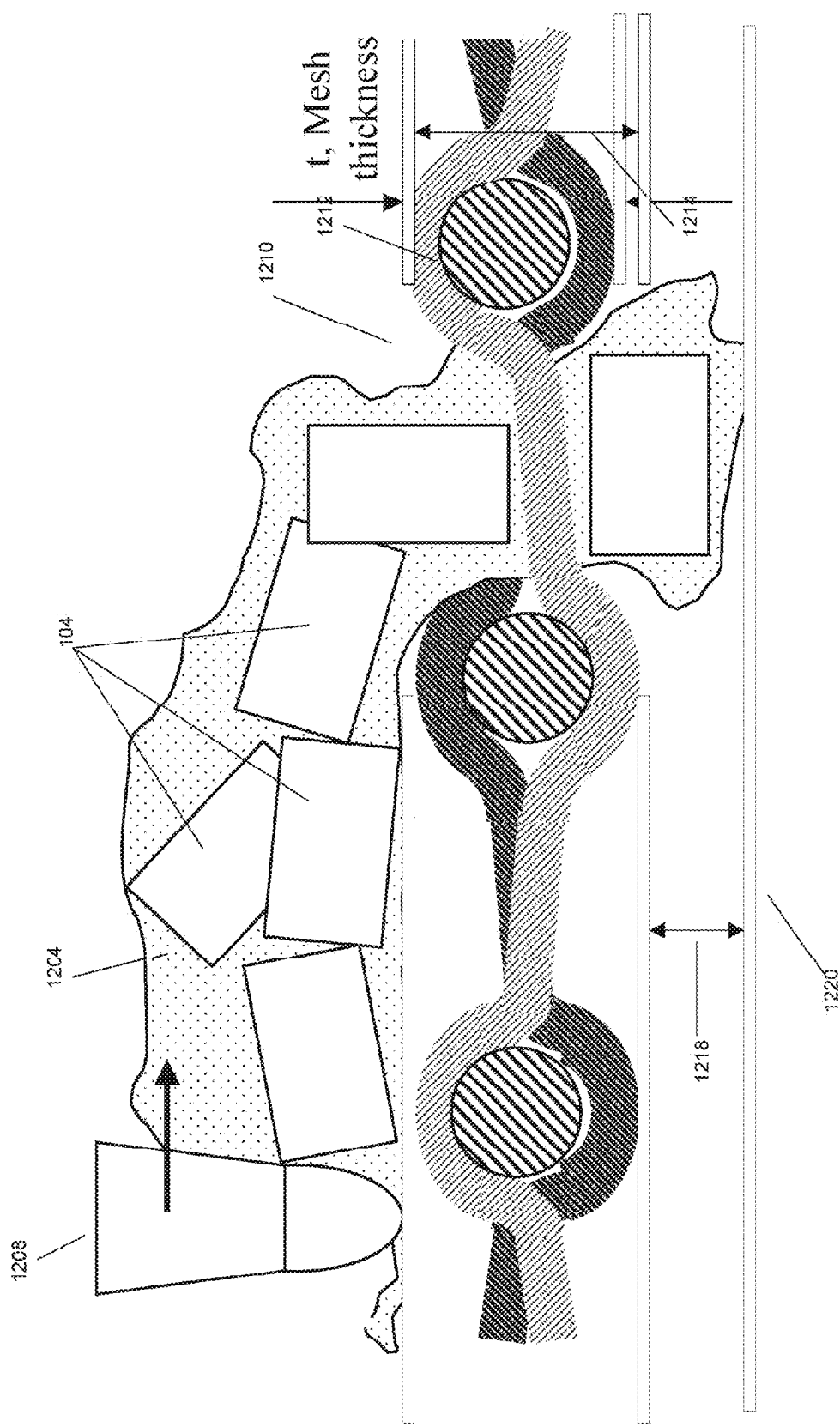
FIG. 12 shows an embodiment of a screen printing method for an RFID tag system.

Referring to FIG. 12, an embodiment of a screen-printing method for the application of RF network nodes to a substrate is shown. In an embodiment, screen-printing may be the method of applying inks, dyes, or the like onto a substrate through a mesh; the mesh may contain the pattern to apply the ink, dye, or the like. For example, screen-printing may be used to apply ink or dye to cloth, apply circuits to a circuit board, or the like. In an embodiment, the screen-printing process may consist of at least one ink, dye, or the like application to a substrate.

In an embodiment, RF network nodes 104 may be in suspended a solution 1204 for application through a mesh 1212 onto a substrate 1220. In an embodiment, the RF network node solution 1204 may be applied to the mesh 1212 screen in preparation for being applied into the mesh openings 1210. In an embodiment, the solution 1204 may include a conductive solution, non-conductive solution, or other solution that may be used with a screen-printing process. In an embodiment, an applicator 1208 may be used in a screen-printing method to move across the mesh 1212 to direct the solution into the mesh openings 1210. In an embodiment, the mesh openings 1210 may be in substantially the same shape as the RF network nodes 104. In an embodiment, the substantial matching of the RF network nodes 104 and the mesh openings 1210 shapes may orient the RF network node 104 to the substrate 1220 as the applicator 1208 directs the RF network node 1202 into the mesh opening 1210. In an embodiment, the RF network node 104 may be any shape that may include round, square, rectangular, or the like.

In an embodiment, the antenna contacts for the RF network nodes 104 may be on opposite faces of the RF network nodes 104. For example, the antenna contacts may be on the top and bottom faces of the RF network nodes 104. This embodiment may permit one antenna contact to connect with the first antenna half and the second contact to be available for connection to the second antenna half. In an embodiment, the shape of the RF network node 104 substantially matching the shape of the mesh opening 1210 may facilitate the proper alignment of the RF network node 104 with the substrate 1220 so that proper contact may be made with an antenna.

In an embodiment, the mesh 1212 may have at least one mesh opening 1210 to create a pattern of RF network nodes 104 being placed on a substrate 1220. In an embodiment, the dimensions of the mesh openings 1210, mesh thickness 1214, mesh distance from the substrate 1218, the mesh shape, and the like may be configured to orient the RF network node 104 to the substrate 1220. For example, the RF network node 104 may be a rectangular shape with the mesh 1212 having a similar rectangular shape opening 1210. The mesh opening 1210 may be substantially the same rectangular shape and the mesh thickness 1214 may be matched to the thickness of the RF network node 1202. Thus, the mesh opening 1210 and thickness 1214 may act as a guide for the RF network node 104 to be properly placed on the substrate. In an embodiment, the mesh to substrate distance 1218 may also be matched to the RF network node 104 thickness so that only one RF network node 104 may be placed per mesh opening 1210. It may be understood by those of skill in the art that any given mesh 1212 may contain more than one mesh pattern, or any arrangement of mesh openings for the application of more than one RF network node 104 pattern on the substrate 1220.

Figure 13:
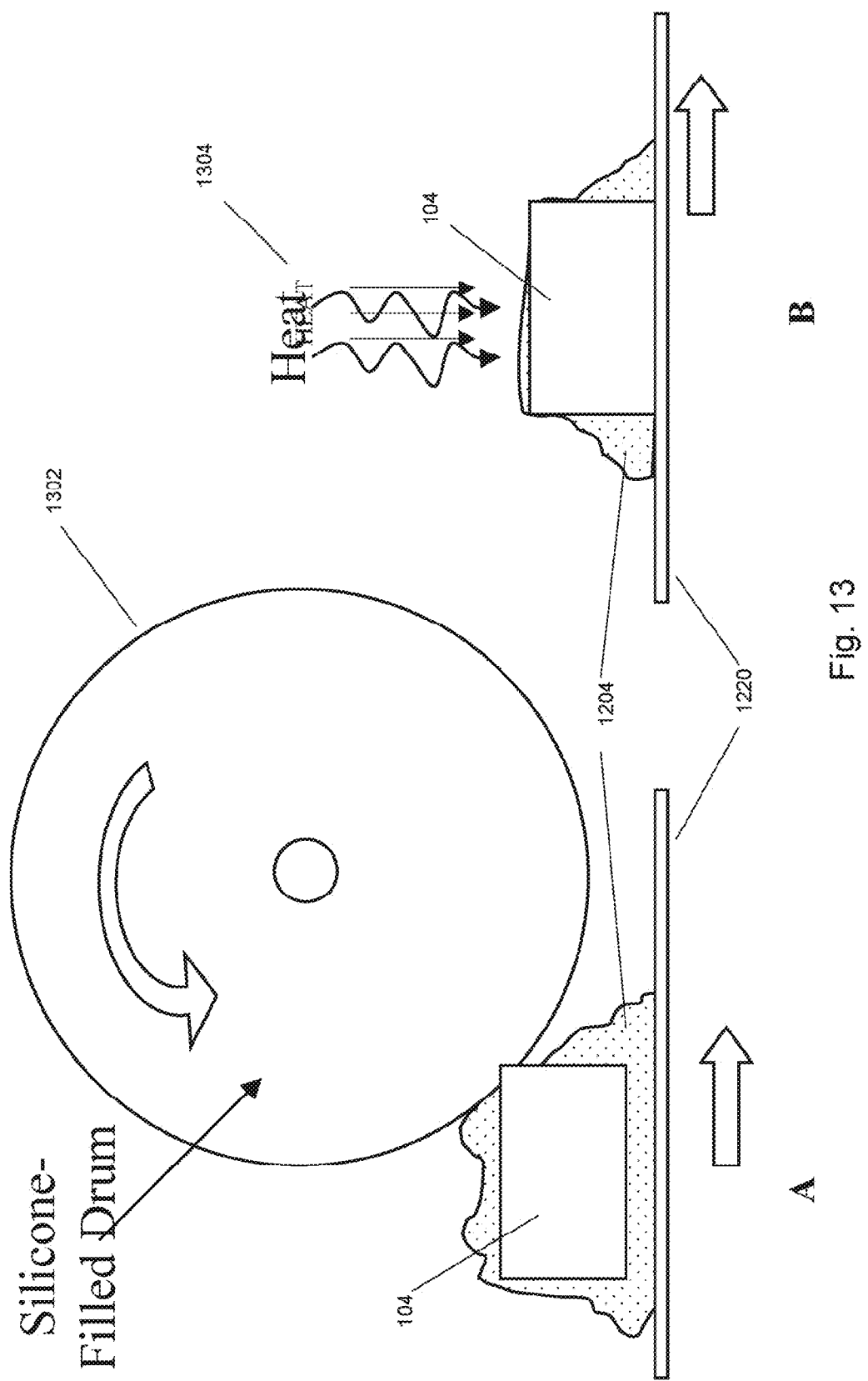
FIG. 13 shows an embodiment of forcing an RF network node to a substrate.

FIG. 13 depicts, in an embodiment, how screen-printed RF network nodes 104 may be directed into contact with the substrate for proper antenna contact. If, after the screen-printing process is complete and the RF network nodes 104 have been applied to the substrate 1220, the RF network nodes 104 are not be in contact with the antenna, a RF network node 104 may be directed into contact with the substrate. In an embodiment, the RF network nodes 104 may be directed to contact the substrate by methods that may include rolling, pressing, air pressure, suction, or other process capable of applying a force on the RF network node 104 to make contact with the substrate 1220.

In FIG. 13, an embodiment of a rolling process to press the RF network nodes 104 into contact with the substrate is shown. As shown in view A, after screen-printing the RF network node 104 may be suspended in the solution 1204 and not in contact with the substrate 1220. As depicted in this figure, a roller 1302 may be used to roll over the screen-printed RF network node 104 pattern to press the RF network nodes 104 onto the substrate 1220. In an embodiment, the roller 1302 may rotate around a center axis. In an embodiment, the roller may be made of a material that will not cause damage to the RF network node 104. In an embodiment, the roller material may include a silicone, rubber, or the like.

As shown in FIG. 13 view B, after the process to press the RF network node 104 into contact with the substrate 1220, the RF network node 104 may be in contact with the substrate 1220 and antenna. As shown in view B, after the RF network node 104 has been pressed into contact with the substrate 1220, the solution 1204 may be cured with heat 1304 so that the RF network node 104 is fixed in its position relative to the substrate 1220.

Figure 14:
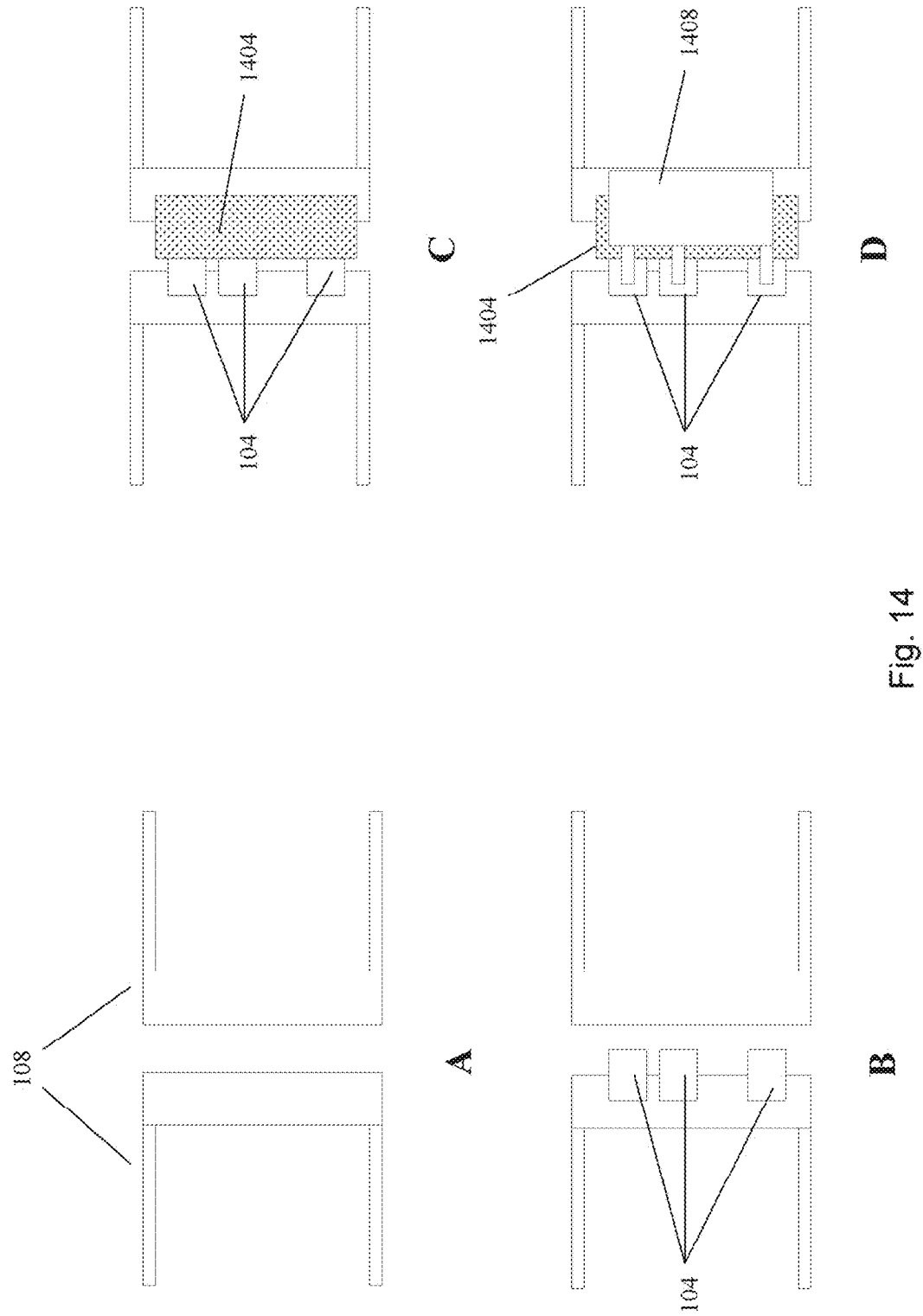
FIG. 14 shows orientation of components in an embodiment of a screen coating application in an RFID tag system.

Referring to FIG. 14, an embodiment of the screen-printing process of applying RF network nodes 104 to an antenna 108 is shown. In an embodiment, as shown in view A, the antenna 108 may be applied to the substrate 1220 using an inkjet process, screen-printing process, or the like. In an embodiment, as shown in view B, the RF network nodes 104 may be applied to the antenna 108 using the screen-printing as previously described in FIG. 12. In an embodiment, the screen-printing process may be able to apply the RF network nodes 104 in a position required to make contact with the antenna 108. In this case, the RF network node 104 may be applied to one side of the antenna 108. In an embodiment, as previously discussed in FIG. 12, the RF network node 104 may have two antenna leads that may be positioned on opposite sides of the RF network node 104. In an embodiment, the screen-printing process may orient the RF network node 104 to position the RF network nodes 104 to the substrate 1220 providing for one of the RF network node 104 antenna leads to be in contact with the antenna 108. In an embodiment, as shown in view B of FIG. 14, one of the antenna leads may be in contact with the left half of the antenna 108.

In an embodiment, after the RF network nodes 104 have been screen-printed in place and cured, a non-conductive layer 1404 may be applied over the RF network nodes 104 to the other half of the antenna 108 as shown in view C of FIG. 14. In an embodiment, the application of the non-conductive layer 1404 may be optional. In an embodiment, the non-conductive layer 1404 may provide a transition material layer to allow a smooth contact path for a contact layer 1408 to follow. In an embodiment, the non-conductive layer 1404 may be a non-conductive solution that may be applied by a process that may include inkjet, screen-printing, spray, brush, or the like.

In an embodiment, the contact layer 1408 may be applied to provide a connection between the RF network nodes 104 and the other antenna half 108 as shown in view D of FIG. 14. In an embodiment, the contact layer 1408 may complete the circuit between one half of the antenna 108, the RF network node 104, and the second half of the antenna 108. In an embodiment, as shown in view D of FIG. 14, one RF network node 104 lead may be in contact with the left side of the antenna 108, the second RF network node 104 lead may be in contact with the contact layer 1408, and the contact layer 1408 may be in contact with the right hand side of the antenna 108.

In an embodiment, the number of RF network nodes 104 applied to the antenna 108 may be related to the number of mesh openings 1210 that may create the pattern of the screen-printing mesh 1212, as described previously with reference to FIG. 12. In an embodiment, the RF network nodes 104 may be applied to one side of the antenna 108, applied to both sides of the antenna 108, bridge across the antenna 108, or may be arranged in any other orientation that allows the RF network node 104 to make contact with both halves of the antenna 108.

Figure 15:
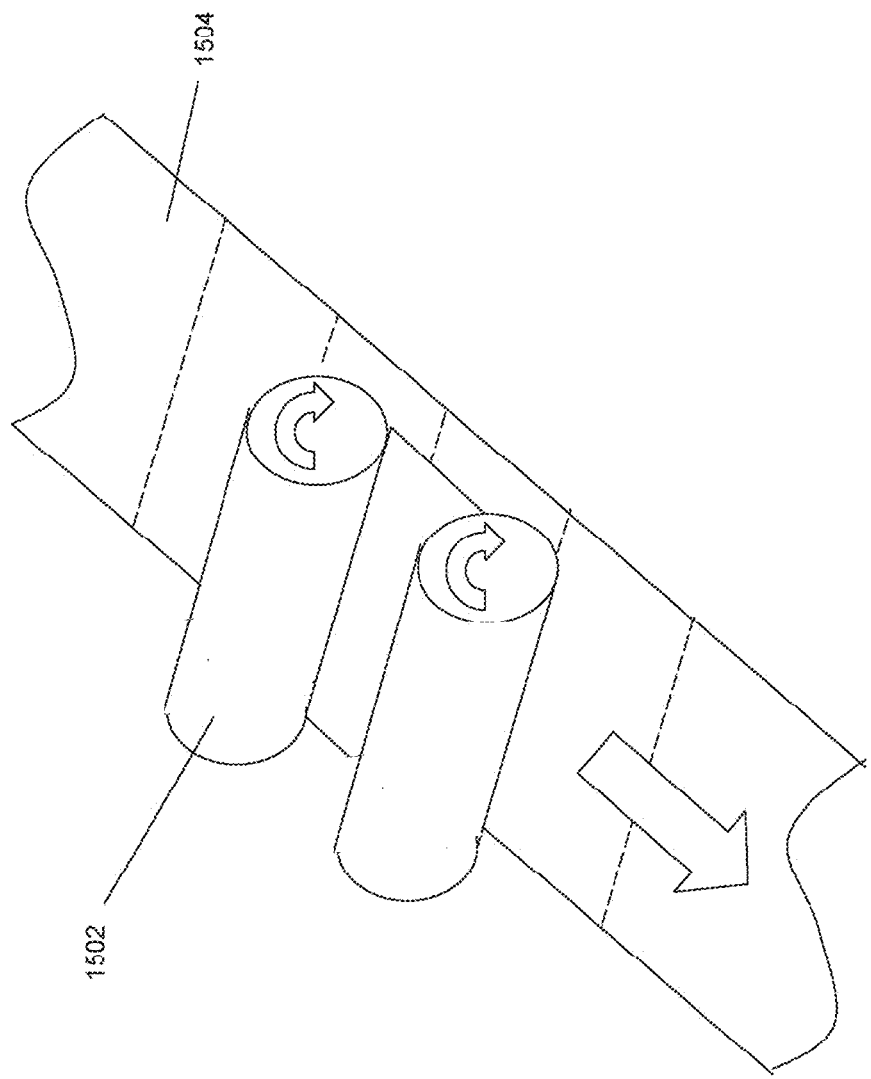
FIG. 15 shows an embodiment of a thermal printer ribbon 1202 applying ink, wax, resin, or the like to a substrate.

In an embodiment, thermal printing may be another printing method that may be used for the application of multiple RF network nodes 104 to a substrate, as shown in FIG. 15. FIG. 15 shows an embodiment of a thermal printer ribbon 1502 applying ink, wax, resin, or the like to a substrate 1504.

In an embodiment, the node network may comprise multiple RF network nodes 104 that are connected to communicate in a coordinated manner. The multiple RF network nodes 104 may be connected as previously described, using a serial connection, parallel connection, antenna connection, or the like. In an embodiment, thermal printing may be used in addition to other multiple network node application methods, such as screen printing, or thermal printing may be a stand alone application that applies both the multiple RF network nodes 104 and the antenna 108.

In an embodiment, the thermal printer ribbon 1502 may be constructed using at least two layers that may include a backing surface, an ink surface, and the like. In an embodiment, the ink may be a wax, resin, or the like that may melt with the application of heat. In an embodiment, a thermal element (not shown) may apply heat to the ribbon 1502 to melt the ink surface and apply the ink to the substrate 1504. In an embodiment, the ink may be a conductive ink.

In an embodiment, the network nodes may be pre-applied to the substrate 1504 using another application method. In an embodiment, the substrate 1504 may be a continuous feed substrate on a roll, a set of individual substrates, or the like. In an embodiment, the substrate 1504 with the multiple network nodes may be fed into a thermal printer. In an embodiment the substrate 1504 may have antenna leads pre-applied to the substrate that may connect to the multiple network nodes. In an embodiment, the thermal printer may apply an antenna pattern to the substrate 1504 that may connect to the pre-applied antenna leads.

In an embodiment, the applied antenna pattern may be matched to the type of container to which the RFID tag 102 is attached, including containers for substances such as liquid, metal, wood, or the like. For example, if the RFID tag 102 is to be applied to a container for liquids, the thermal printer may print an antenna that performs best when in close relation to a liquid. Similarly, the thermally printed antenna may be adapted for the surface of the container upon which it is printed, or it may be adapted for the environment in which the container exists (e.g., hot or cold conditions, humidity levels, proximity to corrosive gases or liquids, and the like).

As an example, the antenna pattern that may be printed onto the substrate 1504 may be selected from a set of antenna patterns that may be used for the different materials on which the RFID tag 102 may be attached. In an embodiment, as a RFID tag 102 is being printed, the proper antenna may be selected from the set of antenna patterns based on the object bearing the RFID tag 102. In an embodiment, the antenna pattern that is printed may be different for each RFID tag 102 that is printed. For example, a first RFID tag 102 that is applied to a water bottle may receive an antenna that is suited for a water application, while the next printed RFID tag 102 that is applied on a metal container may receive an antenna that is suited for the metal application. In an embodiment, the antenna pattern that may be printed on an RFID tag 102 may be any antenna pattern chosen from the available antenna pattern set.

It will be understood by skilled artisans that any type of information, such as bar code information, man readable information, or the like may be printed on the RFID tag 102 by the thermal printer, in addition to an antenna pattern.

In another embodiment, the thermal printer may apply both the multiple RF network nodes 104 and the antenna pattern onto an RFID tag 102. In an embodiment, the multiple RF network nodes 104 may be applied to the thermal ribbon 1502 and may be applied along with a matched antenna during the thermal printing of the RFID tag 102. In an embodiment, the substrate may be blank and all the RFID tag 102 components (e.g. multiple RF network nodes 104 and antenna 108) may be applied to the blank substrate. In this manner, the substrate may be any type of blank substrate to be applied to an object and the proper multiple RF network nodes 104 and antenna 108 may be applied as the RFID tag 102 is printed.

In an embodiment, the multiple RF network nodes 104 may have been applied to ribbon 1502, as shown in FIG. 15. In an embodiment, the multiple RF network nodes 104 may be applied using methods previously described methods such as screen printing, spray, brush, or the like. In an embodiment, the multiple RF network nodes 104 may be applied in a generic manner so that multiple RF network nodes 104 may be printed based on the object to which the RFID tag 102 may be attached. For example, a first item may require a smaller amount of storage space for product data and therefore require fewer RF network nodes 104. A second item may be more complicated and may require more memory, functionality, and the like and therefore may require more RF network nodes 104. In an embodiment, the memory used for the second item may include public and private memory.

In an embodiment, the multiple RF network nodes 104 may be applied to the ribbon 1502 using ink, wax, resin, or the like that hold the multiple nodes in place on the ribbon 1504. In an embodiment, during the printing process the multiple RF network nodes 104 may be applied to the substrate by melting the ink, wax, resin, or the like that is holding the multiple RF network nodes 104 to the ribbon. In an embodiment, once the ink, wax, resin, or the like is melted, the multiple RF network nodes 104 may be applied to the substrate. In an embodiment, the connections between the multiple RF network nodes 104 may also be applied by the thermal printing process.

In an embodiment, the generic application of the multiple RF network nodes 104 may be a grid of RF network nodes 104 on the ribbon 1502 applied to the substrate 1504 as required for the item that will bear the RFID tag 102. For example, there may be an N×M grid of nodes on the ribbon 1502 applied as required to create the multiple network nodes on the substrate 1504. The multiple RF network nodes 104 required for a particular application may require an N−3×M grid of RF network nodes 104 to provide the application with the necessary memory and functionality requirements. The thermal printing process would apply the N−3×M nodes to form the multiple RF network nodes 104; the remainder of the nodes may remain on the ribbon 1502.

In an embodiment, the thermal printer may apply an antenna 108 pattern to the substrate 1504 that may connect to the multiple RF network nodes 104 that may have been applied by the thermal printing.

Figure 16:
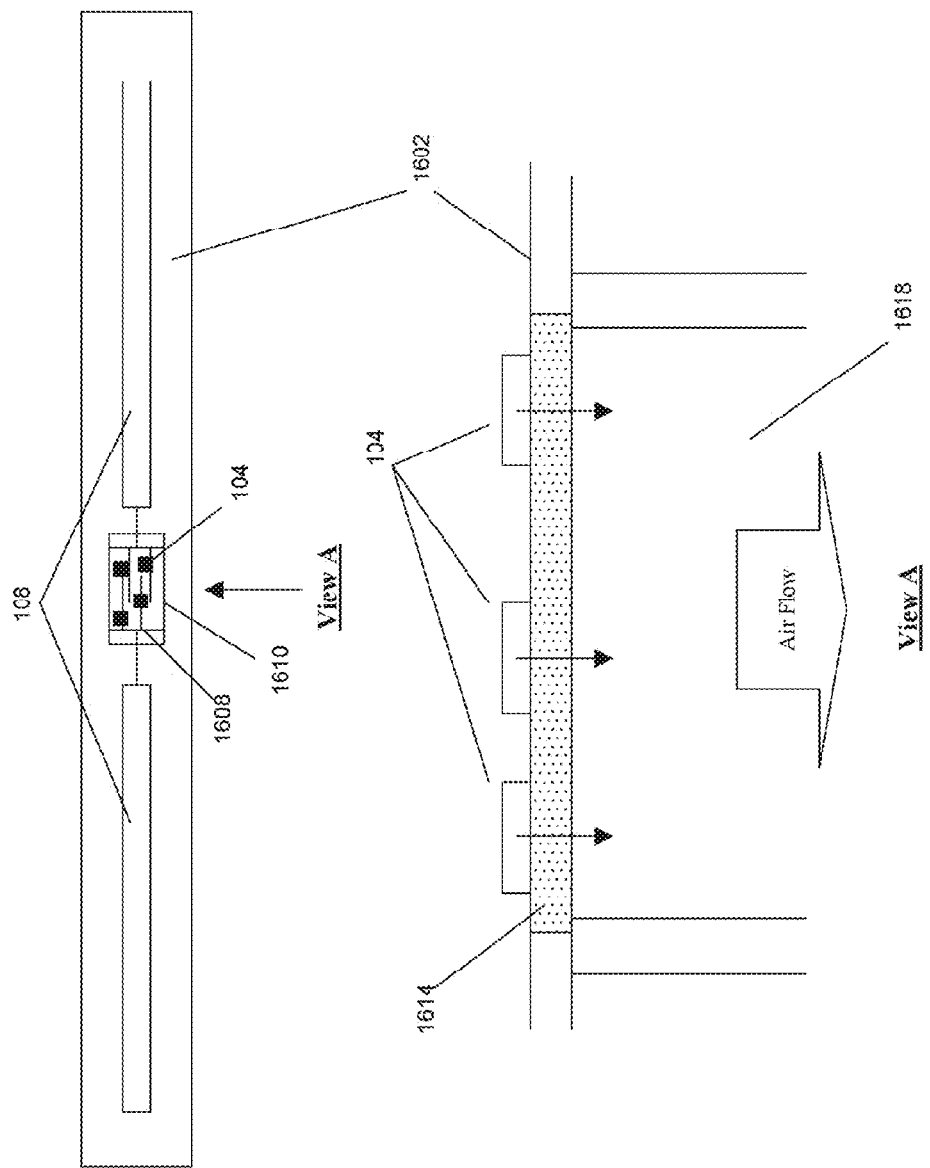
FIG. 16 shows a vacuum attachment method for an RFID tag system.

When using ink or fluid RF network node 104 placement methods, the RF network nodes may not be in contact with the antenna 108, may not be close enough to the antenna 108, may not be in the correct orientation to the antenna 108, or the like. In these cases, as illustrated in FIG. 16, the RF network nodes 104 may be pulled into contact with the antenna 108 using a vacuum device 1618. Referring to FIG. 16, a method and system to provide a maximum number of randomly placed RF network nodes 104 contacting the antenna leads 108 is shown. A vacuum device 1618 may be used to pull the randomly placed RF network nodes 104 to the antenna leads 108 in the attachment zone 1610. This method may increase the percentage of randomly placed RF network nodes 104 in electrical contact with the antenna leads 108 in the attachment zone 1610. The attachment zone 1610 may be where the leads from the antenna(s) 108 are in close proximity to each other to allow contact with the randomly placed RF network nodes 104. As previously described herein, the RF network nodes 104 may be applied using a conductive ink method of depositing the RF network nodes 104 to the attachment zone 1610. In embodiments, the RF network nodes 104 may be applied by other random placement methods that place the RF network nodes 104 on the attachment zone 1610. In an embodiment, the RF network nodes 104 may be randomly placed in the attachment zone 1610 by any placement process.

The randomly placed RF network nodes 104 may not be flat on the attachment zone 1610, and therefore all the RF network nodes 104 may not make an electrical connection with the antenna leads 1608. If the conductive ink application process is used, the RF network node 104 may be partially on top of another RF network node 104. In an embodiment, the RF network nodes 104 may be angled between the antenna leads 1608 and part of another RF network node 104. There may also be a plurality of RF network nodes 104 suspended in the conductive ink solution and not close enough to the antenna leads 1608 for the conductive ink to allow electrical contact between the RF network nodes 104 and the antenna leads 1608.

As depicted in FIG. 16, a vacuum device 1618 may be used to draw RF network nodes 104 that are not in contact with the antenna leads 1608 into contact with the antenna leads 1608. In an embodiment, the attachment zone 1610 or the entire substrate 1602 may be made of a porous material 1614 that allows air or fluid flow through the porous material 1614 using a vacuum device 1618. The vacuum device 1618 may be on the opposite side of the substrate 1602 from the RF network nodes 1612 to draw air or fluid over the RF network nodes 104 and through the porous 1614 substrate 1602. The antenna 108 and antenna leads 1608 may have previously been applied to the porous 1614 substrate 1602. The vacuum device 1618 may be used to draw air or fluids through the porous 1614 substrate 1602 and may pull the RF network nodes 104 flat to the antenna leads 1608. To further aid the positioning of RF network nodes 104 that are partially or fully on top of another RF network node 104, the substrate 1602 may be vibrated to allow the RF network nodes 104 to be pulled flat to the antenna leads 1608. The substrate 1602 vibration, in conjunction with the vacuum device 1618, may allow the RF network nodes 104 that are partially or fully on top of other RF network nodes 104 to move to a flat contact with the antenna leads 1608.

As previously described herein, and with reference to FIG. 2, the RFID tag 102 may include at least one antenna 108 associated with the multiple RF network nodes 104. In embodiments, the multiple antennas may be used to provide different antenna selections to match the type of object to which the RFID tag 102 is attached such as a metal object, liquid object, or the like. The RFID tag 102 may be able to select the antenna that provides the best reception and transmission characteristics for the RFID tag 102 and object combination. In an embodiment, the RFID tag 102 may select one of the antennas to improve the impedance match between the antenna 108 and the RF network nodes 104, the object to which the RFID tag is attached may influence the antenna impedance.

In an embodiment, the at least one antenna 108 may be all the same type of antenna, different types of antennas, a combination of similar antenna and different antennas, or the like. For example, an RFID tag 102 that includes four antennas may have two pair of similar antennas. This may allow the RFID tag 102 a choice of two different types of antenna for different object types (e.g. liquids or metals) and a choice within the antenna types to adjust the impedance of the selected antenna type to the RF network nodes 104. In an embodiment, there may be a plurality of different antenna designs that may be used on an RFID tag 102 such as a bar antenna, a loop antenna, a patch antenna, and the like. Additionally, in a multiple antenna configuration, the individual antennas may be shaped to simulate other antenna configurations. For example, more than one loop antenna may be applied in a circular configuration to simulate a patch antenna.

In an embodiment, the antenna 108 may have a plurality of antenna leads in the area of the RFID tag 102 where the RF network nodes 104 are attached to the RFID tag 102. The antenna 108 leads may be of various designs that may provide for small gaps between the two antenna 108 halves. The small gap between the antenna leads may allow the RF network node 104 leads to bridge the gap and make contact to both halves of the antenna 108. The two antenna 108 leads may branch into a plurality of leads; the plurality of leads of the antenna 108 may be in close proximity in the area on the RFID tag 102. This area on the RFID tag 102 may be an area where the RF network nodes 104 are applied to the RFID tag 102. In embodiments, the gap between the leads may be small enough to allow the RF network node 104 to bridge the antenna 108 lead gap.

In an embodiment, the antenna 108 may be made of different materials such as metal, conductive inks, or the like. In embodiments, the conductive ink antennas 108 may be applied using ink jet, silkscreen, thermal printing, or the like, using, for example, a method that is similar to the previously described conductive ink application of the RF network nodes 108.

In an embodiment, the ink jet application of antennas may use a computer device to apply a selected antenna pattern to the RFID tag 102 using conductive ink. The ink jet process may be similar to printing using a standard ink jet printer. In an embodiment, the selected antenna pattern may be stored in a database and at the time of the antenna 108 printing, the database may be searched to identify a suitable antenna for the RFID tag 102. In an embodiment, the application of the antenna 108 may include the application of the antenna leads, or the antenna leads may be applied at a separate time.

In an embodiment, the silkscreen application of the antenna 108 may be similar to the silkscreen application of RF network nodes 104 depicted in FIG. 12. There may be an antenna pattern provided in the mesh to apply the selected antenna. In an embodiment, the antenna 108 may be applied at the same time as the RF network nodes 104 as part of the silkscreen printing process.

In an embodiment, the thermal printing application of antennas 108 may use a thermal printer and ink ribbon to apply an antenna 108 to the RFID tag 102, similar to the application thermal printing RF network nodes 104 as described with reference to FIG. 15. In an embodiment, the selected antenna pattern may be stored in a database and at the time of the antenna 108 printing, the database may be searched to identify a suitable antenna for the RFID tag 102. In an embodiment, the application of the antenna 108 may include the application of the antenna leads or the antenna leads may be applied at a separate time.

In an embodiment, the antenna 108 may be applied to the RFID tag 102 substrate before the RF network nodes 104 are applied. As the RF network nodes 104 are applied to the antenna lead area of the RFID tag 102, the RF network node 104 antenna contacts may make a connection between the antenna leads for the two antenna halves, thereby making a complete connection with the antenna 108. As previously described, the RF network nodes 104 may be precision placed onto the antenna leads or may be randomly placed on the antenna leads. In an embodiment, if a conductive ink process is used to apply the RF network nodes 104 to the antenna 108, the antenna 108 may be applied at the same time using conductive inks.

In another embodiment, the RF network nodes 104 may be randomly placed on the substrate before the antenna 108 and antenna leads are applied to the substrate. The RF network nodes 104 may be randomly applied to the substrate using any random application process including one of the conductive ink application processes. In an embodiment, the antenna 108 and antenna leads may then be applied over the RF network nodes 104; the antenna 108 and antenna leads may be applied at the same time or at separate times. In an embodiment, the antenna leads may be applied using one of the conductive ink processes. In an embodiment, the antenna leads may be applied using a non-intelligent application of the antenna leads or an intelligent application of the antenna leads.

In an embodiment, the non-intelligent method of applying the antenna lead pattern may involve applying the antenna leads in a preset pattern regardless of the placement of the RF network nodes 104. By applying the antenna leads after the RF network nodes 104, the RF network nodes 104 may not have to be completely flat on the substrate for the antenna leads to make contact with the RF network nodes 104 as the antenna leads are applied over the RF network nodes 104. For example, the RF network nodes 104 may be positioned at an angle to the substrate but may still make contact with the antenna lead if the antenna lead is applied over the RF network node 104 using the methods described herein. Thus, this method may yield a satisfactory percentage of RF network nodes 104 in contact with the antenna leads. It may be understood that this process may connect a high percentage or some other percentage of the randomly applied RF network nodes 104 to the antenna leads.

In an embodiment, the RF network nodes 104 may be applied to the RFID tag 102 substrate first and the antenna lead may be applied over the RF network nodes 104 using an intelligent application process. In an embodiment, using the intelligent application of antenna leads, a pattern recognition system may be used to recognize the position of the RF network nodes 108 on the substrate and may apply a unique antenna lead pattern based on the placement of the RF network nodes 104. In an embodiment, a software application may determine the antenna lead pattern that may contact a maximum number of the RF network nodes 104, a required number of RF network nodes 104, a minimum number of RF network nodes 104, or the like. It may be understood that not all of the randomly applied RF network nodes 104 may be connected to the antenna leads 1608 using this process. For example, some RF network nodes 104 may not be accessible to the determined antenna lead 1608 pattern.

In an embodiment, the antenna pattern may be applied either before or after the RF network nodes 104 are applied and may be matched to the type of container or object to which the RFID tag 102 is attached, including containers for substances such as liquid, metal, wood, or the like. For example, if the RFID tag 102 is to be applied to a container for liquids, the antenna that is applied may be selected from antennas 108 that perform best when in close relation to a liquid. Similarly, the applied antenna 108 may be adapted for the surface of the container upon which it is printed, or it may be adapted for the environment in which the container exists (e.g., hot or cold conditions, humidity levels, proximity to corrosive gases or liquids, and the like).

As an example, the antenna pattern that may be printed onto the substrate may be selected from a set of antenna patterns that may be used for the different materials on which the RFID tag 102 may be attached. In an embodiment, as a RFID tag 102 is being applied, the proper antenna may be selected from the set of antenna patterns based on the object bearing the RFID tag 102. In an embodiment, the antenna pattern that is applied may be different for each RFID tag 102. For example, a first RFID tag 102 that is applied to a water bottle may receive an antenna that is suited for a water application, while the next RFID tag 102 that is applied on a metal container may receive an antenna that is suited for the metal application. In an embodiment, the antenna pattern that may be printed on an RFID tag 102 may be any antenna pattern chosen from the available antenna pattern set.

In an embodiment, the set of antenna patterns may be a stored set of antenna patterns in a database that may be applied by a conductive ink process, may be preprinted on the thermal ink ribbon to be selected at the time of printing, may be a silkscreen pattern selected at the time of printing, or the like.

In an embodiment, using a conductive ink antenna application method, the antenna type may be selected and printed when it is determined which object to which the RFID tag 102 will be attached. For example, on a thermal ink printer, the user may use a computer device to indicate the RFID tag 102 will be applied to a certain object. As part of the RFID tag 102 printing process, the computer device may search a database of antenna patterns for a suitable antenna 108 to be applied to the object. Once the antenna 108 is selected from the database, the printer may print the selected antenna 108 pattern on the RFID tag 102. In this manner, a suitable antenna 108 for use with the object may be printed on the RFID tag 102 based on the indicated object.

Figure 17:
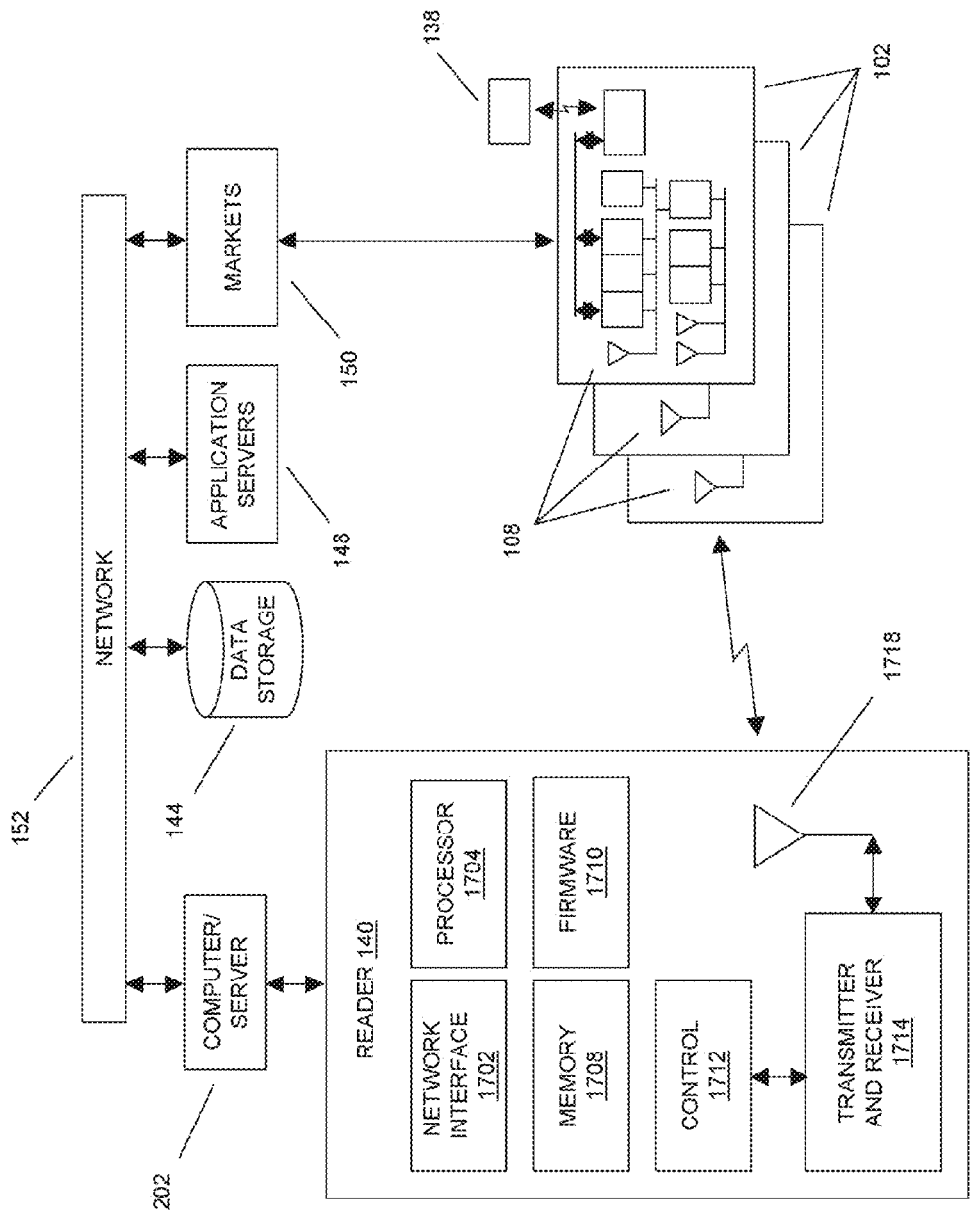
FIG. 17 shows the systems associated with a reader.

The RFID tag 102 may interface with the reader 140, and include a plurality of functions, as shown in FIG. 17. The reader 140, sometimes referred to as a scanner or interrogator, may include a radio frequency transmitter and receiver 1714 that may both read and write information to the RFID tag 102. The reader 140 may come in a plurality of configurations, including fixed, portable, embedded, smart, or the like, for a plurality of functionality and applications. For example, a fixed reader 140 may allow for automatic data capture from a specific location, while a portable reader 140 may enable verification functionality. In embodiments, the right combination of portable readers 140 and fixed readers 140 may be important in maintaining the greatest visibility of a RFID tagged 102 item throughout a supply chain. Another example may be a smart reader 140, where the reader 140 may have functionality that allows the reader 140 to process and store information associated with the RFID tag 102. Functionality included in a reader 140 may include a network interface 1702, a processor 1704, a memory 1708, a firmware 1710, a control facility 1712, a transmitter and receiver facility 1714, a reader antenna 1718, or the like.

In embodiments, the reader 140 may include the control facility 1712, the transmitter and receiver facility 1714, and the reader antenna 1718 as part of its core functionality. For example, the control facility 1714 may provide for the control and flow of data to and from the transmitter and receiver facility 1714, which may modulate and demodulate data through the reader antenna 1718. The reader antenna 1718 may in turn, provide for the RF communications interface to the RFID tags' 102 antenna(s) 108. In embodiments, these three core functional blocks may be an integral part of the reader 140 configuration, providing its basic functionality. This basic functionality may include the emitting of an RF carrier signal that may activate the RFID tag 102, enabling the RFID tag 102 to exchange data with the reader 140.

In embodiments, when a RFID tag 102 passes through a region where the reader 140 is actively transmitting an activating RF carrier wave, the RFID tag 102 may detect the reader's 140 activation signal, and power up. Communications between the reader 140 and the RFID tag 102 may now commence. The reader 140 may transmit commands to the RFID tag 102 that may initiate a return of information. The information transmitted from the RFID tag 102 may be decoded, and passed to the processor 1704. The processor 1704 may perform a plurality of processing steps on the returned RFID tag 102 data, including filtering operations to reduce the numerous, and often redundant, reads of the same RFID tag 102, to a smaller and more useful data set. In embodiments, the protocols for exchanging of information between the RFID tag 102 and the reader 140 may be governed by international standards, national standards, private standards, proprietary standards, or the like.

In embodiments, the reader 140 may provide for an interface to the network 152 by processing information through the computer server 202. The data collected from the RFID tag 102 may be transferred to the network 152 resource, such as the mass data storage 144, the application servers 148, the markets 150, or the like. The network 152 resources may provide for market specific applications processing of data, collected from a plurality of RFID tags 102 and/or from a plurality of locations. For instance, the reader 140 may collect data from the RFID tags 102 as the RFID tag 102 enters the reader's 140 proximity. As an example, the market 150 application may be associated with the tracking of inventory in a supply-chain. The reader 140 may collect data as the product nears the reader, and may transfer the data to the network 152, through the reader's 140 network interface 1702 and the computer server 202. The application server 148 may then transfer the data into the mass data storage 144, and make the data available for use to the appropriate market 150. In embodiments, the ability of markets 150 to access data collected from the plurality of RFID tags 102, through the plurality of readers 140, may be a powerful market tool in the collection and management of information associated with the RFID tagged 102 items.

In embodiments, the reader 140 may provide for data processing or storage as an embedded function of the reader 140. This functionality may provide for an intelligent reader 140, or smart reader 140, capable of providing data processing functions that may be independent, or in addition to, the network 152 resources. Functional blocks that may be associated with these additional capabilities may include the processor 1704, the memory 1708, the firmware 1710, or the like. The processor 1704 may be a central processor 1704, a digital signal processor 1704, a network processor 1704, or the like. The memory 1708 and the firmware 1710 may be RAM, DRAM, ROM, PROM, EEPROM, Flash, or any other memory technology known to the art. In embodiments, the reader 140 embedded processing and storage may enable data processing capabilities that distribute or localize processing that would otherwise be performed by the network 152 resources. This may increase the speed and accessibility of the RFID tag 102 data. Additionally, the reader 140 embedded processing and storage may enable data processing capabilities that may not be possible with the network 152 resources, such as real-time processing of data for immediate local use, closed-loop processing in association with the RFID tag 102 processing capabilities, the RFID tag 102 integrated mesh-network data distribution and transfer, or the like. In embodiments, intelligent capabilities of the reader 140 may be associated with the distributed and/or shared processing and memory storage capabilities of the multiple RF network node 104 RFID tag 102.

In embodiments, information stored in the reader's 140 memory 1708 may be for a plurality of uses. Examples may include information transmitted from the RFID tag 102, and stored for future processing either within the reader 140 or by the network 152 resources; information transferred into the memory 1708 from the network 152 resources, and used by the reader's 140 processor 1704; information transferred into the memory 1708 from the network 152 resources, and subsequently transferred to one or more of the RFID tags 102, or the like. In embodiments, the combination of the reader processor 1704 and the memory 1708 may enable a plurality of processing capabilities that may be utilized in conjunction with the increased, multiple RF network node 104, functionality. For example, the smart reader 140, local to the number of multi-RF network node 104 tags 102, may provide for a distributed monitoring and detection network. In this example, the RFID tags 102 may utilize their extended processing capabilities to read, convert, and compare the sensor 138A data interfaced to the RFID tag 102. The RFID tags 102 may periodically provide the sensor 138A processed data to the reader 140 upon request. The reader 140 may utilize an embedded, stored, or downloaded processor 1704 capability to monitor collected sensor 138A data. This may be based on parameter limits set by the network 152 resources, such as the market 150 application. In this way, the market 150 application may have many such reader 140 monitoring sites, but may only receive feedback from the reader 140 when parameter limits have been exceeded, thus decreasing the complexity of the market 150 data collection system.

In embodiments, the firmware 1710 stored in the reader 140 may contain fundamental operability routines and data for the reader 140, such as communication protocols for the network interface 1702, control algorithms for the control 1712 of the transmitter and receiver 1714, the processor 1704 initialization routines, or the like. The firmware 1710 may be upgradeable to help ensure compatibility with future standards, and to changes in the reader's 140 market 150 applications. In embodiments, changes to the reader's 140 firmware 1710 may be associated with the functionality and the market 150 applications embedded in the RFID tags 102.

In embodiments, the processing capabilities of the reader 140, and the processing capabilities of the RFID tag's 102 RF network nodes 104, may enable system functionality beyond typical passive RFID devices. For example the extended functionality of the system may enable the RFID tag 102 to have an extended contact with the reader 140, sometimes referred to as a session. Another example is the ability for the system to support encryption. Standard cryptographic techniques may require more resources than are available with typical RFID devices. In embodiments, the increased functionality of the RFID tag 102 may better enable the use of cryptographic techniques.

In embodiments, cryptography implemented between the reader 140 and the RFID tag 102 may prevent RFID tag 102 cloning, a form of security breach associated with unauthorized reading and reuse of the RFID tag 102 commands. Some of the RFID tags 102 may use a form of 'rolling code' scheme, wherein the RFID tag 102 identifier information may change after each scan from the reader 140, thus reducing the vulnerability of the RFID tag 102 to previously stolen responses. More sophisticated devices may engage in challenge-response protocols where the RFID tag 102 may interact with the reader 140. In these protocols, secret RFID tag 102 information may be sent over a secure communication channel between the RFID tag 102 and the reader 140, where the reader 140 issues a challenge to the RFID tag 102. The RFID tag 102 may respond with a result computed using a cryptographic circuit keyed with some secret value. Such protocols may be based on symmetric or public key cryptography, as described herein. Still other cryptographic protocols may protect privacy against unauthorized readers 140. One major challenge in securing the RFID tags 102 may be the shortage of computational resources within the typical RFID device. In embodiments, the RFID systems described herein may provide greater resources, so that standard cryptographic techniques may be more easily implemented.

In embodiments, the reader 140 may be operating in proximity to a plurality of RFID tags 102, and within range of other readers 140. In such circumstances, anti-collision techniques may be employed. Anti-collision algorithms may permit the simultaneous reading of large numbers of RFID tagged 102 objects, while ensuring that each of the RFID tags 102 is read only once. The chance of interference of the two readers 140 attempting to interrogate the same RFID tag 102 may be small if the bandwidth of the reader's 140 frequency is wide enough. The RFID tag 102 collision in RFID systems may occur when multiple tags 102 are energized by the reader 140 simultaneously, and reflect their respective signals back to the reader 140 at the same time. This problem may be seen when a large volume of RFID tags 102 are read together in the same RF field. The reader 140 may be unable to differentiate between these signals; with the resulting RFID tag 102 collision causing contention within the reader 140. When the reader 140 recognizes that RFID tag 102 collision has taken place, it may send a special signal, sometimes referred to as a gap pulse. Upon receiving this signal, each of the RFID tags 102 may consult a random number generator 122 to determine the interval to wait before sending its data. Since each of the RFID tags 102 receives a unique number interval, the RFID tags 102 may send their data at different times.

The reader 140 collision may also occur in RFID systems when the coverage area of one reader 140 overlaps with that of another reader 140. This may cause signal interference, with the RF fields of two or more readers 140 overlapping and interfering. Having the readers 140 programmed to read at fractionally different times may solve this.

Another technique that may be used to avoid collisions is frequency hopping. Frequency hopping is understood to be a technique useful for keeping two or more readers 140 from interfering with each other while reading the RFID tags 102 in the same area. For example, UHF readers 140 in the United States may operate between 902 and 928 MHz, jumping randomly (or in a predetermined sequence) to frequencies in between 902 and 928 MHz.

In embodiments, the reader 140 may only be able to communicate with the RFID tag 102 when the RFID tag 102 is in range. A number of factors may affect the distance from the reader 140, also known as read distance, at which a RFID tag 102 may be read. Examples may include the frequency used for identification, antenna gain, orientation and polarization of the reader antenna 1718, orientation and polarization of the RFID tag's 102 antenna 108, placement of the RFID tag 102 on the object to be identified, or the like. In embodiments, the choice of modulation scheme used to communicate between the reader 140 and the RFID tag 102 may change the effective read distance or communication data rate. The modulation technique used in the demodulator 118 may be any modulation technique known to the art, such as ASK, PSK, FSK, QAM, or the like. In embodiments, the systems and methods described herein may employ the ability to change the modulation technique of the reader 140 and/or the RFID tag 102 as a way to increase read distance and/or data rate. For instance, the system may change the order of a QAM scheme to increase a reception parameter, such as raising the QAM order to increase the bit rate when the RFID tag 102 is close to the reader 140, lowering the QAM order to improve bit-error-rates when the RFID tag 102 is at an increased distance from the reader 140, or the like. By accommodating various modulation schemes, the system may be able to improve its data rate and/or its read range.

In embodiments, the reader 140 may provide resources and capabilities that are associated with the increased resources and capabilities of the RFID systems described herein. For instance, the reader's 140 interface to the network 202 may better enable the RFID tag 102 to remain responsive to the market 150 needs, even after the RFID tag 102 has been deployed in application; the reader's 140 processor 1704, the memory 1708, and the firmware 1710, may better enable the RFID tag 102 to provide the market 150 pre-processing, localized processing, encryption or the like; the reader's control 1712, transmitter and the receiver 1714, and the reader antenna 1718, may better enable the RFID tag 102 to communicate at a plurality of different frequencies, a plurality of simultaneous frequencies, varying modulations to improve data rate and/or read range, or the like. In embodiments, the reader 140 may provide an extension of the RFID tag's 102 resources and capabilities, as well as providing an interface through which the RFID tag's 102 resources and capabilities may be extended to the market 150 applications.

Figure 18:
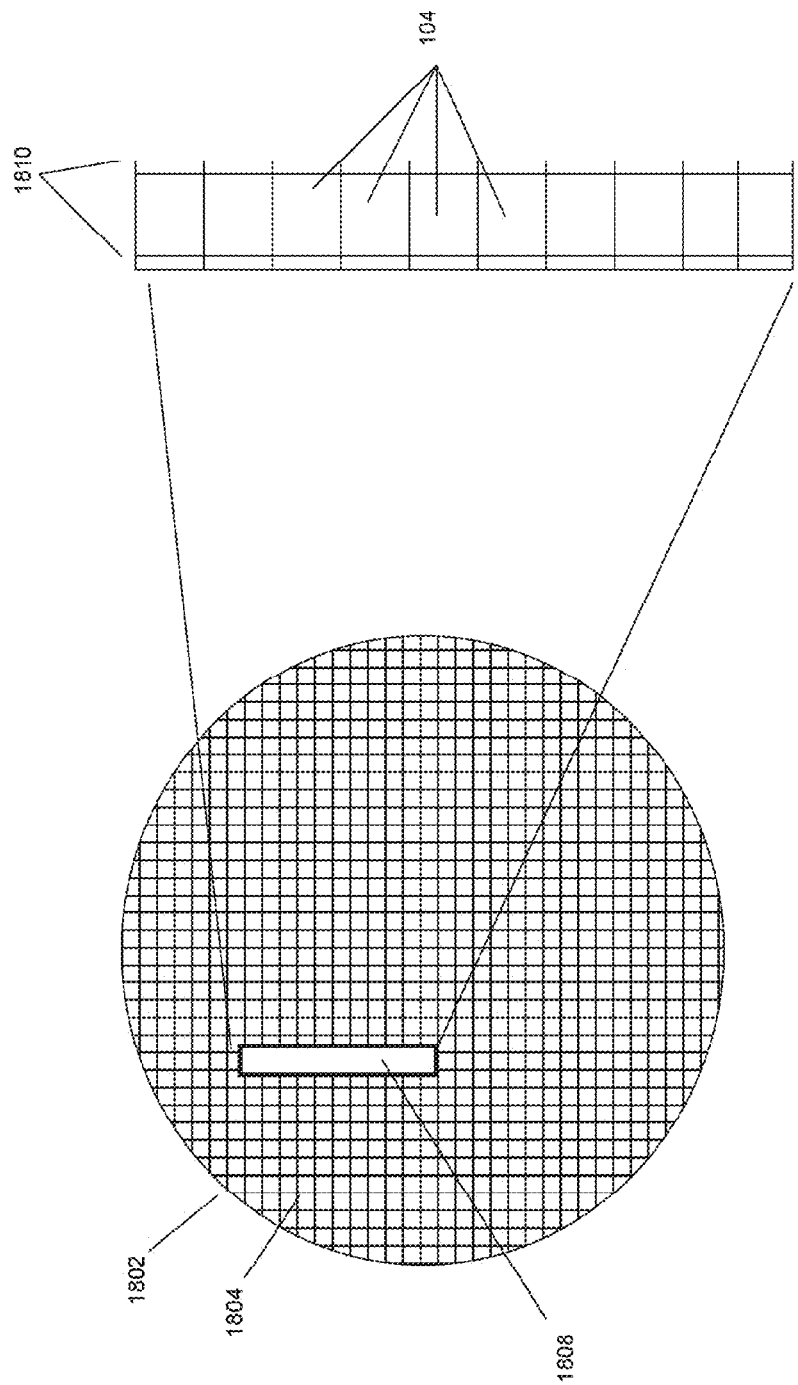
FIG. 18 shows components of a method for facilitating increased memory in an RFID tag system.

Referring to FIG. 18, a method and system for providing increased capability for an RFID tag 102 using distributed architecture is shown. The increased capabilities may allow for different types of RFID memory (e.g. secure memory, extended memory), encryption engines, and the like to be provided within a single RF network node 104.

In an embodiment, a wafer 1802 may be designed with a plurality of individual adjacent RF network nodes 104 to be combined into one larger increased capacity RFID distributed RF network node 1808. The increased capacity RFID distributed RF network node 1808 may permit individual RF network nodes 104 to be integrated to allow the functionality of the individual RF network nodes 104 to be combined. The increased capability RFID distributed RF network node 1808 may be singulated out of the wafer 1802 as a single combined RF network node 1808. In an embodiment, the wafer 1802 may include the same or a combination of different types of RF network nodes such as individual RF network nodes 104, increased capacity RFID distributed RF network nodes 1808, and the like.

In an embodiment, the increased capability RFID distributed architecture RF network node 1808 may incorporate at least two contacts 1810 that may be common to all or some of the individual RF network nodes 104. The common contacts 1810 may be additional antenna contacts, power contacts, data bus contacts, connection to other RF network node contacts, or the like. In an embodiment, the increased capability RFID distributed RF network node 1808 may have internal data connections between the individual RF network nodes 104 to allow communication of information to be passed between the individual RF network nodes 104. The information may be memory data, commands, and the like.

In an embodiment, the individual RF network nodes 104 within the increased capability RFID distributed RF network node 1808 may continue to function as individual RF network nodes 104 with individual functionalities and may store individual data, commands, information, or the like. In this case the multiple individual RF network nodes 104 within the increased capacity RFID distributed RF network node 1808 may provide data and information redundancy that may act the same as a plurality of individual RF network nodes 104.

In an embodiment, the individual RF network nodes 104 may be coordinated within the increased capacity RFID distributed RF network node 1808 with one individual RF network node 104 acting as a master RF network node to coordinate the functionality of the other individual RF network nodes 104 as described herein.

In an embodiment, the individual RF network nodes 104 may be integrated into the increased capacity RFID distributed RF network nodes 1808 with some or all of the individual RF network nodes 104 combined for a larger functional capacity. In an embodiment, there may be more than one coordinated set of individual RF network nodes 104 within the increased capacity RFID distributed RF network node 1808; this may provide for more than one functionality within the increased capacity RFID distributed RF network node 1808. The integration RF network nodes 1808 may include internal connections between RF network nodes 104 for communication and combining of functionality of the individual RF network nodes 104. In an embodiment, the increased functionality capability may include increased data storage that may be coordinated with the integrated RF network nodes 1808.

In an embodiment, the increased memory capability may allow for different types of memory capabilities within the increased capacity RFID distributed RF network node 1808. In an embodiment, the memory capabilities may include public and private memory locations. In an embodiment, one or more RF network nodes 104 may be coordinated to contain data for public read and write. In an embodiment, one or more RF network nodes 104 may be coordinated to contain data that may include a secure method for reading and writing the data. Depending on the application, the combination of different RF network nodes 104 (public or secure) may vary to provide the required memory capability for a particular application. In an embodiment, a single increased capacity RFID distributed RF network node 1808 may contain both public and secure data memory locations. In an embodiment, the public information may include the item name, the amount of the item, the weight of the item, and the like. In an embodiment, the secure information may include the price of the item, the owner information, the destination, and the like. In an embodiment, the secure information may require a particular reader that may decrypt the secure information.

In an embodiment, the increased capacity RFID distributed RF network node 1808 may provide additional encryption features to the standard functionality. For example, the different memory locations may be associated to an encryption integrated circuit within the same distributed architecture. A data read/write may first pass through the encryption function before performing the read/write of the RFID tag data. In an embodiment, some public access memory may not be encrypted while other security memory may be encrypted.

An additional benefit to the increased capacity RFID distributed RF network node 1808 configuration may be an increased predictability of placement on an antenna lead. The increase size of the increased capacity RFID distributed RF network node 1808 may provide for the RF network node more predictably to be flat to the substrate. The increased length may also allow for more predictability of the RF network node contacts connecting with the antenna leads.

Figure 19:
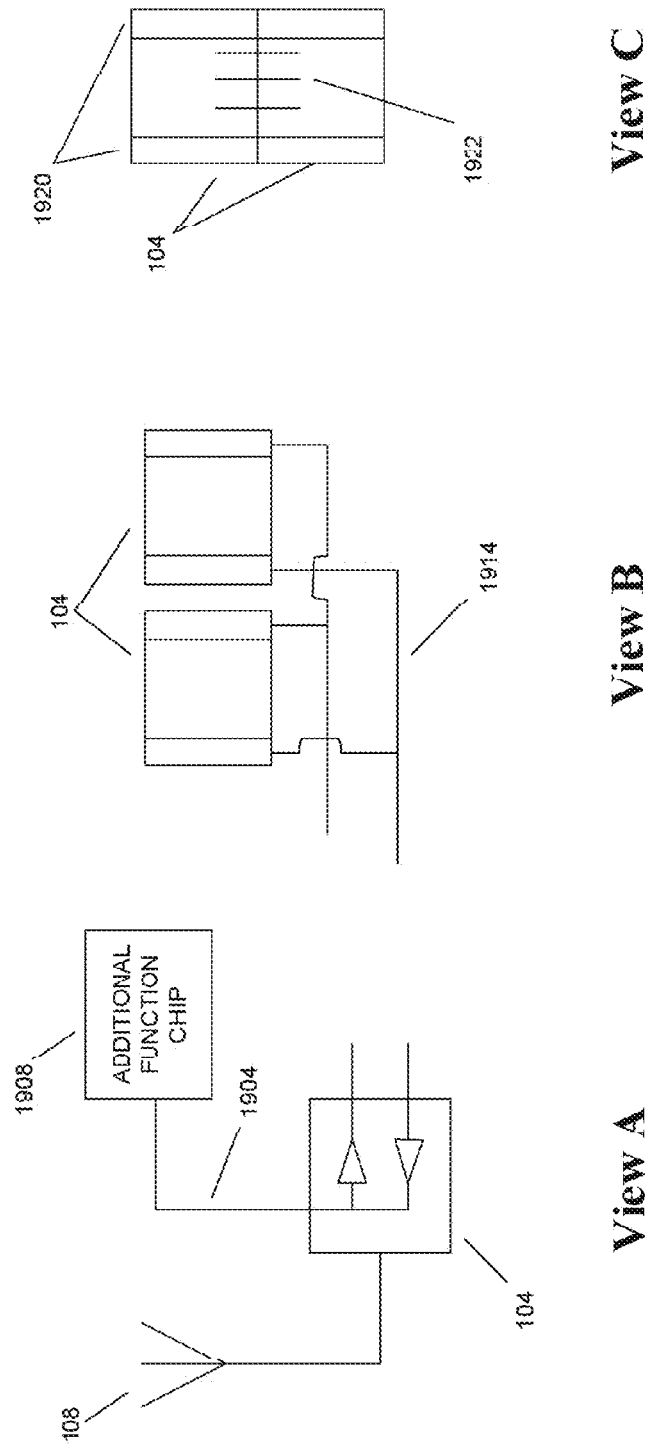
FIG. 19 shows a method of facilitating communication among chips on an RFID tag.

Referring to FIG. 19, three embodiments of RF network node communication methods between RF network nodes 104 or other functional network nodes are shown. The RF network node 104 may be able to provide a signal to an additional function network node 1908 using an additional lead 1904, two or more RF network nodes 104 may be able to communicate in a serial means 1914, or two or more RF network nodes 104 may be able to communicate using a parallel means 1922. The added RF network node 104 communication may provide additional functionality, function sharing between RF network nodes 104, memory combination, or the like. The RF network nodes 104 communication may provide for communication of commands from a master RF network node 104, redundancy of functions or memory, increased memory capability, or the like.

In View A of FIG. 19, an embodiment of a RF network node 104 communicating with an antenna 108 and an external additional function network node 1908 is shown. The RF network node 104 may contain at least one additional lead 1904 that may be connected to at least one additional function network node 1908 that may provide an additional functionality to the RF network node 104. The additional function network node 1908 may be a different type of network node or may be another RF network node 104. The type of additional function network node 1908 may include an encryption network node, a decryption network node, master network node, impedance matching network node, security data network node (e.g. secure password and data storage), memory network node, and the like. In an embodiment, the additional function network node 1908 may be an integrated circuit, a processor, a microprocessor, a microcontroller, or the like.

In embodiments, the RF network node 104 may receive a read request through the antenna 108 from an RFID reader 140. The RF network node 104 may communicate with the additional function network node 1908 before or during the return transmission to the reader. For example, when communicating secure data, the RF network node 104 may request an encryption or decryption of the data to be transmitted to the reader 140. In another example, the additional function network node 1908 may act as a master RF network node 104 and coordinate the communication of information contained in at least one RF network node 104.

In embodiments, the RF network node 104 may contain logic to determine when to communicate with the additional function network node 1908 or the RF network node 104 may communicate with the additional function network node 1908 with every read request.

In embodiments, there may be more than one additional lead 1904 to more than one additional function network node 1908. In an embodiment, the RF network node 104 may contain logic to determine with which of the more than one additional function network nodes 1908 to communicate. In an embodiment, each additional lead 1904 may be connected to more than one additional function network node 1908. In an embodiment, the more than one function network node 1908 may provide a function redundancy.

In View B of FIG. 19, an embodiment of at least two RF network nodes 104 with a serial connection 1914 between the RF network nodes 104 is shown. This serial connection 1914 may act as a serial bus permitting the RF network nodes 104 to communicate information. The communicated information may be memory data, synchronization data, command data, or the like.

In an embodiment, the serial connection 1914 may be a communication bus that may permit the individual RF network nodes 104 to coordinate functions. In an embodiment, there may be a master RF network node that may provide commands for the other RF network nodes 104. In an embodiment, each of the individual RF network nodes 104 may contain communication logic to coordinating data reads and writes from the RFID tag 102; the coordination may include time slot transmission for each RF network node 104, memory combination, function combination, or the like.

In an embodiment, the serial connection 1914 may allow the individual RF network nodes 104 to perform as a single RF network node 104. For example, all of the individual RF network nodes 104 may combine memory locations by communicating memory information through the serial connection 1914. In an embodiment, the memory locations may be combined using a master RF network node.

In an embodiment, the serial connection 1914 may allow the individual RF network nodes 104 to perform as a combined memory location. The combined memory locations may be at least two RF network nodes 104 coordinated to store information. In an embodiment, there may be a plurality of combined memory locations within an RFID tag 102. In an embodiment, the plurality of combined memory locations may contain different types of information (e.g. public or secure), redundant information, information for more than one item or product (e.g. more than one type of product on a pallet), different aspects of information about an item, or the like. For example, an RFID tag 102 may contain N combined memory locations; each may be capable of storing information about N items on a single pallet. This may permit having N mixed items on a pallet and having just one RFID tag 102 on the pallet to track the N items. In an embodiment, a master RF network node may control each of the plurality of combined memory locations; there may be a plurality of master RF network nodes in an RFID tag.

In an embodiment, the at least two RF network nodes 104 may be separated or may be in contact with each other. In an embodiment, if the RF network nodes 104 are in contact, they may form a single larger RF network node 104; the single larger RF network nodes 104 may be able to communicate in a serial manner with each other to combine functions or memory capabilities.

In an embodiment, if the RF network nodes 104 are separated, they may be randomly placed in a serial connection zone where the serial connection 1914 leads may be in close relation to each other. In an embodiment, the randomly placed RF network nodes 104 may make contact with the serial connection 1914 leads in a similar manner as making contact with antenna leads as described herein. In an embodiment, the serial connection zone leads may be connected to the antenna leads.

In View C of FIG. 19, an embodiment of at least two RF network nodes 104 having connections between the RF network nodes 104 to create a parallel communication connection 1922 is shown. This parallel connection 1922 may act as a parallel bus that may permit the RF network nodes 104 to communicate information. The communicated information may be memory data, synchronization data, command data, or the like.

In an embodiment, the parallel connection 1922 may be a communication bus that may permit the individual RF network nodes 104 to coordinate functions. In an embodiment, there may be a master RF network node, as described herein, which may provide commands for the other RF network nodes 104. In an embodiment, each of the individual RF network nodes 104 may contain communication logic to coordinating data reads and writes from the RFID tag 102; the coordination may include time slot transmission for each RF network node 104, memory combination, function combination, or the like.

In an embodiment, the parallel connection 1922 may allow the individual RF network nodes 104 to perform as a single RF network node 104. For example, all of the individual RF network nodes 104 may combine memory locations by communicating memory information through the parallel connection 1918. In an embodiment, the memory locations may be combined using a master RF network node.

In an embodiment, the parallel connection 1922 may allow the individual RF network nodes 104 to perform as a combined memory location. The combined memory locations may be at least two RF network nodes 104 coordinated to store information. In an embodiment, there may be a plurality of combined memory locations within an RFID tag 102. In an embodiment, the plurality of combined memory locations may contain different types of information (e.g. public or secure), redundant information, information for more than one item or product (e.g. more than one type of product on a pallet), different aspects of information about an item, or the like. For example, an RFID tag 102 may contain N combined memory locations; each may be capable of storing information about N items on a single pallet. This may permit having N mixed items on a pallet and having just one RFID tag 102 on the pallet to track the N items. In an embodiment, the master RF network node may control each of the plurality of combined memory locations; there may be a plurality of master RF network nodes in an RFID tag 102.

In an embodiment, there may be common connections 1920 between the RF network nodes 104. In an embodiment, the common connections 1920 may be provide connections to the antenna leads, power, additional function network nodes 1908, or the like.

Figure 20:
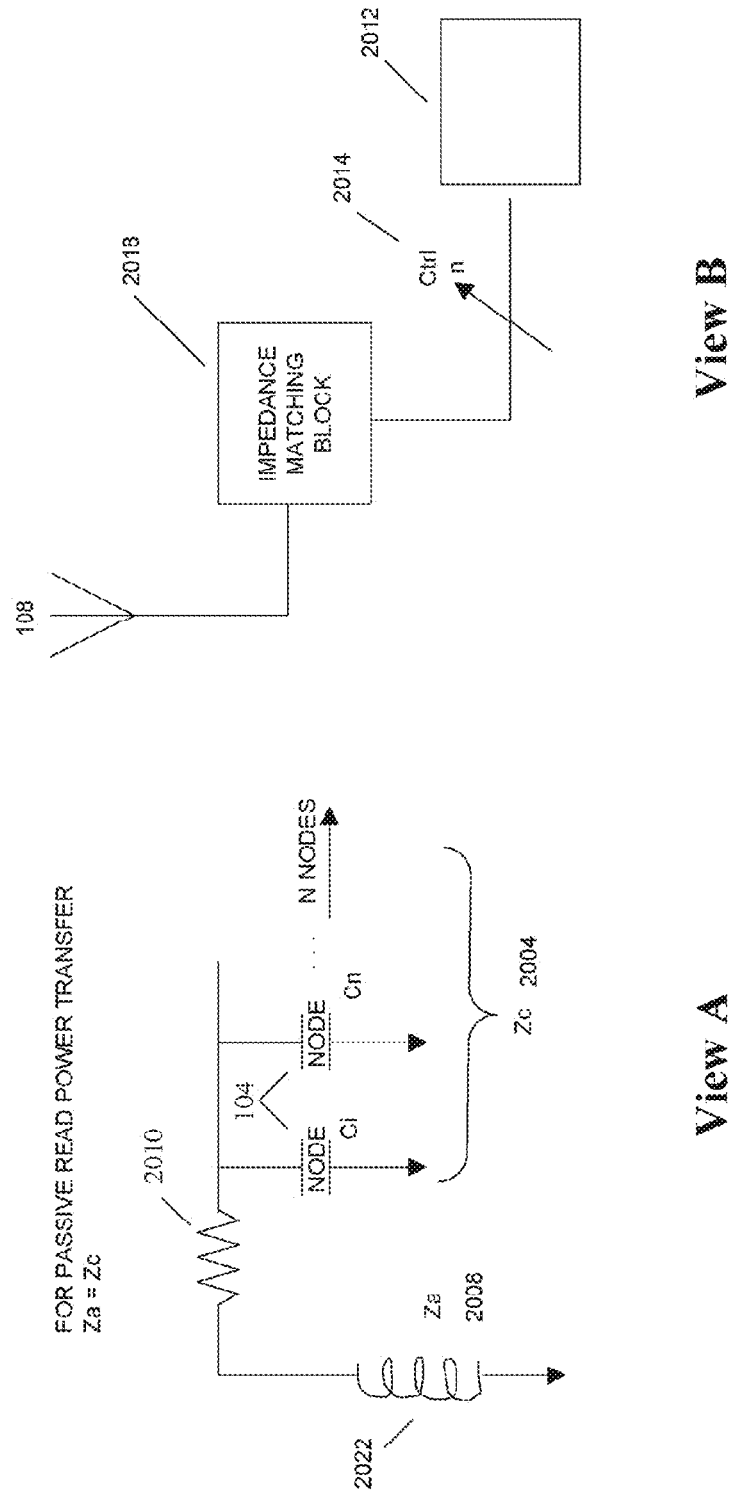
FIG. 20 shows a method of impedance matching for an RFID tag system.

Referring to FIG. 20, an embodiment of using the number of active RF network nodes 104 match the antenna impedance 2008 is shown. Placing an unknown number of multiple RF network nodes 104 on a known antenna or the placement of RF network nodes 104 on an antenna with an unknown impedance, an impedance mismatch may be created that may reduce the ability to energize the RF network nodes 104. In an embodiment, the impedance 2004 of the combined RF network nodes 104 may be adjusted to compensate for some of the antenna impedance 2008 mismatch.

In the application of the RF network nodes 104 to the RFID tag 102, the antenna 108 or the surrounding environment may not be a constant and therefore the impedance may change with each situation. For example, RF network nodes 104 may be used with various antenna designs with various impedances. In another example, an RFID tag 102 may be placed on items such as liquids and metals that may change the impedance of the RFID tag 102 antenna 108. In addition, in multiple RF network node 104 RFID tags 102 the impedance of the combined RF network nodes 104 may not be a constant depending on the number of active RF network nodes 104 on the RFID tag 102.

Referring to View A of FIG. 20, an antenna 108 may have an impedance of Za 2008. In an embodiment, the antenna impedance 2008 may not be constant for each application of the RF network node 104. For example, many different enterprises that may use different and unique antennas on the RFID tags 102 may use the RF network nodes 104. The different antennas 108 may present different impedance 2008 to the RF network nodes 104.

Additionally, having more RF network nodes 104 that are active on an RFID tag 102 may affect the impedance created by the RF network nodes 104. In an embodiment, with the random placement of RF network nodes 104 on an RFID tag 104, a variable number of RF network nodes 104 may be active depending on the number of RF network nodes 104 making contact with the antenna leads. For example, a first tag may have N active RF network nodes 104 while a second tag may have M active RF network nodes 104 (where N M). Each of these RFID tags 102 may have different RF network node impedance 2004 but may be associated with the same type of antenna 108. The impedance of the RF network nodes 2004 may be the total impedance of all the active RF network nodes 104.

In order to properly energize the passive RF network nodes 104 in the RFID tag 102, the antenna impedance 2008 must be matched to the impedance 2004 of the RF network nodes 104 on the RFID tag. Za=Zc; where Zc is the equivalent impedance of all the active RF network nodes 104.

Referring to View B of FIG. 20, the RF network nodes 104 on an RFID tag 102 may have their impedance Zc 2004 matched to the antenna 108 by adjusting the impedance of the RF network nodes 2018 (impedance matching block). This may be accomplished by the use of a logic RF network node 2012 that may be able to send a control command 2014 to the impedance matching block 2018. The command may be to adjust the impedance of the RF network nodes 104. The adjustment of the active RF network nodes 104 may adjust the total impedance 2004 of the impedance matching block 2018 and therefore attempt to make an optimal impedance match with the antenna 108.

In an embodiment, the impedance matching block 2018 may be a set of individual RF network nodes 104 or may be a RF network node 104 group connected by a serial, parallel bus, antenna bus, or the like. In an embodiment, the control command 2014 may be a number that relates to the number of switch elements to turn on or off in the impedance matching block 2018. In an embodiment, the control command 2014 may be a function command that is executed by the impedance matching block 2018 that may result in switch elements being turned on or off. In an embodiment, the logic RF network node 2012 may make the determination of the number of switch elements to turn on or off in the impedance matching block 2018. In an embodiment, the logic RF network node 2012 may send more than one control command 2014 for the adjustment of the impedance matching block 2018. For example, there may be a control command 2014 sent after each read attempt by the RFID tag reader 140.

In an embodiment, the RFID reader 140 may have an algorithm to receive the RFID tag 102 transmissions, measure the strength of the response, calculate a command function, and resend the read signal with the command function. The command function may be a command to adjust the RFID tag 102 impedance and resend the RFID tag 102 data. The command function may be received by the logic RF network node 2012, the logic RF network node 2012 may determine the control command 2014 to be sent to the impedance matching block 2018 to turn switch elements on or off to match the impedance of the antenna 108. An improved impedance match may result in the improved strength RFID tag 102 second return signal. In an embodiment, the process of the RFID tag reader 140 sending a read request and a function command to adjust the RFID tag 102 impedance may be repeated until an acceptable RFID tag 102 transmission strength is achieved.

Figure 21:
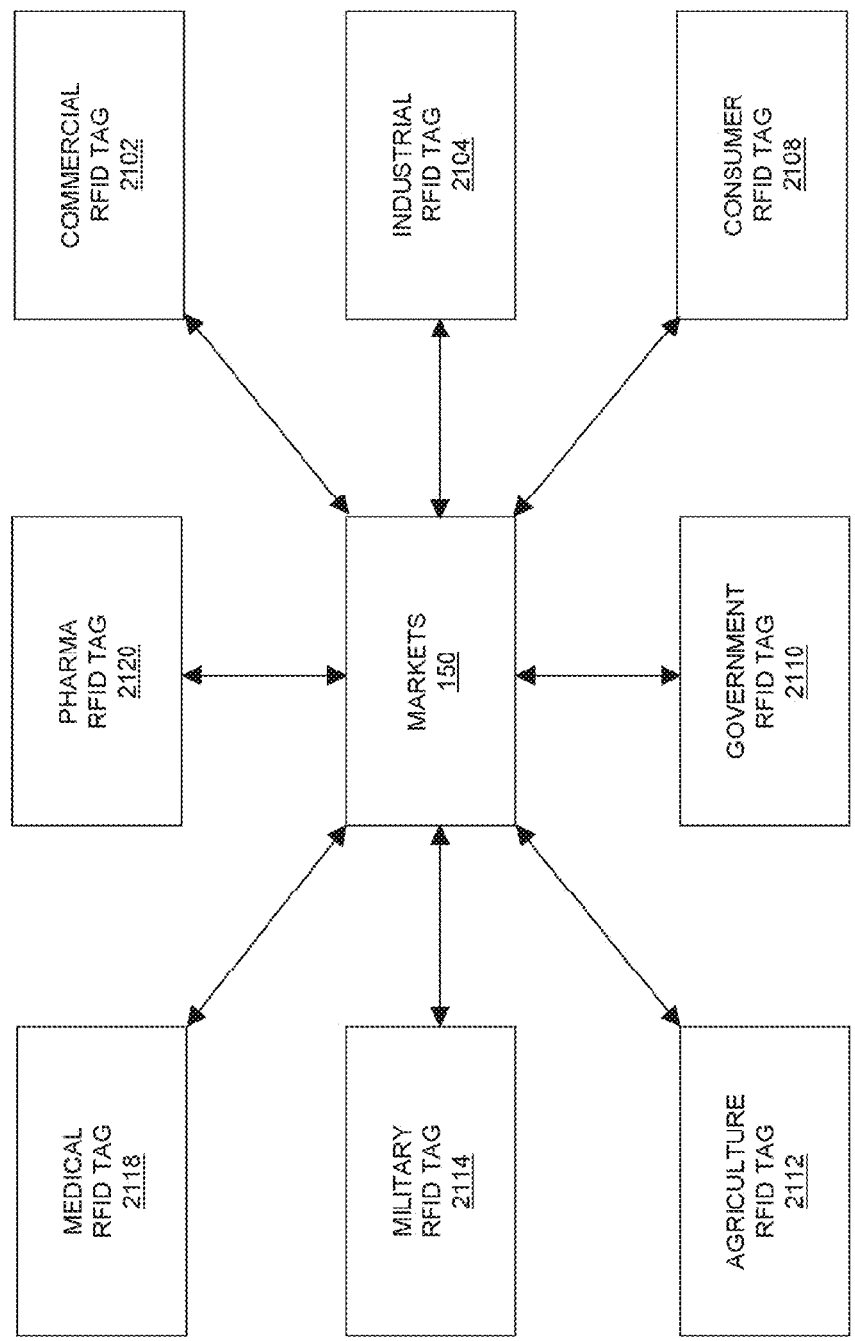
FIG. 21 shows a range of applications enabled by an RFID tag system.

Aspects of the systems and methods described herein may be used in many different markets 150 where material, parts, products, processes, and the like may benefit from history tracking, movement tracking, identification, data recording, or other recording information on an RFID tag 102. Referring to FIG. 21, market 150 examples may include commercial markets 2102, industrial markets 2104, consumer markets 2108, government markets 2210, agriculture markets, 2112, military markets 2114, and medical markets 2118. These markets 150 are described in more detail herein. It may be understood by a person with ordinary skill in the art that other markets 150 may benefit from the increased capabilities of the RFID tag 102 systems and methods described herein and this list of markets is not to be considered a limiting list of markets.

Figure 22:
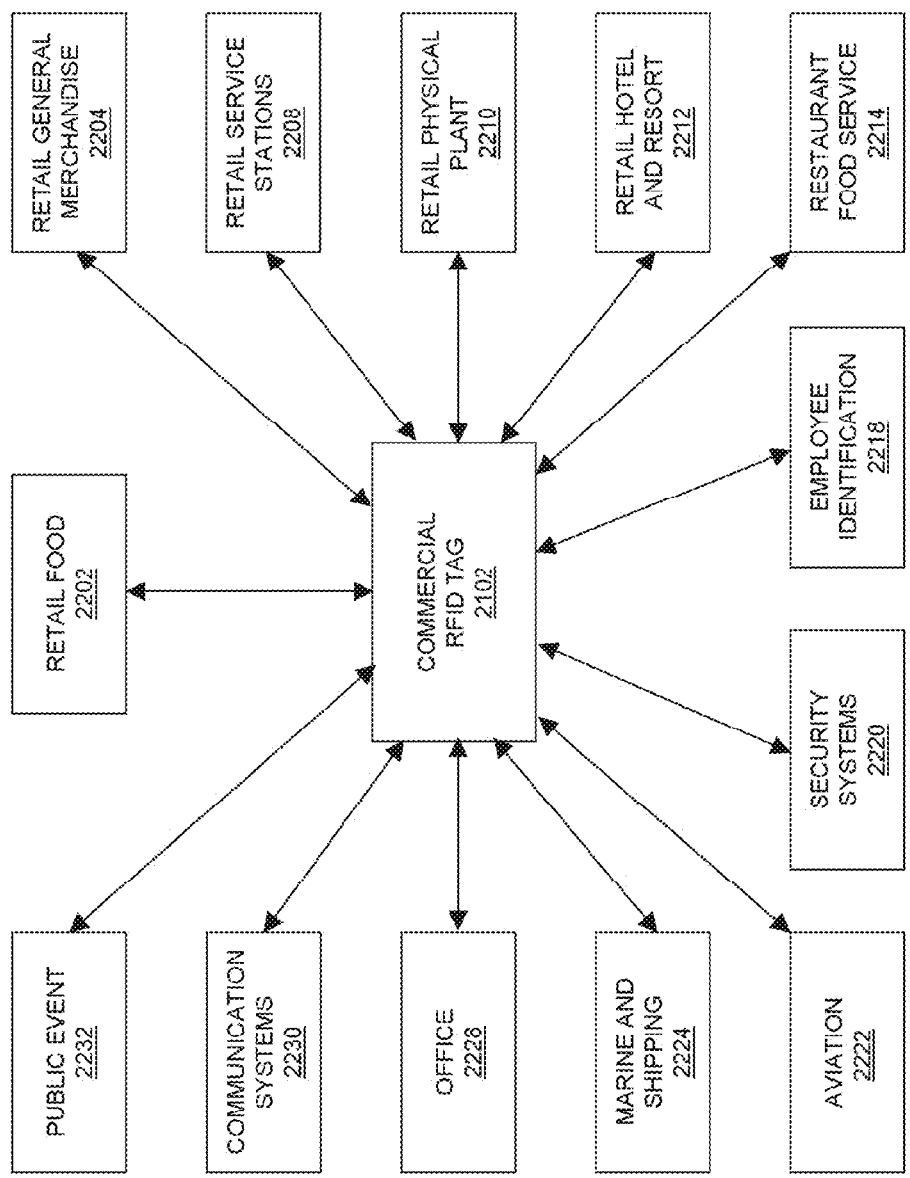
FIG. 22 shows a range of applications enabled by an RFID tag system in a commercial environment.

Aspects of the systems and methods described herein may be used in many different commercial markets where material, parts, products, processes, and the like may benefit from history tracking, movement tracking, identification, data recording, or other recording information on a commercial RFID tag 2102. Referring to FIG. 22, commercial market examples may include retail food 2202, retail general merchandise 2204, retail service stations 2208, retail physical plant 2210, retail hotels and resorts 2212, restaurant food service 2214, employee identification 2218, security systems 2220, airline management 2222, marine and shipping 2224, office management 2228, communication systems 2230, public events 2232, or the like.

The commercial RFID tag 2102 may be connected to a network where the network connection may be a wireless connection, a wired connection, or the like. The network with which the commercial RFID tag 2102 may communicate, may be a LAN, a WAN, a peer-to-peer network, an intranet, an Internet, or the like. The network connection may use the gateway facility 138C discussed in FIG. 11.

An aspect of the systems and methods described herein may be related to the commercial RFID tag 2102 associated with a retail object and may store and communicate commercial RFID tag 2102 information related to retail food 2202. The retail food 2202 may be a perishable product, a non-perishable product, or the like. The commercial RFID tag 2102 may be connected to a sensor; the sensor may be a temperature sensor, a humidity sensor, an acceleration sensor, or the like for recording information on the environmental conditions in which the food 2202 is stored and transported.

The commercial RFID tag 2102 may be attached to a container of the retail object. The commercial RFID tag 2102 may be attached directly to the container, or the commercial RFID tag 2102 may be attached to an RFID tag substrate and the RFID tag substrate may be connected to the container. Additionally, the commercial RFID tag may be attached directly to the retail object.

With the commercial RFID tag 2102 associated with retail food 2202, the stored information may be an expiration date, at least one transportation date, at least one enterprise, or the like. The stored information may provide a transportation history of the retail food 2202 along with freshness information of the food 2202.

In an embodiment, the stored information may contain information as a result of a calculation where the calculation uses information that may be stored on the commercial RFID tag 2102. In an embodiment, the stored information may be in the commercial RFID tag 2102 memory, stored in the commercial RFID tag 2102 firmware, or the like. In an embodiment, the stored information may contain information as a result of information manipulation where the manipulation information uses information that may be stored on the commercial RFID tag 2102. In an embodiment, the stored information may be in the commercial RFID tag 2102 memory, stored in the commercial RFID tag 2102 firmware, or the like. In an embodiment, the stored information may contain information as a result of information interpretation where the information interpretation uses information that may be stored on the commercial RFID tag 2102. In an embodiment, the stored information may be in the commercial RFID tag 2102 memory, stored in the commercial RFID tag 2102 firmware, or the like.

In an embodiment, the stored retail object information may contain pricing information, retail pricing information, wholesale pricing information, discount pricing information, or the like. The stored information may contain quantity information; the quantity information may be changed, added, modified, or the like. Additionally, the information may contain quality information, point of sale check out information, return information, or the like.

In an embodiment, the stored retail object information may contain promotional information that may include a newspaper promotion, a magazine promotion, a mass mail promotion, a regional promotion, a national promotion, or the like. In an embodiment, the stored information may contain coupon information that may include a newspaper coupon, a magazine coupon, a mass mail coupon, a regional coupon, a national coupon, or the like.

An aspect of the systems and methods described herein may be related to the commercial RFID tag 2102 associated with a service station purchase and may store and communicate commercial 2102 RFID tag information related to a service station purchase. The service station purchase may be a gas purchase, a car supply purchase, a food purchase, a service purchase, or the like. In an embodiment, the stored information may include an expiration date, at least one transportation date, at least one enterprise, or the like.

In an embodiment, the stored information may contain a result of a calculation. The calculation may use information stored on the commercial 2102 RFID tag. In an embodiment, the calculation information may be in memory, in firmware, or in the like. In an embodiment, the information may contain a result of information manipulation. In an embodiment, the manipulation may use information stored on the commercial RFID tag 2102. The stored manipulation information may be in memory, in firmware, or the like. In an embodiment the information may contain a result from information interpretation. In an embodiment, the interpretation may use information stored on the commercial RFID tag 2102. The stored interpretation information may be in memory, in firmware, or the like.

In an embodiment, the stored information may contain service station 2208 pricing information that may include retail pricing information, wholesale pricing information, discount pricing information, or the like. In an embodiment, the stored information may contain quantity information; the quantity information may be changed, added, modified, or the like. In an embodiment, the stored information may contain quality information, point of sale check out information, return information, promotional information, or the like. The promotional information may be a newspaper promotion, a magazine promotion, a mass mail promotion, a regional promotion, a national promotion, or the like. In an embodiment, the stored information may contain coupon information. The coupon information may be a newspaper coupon, a magazine coupon, a mass mail coupon, a regional coupon, a national coupon, or the like.

In an embodiment the stored information may contain service agreement information, warranty agreement information, or the like.

An aspect of the systems and methods described herein may be related to the commercial RFID tag 2102 used for storing and communicating commercial RFID tag 2102 information related to physical plant management 2210. The physical plant may be a retail mall, a retail store, a warehouse, a manufacturing facility, an industrial facility, or the like.

In an embodiment, the commercial RFID tag 2102 may be connected to a sensor for recording information related to physical plant management 2210. In an embodiment, the sensor may be a temperature sensor, a humidity sensor, an acceleration sensor, a smoke sensor, a carbon dioxide sensor, a carbon monoxide sensor, or the like. In an embodiment, the sensor may be used to remotely record environmental conditions with the physical plant 2210.

In an embodiment, the stored commercial RFID tag 2102 information may be related to personnel identification. The RFID tag may track the egress and ingress of personnel within the physical plant.

In an embodiment, the stored commercial RFID tag 2102 information may be related to supply ordering. The supply ordering may be manual, automatic, semi-automatic, or the like for ordering supplies for the physical plant 2210 based in material information stored on the commercial RFID tag 2102.

In an embodiment, the stored commercial RFID tag 2102 information may be related to maintenance information. The commercial RFID tag 2102 may be associated with an object or device that requires maintenance within the physical plant 2210. The commercial RFID tag 2102 sensor may monitor and measure a maintenance characteristic related to the physical plant 2210.

In an embodiment, the commercial RFID tag 2102 information may be related to physical plant 2210 security where the commercial RFID tag 2102 tracks the egress and ingress of personnel within a physical plant 2210 facility.

An aspect of the systems and methods described herein may be related to the commercial RFID tag 2102 used for storing and communicating commercial RFID tag 2102 information related to hospitality enterprise management 2212. The hospitality enterprise 2212 may be a hotel, a motel, an inn, a bed and breakfast, a resort, or the like.

In an embodiment, the hospitality enterprise 2212 information may be related to check-in, an automatic check-in, check-out, automatic check-out, a hospitality enterprise service purchase, a hospitality enterprise supplied device, or the like.

In an embodiment, the commercial RFID tag 2102 may be a credit card, a hospitality enterprise rewards card, a loyalty card, or the like.

An aspect of the systems and methods described herein may be related to the commercial RFID tag 2102 used for storing and communicating commercial RFID tag 2102 information related to food service enterprise management 2214. The food service enterprise 2214 may be a restaurant, a bar, a caterer, or the like. In an embodiment, the commercial RFID tag 2102 may be related to a credit card, a food service enterprise rewards card, a loyalty card, or the like.

In an embodiment, the restaurant food service 2214 information may be related to quantity of a food service product, a value of the food service product, an expiration date of the food service product, a food service product ordered by a customer, at least one enterprise, or the like.

The restaurant food service 2214 information may contain a result of a calculation. The calculation may use information stored on the commercial RFID tag 2102. The stored calculation information may be in memory, in firmware, or the like. In an embodiment, the restaurant food service 2214 information may contain a result of information manipulation. The manipulation may use information stored on the commercial RFID tag 2102. The stored manipulation information may be in memory, in firmware, or the like. The restaurant food service 2214 information may contain a result of information interpretation. The interpretation may use information stored on the commercial RFID tag 2102. The stored interpretation information may be in memory, in firmware, or the like.

In an embodiment, the restaurant food service 2214 information may be related to pricing information. The pricing information may be retail pricing information, wholesale pricing information, discount pricing information, or the like. The restaurant food service 2214 information may contain quantity information; the quantity information may be changed. The restaurant food service 2214 information may contain point of sale check out information, return information, or the like.

In an embodiment, the restaurant food service 2214 information may contain promotional information. The promotional information may be a newspaper promotion, a magazine promotion, a mass mail promotion, a regional promotion, a national promotion, or the like.

In an embodiment, the restaurant food service 2214 information may contain coupon information. The coupon information may be a newspaper coupon, a magazine coupon, a mass mail coupon, a regional coupon, a national coupon, or the like.

An aspect of the systems and methods described herein may be related to the commercial RFID tag 2102 associated with employee identification 2218 and may store and communicate commercial RFID tag 2102 information related to the employee identification 2218. In an embodiment, the employee identification 2218 may be an employee badge, an employee card, or the like. Additionally, the employee identification 2218 may be incorporated within part of an employee uniform such as a hat, a coat, a shirt, an apron, or the like.

In an embodiment, commercial RFID tag 2102 information may be related to employee identification 2218 within an enterprise, employee identification during egress from an enterprise, employee identification during ingress to an enterprise, or the like. In an embodiment, the commercial RFID tag 2102 information may be related to tracking employee work time such as a time card. In an embodiment, the commercial RFID tag 2102 information may be related to associating an employee with a transaction such as a point of sale.

In an embodiment, the commercial RFID tag 2102 may contain information related to employee identification 2218 during ingress and egress from an enterprise parking facility. This may provide information on the location of the employee within the enterprise or providing for safe entrance and exit from a parking facility.

An aspect of the systems and methods described herein may be related to the commercial RFID tag 2102 associated with an identification device and may be used for storing and communicating commercial RFID tag 2102 information related to a security system 2220 identification. The identification device may be a badge, a card, a part of clothing, a part of a vehicle, or the like.

In an embodiment, the security system 2220 information may be related to positioning of an object within a location, to positioning of a person within a location, to identification during egress from a location, to identification during ingress to a location, or the like.

In an embodiment, the commercial RFID tag 2102 may be associated with a sound facility. The commercial RFID tag 2102 may command the sound facility to emit a noise when the identification device may be located external to a permitted location.

In an embodiment, the security system 2220 commercial RFID tag 2102 may be used with a food service, a hospitality enterprise, a physical plant, a service station, employee identification, an aircraft, a ship, an office, a public event, or the like.

Additionally, the commercial RFID tag 2102 may be used with a vehicle security system 2220 for information related to vehicle tracking. In an embodiment, the information may relate to a location of a vehicle, an ingress of a vehicle to a location, an egress of a vehicle from a location, a product transported by the vehicle, a mileage of the vehicle, a driver of the vehicle, an enterprise that owns the vehicle, and the like.

An aspect of the invention may be related to the commercial RFID tag 2102 associated with a vehicle and may be used to store and communicate commercial RFID tag information related to vehicle maintenance. The information may relate to a vehicle maintenance, a next required vehicle maintenance, a type of maintenance performed, a type of maintenance to be performed, or the like.

In an embodiment, the commercial RFID tag 2102 may receive information from a vehicle communication network. The received information may be lubrication information, a fault notification, a part associated with the fault, or the like.

Aspects of the systems and methods described herein may be used in many different environments where material, parts, products, processes, and the like may benefit from history traceability, movement tracking, identification, data recording, or other information recording information. One environment may be the aviation 2222 industry, where information may be tracked for individual components, assemblies, systems, or the like for quality, safety, traceability, service tracking, maintenance tracking, counterfeit part prevention, life cycle management, identification, or the like. While the aviation industry may presently collect and store information on hardcopy or internal data stores, the hardcopy or data stores may not follow the component or system through the components life cycle making it difficult to verify the history of a component at the point of use. Additionally, the life cycle of an aviation component may be twenty years or more under variable, often harsh conditions. As a result, the environment requires durable recording devices for maintenance of life cycle information. The life cycle information to be recorded may include date of production, dates of maintenance, in-use dates, amount of time in service, number of flight cycles, quality checks, information of the enterprise providing the component or service, and the like.

In an embodiment, an aviation component may include a commercial component RFID tag 2102 that may be used for the recording and maintaining of information about the aviation component. Information may be related to safety, component traceability, service tracking, maintenance, quality, counterfeit part prevention, life cycle management, part identification, or the like.

In an embodiment, safety information may be related to airworthiness checks at the component or system level, recording of service bulletins, maintaining the airworthiness document of the component, aircraft security, or the like. In an embodiment, using commercial RFID tags 2102, each component may be safety checked before a flight, at regular safety check intervals, after a set number of flights, after a service bulletin has been received, or the like to verify the compliance of the component or set of components. The commercial RFID tag 2102 may contain the memory requirements to store all the safety information pertaining to the component for the life cycle of the component.

In an embodiment, the set of commercial RFID tag 2102 on an aircraft may be used to verify the airworthiness of the aircraft before a flight. For example, there may be an aircraft safety check prior to takeoff where all of the commercial RFID tags 2102 are read to verify the airworthiness of the entire aircraft system. This check may be performed at a certain location at the airport, by ground personnel before leaving the loading gate, by an automatic check as part of the pilots preflight check list, or the like. In another embodiment, while at one of the aircraft check locations, the airworthiness of the aircraft may be read and verified by a person at a location remote from the aircraft such as by an airline enterprise quality center, a control tower, a central airworthiness control center, or the like. The remote location may not be located at the airport, but may be located at a distant facility that may monitor airworthiness of aircraft at one or more airports. In an embodiment, the aircraft may not be cleared for takeoff until the airworthiness of the aircraft was verified. In an embodiment, the verification may include a check for components beyond the permitted number of flight cycles, proper airworthiness documentation, properly functioning systems, and the like.

In another embodiment, commercial RFID tag 2102 at entry points to the aircraft may enhance aircraft security. In an embodiment, the aircraft entry points such as aircraft doors, cargo doors, maintenance access doors, or the like may have commercial RFID tag 2102 that may require verification that the person attempting to gain access is authorized to open the entry point. For example, a cargo door used for loading passenger luggage may have a commercial RFID tag 2102 that may record the identification of the personnel accessing the cargo door. In an embodiment, when the aircraft airworthiness check is performed, the cargo door may transmit identification of all personnel that accessed the cargo door; the aircraft airworthiness may not be cleared if the identification of all access personnel does not match a permissible personnel list. In another embodiment, an aircraft access door may not unlock unless the personnel requesting access matches a list of permitted personnel stored on the commercial RFID tag 2102.

In another embodiment, commercial RFID tag 2102 associated with critical components may be constructed to survive catastrophic events such as an aircraft crash, component catastrophic failure, or the like. For these aviation components, the commercial RFID tag 2102 may survive the catastrophic event and be able to transmit the last recorded information; the information from the commercial RFID tag 2102 may be useful in the catastrophic event investigation. For example, the commercial RFID tag 2102 may provide rapid on location information on the airworthiness of the various components, the flight cycles, maximum and minimum data points, part identification, maintenance history, and the like. As another example, a commercial RFID tag 2102 associated with a critical component may be able to sense an overwhelming overrun of system parameters such as would occur with a catastrophic component or system failure, and may collect information from a plurality of other commercial RFID tag 2102 associated with critical components. This information may then be recorded and/or transmitted to an offsite location, so as to provide a snapshot of system wide component status at the moment of crucial component failure.

In an embodiment, component traceability information may be related to the type of repairs to a component, the repair history, tracking of the component within an assembly of components, when a component is retired from service, or the like. During the life cycle of a component many actions such as repairs, component upgrades, reassemblies, or the like may be performed on the component. The commercial RFID tag 2102 may record information once the action has been completed, thereby providing a history of the actions performed on the component. The recorded information may provide for traceability of the actions back to a time, an enterprise, a repair, an assembly, or the like if there is a question of the components airworthiness. For example, an airworthiness bulletin may be received and an enterprise may need to determine if components within the enterprise comply with the bulletin. All the enterprises commercial RFID tags 2102 may be read for information related to the bulletin to verify the airworthiness of the enterprise's components.

In an embodiment, service tracking may be recorded on the commercial RFID tag 2102 to track the actual flight cycle information of a component such as the number of flight cycles of the components, the latest flight cycle number of the component, storing the last service of the component, storing the next required service of the component, or the like. Some aviation components may have requirements for inspections based on the number of flight on which the component has been used. In an embodiment, the commercial RFID tag 2102 may be associated with a sensor to record flight parameters that may be indicative of a component flight such as air pressure, temperature, component stress (e.g. landing forces), or the like. Using the sensor, the commercial RFID tag 2102 may automatically record the actual flight characteristics as applied to the component. For example, a component may only be considered having a flight cycle if it experienced a certain stress load during the flight. If the certain stress load was exceeded, the commercial RFID tag 2102 may record that the component has experienced a flight cycle. The number of flight cycles may be read during the next data reading from the component and may be compared to the flight cycle service requirements.

In an embodiment, component maintenance may be recorded on the commercial RFID tag 2102 to track maintenance information about the component such as the type of repair, the repair technician, the repair dates, the repair enterprise, or the like. In an embodiment, as the component has maintenance (e.g. repair, upgrade), the maintenance information may be recorded to the commercial RFID tag 2102 to provide a maintenance history of the component. In an embodiment, the maintenance history may be read from the commercial RFID tag 2102 any time during the components life cycle. For example, there may be a question of the type of repair performed on a class of components and an enterprise may be able to query all of their commercial RFID tag 2102 to determine if any of the enterprise's components may have had this type of repair. This capability may provide the enterprise a rapid method of component verification to quickly resolve a question of component airworthiness.

In aviation maintenance, repair, and overhaul facilities, aviation components and aviation assemblies may undergo a number of maintenance and repair cycles during the life cycle of the component or component assembly. The components may have defects that have developed during normal operation. These defects may be repaired or sub-components of the aviation component may be replaced as part of the repair. The commercial RFID tag 2102 may be used to record the maintenance history of the aviation component during overhaul and repair of the aviation component.

During the life cycle of the aviation component, the commercial RFID tag 2102 that is associated with the component may record the operational history of the component such as the number of flight cycles, operating environment, maintenance dates, maintenance history, and the like. The increased memory capability of the multi-RF network node 104 commercial RFID tag 2102 may allow for storing these various types of information in segmented memory (e.g. set memory locations for each type of information), redundant memory, protected memory, public memory, and the like. The enhanced memory capabilities of the commercial RFID tag 2102 may allow for the continuous storing of the operational history of the component throughout the life cycle of the component.

A critical part of aviation component maintenance may be the determination of the cause of the operational defect to be repaired. There may be a number of quality protocols used to determine the cause of the defect such as a root-cause analysis. Root-cause analysis attempts to determine not just the immediate cause of the defect, but the root manufacturing process or design characteristic that may have contributed to the development of the defect. Root-cause analysis depends on reviewing past history of the component that may include the OEM manufacture, operational parameters, previous maintenance, materials used to produce the component, and the like. The commercial RFID tag 2102 may store these types of information in its enhanced memory and may be reviewed during the initial review of the component being repaired; the information stored on the commercial RFID tag 2102 may be read and reviewed as part of the root-cause analysis. The root-cause determination may require the information from a number of components to be reviewed, over time the operational history of components stored on the commercial RFID tag 2102 may be aggregated for an analysis of a plurality of the same components for development of trends that may contribute to component defects.

During the maintenance of the component, information may be written to the commercial RFID tag 2102 to provide a maintenance history of the component. As the repair is performed the commercial RFID tag 2102 may record the mechanic performing the repair, the repair process performed, the date of the repair, the identification of the quality assurance personnel, materials used in the repair, and the like. The repair information may be written to the commercial RFID tag 2102 for every repair sequence performed, at the completion of the repair, at the certification of the repair, or the like to form the maintenance history of the repair. In an embodiment, each time the component is repaired during its life cycle, the repair information may be written to the commercial RFID tag 2102.

During the repair of the component, it may be determined to replace a part of the component, replace a sub-component, retire the component and provide a replacement component, or the like. The replacement of the sub-components and parts of a component may be recorded on the commercial RFID tag 2102 as part of the maintenance history of the component. The recording of the replacement of the sub-component within a component assembly may provide for configuration control of the component. For example, repairing an assembly may require replacing a damaged heat shield by installing a new heat shield into the assembly. When the new heat shield is installed into the assemble the new configuration information may include the new heat shield part number, serial number, manufacture date, or the like may be written to the commercial RFID tag 2102 of the assembly. The information stored to the commercial RFID tag 2102 may also include information about the damaged heat shield such as the part number, serial number, date of manufacture, date of removal from the assembly, and the like.

In an embodiment, the maintenance history of the component may be available to the airline enterprise, field maintenance personnel, FAA inspectors, or the like by reading the commercial RFID tag 2102 maintenance information with a reader or portable reader. The maintenance history may be read and verified by a maintenance enterprise that is responsible for assembling the repaired component into an aircraft. The maintenance personnel may be able to read the commercial RFID tag 2102 to verify the repair performed, the mechanic performing the repair, final FAA certification of the repair, or the like. The reading of the information on the commercial RFID tag 2102 may also be stored into the configuration information for the entire aircraft to provide configuration control for the aircraft. The maintenance personnel may be able to verify that the component should be assembled into the aircraft by verifying that the part number of the component is part of the aircraft configuration. This check may prevent a wrong component from being assembled into an aircraft.

The commercial RFID tag 2102 may also be used to store Air Transport Association (ATA) Spec 2000 standards information. The ATA Spec 2000 is a comprehensive set of e-business specifications, products, and services that are used to streamline the aircraft component supply chain. Information related to component maintenance, component history, component ordering, and the like may be written to and read from the commercial RFID tag 2102 using the ATA Spec 2000 standard. The ATA Speck 2000 information may be stored in XML format to allow rapid transmission of information over a network, including the Internet. Information read from the commercial RFID tag 2102 may be transmitted to a network for increased speed in ordering replacement components, requesting a repair of a component, aggregation of a components operational history, and the like. In an embodiment, the XML formatted ATA Spec 2000 information may be stored in the enhanced memory of the commercial RFID tag 2102.

In embodiments, the enhanced memory capabilities of the commercial RFID tag 2102 may be a point-of-use information source, reduce maintenance cycle times, improve configuration management, improve component tracking, increase asset value, improve product integrity, document abuse/misuse, document no-fault-found history, and the like. Storing component history information with the component may provide readily accessible critical component information that may be read at any point-of-use (e.g. at an aircraft). Maintenance cycle time and configuration control may be easily stored and maintained electronically with the component on the enhanced memory commercial RFID tag 2102 to allow verification of repairs and configuration control at the component and aircraft level. Component tracking may be greatly enhanced by permitting the commercial RFID tag 2102 to be read at a plurality of access points in the distribution system, in storage, in the aircraft, or the like. Documenting the history of the component may prevent the misuse of components by providing information on the airworthiness of a component, information if the component has a valid serial number, verification if a component has been retired from service, and the like. Additionally, the documented history of a component, including the flight cycle history, may provide information to reduce the no-fault-found determinations when a component fault cannot be reproduced on the ground or away from the aircraft. Flight cycle history may provide the needed information to successfully complete a root-cause analysis and therefore may allow for a repair that may not have been possible without the stored information on the commercial RFID tag 2102.

In an embodiment, component quality information may be recorded on the commercial RFID tag 2102 to track quality related information such as inspection dates, flight cycle tracking, component configuration, material information, supplier information, or the like. This information may be used in the quality confirmation of a component, used in defect root cause analysis, verification of a proper assembly, comparing the components actual life cycle information with industry and FAA requirements, or the like. In an embodiment, quality control personnel may be able to read the component quality information for an aircraft before a flight to verify that all of the components with the commercial RFID tag 2102 are airworthy. Additionally, an aviation enterprise may be able rapidly to perform a quality check of all their aircraft in response to a supplier notification, FAA request, airworthiness bulletin, or the like by reading all the commercial RFID tags 2102 within their aircraft.

In an embodiment, the commercial RFID tag 2102 may be used in counterfeit part prevention by storing the component supplier information, component identification, component serial numbers, or the like. Counterfeit parts may be produced by an enterprise that is not certified to produce airworthy components, components produced from other components that have been retired from service (e.g. scrapped), or the like; a counterfeit part may not be airworthy. In an embodiment, an aviation enterprise may receive a component from a supplier. The component information may be read from the commercial RFID tag 2102 for verification that the part is airworthy and not counterfeit. For example, the received component information may be verified against a component database to verify the components identification, verify that the serial number is still an active serial number (e.g. not retired), view the history of the components life cycle, or the like.

In an embodiment, component life cycle management may be recorded on the commercial RFID tag 2102 to allow tracking of the component's life cycle. The life cycle management information may contain life cycle information from the original equipment manufacturer (OEM) to the current time period, record past maintenance dates, future maintenance dates, particular flight information (e.g. stress levels), or the like. Life cycle management may be related to other aspects of the component such as safety, maintenance, quality, or the like. In an embodiment, an aviation enterprise may be able to rapidly determine the status of the life cycle of any or all components of an aircraft that has a commercial RFID tag 2102. For example, the aviation enterprise may periodically read all the commercial RFID tags 2102 on an aircraft to record the life cycle information for the entire aircraft. The aviation enterprise may use the life cycle information to manage the maintenance schedules of the aviation enterprise's aircraft fleet.

In an embodiment, component identification may be recorded on the commercial RFID tag 2102 to include the OEM information, repair enterprise information, component number, serial number, component revision level, or the like. This information may be applied as the component is produced, revised, repaired, or the like to provide a traceable history of the manufacture of the component. The component identification may become the base information to allow the component to be tracked though out the component's operational life cycle.

In an embodiment, the storing of information for the above capabilities may be implemented using different memory configurations such as public memory, private memory, encrypted memory, read/write memory, write once/ read many memory, read only memory, or the like. For example, the component identification may have information that should not be changed such as component number and serial number, therefore the some or all of the component identification may be stored in write once/read many memory. This would allow the OEM to write the component identification but not allow anyone else to change this information. In another example, there may be enterprise only information that may be stored using encryption memory so only the enterprise may read the information. It may be understood by someone knowledgeable in the art that the memory of the commercial RFID tag 2102 may be configured based on the requirement of the commercial RFID tag 2102.

Aspects of the systems and methods described herein may be related storing and communicating commercial RFID tag 2102 information related to maritime shipping 2224. In an embodiment the maritime shipping 2224 information may be related to a location of a maritime ship such as ingress and egress of the ship to and from a port.

In an embodiment, the maritime and shipping 2224 information may be related to a cargo of the maritime ship. The cargo information may be a type of cargo, a quantity of cargo, an origin of the cargo, a final destination of the cargo, at least one interim destination of the cargo, a product, a pallet, a container, a ship, or the like.

An aspect of the systems and methods described herein may be related to storing and communicating commercial RFID tag 2102 information related to a public event 2232.

The public event may be a concert, a play, a sporting event, a business conference, or the like.

The public event 2232 information may be related to ticket validation, a public event date, a public event time, a number of tickets, a seating location, a public event title, or the like. The public event 2232 information may be related to admission to a public event, an admission taken manually at a gate, an admission taken automatically at a gate, or the like.

Figure 23:
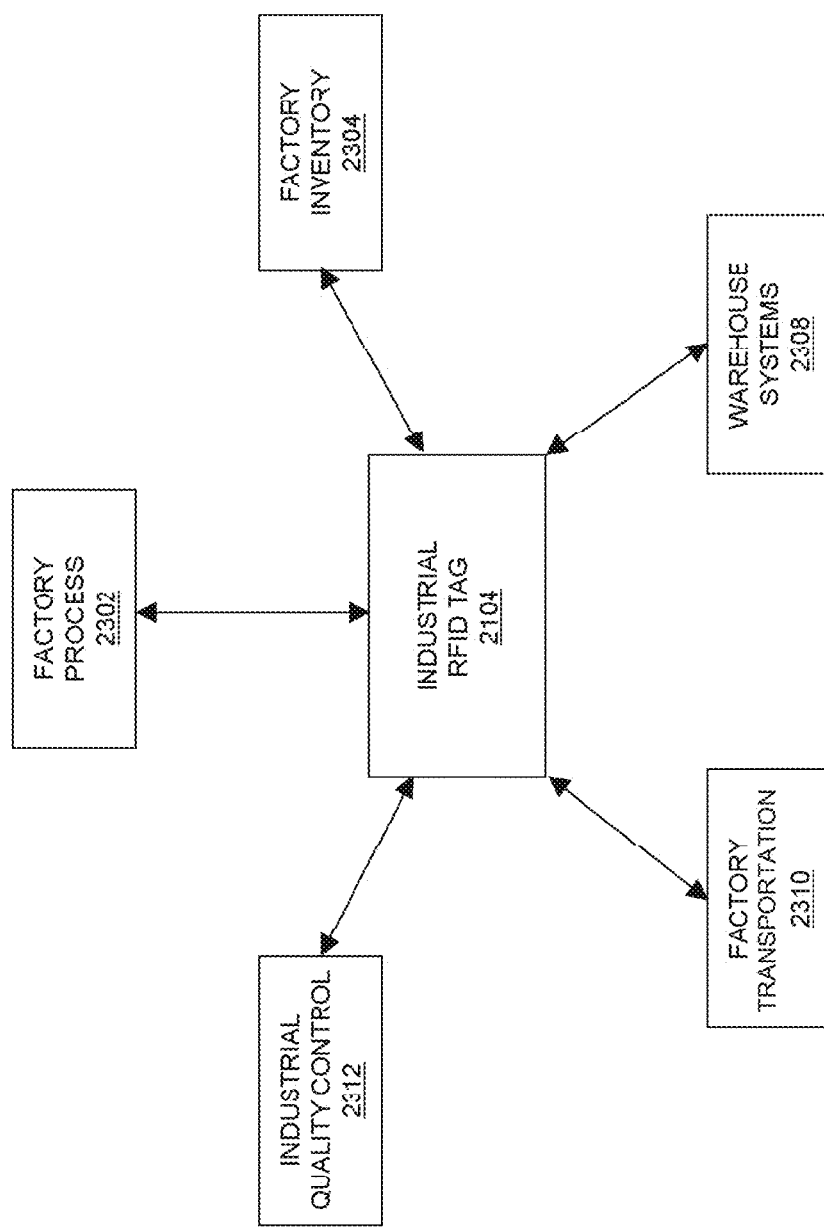
FIG. 23 shows a range of applications enabled by an RFID tag system in an industrial environment.

Aspects of the systems and methods described herein may be used in many different markets where material, parts, products, processes, or the like may benefit from history traceability, movement tracking, identification, data recording, or other information recording and processing. Referring to FIG. 23, a market example may be the industrial field, where product information and history may be tracked through industrial RFID tags 2104. Product information and history may be followed through the entire life-cycle of the product, from the receiving of raw materials to the shipment of finished goods for sale, including factory process 2302, factory inventory 2304, warehouse systems 2308, factory transportation 2310, industrial quality control 2310, or the like. The use of industrial RFID tags 2104 as described herein may significantly increase the ability of an industrial facility to track the location and history of the final product, as well as the components that are included as a part of the final product. Further, through access to location and history information for the product and its components, post-sale attributes may be tracked, such as product performance, quality, reliability, return rate, customer complaints, or the like. An industrial facility may feed these post-sale attributes back into the manufacturing process and product design to further improve the quality of the product and reduce post-sale costs. The use of the systems and methods described herein may therefore contribute to the future quality of the produced product.

The factory process 2302 may benefit from the systems and methods disclosed herein in a number of ways, including the identification tracking of components and sub-assemblies included in the final production product; the production history of the components and sub-assemblies of the final production product, such as the location of manufacture, the date of manufacture, the time of manufacture, the personnel that participated in the manufacture of the components and sub-assemblies, or the like; the transportation history of components and sub-assemblies; the tracking of the manufacturing process for the final production product, such as where it is in the process; the control of the manufacturing process for the final production product, such as implementation of unique processing steps; the history of the manufacturing process for the final production product, such as the date of production, the time-sequence of each subassembly process step, personnel involved in the production, or the like; the tracking of issues encountered during production of the product; a history of all inspections performed on the product; date of final packaging of the product; or the like. In embodiments, the factory process 2302 may be made more efficient and reliable due to the expanded capabilities of the systems and methods described herein.

In embodiments, manufacturing control may be made more efficient through the use of the disclosed systems and methods. Manufacturing control includes factory processes 2302 that effect the production of a product being manufactured, such as what color the product is to be, selection of optional features for the product, selection of optional processing steps for the product, or the like. For example, in an embodiment, a product may have the option of being painted red, green, or blue. The product may have an attached industrial RFID tag 2104. The product's industrial RFID tag 2104 may have been previously loaded with an identification number and data to indicate what color the product is to be painted. As the product is brought near the paint facility, the reader 140 may extract the identification number and color data, and send that data to the painter. During the painting, various paint parameters, such as paint mix, spray time, temperature, or the like, may be recorded by the paint facility. Upon completion of the painting step in the manufacturing process, the paint parameters may be downloaded onto the industrial RFID tag 2104 through the reader 140. In this way, the product that has been painted now may contain the paint parameters through its useful life. If the product was a car for example, and the car showed premature rusting, the industrial RFID tag 2104 may be accessed to help determine whether the painting during manufacturing may have contributed to the premature rusting. In embodiments, the systems and methods described herein may be able to utilize RFID tag capabilities to not only control the manufacturing step, such as painting, but also to record the conditions of manufacture to be stored on the industrial RFID tag 2104, and to stay with the product through its operational life.

In an embodiment, the product being manufactured may be a motherboard of a personal computer. The motherboard containing an industrial RFID tag 2104 may have options associated with it, such as amount of memory, type of processor, clock speed, or the like, recorded in the memory of the industrial RFID tag 2104. As the blank printed circuit board approaches the component placement facility, the reader may access the industrial RFID tag 2104 for component information. The component placement facility may then choose the appropriate components, and mount them on the motherboard. Further, the component history for the parts placed on the motherboard, such as part number, date code, lot code, or the like, may be recorded by the component placement facility. The component placement facility may write this component history to the industrial RFID tag 2104 attached to the motherboard. This information may stay with the motherboard through the remaining stages of manufacturing, and on through its operational life.

In embodiments, the industrial RFID tag 2104 may be read by a technician to aid in the diagnosis of problems associated with the motherboard, either during test stages in manufacturing, or during the operational life of the unit. In embodiments, the industrial RFID tag 2104 attached to the motherboard may be able to communicate with an industrial RFID tag 2104 associated with the higher assembly personal computer. The industrial RFID tag 2104 associated with the personal computer may have access to an Internet interface, which may be used to monitor recalls or other issues related to the components on the motherboard. Further, this type of informational connection between the industrial RFID tag 2104 on the motherboard and the Internet may enable a technical support facility connected to the internet to extract information contained on the industrial RFID tag 2104 on the motherboard. In embodiments, the industrial RFID tag 2104 may utilize the capabilities of the systems and methods described herein to aid in the control of manufacture, as well as to record associated component and process history of the components to more efficiently diagnose future failures for issues associated with the components.

In embodiments, the industrial RFID tag 2104 may be associated with the manufacturing of a material component that is formed from raw materials and integrated into a larger assembly. One such example of such a material component may be a steel bridge member that is formed from molten steel and integrated into a road bridge. In this instance, the forging and forming facility that manufactures the bridge member may record the history information associated with the raw materials, the conditions and environments experienced during forming, post-forming performance test results, or the like. This information may be downloaded onto an industrial RFID tag 2104 that is mounted on the bridge member. This information may now be utilized in mechanical testing of the bridge member prior to shipment, as well as placement information on the site of the bridge assembly. Further, in embodiments, the information stored in the bridge member's industrial RFID tag 2104 may be utilized during periodic bridge inspections, along with environmental information that may be collected by industrial RFID tags 2104 associated with the entire bridge assembly.

In embodiments, tracking and location of manufacturing parts may be made more efficient through the use of the systems and methods described herein. Each part may be associated with an industrial RFID tag 2104, either by direct mounting, or through mounting to the part's packaging. The ability for a manufacturing facility to track and locate all of the parts within the facility may be advantageous to the efficiency of the manufacturing facility. For example, one of the most fundamental steps in the assembly of a component may be the gathering of parts, sometimes referred to as kitting, required to complete the assembly procedure. If an assembly is begun without all parts accounted for, the assembly may have to be halted, breaking the flow and time efficiency of the production line. The systems and methods described herein may aid in the automated determination of whether a kit is complete or not, and if not, reporting shortages. With industrial RFID tags 2104 on all parts within the facility, it may become easier to locate parts that are needed, determine what assemblies have priority within the manufacturing flow, and move those parts in order to maintain a smooth running assembly flow.

The systems and methods described herein may also better enable the aggregation of part histories. For instance, industrial RFID tags 2104 associated with parts may contain history associated with those parts. As these parts are integrated into higher assemblies, their histories may be requested through readers 140 and transferred to an industrial RFID tag 2104 associated with the higher assembly. In this way, the higher assembly's industrial RFID tag 2104 may contain the history information of all the parts that make it up. In embodiments, the disclosed systems and methods may have expanded capabilities to better enable the tracking of information pertaining to an assembly's parts.

In embodiments, the tracking and location scheme that starts with parts or raw materials, may be extended up through the sub-assembly and assembly stages that lead to the finished product. For instance, an industrial RFID tag 2104 may be associated with each part, with all its history and performance data written into the memory of its industrial RFID tag 2104. As the parts are integrated into sub-assemblies, an industrial RFID tag 2104 may be attached and associated with each sub-assembly. The sub-assemblies may get an identification number to track and locate them, allowing the facility to track and locate a particular sub-assembly to be kitted for the next level of assembly integration. In addition, the industrial RFID tag 2104 associated with the sub-assembly may contain all the history data from the parts that constitute it. This may be accomplished through a facility associated with the reader 140, reading the data from all parts and subsequently writing the data into the sub-assembly's industrial RFID tag 2104, or having the sub-assembly industrial RFID tag 2104 communicate directly with the part's industrial RFID tags 2104. With industrial RFID tags 2104 associated with parts, sub-assemblies, assemblies, finished products, and the like, all components used in the manufacturing process may be tracked and located. In embodiments, the ability to track and locate any part, sub-assembly, or assembly in the manufacturing facility, may improve the efficiency of the manufacturing facility.

The tracking and location of parts within the manufacturing facility may begin with parts being received at the manufacturing facility. Parts may be received with industrial RFID tags 2104 already attached, or the industrial RFID tags 2104 may have to be attached when the part is received. Whether the industrial RFID tag 2104 is attached to the part itself, or attached to its container, the industrial RFID tag 2104 may allow for a simple and quick way to perform stocking and vending of inventory. For instance, the stocking and vending facility may have an array of readers that covers the entire stockroom area, including the receiving area and the vending, or outgoing, area. As parts with industrial RFID tags 2104 are received, the stocking and vending facility logs the part in and tracks its location. Similarly, when parts come in with no industrial RFID tag 2104, the part is tracked from the time an industrial RFID tag 2104 is attached. As parts are placed into stock, their industrial RFID tag 2104 may be always accessible, and the part's location and history data may be always available. As parts are vended out of stores, the stocking and vending facility may log the part out of stores and onto the manufacturing floor. In this way, the stocking and vending facility may have a continuous log of what is received, stored, and vended within inventory. In addition, because parts may come with an industrial RFID tag 2104 containing history data, the stocking and vending facility may have access to history information for parts in inventory. Further, the stocking and vending facility may utilize these part histories to create a database that may enable the manufacturing facility immediate access to real-time inventory. In embodiments, the systems and methods described herein may better enable real-time inventory control, and may provide easy access to a real-time part history database.

Warehouse systems 2308 may benefit from the systems and methods described herein in ways similar to those described above for monitoring factory inventory, such as the tracking and location of all products in the warehouse system 2308, a real-time database of stock, automated addition of stock at receiving, automated material stocking and return systems, automated tracking of vending systems at departure, history information on all stock in the warehouse system 2308, or the like. Material location and tracking systems may be applied at all levels of warehouse packaging, such as container-level, pallet-level, case-level, product-level, or the like. In embodiments, the systems and methods described herein may enable more efficient stock management within the warehouse system 2308.

In addition, warehouse stock, as well as inventory stock, may have time expiration codes or environmental limits that require monitoring. Typically, this monitoring may have been done with a database system. But logging in and out all the information associated with stock, especially with the warehouse system 2308 where there turnover of stock may be high, can be time consuming and prone to human error. The systems and methods described herein provide extended memory and functionality that may support an automated way to have stock self-report warnings due to such variables as time expiration, environmental limits, handling limits, or the like. Through such extended memory, these variables may be stored in the industrial RFID tag's 2104 memory. Through such extended functionality, these variables may be actively compared to external references, such as current time provided by the reader 140 signal, or sensor 138A data, such as temperature, humidity, shock, or the like. Periodic interrogations by warehouse system 2308 readers 140 may provide the power for the industrial RFID tag 2104 to assess and report on any conditions that may warrant caution or warning.

As an example, the warehouse system may be storing a perishable food product such as milk. The milk may have perishable limits that cannot be exceeded without loss of the product, such as a sell-buy date code, minimum and maximum temperature extremes, maximum shock to the shipping container, or the like. This information, along with its identification number, may be stored in the milk's industrial RFID tag 2104, and may be transferred to the warehouse system 2308 database when the milk is received. The milk may then be stored in the warehouse system for some time duration before being shipped out. The warehouse system 2308 may be a company separate from the company that produced, packaged, and transported the milk to the warehouse system 2308 site. It is essential for a warehouse system 2303 that handles perishables to prevent the product from expiring, and if it does expire, to identify the point in the supply chain where the product experienced the out of limit parameter. Therefore, the warehouse system 2308 may read these parameters from the product's industrial RFID tag 2104 upon receiving the product, for example, to determine whether the milk has expired prior to receiving. Once the milk is determined to be good, and not to have exceeded any product parameters, the milk may be stored. During storage, the warehouse system 2308 may monitor the product's parameter limits within its database. But the database may not be monitoring the product itself, and parameters such as temperature and shock may only be accurately monitored at the product location. For example, the database may not be able to detect whether the milk's shipping container was dropped, or whether local temperature variations within the warehouse system 2308 caused temperature parameters to be exceeded. Monitoring parameters at the product's location may be the most accurate way to ensure that product parameters are not exceeded.

In an embodiment, the systems and methods described herein may provide for monitoring product parameters at the location of the product, and reporting status and warnings to the warehouse system 2308. For example, the bottle of milk with an industrial RFID tag 2104 attached, may be continuously monitored for time, temperature, shock, or the like. Readers 140 distributed throughout the warehouse system 2308 may periodically interrogate the industrial RFID tags 2104 within the warehouse system 2308. Sensors 138 may be continuously monitoring parameters, and when the industrial RFID tag 2104 is interrogated, the industrial RFID tag 2104 may then read sensor 138A data and compare their values to parameter limits. Sensors may be independently powered, and so the industrial RFID tag 2104 may be reading a data history since the sensor's last access by the industrial RFID tag 2104. If conditions were near or in excess to parameter limits, the industrial RFID tag 2104 may report a warning to the warehouse system 2308 to indicate a possible problem. The systems and methods described herein may take advantage of extended memory and/or functionality to perform this self-monitoring and self-reporting. In embodiments, the systems and methods described herein may help reduce the loss of product during warehousing, locate where the product experienced the out-of-limit condition, track the conditions under which the product was warehoused, or the like.

In embodiments, the warehouse system 2308 may have need of navigation system to locate products for shipment out of the warehouse system 2308. The systems and methods described herein may provide a way for locating product within the warehouse system 2308. For example, at times warehouses or other industry facilities may utilize a forklift for factory transportation 2310 to help facilitate the storage and retrieval of products. In embodiments, it may be useful for the forklift to have a navigation system that leads the forklift operator to the location of the desired product. The initial directions provided by the navigation system may be provided though the network of readers 140 throughout the warehouse system 2308. The forklift may also have its own reader 138. As the forklift reader 138 comes into range with the industrial RFID tag 2104 of the product, the forklift may be directed to the exact location of the product, possibly even employing triangulation methods with multiple readers 140 within the warehouse system 2308. When the forklift has successfully retrieved the product, the forklift navigation system may list all products that are currently being transported by the forklift. This information may then be relayed to the warehouse system 2308 database, to transport facilities for departure, to receiving facilities to indicate space available, or the like. A forklift embodying certain systems and methods described herein may be automated, that is, not requiring a human operator. Whereas the forklift has been used as an example of how the systems and methods described herein may be used in product location and transport, other examples, such as handheld readers, wand readers, winch readers, or the like, may also be utilized. In embodiments, the systems and methods described herein may provide a more efficient way to locate products within the warehouse system 2308.

Other industrial transportation 2310 facilities may include industrial elevator systems, industrial escalator systems, industrial conveyor systems, cargo terminal systems, or the like. In transporting products, primary concerns may include products being misplaced or mishandled, which may cause loss of time and/or loss of product. The systems and methods described herein may allow a product associated with an industrial RFID tag 2104 to be located within a network of reader 140 facilities, reporting not only its identification, but its handling and environmental history. For example, a series of ten part kits may be sent down a conveyor system to an assembly area, but only nine kits are counted at the end of the conveyor system. Typically this would initiate a search for the missing kit at the sending end, along the conveyor, and at the receiving end of the conveyor system. This would typically involve personnel, and reduce the efficiency of the assembly facility. With the systems and methods described herein, and in conjunction with a portable reader or network of readers, the part kit may be quickly located. In addition, the handling and environmental history for the parts kit may be read to determine if any degradation to components within the kit may have occurred.

The transportation systems 2310 outside the warehouse facility may benefit from the parameter monitoring capabilities using the systems and methods described herein in similar ways to warehouse systems 2308, such as having readers on transport facilities that are able to determine the state of the product when received, monitor product parameter limits during transport, locate products with portable or mobile reader 140/navigation systems, or the like. For example, in loading a product onto a truck for transportation to a distribution site, the systems and methods described herein may be utilized to determine whether product parameter limits have been exceeded prior to loading onto the truck. With all product loaded onto the truck, a reader 140 on the truck may monitor products with industrial RFID tags 2104, and alert the driver if parameter limits are being approached or exceeded. When the truck reaches a distribution point, and some product is to be off-loaded, hand-held readers, possibly in conjunction with the truck's reader, may be utilized to locate specific products. Receiving personnel may access product industrial RFID tag 2104 memory to transfer the status and history of the products being off-loaded into a local database. For instance, if a product has been dropped or mishandled, sensor 138A data may indicate this when read from the memory of the industrial RFID tag 2104. In embodiments, the systems and methods described herein may increase the ability to monitor product handling and environment during transportation.

Global factory product transportation 2310 may involve containerization, a system of inter-modal cargo transport using standard ISO containers, also known as isotainers, that can be loaded and sealed intact onto container ships, railroad cars, planes, and trucks. Typically the cargo is loaded into containers, mounted on rail or truck, and transported to a container terminal for sea or air transport. The contents of the containers are not typically removed from the containers as they are shifted between truck, rail, ship, and air, in transit from source to destination. Given the potentially long durations for global shipment of factory products via containerization, and the great variety of environmental conditions that the products may experience, it may be paramount to maintain a history including time, mode of transport, owner of transport, environmental conditions during transport, shock environments during transport, or the like. The capabilities of the systems and methods described herein may be ideal for maintaining reliable long-term monitoring of the product's conditions while in transport. A reader 140 network on the various transportation modes may be utilized for monitoring and/or activation of the product's industrial RFID tag 2104.

Factory transportation 2310 through the system of containerization may provide a varied shock environment to the container and associated cargo. For example, moving containers from one mode of transport to another, such as from truck-to-train, train-to-dock, dock-to-ship, or the like, may impart shock to the cargo. Transporting a fragile product, such as glass, may cause breakage as a result of handling. The transport agency may specify maximum instantaneous accelerations due to shock that are to be taken as acceptable in shipment. In embodiments, these values, along with other specified environmental conditions for transport, may be stored in the memory of the industrial RFID tag 2104 associated with the product. The industrial RFID tag 2104 may monitor its associated sensors 138, and compare sensor 138A values to the stored specified maximums. If the measured values exceed the specified maximums, the industrial RFID tag 2104 may transmit a status or warning to resident readers 140, as well as to a running log to be read by the cargo's eventual recipient. In this way, it can be determined quantitatively whether any breakage was due to poor packaging or to excessive shock during transport. Industrial RFID tags 2104 may also communicate with local readers 140 or with other industrial RFID tags 2104 to attempt to report or cross correlate its readings with the readings of other industrial RFID tags 2104. In embodiments, the industrial RFID tag 2104 reporting the anomalous reading may read and record data provided from the network of readers 140, or from other local industrial RFID tags 2104.

A number of other parameters may be specified by the transport agency where certain limits are not to be exceeded. For example, in the transport of perishable goods or livestock, certain temperature maxima or minima must not be exceeded. Industrial RFID 2104 tags incorporated in the packaging or containers for perishable goods, or incorporated in the pens or shipping crates for livestock, may indicate exposure temperatures. Such tags 2104 may also be attached to individual animals for livestock shipments. It can be determined by reading the data on the industrial RFID 2104 tags whether temperature tolerances have been exceeded during the shipment, to the potential detriment of the goods or livestock. In addition to large-scale or bulk shipments, industrial RFID 2104 tags may be affixed to or imbedded into unique items of livestock, such as performance animals (e.g., circus animals, rodeo animals, and the like), laboratory animals, or pets. Because such specialized shipments may have detailed requirements for their transportation, and narrow tolerance ranges, industrial RFID 2104 tags may be used to collect data regarding transportation conditions to determine whether, for example, contractually-determined transportation requirements have been met.

In addition to industrial RFID tags 2104 on the products or their packaging, there may be industrial RFID tags 2104 on the shipping container itself, providing a unique identification number for each container. Additionally, the container's industrial RFID tag 2104 may collect the information resident on product level industrial RFID tags 2104 internal to the container. Since the container's industrial RFID tags 2104 may be external, and the container may be metallic, there may be an interface between the industrial RFID tags 2104 on products internal to the container, and the industrial RFID tag 2104 for the container, mounted on the container. In this way, external readers 140 may more easily read the contents of the container. In embodiments, the container's industrial RFID tag 2104 may be mounted on the external surface of the container, and as such, may be more exposed to the outside elements and to physical contact with container handling equipment and other containers. As a result, damage to the industrial RFID tag 2104 may be more likely, and may require greater reliability than is typical for RFID tags. The systems and methods described herein may have significant redundancy capabilities due to the multiple RF network node 104 configuration of the tag 102. In embodiments, the systems and methods described herein may provide significantly greater redundancy than typical RFID tags, and may be an advantageous solution to the requirements of the container's industrial RFID tag 2104.

In industrial applications, quality control is involved in ensuring products are produced to meet or exceed customer requirements. The systems and methods described herein may enable the tracking and logging of quality control history for a product. This history may begin at the parts level, including information such as lot, date, part testing at source, or the like. The quality testing results and information for parts may then be aggregated into the sub-assembly level, and then to the assembly, and finished product level. In this way, information recorded on the industrial RFID tags 2104 of a lower assembly may be collected and transferred to the industrial RFID tag 2104 of a higher assembly, which may allow all information associated with a finished product to build as an integral part of the assembled product. In embodiments, the systems and methods described herein may eliminate the need for an external file to keep track of quality control results and logs. This may allow the quality control information to be networked via readers 140, and/or accessed by hand-held readers by quality control personnel. In embodiments, the systems and methods described herein may lead to more efficient quality management, and greater reliability in quality control record keeping.

Figure 24:
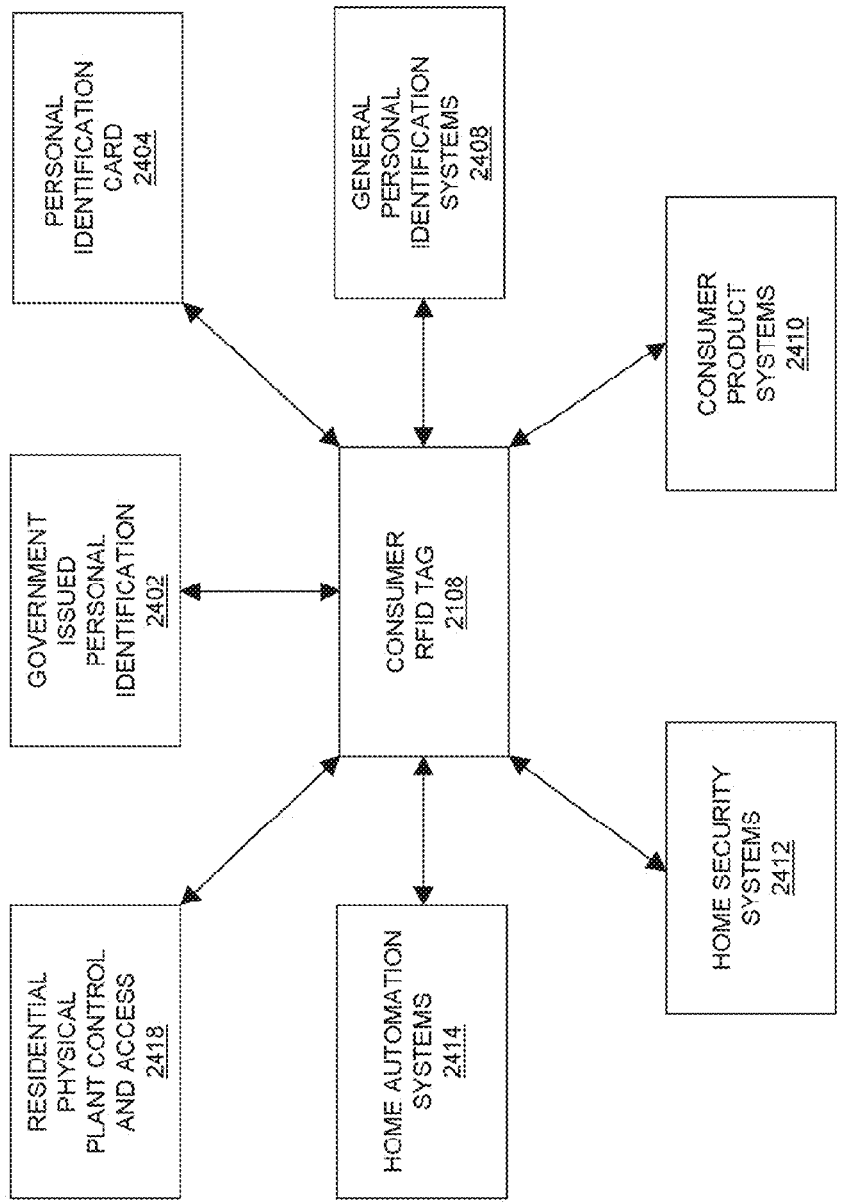
FIG. 24 shows a range of applications enabled by an RFID tag system in a consumer environment.

Aspects of the systems and methods described herein may be used in many different consumer markets where material, parts, products, processes, and the like may benefit from history tracking, movement tracking, identification, data recording, or other recording information on a consumer RFID tag 2108. Referring to FIG. 24, consumer market examples may include government issued personal identification 2402, personal identification card 2404, general personal identification systems 2408, consumer product systems 2410, home security 2412, home automation systems 2414, residential plant control and access, or the like.

The consumer RFID tag 2108 may be connected to a network where the network connection may be a wireless connection, a wired connection, or the like. The network to which the consumer RFID tag 2108 may communicate may be a LAN, a WAN, a peer-to-peer network, an intranet, an Internet, or the like. The network connection may be use the gateway facility 138C discussed in FIG. 11.

An aspect of the systems and methods described herein may relate to associating the RFID tag with a government identification and storing and communicating consumer RFID tag 2108 information related to a government identification 2402.

In an embodiment, the government identification 2402 may be a passport. The owner of the passport may be tracked within a passport zone. The government identification may provide automatic identification at a passport checkpoint.

In an embodiment, the government identification 2402 may be a visa. The owner of the visa may be tracked within a visa zone. The government identification 2402 may provide automatic identification at a visa checkpoint.

Additionally, the government identification may be a driver's license, a public safety personnel identification, a government employee identification, or the like.

In an embodiment, the government identification 2402 may provide automatic access to a location, manual access to a location, or the like.

In an embodiment, the government identification 2402 information may be a user name, user address, user personal characteristics, a user place of work, a user rank, or the like.

In an embodiment, the government identification 2204 may track a user's ingress and egress to a facility.

An aspect of the systems and methods described herein may be associating the consumer RFID tag 2108 with a personal identification 2404 and storing and communicating consumer RFID tag 2108 information related to a personal identification 2404.

In an embodiment, the personal identification 2404 may be related to a credit card. Items may be automatically purchased with the credit card using a reader 140. In an embodiment, the credit card may provide automatic identification of a user.

In an embodiment, the personal identification 2404 may be related to an ATM card. Items may be automatically purchased with the ATM card using a reader 140. In an embodiment, the ATM card may provide automatic identification of a user.

In an embodiment, the personal identification 2404 may be related to a bankbook.

Aspects of the systems and methods described herein may be associating the RFID tag with a product and storing and communicating consumer RFID tag 2108 information related to a product warranty. In an embodiment, the warranty information may be a product part number, a product serial number, a date of purchase, a date the warranty expires, a warranty contract, an owner's identification, a return date, a return control number, or the like.

An aspect of the systems and methods described herein may be associating the consumer RFID tag 2108 with a home security system 2412 and storing and communicating the consumer RFID tag 2108 information related to home security 2412. Home security may be intrusion detection, fire detection, water detection, smoke detection, or the like.

In an embodiment, the home security system 2412 information may be related to a status of home locks such as when the home lock is locked or unlocked.

In an embodiment, the home security system 2412 information may be related to a personal identification facility where the personal identification facility may contain home egress and ingress information. In an embodiment, the home information may automatically lock and unlock doors. In an embodiment, the home information may manually lock and unlock doors. In an embodiment, the home information may automatically lock and unlock windows. In an embodiment, the home information may manually lock and unlock windows.

In an embodiment, the home information may automatically secure a home zone when leaving the zone. The home information may automatically adjust the security when the zone is reentered.

An aspect of the systems and methods described herein may be associating the consumer RFID tag 2108 with a home automation system 2414 and storing and communicating consumer RFID tag 2108 information related to home automation 2414. Home automation may be turning lights on and off, dimming lights, turning entertainment systems on and off, adjusting an environmental control within a zone, or the like.

In an embodiment, the home automation 2414 information may include a user's personal settings. The user's personal setting may be activated when entering a zone of a home. In an embodiment, the home automation information may be modifiable. The information may be modified based on a last setting of the home automation system, modified by a user, or the like.

Figure 25:
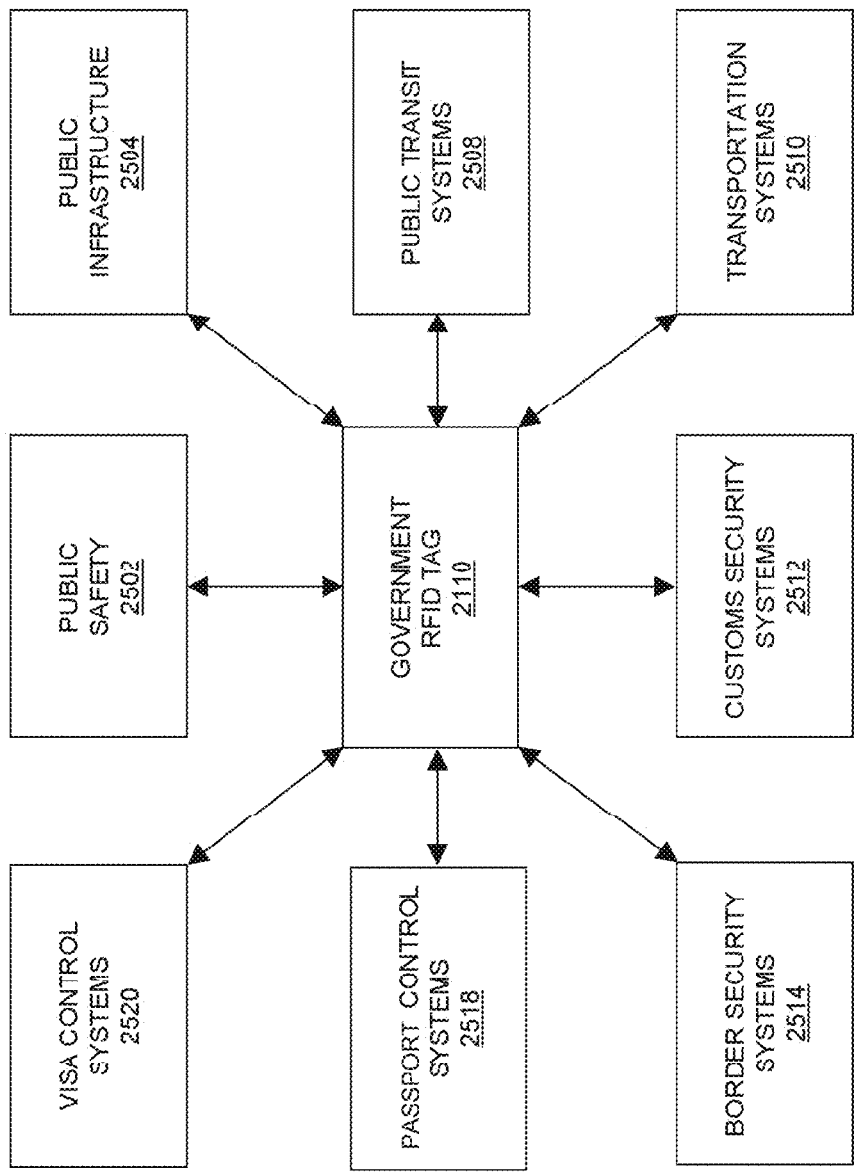
FIG. 25 shows a range of applications enabled by an RFID tag system in a government environment.

Aspects of the systems and methods described herein may be used in many different government markets where material, parts, products, processes, and the like may benefit from history tracking, movement tracking, identification, data recording, or other recording information on a government RFID tag 2110. Referring to FIG. 25, government market examples may include public safety 2502, public infrastructure 2504, public transit systems 2508, transportation systems 2510, customs security systems 2512, border security systems 2514, passport control systems 2518, and visa control systems.

The government RFID tag 2110 may be connected to a network where the network connection may be a wireless connection, a wired connection, or the like. The network to which the government RFID tag 2110 may communicate with a LAN, a WAN, a peer-to-peer network, an intranet, an Internet, or the like. The network connection may be use the gateway facility 138C discussed in FIG. 11.

An aspect of the systems and methods described herein may be associating the government RFID tag 2110 with a security device and storing and communicating government RFID tag 2110 information related to public safety 2502.

In an embodiment, the security device may include information for a correctional facility. The correctional facility device may provide ingress and egress tracking. The correctional facility device may provide location information for the security device. In an embodiment, the correctional facility device may be associated with a person, with an object, or the like.

In an embodiment, the security device may include information for a courthouse. The courthouse device may provide ingress and egress tracking. The courthouse device may provide the location information of the security device. The courthouse device may be associated with a person, with an object, or the like.

In an embodiment, the security device may be associated with a GPS system. The security device may provide a prisoner location, a personnel location, or the like. The security device may provide ingress and egress information from a zone.

An aspect of the systems and methods described herein may include associating the RFID tag with a vehicle infrastructure device and storing and communicating government RFID tag 2110 information related to public infrastructure 2504. The public infrastructure may include transportation control such as traffic control, bridge access and control, tunnel access and control, and the safety of vehicles operation on the public infrastructure.

In an embodiment, the transportation control may be traffic flow control. The information may be used to control the coordination of at least one street traffic light to control the flow of traffic through a city, town, or the like.

In an embodiment, the transportation control may be bridge flow control where the information may be used to control the number of vehicles on the bridge. The information may be used to control access to the bridge.

In an embodiment, the transportation control may be tunnel flow control where the information may be used to control the number of vehicles in the tunnel. The information may be used to control access to the tunnel.

In an embodiment, the transportation control may provide automatic payment of tolls. The information may be a vehicle identification, a vehicle owner, a history of toll access, a last safety inspection on a vehicle, or the like. In an embodiment, the safety inspection information may indicate a pass and fail of the safety inspection for the vehicle. The vehicle may be denied access if the vehicle failed inspection.

An aspect of the systems and methods described herein may be associating the RFID tag with a personal infrastructure device and storing and communicating government RFID tag 2110 information related to public transit systems 2504 transportation control. In an embodiment, the personal infrastructure device may be a card, a loyalty card, a credit card, a transportation system device, or the like.

In an embodiment, the personal infrastructure device may provide automatic ingress and egress control to a public transportation system. The public transportation system may be a bus, a train, a subway, and the like. In an embodiment, the personal infrastructure device may store user identification information, an egress and ingress history, a value of the personal infrastructure device, or the like. The personal infrastructure device value may be automatically added, deducted, or the like.

In an embodiment, the personal infrastructure device may store wanted persons information for the owner of the personal infrastructure device. The wanted owner ingress and egress may be tracked during ingress and egress from public transportation. The wanted owner may be denied access to a public transportation system.

In an embodiment, the personal infrastructure device may provide location information within a public transportation station.

An aspect of the systems and methods described herein may be associating the government RFID tag 2110 with a customs security device and storing and communicating government RFID tag 2110 information related to customs control 2512.

In an embodiment, the customs device may be associated with baggage to store information about the baggage. The baggage information may contain a declaration of the baggage contents, baggage owner identification, a final destination, a starting location, at least one interim destination, or the like. In an embodiment, the baggage may be tracked while the baggage is within the customs area.

An aspect of the systems and methods described herein may be associating the government RFID tag 2110 with a border security device and storing and communicating government RFID tag 2110 information related to border control 2514.

In an embodiment, the border security device may be used as a covert tagging device for tracking objects or people as they cross borders. In an embodiment, the covert information may be a border crossing name, a border crossing time, an identification of the user crossing the border, or the like. In an embodiment, the border security device may be tracked each time the border security device is in a border crossing area.

In an embodiment, the border security device may be tracked when the border security device is in-custody of a border crossing for tracking objects and people when in the in-custody area of border security. In an embodiment, information on the border security device may contain information on ingress and egress from the in-custody area, location information for within the in-custody area, user information for the border security device, or the like.

Figure 26:
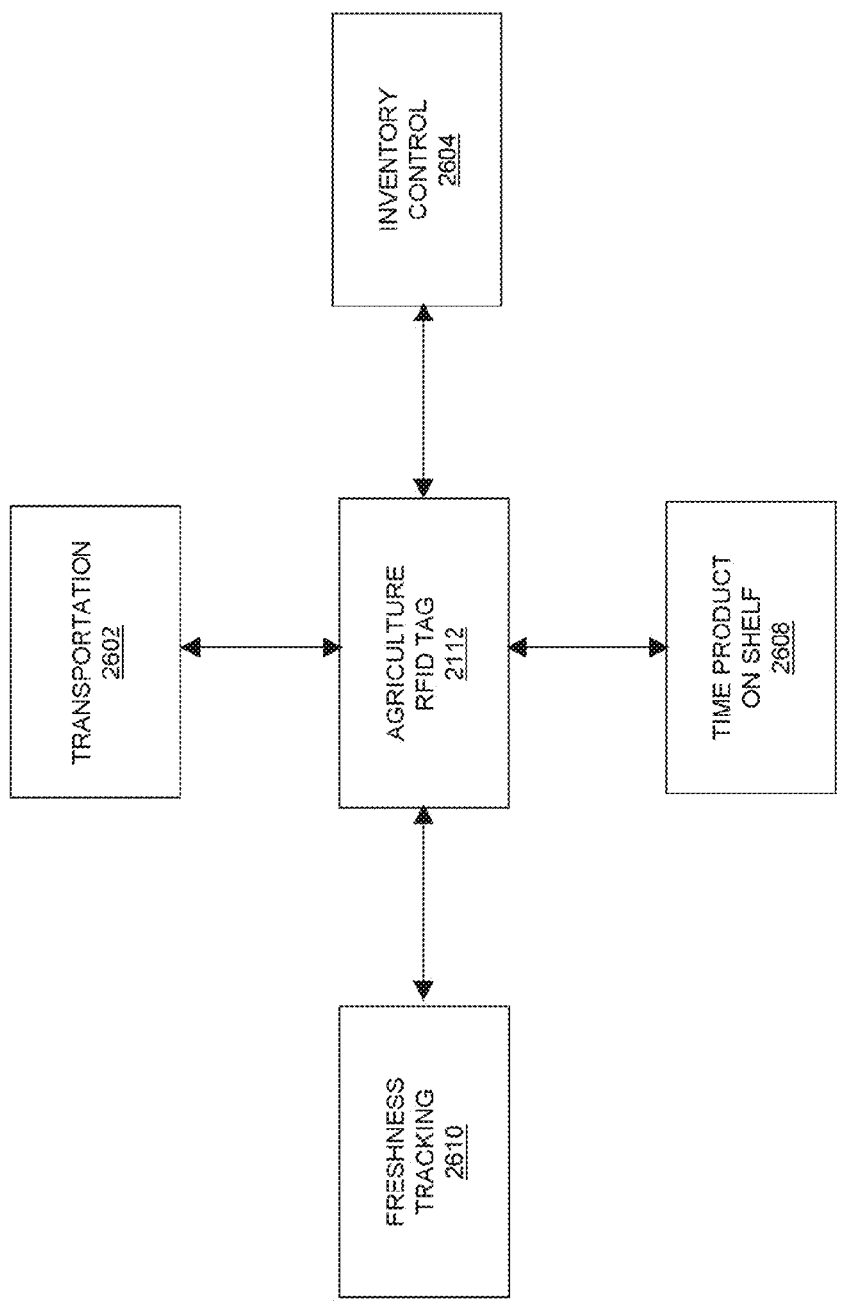
FIG. 26 shows a range of applications enabled by an RFID tag system in an agriculture environment.

Aspects of the systems and methods described herein may be used in many different agriculture markets where material, parts, products, processes, and the like may benefit from history tracking, movement tracking, identification, data recording, or other recording information on an agriculture RFID tag 2112. Referring to FIG. 26, agriculture market examples may include transportation 2602, inventory control 2604, time a product is on a shelf 2608, freshness tracking 2610, and the like.

The agriculture RFID tag 2112 may be connected to a network where the network connection may be a wireless connection, a wired connection, or the like. The network to which the agriculture RFID tag 2112 may communicate with a LAN, a WAN, a peer-to-peer network, an intranet, an Internet, or the like. The network connection may be use the gateway facility 138C discussed in FIG. 11.

An aspect of the systems and methods described herein may be associating the agriculture RFID tag 2112 with an agriculture product and storing and communicating agriculture RFID tag 2112 information related to the agriculture product. In an embodiment, the agriculture RFID tag 2112 may be connected to a sensor for measurement of environmental conditions of various agriculture products. In an embodiment, the sensor may be a temperature sensor, a humidity sensor, an acceleration sensor, or the like.

In an embodiment, the environmental conditions of the agriculture product transportation 2602 may be recorded such as temperature, humidity, handling of the agriculture product (e.g. dropping), transportation time, or the like.

In an embodiment, the agriculture information may be related to inventory control 2604. In an embodiment, the information may be the amount of agriculture product within a distribution system, a warehouse, a store, or the like. In an embodiment, the agriculture information related to inventory control may be aggregated remotely from the agriculture product at the plurality of locations within the inventory control 2604 system.

In an embodiment, the agriculture information may be related to the freshness of the agriculture product. In an embodiment, the agriculture information may be the time since the agriculture product has been harvested, an environmental condition of the agriculture product since harvesting, or the like for determination of the agriculture freshness 2610. In an embodiment, sensors may record the environmental conditions of the agriculture product; the information may be tracked remotely from a location of the agriculture product.

Figure 27:
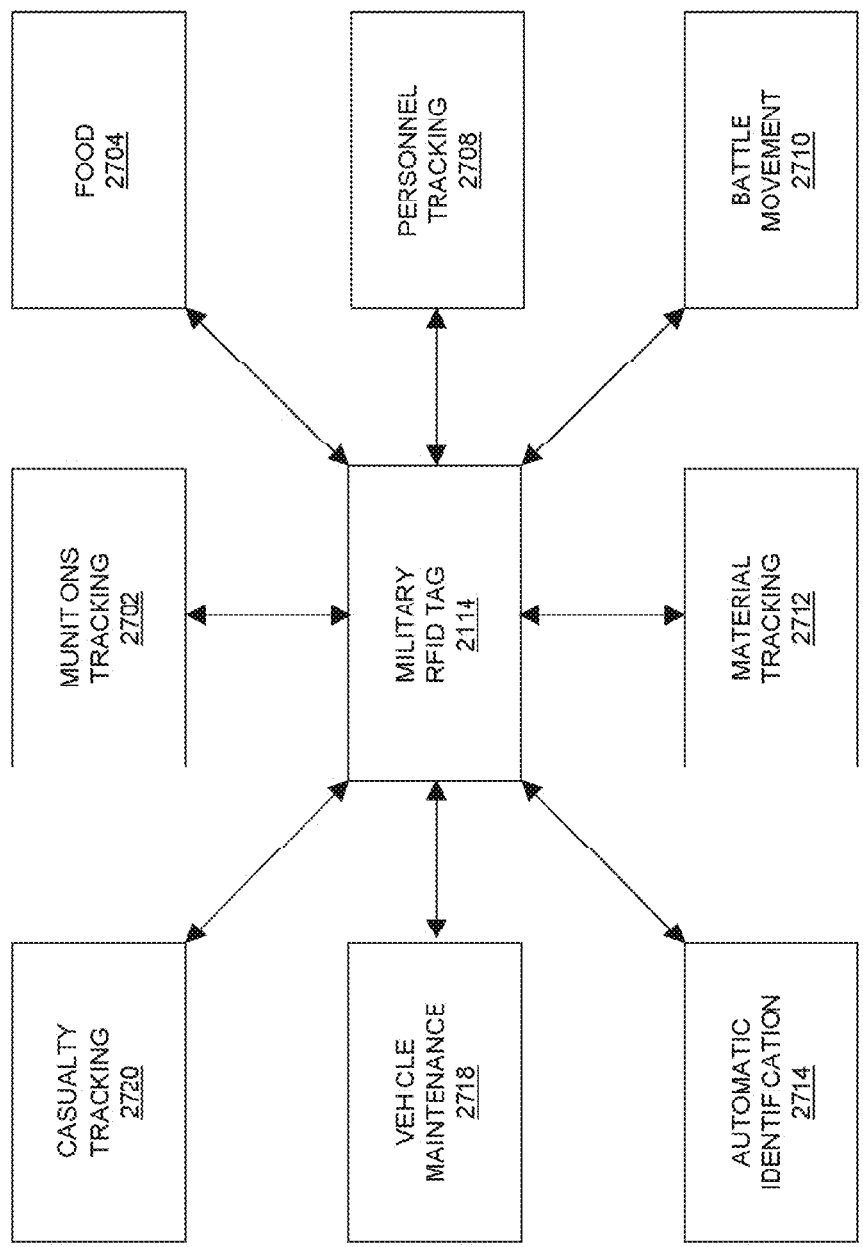
FIG. 27 shows a range of applications enabled by an RFID tag system in a military environment.

Aspects of the systems and methods described herein may be used in many different markets where material, parts, products, processes, and the like may benefit from history tacking, movement tracking, identification, data recording, or other recording information. Referring to FIG. 27, a market example may be military applications, where information may be for tracking munitions inventory, tracking food inventory, food expiration dates, tracking personnel, tracking battle movements, supply material tracking, automatic identification, maintenance, casualty tracking, and the like. The military, and the Department of Defense (DoD) in general, is a large and complex organization that has requirements to track large supply chains, provide security for locations and personnel, track movements of personnel and vehicles within a military facility, and the like.

The military may benefit from the use of automatic tracking systems that may be provided by the systems and methods disclosed herein. The multi RF network node 104 RFID tag 102 may provide increased memory for additional storage of information related to the type of product to which the RFID tag 102 is attached, information related to the movement of the product, information related to the personnel in possession of the product, and the like. The increased memory may be implemented as redundant memory to provide a more robust RFID tag 102 for situations where the product may be in a harsh environment. The RFID tag 102 as described herein may also provide functional redundancy where the RFID tag 102 may be able to incur some damage and continue to provide normal functions.

Additionally, the RFID tag 102's capability of multiple frequencies and multiple antennas may allow the military to transmit and receive information from the RFID tag 102 using a number of different frequencies. Certain parts of the RFID tag 102 memory may only be accessed by certain frequencies and/or encryptions. These capabilities may provide secure storage of information for many different products for which the military has responsibility.

Referring to FIG. 27, the military RFID tag 2114 may be applicable to munitions tracking 2702, food 2704, personnel tracking 2708, battle movement 2710, material tracking 2712, automatic identification 2714, vehicle maintenance 2718, and casualty tracking 2720. It should be understood by someone knowledgeable in the art that the military RFID tag 2114 may have other applications in the military and the listed applications is not intended to be limiting.

As may be readily understood, the military has a significant amount of munitions to store, transport, track, disperse, and the like, ranging from small caliper to larger munitions. The military may be interested in tracking the amount of munitions available, the type of munitions available, the distribution of the munitions, the munitions available to a unit, and the like. The military RFID tag 2114 may be attached to the munitions, may be attached to the munitions container, or the like. In an embodiment, the increased memory of the military RFID tag 2114 of the systems and methods described herein may allow for increased amounts of information to be stored about the munitions such as the type of munitions, the amount of munitions within the storage container, the age of the munitions, the location of the munitions, part numbers, serial numbers, and the like. Depending on the security requirements, some or all of the information may be stored with a password, with encryption, with a combination of password and encryption, or the like.

Using the information stored on the military RFID tag 2114, the military warehouses and stores could utilize smart shelf inventory for munitions. Using the military RFID tag 2114 associated to the munitions and at least one reader 140 within a warehouse, the munitions may be inventoried rapidly. The read or series of reads may be able to determine the amount of all the munitions within the warehouse, the amount of certain munitions within a warehouse, the age of the munitions, and the like. This type of smart shelf inventory may be used in large base warehouses and smaller field munitions stores to allow for rapid munitions determination. With this RFID tag 102 technology, the inventory of munitions in many widely separated warehouses may be determined within a short period of time. For example, an entire Command may inventory the munitions in a plurality of munitions warehouses by reading the military RFID tags 2114 associated with the munitions. The military RFID tag 2114 readers 140 may be associated with a network as, described herein, to allow a remote site to initiate a read of information and receive information for the munitions inventory. The munitions information may then be aggregated for the Command to provide the overall munitions readiness of the Command. The aggregation of munitions information may allow the Command to determine the number and type of munitions that are stored in all of the units within the Command.

The military RFID tag 2114 may also be used to track the movement of munitions into and out of the munitions warehouse. For example, as new munitions are stored in the warehouse, the military RFID tag 2114 may be read and added to the inventory of the warehouse. Similarly, when munitions are removed from the warehouse, the munitions information may be removed from the warehouse. Additionally, the personnel removing the munitions may also have a military RFID tag 2114 that may identify the personnel. As the munitions are checked out of the warehouse, the personnel identification may also be read to create a history record of the munitions movements and the personnel that moved the munitions. Furthermore, when certain munitions are added to the inventory of another warehouse (e.g. a field munitions storage), the munitions military RFID tag 2114 may be read and the munitions information added to the other warehouse.

During the movements of the munitions from one warehouse to another, the munitions information may be read by a reader 140 and stored to the network 152 allowing for aggregation, searching, sorting, or the like of the munitions information from remote locations. Additionally, as the reader 140 reads the movement information, the movement information may be stored onto the munitions military RFID tag 2114. Therefore the munitions military RFID tag 2114 may contain the entire distribution history that may be read by a reader 140 within a warehouse, a portable reader, or the like.

Using the smart self inventory within the warehouse and the tracking of munitions being added and removed from the warehouse, automatic munitions ordering may be implemented based on preset inventory level requirements. For example, when munitions are removed from a central warehouse and dispersed to smaller field warehouses, the automatic inventory levels determined by the military RFID tag 2114 information may initiate an order for replacement munitions.

As an additional aspect of the munitions inventory, the munitions military RFID tag 2114 may be read as it is moved within the munitions distribution system. There may be checkpoints along the distribution system such as at airports, at rail stations, at trucking stations, on loading docks, on transports (e.g. aircraft, trains, trucks), and the like. In this manner, the munitions may be tracked from the starting point of the distribution system until it is received at the final destination. Using readers 140 that are associated with the network 152, a remote site may be able track the munitions throughout the entire distribution system. In an embodiment, the remote site may be provided with an alert when the munitions do not move within the distribution system in a predictable manner.

The DoD may require a significant amount of food 2704 to supply all the military personnel within its responsibility. The military food 2704, similar to retail or commercial food, may require inventory tracking, distribution tracking, shelf life determination, and the like. Military RFID tags 2114 of the systems and methods described herein may be used to track inventories, distribution, freshness, and the like by storing information about the product to which it is associated. The increased memory in a multi RF network node 104 military RFID tag 2114 may allow for storing information about the type of food 2704, the amount of food 2704, the original supplier of the food 2704, the time on the shelf, the environment in which the food 2704 has been stored, and the like. This information may be stored in public memory, private memory, encrypted memory, or the like. The increased memory of the military RFID tag 2114 of the systems and methods described herein may allow for redundant memory for foods that may be stored in harsh environments such as hot dry environments, wet environments, cold environments, and the like. The redundant memory may allow for damage to the military RFID tag 2114 that still provide memory storage and functionality.

Using the information stored on the military RFID tag 2114, the military warehouses and stores could utilize smart shelf inventory for food. Using the military RFID tag 2114 associated to the food and at least one reader 140 within a warehouse, the food may be inventoried rapidly. The read or series of reads may be able to determine the amount of all the food within the warehouse, the amount of certain food within a warehouse, the age of the food, expiration dates of the food, and the like. This type of smart shelf inventory may be used in large base warehouses and smaller field stores to allow for rapid food supply determination. With this RFID tag 102 technology, the inventory of food in many widely separated warehouses may be determined within a short period of time. For example, an entire Command may inventory the food in a plurality of food warehouses by reading the military RFID tags 2114 associated with the food. The military RFID tag 2114 readers 140 may be associated with a network as, described herein, to allow a remote site to initiate a read of information and receive information for the food inventory. The munitions information may then be aggregated for the Command to provide the overall food readiness of the Command. The aggregation of food information may allow the Command to determine the amount and type of food that are stored in all of the units within the Command.

The military RFID tag 2114 may also be used to track the movement of food into and out of the food warehouse. For example, as new food is stored in the warehouse, the military RFID tag 2114 may be read and added to the inventory of the warehouse. Similarly, when food is removed from the warehouse, the food information may be removed from the warehouse. Additionally, the personnel removing the food may also have a military RFID tag 2114 that may identify the personnel. As the food is checked out of the warehouse, the personnel identification may also be read to create a history record of the food movements and the personnel that moved the food. Furthermore, when the food is added to the inventory of another warehouse (e.g. a field food storage), the food military RFID tag 2114 may be read and the food information added to the other warehouse.

During the movements of the food from one warehouse to another, the food information may be read by a reader 140 and stored to the network 152 allowing for aggregation, searching, sorting, or the like of the food information from remote locations. Additionally, as the reader 140 reads the movement information, the movement information may be stored onto the food military RFID tag 2114. Therefore the food military RFID tag 2114 may contain the entire distribution history that may be read by a reader 140 within a warehouse, a portable reader, or the like.

Using the smart self inventory within the warehouse and the tracking of food being added and removed from the warehouse, automatic food ordering may be implemented based on preset inventory level requirements. For example, when food is removed from a central warehouse and dispersed to smaller field warehouses, the automatic inventory levels determined by the military RFID tag 2114 information may initiate an order for replacement food.

As an additional aspect of the food inventory, the food military RFID tag 2114 may be read as it is moved within the food distribution system. There may be checkpoints along the distribution system such as at airports, at rail stations, at trucking stations, on loading docks, on transports (e.g. aircraft, trains, trucks), and the like. In this manner, the food may be tracked from the starting point of the distribution system until it is received at the final destination. Using readers 140 that are associated with the network 152, a remote site may be able track the food throughout the entire distribution system. In an embodiment, the remote site may be provided with an alert when the food does not move within the distribution system in a predictable manner.

In another aspect of inventory and movement of food associated with military RFID tags 2114 may be the availability of food within the DoD. For example, by reading the military RFID tag 2114 information within food warehouses, the DoD may be able to aggregate a "snap shot" of food information within the warehouse and distribution system. The snap shot may provide the ability to determine the amount and type of food that may be stored in which warehouses and/or within the distribution system. For example, if one branch of the DoD requires a certain type of meals ready to eat (MRE), the DoD may be able to determine the supply and location of the required MRE and determine if the MRE can be distributed to the requiring branch or if additional MREs need to be ordered.

As described herein, the food military RFID tag 2114 may be associated with at least one sensor 138A, the sensor 138A may measure temperature, humidity, acceleration, and the like and provide the measured information to the military RFID tag 2114. In an embodiment, during a read of the military RFID tag 2114, the military RFID tag 2114 may read the information from the sensor 138A. The sensor 138A information may be stored on the military RFID tag 2114, transmitted to the reader 140, stored on the military RFID tag 2114 and transmitted to the reader 140, or the like. The sensor information may provide a storage history of the food and may be used to indicate the shelf life of the food.

For example, perishable foods such as fruits and vegetables may have a limited shelf life if stored at elevated temperatures. The military RFID tag 2114 associated with the food may have a temperature sensor 138A that may provide a temperature history of the food that may be used to determine the freshness of the food. In this manner, the shelf life of military food may be determined from a remote location by requesting a read of the food military RFID tag 2114. In an embodiment, the foods self life may be calculated on the military RFID tag 2114, calculated at a remote location after the read, calculated by both the military RFID tag 2114 and the remote location, or the like. In an embodiment, the sensor 138A may be self powered and able to read temperatures continuously; the sensor 138A may be able to store some or all of the temperature information. When the military RFID tag 2114 is read, the military RFID tag 2114 may read the instantaneous temperature information, the temperature history information, or a combination of the instantaneous and historical information.

In another example, the environment in which it is stored may affect even long life, or non-perishable foods. The MRE may be considered a long shelf life product but may be affected by very hot temperatures or very wet environments. In an embodiment, the MRE may have a military RFID tag 2114 that tracks the temperature, humidity, and the like using sensors 138. The MRE military RFID tag 2114 may be able to read the sensors 138 and calculate the affect the environment may have on the MRE. A portable reader 140 may be used to read the expiration date of the MRE as it is being distributed to verify the freshness of the MRE. For example, if the MRE is stored in the desert for a long period of time, the shelf life may be reduced. The sensor on the military RFID tag 2114 may continuously read the environment and store the environment information to the MRE military RFID tag 2114 during each read. With each read, the military RFID tag may calculate the new expiration date of the MRE. The new expiration date may be read at the distribution point before being issued to the military personnel.

The military RFID tag 2114 may be associated with military identification and may store and communicate military RFID tag 2114 information related to the military tracking 2708. The military RFID tag 2114 may be connected to a network that may be a wireless connection, a wired connection, or the like. The network may be a LAN, a WAN, a peer-to-peer network, an intranet, an Internet, or the like. The network connection may allow the military RFID tag 2114 to transmit information related to personnel identification to a military network for tracking 2708, aggregation, reporting, or the like.

The military information may be related to military security where the information may provide the tracking 2708 of military personnel. The military information may be the location of military personnel within a camp, within a military building, or the like. The military personnel location may be automatically recorded on the military RFID tag 2114 at a checkpoint, at a building, or the like. For example, the military personnel location may be tracked 2708 within a base. The military personnel ingress and egress may be recorded on the military RFID tag 2114 that may be carried by the military personnel. The military personnel location may be tracked 2708 at a checkpoint where the military personnel ingress and egress are recorded on the military RFID tag 2708.

The military RFID tag 2114 may be associated with a military vehicle and may store and communicate military RFID tag 2114 information related to the military vehicle tracking 2712. The military RFID tag 2114 may be connected to a network that may be a wireless connection, a wired connection, or the like. The network may be a LAN, a WAN, a peer-to-peer network, an intranet, an Internet, or the like. The network connection may allow the military RFID tag 2114 to transmit information related to vehicle identification to a military network for vehicle tracking 2712, aggregation, reporting, or the like.

The information may be related to a type of the military vehicle. The information may be related to a location of the military vehicle; the military vehicle location may be tracked 2712 within a base, at a checkpoint, or the like. The information may include information about the driver of the military vehicle, the contents of the military vehicle, and the like.

The military vehicle information may be related to maintenance 2718 of the military vehicle. The military vehicle maintenance 2718 information may be a type of vehicle, a make of the vehicle, an owner of the vehicle, a last maintenance date, a last maintenance type performed, a next maintenance date, a next type of maintenance required, a maintenance history of the vehicle, or the like. The military vehicle maintenance information may be read while the vehicle is within a maintenance facility, at a checkpoint, within a base, within a camp, while the vehicle is moving, while the vehicle is stationary, or the like to determine if the military vehicle is in need of maintenance 2718.

The military RFID tag 2114 may communicate with a vehicle communication network to receive maintenance information from the military vehicle. For example the received maintenance 2718 information may be lubricant information, a fault indicator, a tire pressure, a part identification associated with the received maintenance information, or the like.

The military RFID tag 2114 may be associated with military personnel and store and communicate military RFID tag 2114 information related to military personnel casualty 2720 information. The military RFID tag 2114 may be connected to a network that may be a wireless connection, a wired connection, or the like. The network may be a LAN, a WAN, a peer-to-peer network, an intranet, an Internet, or the like. The network connection may allow the military RFID tag 2114 to transmit information related to military casualty tracking 2720 to a military network for rapid identification of information related to the medical history of the military personnel.

The casualty tracking 2720 information may relate to the military personnel information that may include a personal identification, a blood type, a military unit, a religious affiliation, allergy information, a medical history, or the like. In an embodiment, as the military personnel are treated, new medical history may be written to the casualty tracking 2720 information on the military RFID tag 2114. The personnel information may include location history information of the military personnel that may aid in the diagnosis of the military personnel, the location history may include the last movements of the military personnel prior to any injury. The RFID tag may provide an automatic identification of the military casualty information, or the information may be read manually using a portable reader 140.

Figure 28:
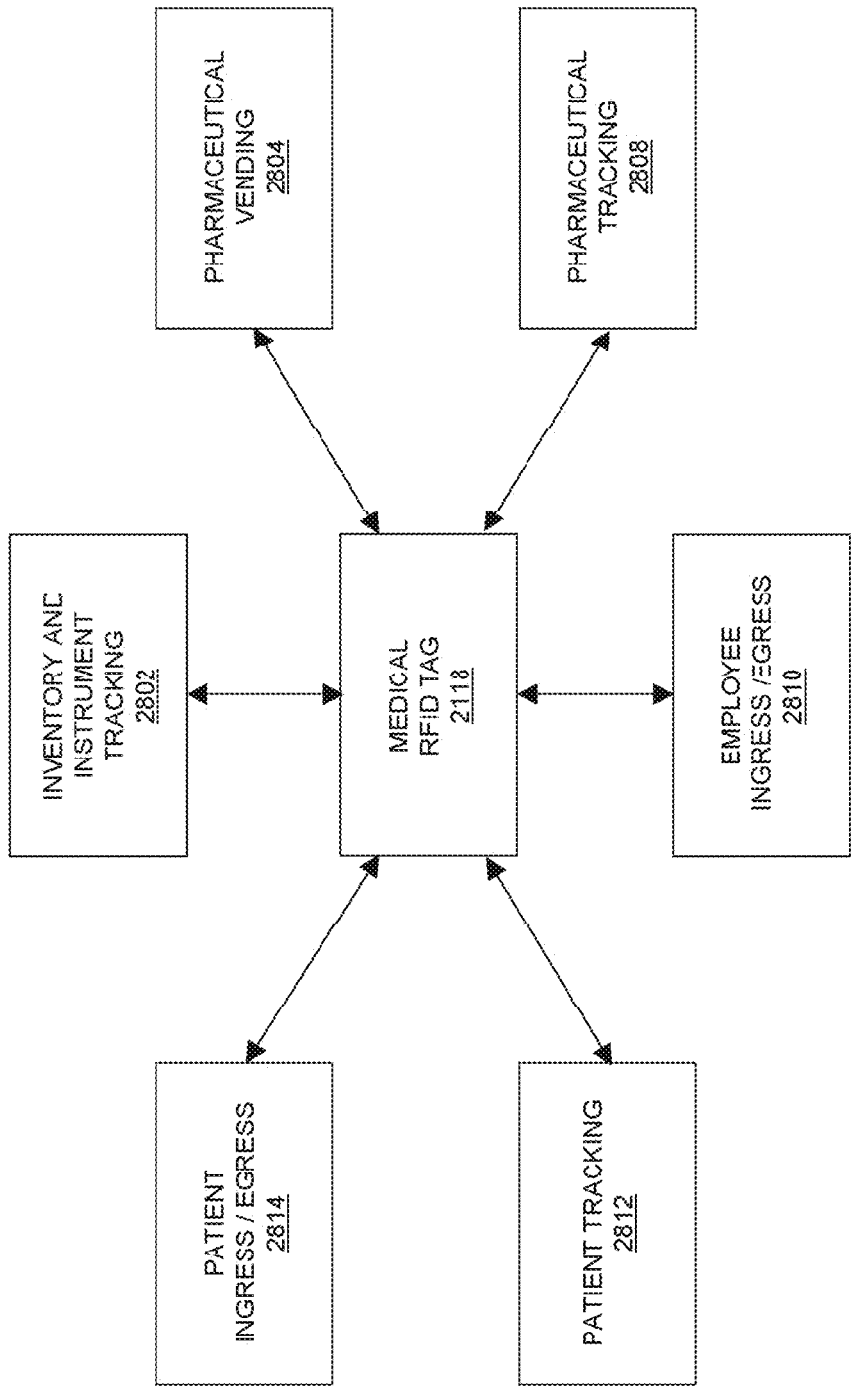
FIG. 28 shows a range of applications enabled by an RFID tag system in a medical environment.

Referring to FIG. 28, a market example may be the medical field, where information may be tracked for monitoring inventories of drugs, medical products and the like within health care facilities, for tracking the distribution and/or maintenance of medical products, for monitoring the deployment and status of medical devices, for tracking the progress of patients within diagnostic or therapeutic protocols, for providing security within health care facilities, for allocating material resources or personnel within a health care facility or system, and the like.

The medical industry presently is a diverse one, with a number of needs for information tracking. Medical supplies, including devices and pharmaceutical products, are distributed from manufacturer through a distribution chain to end-user. Being able to track a product's status and location is crucial in the event of a recall, or if resource allocation becomes problematic, as in times of widespread health care emergencies. It is advantageous, therefore, to be able to follow a shipment unit, for example to locate it for recall, to match scarce supplies with demands, and the like.

Moreover, while the medical industry may presently collect and store information on hardcopy or internal data stores, the hardcopy or data stores may not follow a pharmaceutical product, a device component or a medical system throughout the life cycle, so that it is difficult to verify the history of the product or component at the point of use. For medical devices in particular, the life cycle may be prolonged and may take place under variable conditions where a durable recording device with memory capabilities to maintain the life cycle information would be desirable. This is of particular importance for medical applications, where component failure may have catastrophic implications for patient care.

Furthermore, as patient care becomes more complex, it may be desirable to permit tracking an individual patient as he or she moves through a diagnostic or therapeutic treatment protocol. A tracking system may permit data to be gathered at a central location about patient status to give care providers a unified view of the progress that a patient has made in accomplishing the steps of a treatment plan. For example, a patient's progress can be monitored as he obtains each of a series of diagnostic tests, so that the care provider can be sure that all necessary information has been obtained and is obtained in the proper sequence. The tracking information may be part of an electronic medical record that the patient carries from test site to test site, or it may be imbedded in an electronic hospital bracelet, or the like, so that the patient's progress through a sequence of tests may be determined by interrogating the electronic medical record or electronic hospital bracelet.

In addition, tracking information can monitor the physical location of a patient or a hospital employee. This can answer staff questions about where a patient may be within the hospital, or where a particular service provider may be. Tracking information may also be incorporated into a larger-scale surveillance system, so that the location of critical personnel within the facility may be determined, for example in case of an emergency. Information about patients or personnel may be carried on an electronic hospital bracelet or an electronic employee ID card or the like. Such information may be combined with credentials that allow or forbid access to certain areas of the hospital. An electronic employee ID card, for example, may permit a pharmacist to enter a pharmacy storage room but may prevent an EKG technician from entering the same area. Tracking information may also identify which employees enter which areas, and how many times. Temporary access cards may allow non-employees such as visitors or vendors to enter certain areas, while barring them from others. Such information may enhance security in a health care facility, or may identify potential security risks. On a system-wide scale, such information may assist in locating medical and ancillary personnel, for example during emergencies.

With reference to FIG. 28, a medical RFID tag 2118 may be used for instrument and inventory tracking 2802. The RFID tag 2118 may be affixed to medical equipment or instruments to permit monitoring their status. Life cycle information may be recorded for an apparatus or a component thereof, including such information as when a component was produced, when the component was maintained, when the component is in service, amount of time in service, number of duty cycles, quality checks, information about of the enterprise providing the component or service, and the like. The information may relate to safety, component traceability, service tracking, maintenance, life cycle management, quality, part identification and the like.

In an embodiment, safety information borne on the medical RFID tag 2118 may be related to electrical grounding, physical integrity, proper fitting of components, sterility, indications and contraindications for use, and the like. Safety information may be stored on the medical RFID 2118 to document safety testing, maintenance schedules, or updates. In an embodiment, using medical RFID tags 2118, each component may be safety checked before a medical instrument is used, or at regular intervals, or after a set number of uses, or the like, to verify the conformity of the component or set of components to safety protocols. The medical RFID tag 2118 may contain the memory requirements to store all the safety requirement of the component for the life cycle of the component.

In an embodiment, the medical RFID tag 2118 may be related to component traceability. Traceability information permits a component to be tracked throughout its lifecycle, allowing monitoring of the repair history, component utilization, component malfunctions, and the like. Traceability information may also permit the component to be located physically in the event of a component recall. Tracking a component within an assembly of components may permit evaluation of each individual element of a larger unit, so that potential problems may be anticipated and pinpointed. During the life cycle of a component many actions such as repairs, component upgrades, reassemblies, or the like may be performed on the component or assembly of components. The medical RFID tag 2118 may record information once the action has been completed, providing a history of the actions performed on the component.

In embodiments, the information recorded on a medical RFID tag 2118 may provide for traceability of the actions back to a time, an enterprise, a repair, an assembly, or the like if there is a question of the component's safety or efficacy. For example, a particular instrument may require certain maintenance to preserve its safe functionality. As an example, an anesthesia machine for delivering inhalable anesthetics may require routine maintenance and inspection of a number of its parts, including supply hoses, valves, fittings, waste gas scavengers, vaporizers, carbon dioxide absorbers and the like. A medical RFID tag 2118 may document proper maintenance and/or calibration of each crucial component. As another example, a medical RFID tag 2118 may document that a surgical instrument has undergone proper cleaning and sterilization.

In an embodiment, service tracking may be recorded on the medical RFID tag 2118 to track the actual usage information of a component, such as the number of uses for a particular component, the patients for whom the component was used, the service for the component or the like. Some medical components may have requirements for inspections based on the number of patients or patient/hours for which the component has been used. In an embodiment, the medical RFID tag 2118 may be associated with a sensor to record parameters that may be indicative of a particular use, such as temperature, pressure, component stress, chemical composition, or the like. Using the sensor, the medical RFID tag 2118 may automatically record the characteristics to which a particular component is exposed.

In an embodiment, component maintenance may be recorded on the medical RFID tag 2118 to track maintenance information about the component such as the type of repair, the repair technician, the repair dates, the repair enterprise, or the like. In an embodiment, as the component undergoes has maintenance (e.g. repair, upgrade), the maintenance information may be recorded to the medical RFID tag 2118 to provide a maintenance history of the component. In an embodiment, the maintenance history may be read from the medical RFID tag 2118 any time during the component's life cycle. For example, there may be a question of the type of maintenance performed on a class of components and an enterprise may be able to query all of the pertinent medical RFID tags 2118 to determine if the components have undergone proper maintenance. This capability may provide the enterprise a rapid method of component verification to quickly resolve a question of device safety.

In an embodiment, information may be recorded on the medical RFID tag 2118 to track quality related information such as inspection dates, patient use tracking, component configuration, material information, supplier information, or the like. This information may be used in the quality confirmation of a component, used in defect root cause analysis, verification of a proper assembly, comparing the components actual life cycle information with manufacturer requirements, or the like. In an embodiment, quality control personnel may be able to read the component quality information for a medical instrument or piece of equipment before its use in a patient, to verify that all of the components with appropriate medical RFID tags 2118 are properly maintained and/or properly functioning. Additionally, a health care facility may be able to perform a rapid quality check of all their equipment bearing a particular component in response to a supplier notification, FDA notification, risk management alert, or the like by reading all the relevant medical RFID tags 2118.

In embodiments, medical RFID tags 2118 may provide information about the physical location of equipment and supplies within a facility. A medical RFID tag 2118 may transmit a signal indicating the position of the equipment within the facility, indicating its availability for use, and the like. Such information may assist a facility manager in determining what resources are available (e.g., how many unused ventilators are on hand) and where the resources may be located at any particular time (e.g., where the ventilators may be found in the hospital). In addition, the medical RFID tag 2118 may allow components within the facility to be readily located, for example if routine maintenance is due, or if a product or component has been recalled, or if a mechanical problem has been found in a component such that all like components may need to be checked.

In embodiments, medical RFID tags 2118 may facilitate managing inventories of medical supplies, medical kits, medical instruments, and the like. A medical RFID tag 2118 may allow an inventory system to track the number of a particular item that is on hand, and may also allow the tracking of the usage pattern for the item. Raw usage data may then be associated with other data pertaining to patterns of hospital admissions, diagnostic or therapeutic patterns, demographics, and the like. In addition, usage of one item may be associated with usage of other supplies, kits, instruments and the like. By accumulating and organizing such information, a health care system may make predictions about the inventory that it needs to maintain. For example, by monitoring the medical RFID tags 2118 associated with medical supplies, a health care system may determine that use of bandages, IV setups, suture materials and surgical instrument kits all rise and fall together, correlated with the number of trauma patients seen in the emergency room. The emergency room may see an increase in trauma patients on weekend nights, on holidays, and in association with certain sporting and entertainment events. A health care facility may then organize its inventory to match its anticipated needs.

In embodiments, a medical RFID tag 2118 associated with medical supplies may permit a "smart shelf" functionality, permitting the use of supplies to be monitored and optionally correlated with usage patterns, and further permitting efficient ordering and stocking of supplies in a timely manner to avoid overstocking and to avoid shortages. The medical RFID tag 2118 may contain information about expiration dates associated with medical supplies so that supplies may be made available for use before the expiration date, and so that supplies whose expiration dates have passed are readily identified for discard.

In embodiments, a medical RFID tag 2118 associated with may be associated with kits containing individual pieces of equipment used for medical or surgical interventions. The medical RFID tag 2118 may permit tracking of the components in kits (e.g., stents, catheters, implants, implantable devices and components thereof), as well as tracking of the kits themselves. The medical RFID tag 2118 may permit the location of components within kits, for emergency purposes, for maintenance or for recalls.

In an embodiment, identifying information may be recorded on the medical RFID tag 2118, to include for example the OEM information, repair enterprise information, component number, serial number, component revision level, or the like. This information may be applied as the component is produced, revised, repaired, or the like to provide a traceable history of the manufacture of the component. The identifying information may become the base information to allow the component to be tracked though out the component's operational life cycle.

In an embodiment, the storing of information for the above capabilities may be implemented using different memory configurations such as public memory, private memory, encrypted memory, read/write memory, write once/read many memory, read only memory, or the like. For example, the medical RFID tag 2118 may have information that should not be changed such as component number and serial number, therefore the some or all of the component's identifying information may be stored in write once/read many memory. This would allow the OEM to write the component identifying information but not allow anyone else to change this information. In another example, there may be enterprise only information that may be stored using encryption memory so only the enterprise may read the information. For example, a medical RFID tag 2118 worn or carried by a patient may contain medical record information that is encrypted to be read only by properly authorized health care personnel, so as to protect patient privacy.

As previously described, a medical RFID tag 2118 providing the above information capabilities may include such features as RFID node chip redundancy, distributed memory, environmental capability, capability of reading external sensor information, or the like. In an embodiment, these capabilities may be used individually or in combination. The medical RFID tag 2118 may further have two or more RFID node chips that provide redundancy, increased memory, environmental resistance, and external sensor reading. In an embodiment, the RFID node chip redundancy may be provided by at least one RFID node chip redundant to at least one other RFID node chip on the medical RFID tag 2118. The redundancy of the RFID node chips may allow the medical RFID tag 2118 to continue to provide functionality even if one or more of the individual RFID note chip become damaged. For example, a medical RFID tag 2118 containing four RFID node chips may continue to read and write information even if one of the RFID node chips was to become damaged and stop functioning. In an embodiment, at least one of the remaining three RFID node chips may assume the function of the damaged RFID node chip so the medical RFID tag 2118 may continue to store and transmit information.

In embodiments, a medical RFID tag 2118 may be implanted within a patient in association with an implantable medical device. Such an implantable medical RFID tag 2118 may be integrated with the medical device in such a way as to be biocompatible. For example, the medical RFID tag 2118 may be imbedded beneath the surface of the implanted medical device, or it may be covered with a biocompatible material. A medical RFID tag 2118 that is implanted may carry out the same functions as a medical RFID tag 2118 that is associated with a medical device or component thereof used externally. For example, the implanted medical RFID tag 2118 may permit tracking of the device or a component thereof. As another example, the medical RFID tag 2118 may be associated with sensors that record parameters indicating the environmental or physiological conditions to which the sensor is exposed. The medical RFID tag 2118 may record the parameters to document device performance. The medical RFID tag 2118 may also transmit a signal in the event that the sensor indicates an environmental or physiological condition outside an acceptable range. A sensor incorporated in a vascular graft, for example, may identify a blood pressure outside the normal range. An associated medical RFID tag 2118 may then provide a signal to a monitoring system that indicates the abnormal parameter. A sensor incorporated in an implanted insulin pump, for example, may identify an abnormally high or low blood glucose level. An associated medical RFID tag 2118 may then provide a signal to a monitoring system, or alternatively may signal the pump itself to alter its insulin dose. A sensor incorporated in a heart valve, for example, may monitor each valve cycle and transmit this information to the medical RFID tag 2118, which in turn may record the number of valve cycles, or record the stresses placed on valve components, or transmit signals corresponding to such information to monitoring systems. The exposure of the valve to stresses imposed by the cardiac cycle may then be monitored, and abnormal stresses or stress responses may be signaled.

If dimensionally adapted to the size and shape of a particular medical device, the medical RFID tag 2118 may be attached thereto or incorporated therein. In other embodiments, the medical RFID tag 2118 may be implanted at the same time as a medical device, to receive signals from sensors or to carry information regarding the device itself or its use. For example, a medical RFID tag 2118 may be implanted subcutaneously at the same time that a heart valve, vascular graft, infusion pump, or the like, is implanted at the appropriate anatomic location. A medical RFID tag 2118 associated with an implanted medical device may also be wearable or portable by the patient, e.g., as an electronic medical identification card, band or medical alert bracelet.

A medical RFID tag 2118 associated with a medical device may receive information from sensors may use a wireless interface or may be hardwire-connected to the sensors, as the anatomic placement position permits. Additionally, the medical RFID tag 2118 may be able to communicate with more than one sensor using either a wired or wireless connection. In an embodiment, a medical RFID tag 2118 may network a number of sensors together to collect and save the sensor information. A networking interface may be a separate device from the medical RFID tag 2118, or may be part of the medical RFID tag 2118, or a combination of separate and integrated, or the like. Sensors may be associated with an implantable medical device, as described above. Sensors may also be associated with a wide range of non-implantable medical devices and pieces of apparatus, as would be understood by those of skill in the art.

In embodiments, a medical RFID tag 2118 may be powered by ambient electromagnetic waves, by a reader signal, by an electromagnet signal device, or the like. In an embodiment, the medical RFID tag 2118 may read the associated sensors during power-up. For example, the medical RFID tag 2118 may power up every time that a piece of equipment (e.g., a ventilator or an anesthesia machine) is turned on. During the power-up, the medical RFID tag 2118 may read the data from the associated sensors. In another example, there may be a signal generator that powers up the medical RFID tag 2118 on a periodic basis to read the associated sensors and record the readings. A signal generator may be associated with the power supply for the device, for example, the battery pack for a pacemaker or an implantable defibrillator. In an embodiment, a powered sensor may be powered by an external source to provide a constant power supply, so that the sensor may continuously measure and provide data to the medical RFID tag 2118. A powered sensor may be powered by battery, by AC, by DC, by solar power, or the like. In an embodiment, a powered sensor may be powered by the same supply that the medical RFID tag 2118 uses. It may be understood by someone knowledgeable in the art that different types of sensors would be useful in different medical contexts, and that a variety of medical RFID tags 2118 may be employed in association with such sensors.

Referring to FIG. 28, a medical RFID tag 2118 may be used to facilitate pharmaceutical product tracking 2808 in ways similar to the medical supplies, devices and instruments tracking 2802 functionalities described above. A container for a pharmaceutical product, for example, may bear a medical RFID tag 2118 with information about the drug, its lot number, its production history, and the like. In addition, a container for a pharmaceutical product may bear a medical RFID tag 2118 with medical information associated with the product, for example its dosage, its indications and contraindications, its interactions with other drugs, and the like. The medical RFID tag 2118 may permit tracking of the physical location of a pharmaceutical product within an enterprise or within a distribution network. Such tracking becomes useful, for example, if a certain lot number of the product needs to be recalled.

Referring to FIG. 28, a medical RFID tag 2118 may be used to manage and streamline pharmaceutical supply inventory and vending 2804 in ways similar to the medical supplies, devices, and instrument inventory management described above. The medical RFID tag 2118 may allow monitoring of available supplies of a pharmaceutical product. Such monitoring may be integrated with systems for ordering pharmaceutical supplies, so that appropriate amounts of the product will be on hand as needed for patient care, without overstock or undersupply. As described above, an ordering system may be associated with a usage pattern recognition system, so that pharmaceutical products that tend to be used together may be ordered in relation to each other. For example, if the usage of coumadin is noted to vary with the incidence of elective orthopedic procedures in patients over forty-five, an ordering system may use the schedule for such procedures as a factor in ordering appropriate amounts of coumadin. Medical RFID tags 2118 for pharmaceutical products may comprise part of a "smart shelf" ordering protocol, whereby inventory is tracked, use is monitored and predicted, and appropriate orders are placed.

In embodiments, a medical RFID tag 2118 associated with a pharmaceutical product may interface with a medical RFID tag 2118 associated with an individual patient. In embodiments, a patient-based medical RFID tag 2118 may bear information about a patient's medical condition, may contain data from the patient's medical record, and the like. Prescription data may be input into the patient-based medical RFID tag 2118. As one example, a pharmaceutical product medical RFID tag 2118 may be designed to query the patient-based RFID to ensure a match between the product, for example, and the patient's prescription information. As another example, the pharmaceutical product medical RFID tag 2118 may be designed to query the patient-based medical RFID tag 2118 to ensure that the indications for the product correspond to the patient's diagnosed conditions. As another example, the pharmaceutical product medical RFID tag 2118 may be designed to query the patient-based medical RFID tag 2118 to ensure that the patient has no recorded allergies or contraindications for the product.

In embodiments, the medical RFID tag 2118 for a pharmaceutical product may durably bear information pertaining to the particular patient who will be receiving it. A prescription for a patient, for example, may be conveyed to a pharmacy, and the medical RFID tag 2118 for the prescribed product may be updated by the pharmacist with information relating to the prescription (e.g., dose, administration schedule, timing with respect to meals, drug interactions, and the like). In embodiments, the information may be read by the patient or by the health care personnel who are monitoring the patient's care. Information from the medical RFID tag 2118 may be downloaded or transmitted, for example, to a handheld device, portable computer, desktop computer, computer network, or other electronic reader device, as would be understood by skilled artisans.

In embodiments, the prescription information from the patient-based medical RFID tag 2118 may interface with a medical RFID tag 2118 or other security system on the product's container to create a "smart pillbox," wherein the container may be opened, for example, only at designated intervals or after the entry of an appropriate security code. Such arrangements may prevent use of the medication by unauthorized users, children, etc., or may be useful with patients who have trouble remembering a dosage schedule or recalling when they last took their medication.

As an alternative to correlating the product medical RFID tag 2118 with a patient-based medical RFID tag 2118, a health care worker administering a medication may access the information on the product medical RFID tag 2118 and correlate it with information from other sources, such as handheld devices, laptop computers, desktop computers, computer networks, hardcopy manuals or textbooks, or the like. The health care worker may have to sign off after the administration of the medication by creating an electronic or hardcopy record, or by inputting the administration accountability information into the product medical RFID tag 2118. In this way, the medical RFID tag 2118 may come to contain information about its own utilization, permitting accountability recording, accumulation of information for patient medical records and enterprise records, and the like.

In embodiments, a medical RFID tag 2118 for a product may acquire and retain information about the particular patient who has used the product, consistent with the requirements of medical privacy, confidentiality and informed consent, so that the product container bearing the medical RFID tag 2118 may provide the pharmaceutical manufacturer with information about the clinical use of the product. This may facilitate acquiring data for clinical studies, such as those required by the FDA. In embodiments, the medical RFID tag 2118 for a product may contain data indicating that the product had been administered to a particular patient. This information may be transmitted to other systems within a health care facility, interfacing for example, with patient billing systems, utilization management systems, automated product ordering systems, or the like. Data carried on a product's medical RFID tag 2118 may be encrypted or otherwise protected so that medical privacy and confidentiality is ensured.

In embodiments, an interlock system may prevent administration of a pharmaceutical product to a patient where the product's and the patient's RFIDs do not match. For example, such an interlock system may prevent the administration of an overdose to a pediatric patient, prevent the administration of a drug to a patient known to be allergic to it, prevent the administration of a drug to a patient with known contraindications or drug interactions, and the like. In embodiments, an interlock system may be imposed at any point in the supply chain for a product, with the product RFID having to match the code for a particular institution, patient care unit, or the like. In this way, inappropriate medications would be detected upon delivery to a particular institution, patient care unit, or the like, minimizing the risk that inappropriate medications would be provided to patients in such settings (e.g., pediatric unit doses would not be accepted when erroneously delivered to a nursing home, or erectile dysfunction products would not be accepted when erroneously delivered to a pediatric floor in a hospital). An interlock system may be absolute, or it may permit override by a medical practitioner. In the event of override, the interlock system may record the identity of the practitioner and the circumstances of the override. A system that requires a match between product and patient information via RFID interaction, and/or a system that provides an interlock in the event of product/patient mismatch, may lead to fewer medication errors and improved risk management.

By integrating pharmaceutical inventory systems and pharmaceutical delivery systems, a medical RFID tag 2118 associated with a pharmaceutical product may permit the tracking of the product from its point of production or delivery throughout its product cycle, to its ultimate administration to the patient. The medical RFID tag 2118 may record the individuals involved at the different stages of the administration process, from the individual who receives the shipment in the facility, to the individual in the pharmacy who receives the bulk shipment, to the pharmacist who distributes the product to the health care personnel, to the individual who administers the product to the patient. A pharmaceutical tracking system 2808 may enhance accountability at every step throughout the distribution chain. In embodiments, a pharmaceutical tracking system 2808 may assist in surveillance for the distribution of controlled substances, which otherwise may be diverted from legitimate uses.

In another embodiment, the pharmaceutical product medical RFID tag 2118 may contain information about that product which is accessible by a medical practitioner. A medical RFID tag 2118 on a pharmaceutical product may act as a "virtual PDR" for the medical practitioner, with information about doses, indications and contraindications, drug interactions and the like. Such information may be downloadable by the practitioner to a handheld device, a portable computer, a desktop computer, a computer network, and the like. The medical RFID tag 2118 on a pharmaceutical product may be updatable with new information as such information becomes available. A pharmaceutical company may provide updates of indications and the like, for example, as such data is accumulated and is approved by the FDA. In this way, the pharmaceutical product itself may bear the most up-to-date information about itself, its doses, indications and contraindications, drug interactions, and the like.

A medical RFID tag 2118 for a pharmaceutical product may be dimensionally adapted for the particular product, its container or its packaging, in such a way as to permit the medical RFID tag 2118 to achieve its goals. For example, a medical RFID tag 2118 may be attached to a cap or a lid of a container in combination with an interlock or usage recording mechanism, the so-called "smart pillbox." As another example, a medical RFID tag 2118 may be associated with the membrane of a product for intravenous injection, so that each withdrawal of the product through the membrane may be recorded on the medical RFID tag 2118, or that each withdrawal of the product would require correlation with a patient's RFID tag and/or accountability tracking. In embodiments, the medical RFID tag 2118 may be associated with a sensor system. A sensor system may comprise one or a plurality of sensors that record information such as twisting of a lid, change in pressure within a container, flow of fluid out of a container, administration of a diluting agent to the container, or the like.

With reference to FIG. 28, a medical RFID tag 2118 may be used for patient tracking 2812. Patient tracking 2812 may involve physical tracking within a health care facility. Patient tracking 2812 may involve monitoring the progress of a patient throughout a protocol, so that a health care worker may determine whether a patient has carried out all the steps of a prescribed diagnostic or therapeutic sequence. In embodiments, patient tracking 2812 via a medical RFID tag 2118 may be associated with the creation of an electronic medical record, aspects of which may be transported with the patient, for example as a hospital bracelet, a medical ID card, a medical alert bracelet, a set of "dogtags," or the like. Medical record information on the medical RFID tag 2118 may then be accessed by health care providers or updated by health care providers, as appropriate.

In embodiments, a medical RFID tag 2118 may permit patient tracking 2812 within a health care institution or health care system. Patient tracking 2812 using a medical RFID tag 2118 may permit a nurse on a hospital floor, for example, to locate a particular patient who has gone off the floor for tests, or a nurse in the operating room to keep track of a trauma patient who is en route from the emergency department. The medical RFID tag 2118 may be associated with sensors within the hospital facility that act as "virtual checkpoints," tracking the patient's physical location as the patient passes the particular sensor. The medical RFID tag 2118 may also interface with check-in stations at different parts of the hospital, so that the patient's medical RFID tag 2118 records her arrival at the XRay department, physical therapy, the EKG lab, and the like. The "virtual checkpoint" or the check-in system, or the like, may permit patient tracking 2812 in association with a patient-based medical RFID tag 2118.

In embodiments, a medical RFID tag 2118 that permits patient tracking 2112 as a patient "checks in" at particular units within a health care system may provide data that other information systems may use. For example, patient tracking 2112 using a medical RFID tag 2118 may allow a patient's presence at a particular unit to be recorded so that an attendance history may be recorded. This may allow the documentation of patient compliance with a treatment regimen, for example, physical therapy, diet counseling, Alcoholics Anonymous, or the like. Patient tracking 2112 as recorded on a medical RFID tag 2118 may be accessible by a variety of patient care personnel, so inpatient and outpatient tests and treatments may be followed. A visiting nurse, for example, may access the tracking information on the medical RFID tag 2118 to determine that the patient has followed the recommended steps for diabetes diagnosis, treatment and lifestyle counseling. As another example, a visiting nurse may be able to determine that an anticoagulated patient has had prothrombin times measured on a regular schedule that are within the proper range. As yet another example, a visiting nurse may be able to determine that a patient has taken her medications on an appropriate schedule, by interrogating the patient-associated medical RFID tag 2118, by interrogating the product-based medical RFID tag 2118 in a patient's home (the "smart pillbox"), or the like.

In embodiments, patient tracking 2812 system may also permit a patient's progress to be followed through a complex sequence of diagnostic and/or therapeutic steps. For example, a diagnostic protocol may require that tests be carried out in a certain sequence, and the patient may be tracked from test to test to ensure that the sequence is followed in the proper order. As an example, a patient being evaluated for breast cancer, for example, may first need a mammogram, then an ultrasound, then a breast Mill, then a mammogram-guided biopsy. As that patient receives each test, her medical RFID tag 2118 may be updated to record that the test was performed, so that she may proceed to the next step. In this way, a patient would not erroneously undergo testing out of order. As another example, a patient tracking 2812 may ensure that a patient undergoing a procedure has accomplished all preliminary diagnostic tests. In this example, a patient's medical RFID tag 2118 may be updated as she has her pre-operative tests to indicate that they had been performed, and this information would be read by operating room personnel before any surgery would be performed. A medical RFID tag 2118 associated with a patient may serve a checklist function, so that the patient cannot advance to a subsequent diagnosis or treatment step until the previous steps have been satisfactorily completed. Individuals performing diagnostic or therapeutic steps or checking the results of such steps may update the patient-associated medical RFID tag 2118 with their identifying data, so that accountability may be maintained for each step.

In embodiments, a satisfactory completion of a diagnostic, therapeutic or pre-procedure sequence may be required before the patient undergoes a particular intervention. The medical RFID tag 2118 may record the satisfactory completion of each step, and may further be associated with an interlock system so that the patient may not undergo the intervention unless the sequence as recorded on the medical RFID tag 2118 is satisfactory. Entry into the operating room, for example, may involve the communication of a patient's medical RFID tag 2118 with an interlock programmed in accordance with the preoperative requirements. In this example, a patient whose medical RFID tag 2118 indicates lack of test results or unsatisfactory test results may be denied physical admission to the operating room. Similarly, progress to the next stage in a diagnostic or therapeutic sequence may be protected by interlock, so that the satisfactory completion of all preceding stages may be required before undergoing the next step in the sequence. A variety of applications combining a medical RFID tag 2118 with an interlock will be apparent to skilled artisans.

In embodiments, medical RFID tags 2118 used for patient tracking 2812 may interface with other error-management systems to decrease the incidence of clinical errors. As an example, a medical RFID tag 2118 may prevent "wrong side" surgery by containing independent information about which side of the patient needs the surgery, or by allowing a patient's position for surgery to be mapped to a protocol for operating on a particular side. A patient undergoing a left lung resection, for example, may require positioning on the operating table with his right side down. A medical RFID tag 2118 containing information about the procedure planned for this patient may communicate with a position sensor affixed to the patient so that a right-side-down position for the left thoracotomy is ensured; with the proper (right) side down, the wrong (right) lung cannot be removed. As another example, a medical RFID tag 2118 containing information about an organ to be removed may need to be "checked off" at several different stages of patient preparation in the operating room (e.g., positioning, prepping, draping) so that all personnel are "reminded" on a number of occasions about which side requires the operation. A reader for the medical RFID tag 2118 may include display means that provide a visual or an audible signal regarding the side for surgery.

A medical RFID tag 2118 may be dimensionally adapted for placement within the body, so that a biocompatible RFID may be implanted during initial procedures to identify tissues or organs for subsequent excision, radiation treatment, etc. A medical RFID tag 2118 may be placed directly during an exploratory procedure or a resection to indicate where post-operative radiation should be directed. A medical RFID tag 2118 may be placed endoscopically in an abnormal organ or tissue to indicate which organ or organ section may require further treatment (e.g., resection, radiation, intraarterial chemotherapy, and the like), thereby enhancing error management. A medical RFID tag 2118 may be placed at the time of a biopsy, for example if a frozen section is abnormal, to designate the location of the tumor for further treatment (e.g., so that the leg with the bone tumor is removed instead of the other leg, or so that the correct region of the body is irradiated to treat a tumor). A medical RFID tag 2118 placed during a first procedure may be used with an interlock system, alert system, display system, or the like, to ensure that a subsequent procedure is directed to the proper organ or anatomic region.

With reference to FIG. 28, a medical RFID tag 2118 may be used to monitor or control patient ingress and egress 2814 and/or ingress and egress of employees 2810 or other personnel. As described above, a medical RFID tag 2118 may allow the tracking 2812 of a patient's physical location. In other embodiments, the medical RFID tag 2118 may permit the monitoring or control of a patient's entry into various areas within the health care facility. In other embodiments, the medical RFID tag 2118 may be useful to monitor or control the ingress or egress of employees from the health care facility or certain areas thereof.

In embodiments, the medical RFID tag 2118 may record the physical location of a patient. A patient-associated medical RFID tag 2118 may record a patient's passage into certain areas or the patient's passage past certain checkpoints. Moreover, a medical RFID tag 2118 may control a patient's entry into or egress from certain areas. Patients, in general, are restricted from certain areas within a health care facility, such as pharmacies, storage areas, clinical areas that are inappropriate, and the like. A medical RFID tag 2118 associated with a patient may prevent access into a prohibited or restricted area, for example by locking the entryway, or by interfacing with an alarm system. A medical RFID tag 2118 may also prevent a patient from leaving the ward in a similar manner, creating a "virtual locked ward."

In embodiments, personnel within a health care facility may be tracked in ways similar to the patient tracking 2812 systems and methods described above. A medical RFID tag 2118 may be used to determine the physical location of health care personnel within a facility, or may be used to follow the path of a particular health care individual. The tracking of personnel may interface with other systems, permitting, for example, system-wide information to be gathered about the whereabouts of particular categories of individuals. In the event of an emergency, for example, it may be useful to know where within the facility the anesthesiologists and respiratory therapists are located. A medical RFID tag 2118 worn by or carried by such individuals may permit their locations within the facility to be identified.

In embodiments, identifying the location of certain personnel within a hospital may be correlated with other features of communication or other systems within a hospital. For example, a selective paging system may page those individuals closest to a particular emergency situation, or may page those individuals whose location indicates that they are most likely to be available. In this example, a medical RFID tag 2118 may show the location of the cardiologist nearest to a cardiac arrest; using that information, the selective paging system may send out an emergency ("STAT") page for that specific cardiologist. Other examples may be readily apparent to those of ordinary skill.

A tracking system for personnel may be correlated with other features of a health care information system, for example to assist with staffing or other personnel management issues. In this example, a medical RFID tag 2118 worn by or carried by nursing personnel may allow each individual to "check in" at the beginning of a shift when he or she reaches the assigned duty station within a hospital or the like. The location of each individual may be mapped onto a personnel chart that shows which duty stations are adequately staffed and which duty stations require additional staffing. Such information may, for example, allow redistribution of available personnel to meet staffing needs, or may allow additional personnel (e.g., off-duty or temporary nurses) to be called upon to meet the staffing needs. As another example, such information may interface with systems to permit adjustment or redistribution of patient admissions, based on personnel numbers and locations of short-staffed areas. For example, information regarding the numbers of nursing staff in a surgical ICU may be collected by medical RFID tags 2118 worn by or carried by nursing personnel and relayed to a control center; the control center may respond to a shortage of nurses in the surgical ICU by recruiting nurses from other hospital areas (medical ICU, recovery room, and the like), by restricting new admissions from other hospital floors, by redistributing patients to other ICUs, by closing the emergency room to new patients, or the like. Other examples may be readily apparent to those of ordinary skill.

In embodiments, a medical RFID tag 2118 may track employee ingress/egress 2810, and/or be used as an adjunct to other security systems. A medical RFID tag 2118 may allow personnel to check into or out of the facility, so that there is a record of who is on-site. Such information may be integrated with other systems in the facility, e.g., communications systems. In such an example, a physician checking into a hospital facility may have a data set about the status of his in-hospital patients downloaded into a handheld device or portable computer after his medical RFID tag 2118 is recognized upon check-in by the hospital information system.

In other embodiments, a medical RFID tag 2118 may be used by an employee to gain access to certain areas within the health care facility. Access regulated by a medical RFID tag 2118 may be organized according to the individual person's identity, the job description, the time of day, or the like. As an example, a pharmacy supervisor may carry or wear a medical RFID tag 2118 providing her access to all areas of the pharmacy, including receiving areas, formulation areas, storage areas and the like. The medical RFID tag 2118 worn or carried by a physical therapist, by contrast, may provide him access to none of these areas. An anesthesia technician may carry or wear a medical RFID tag 2118 granting access only to operating room pharmacy areas, and only during her working hours. The anesthesia technician attempting to use the medical RFID tag 2118 to gain access to an operating room pharmacy area during non-working hours may be denied access; moreover, a record of the access attempt and/or an alarm may be generated. As another example, a specifically encoded medical RFID tag 2118 may be necessary for accessing patient medical records, so that only individuals involved in caring for a particular patient may have access to that patient's medical records.

In other embodiments, a medical RFID tag 2118 may be employed to grant or restrict access for other individuals who are not employed by the health care facility. A vendor, for example, may be provided with a medical RFID tag 2118 that allows him access to an area of the hospital for a specified period of time. In this example, an individual like a medical devices sales representative may use his medical RFID tag 2118 to gain access to the operating suite where he is to demonstrate the use of a particular product. However, the medical RFID tag 2118 issued to this individual may not grant him access to any other area, and may be time-limited, so that his failure to leave the premises and check out by a certain time may, for example, send an alarm to hospital security personnel. As another example, a visitor to a hospital may be issued a medical RFID tag 2118 that allows him or her to enter a specified area of the hospital where he or she will be visiting a patient. The medical RFID tag 2118 may be time-limited, so that the visitor's failure to leave the premises and check out by a certain time may, for example, send an alarm to hospital security personnel. Prior to obtaining a medical RFID tag 2118, the visitor may have to check in with security. Certain individuals (visitors whom the patient does not wish to see, abusive spouses, etc.) may, for example, be placed on a no-visit list and may be denied a medical RFID tag 2118 granting hospital access. Alternatively, a prospective visitor's name may need to be registered on a visitor list before a medical RFID tag 2118 granting hospital access is issued. Other examples may be readily apparent to those of ordinary skill.

Figure 29:
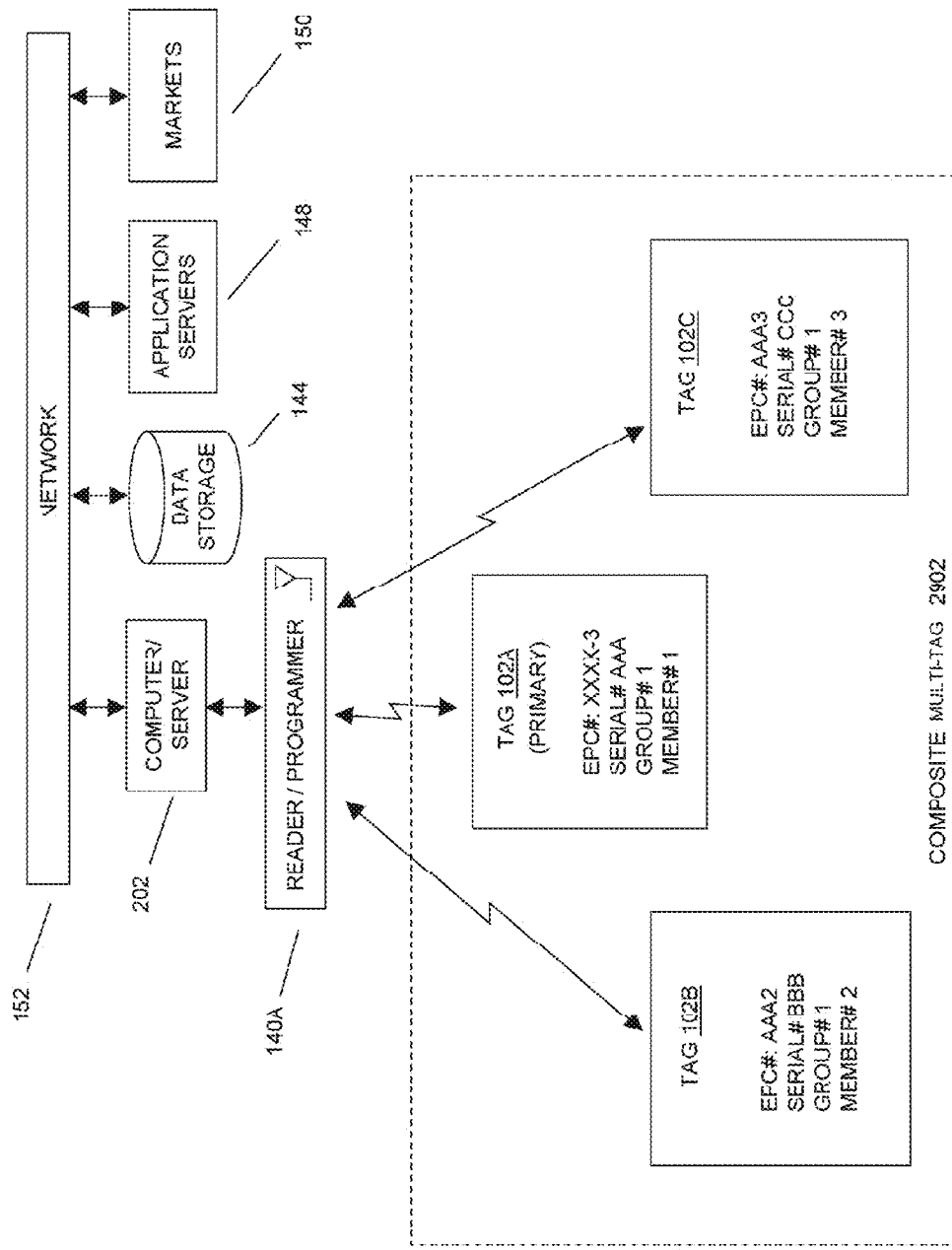
FIG. 29 depicts an embodiment for the programming of a composite multi-tag facility.

In embodiments, a plurality of RFID tags 102 may be programmed such that they operably act as a composite multi-tag 2902, that is, multiple RFID tags 102 may be configured in the system to present such that they are treated as if they were configured as one device. In embodiments, the plurality of RFID tags 102 may be realized as a composite multi-tag 2902 at the physical tag 102 to reader 140 interface level, or at a higher level of abstraction in the system, such as in the reader 140, the computer/server 202, the application servers 148, in markets 150, or the like. For example, and as illustrated in FIG. 29, the composite multi-tag 2902 may be realized at the tag 102 to reader 140 interface by configuring the EPC numbers of the plurality of RFID tags 102A-C so that one RFID tag 102A is identified as the primary, and the remaining of the plurality of RFID tags 102B-C, are identified as secondary. The primary RFID tag 102A may thereafter act as the primary communications point between the composite multi-tag 2902 and the reader 140, the primary RFID tag 102A may provide a group interface to the reader 140, the primary RFID tag 102A may provide a central memory collection point for the plurality of RFID tags 102A-C, the primary RFID tag 102A may provide a central functional coordination point for the plurality of RFID tags 102A-C, and the like. In embodiments, the secondary RFID tags 102B-C, may be communicated through the primary RFID tag 102A, directly with the reader 140, through an RF coupling between RFID tags 102, through a physical connection between RFID tags 102, and the like. In addition, the primary RFID tag 102A may be chosen to be physically capable of longer range communications than the secondary RFID tags 102B-C, and the plurality of RFID tags 102A-C may have different physical memory allocations. In embodiments, due to the connectivity between the plurality of RFID tags 102A-C, secondary RFID tags 102B-C may not need to be configured with an antenna 108.

In embodiments, when memory 3004 is spread across the plurality of RFID tags 102A-C, the system may need to maintain certain associations. For instance, if there is a risk of multiple such RFID tag 102A-C combinations presenting at a reader 140 simultaneously, it may be necessary to maintain a reference or other means of determining which RFID tags 102 are part of which combination. In addition, in order to determine the logical ordering of memory 3004, individual tags 102 within the combination may need to be uniquely identifiable, such that the memory 3004 they contain may be properly mapped. One such means of maintaining grouping and ordering may be to assign one RFID tag 102A as the primary tag 102A, and supplemental tags 102B-C being assigned as secondary tags 102B-C. In embodiments, all to the RFID tags 102A-C may be linked via data in their EPC banks. In embodiments, any functionality spread across multiple devices, including sensor inputs, alerting mechanisms, and the like, may also be abstracted to present as if they were implemented as one device.

Continuing in reference to FIG. 29, an example is presented to show how programming of the RFID tags 102A-C may identify the set of RFID tags 102A-C as a composite multi-tag 2902. This example is meant to be illustrative, and not limiting in any way. One skilled in the art will recognize alternate configurations for establishing the plurality of RFID tags 102A-C such that they act as a composite multi-tag 2902. In this example, one of the RFID tags 102A is chosen as the primary, where the serial number of the primary, in this case 'AAA', may then be used as the start of the EPC number for all the secondary RFID tag 102B-C members of the composite multi-tag 2902. In addition, each of the RFID tag 102A-C members may be assigned a member number, where for instance the primary RFID tag 102A is numbered '1', the next RFID tag 102B is numbered '2', the next RFID tag 102C is numbered '3', and so on for the rest of the plurality of RFID tags 102A-C that make up the composite multi-tag 2902. In embodiments, the primary RFID tag 102A may also have an indication of the number of RFID tags 102A-C that make up the composite multi-tag 2902, such as by an identifier provided after the primary RFID tag's 102A EPC number, in this case the number '3' to indicate that there are three RFID tag 102A-C members making up the composite multi-tag 2902. With this programmed configuration, the reader 140 may determine the configuration and EPC numbers of all RFID tag 102A-C members by reading only the primary RFID tag 102A information. For instance, when the reader 140 extracts the EPC and supplemental number XXXX-3, and the primary RFID tag's 102A serial number AAA, the reader may then be able to derive the EPC numbers for the rest of the RFID tags 102B-C making up the composite multi-tag 2902. That is, from the primary RFID tag's 102A serial number of 'AAA', and the EPC supplemental number of '3', the reader now knows there are a total of three RFID tag 102A-C members, including the primary RFID tag 102A, where the secondary RFID tag 102B-C EPC numbers are 'AAA2' and 'AAA3'. In embodiments, all of the RFID tag 102A-C members may also be provided a group number to identify all the member RFID tags 102A-C within a composite multi-tag 2902, such as a group number of '1' in this example.

In embodiments, the plurality of RFID tags 102 may be realized as a composite multi-tag 2902 at a higher level of abstraction in the system. For example, and referring to FIG. 30, each of the plurality of RFID tags 102A-C may be individually read by the reader 140, where the reader 140 may not be required to immediately recognize that the plurality of RFID tags 102A-C are associated with one another, and where the reader 140 may collect information from the plurality of RFID tags 102 and either processes the collected information to associate the plurality of RFID tags 102 as a composite multi-tag 2902, or send the information on to other components in the system for like processing, such as to the computer/server 202, the data storage 144, the application servers 148, the markets 150, and the like. In embodiments, the processing may be performed through software that associates the plurality of RFID tags 102 to a composite multi-tag 2902. Further, the information collected from the plurality of RFID tags 102 may be associated together as a part of the single composite multi-tag 2902 entity. For instance, the memory collected from the plurality of RFID tags 102A-C may be assembled into a contiguous memory, where thereafter the contiguous memory is associated with the composite multi-tag 2902 rather than the individual RFID tags 102A-C. In embodiments, other RFID tag 102 functions may also be associated with the composite multi-tag 2902, such as processor functions, sensor functions, and the like. In embodiments, associations between RFID tags 102 may be retained off the tag 102, such as in the data storage 144, in a database, by algorithmic processing of data such as with unique Ids encoded with the RFID tags 102, and the like.

Figure 30:
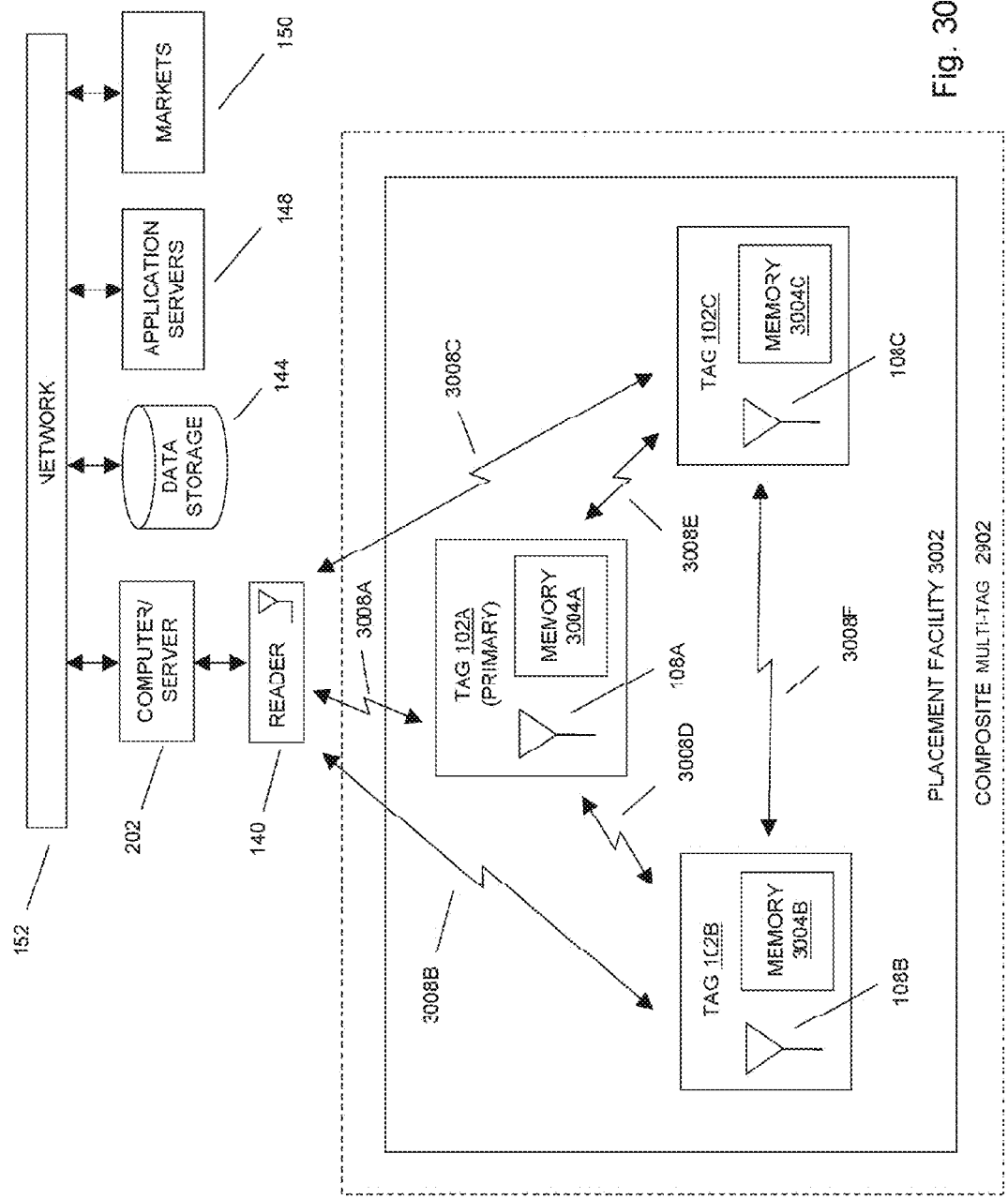
FIG. 30 depicts an embodiment of a composite multi-tag facility.

Referring to FIG. 30, in embodiments the plurality of RFID tags 102A-C comprising the composite multi-tag 2902 may be mounted on a placement facility 3002, where the placement facility 3002 may be a substrate, a silicon wafer, a ceramic platform, a metal surface, a box, a container, a shipping container, and the like, where the plurality of RFID tags 102A-C may be spread out while maintaining their collective identity as a composite multi-tag 2902. In embodiments, the primary RFID tag 102A may be capable of longer range communications 3008A than the secondary RFID tags 102B-C, such as being physically equipped with a larger antenna 108A. As a result, the primary RFID tag 102A may be detected 3008A by the reader 140 at greater distances than the secondary RFID tags 102B-C, which may be equipped with smaller antennas 108B-C. In this way, the primary RFID tag 102A may act as a beacon 3008A to the reader 140 for location of the composite multi-tag 2902 at greater distances than the reader 140 can detect the secondary RFID tags 102B-C. In embodiments, as the reader 140 is brought closer to the composite multi-tag 2902, the reader 140 may be able to directly communicate 3008B-C with the secondary RFID tags 102B-C. In embodiments, a system where the composite multi-tag 2902 is influenced by coupling effects with the tagged item may achieve a performance boost beyond the performance that would be expected in free space.

In embodiments, the RFID tags 102A-C comprising the composite multi-tag 2902 may be able to communicate between themselves 3008D-F, such as through the larger antenna 108A being electrically coupled by close proximity to the smaller antennas 108B-C which may give them the benefit of a larger antenna 108A. This may enable the shorter range tags 102B-C to be read at a greater distance. In embodiments, electrical coupling may use capacitive coupling, inductive coupling, coupling through the tagged product, and the like. In addition, communication between the secondary RFID tags 102B-C and the primary RFID tag 102A may be implemented by direct connection, such as by soldering, adhering, crimping, and the like. In embodiments, there may be more than one long range RFID tag 102A provided on the composite multi-tag 2902 in order to improve the communication between the reader and the composite multi-tag 2902. In embodiments, a system where the composite multi-tag 2902 may combine with a tagged item using capacitive, inductive, direct connection, or other coupling means, may use the tagged item as a primary antenna component for the purposes of communication.

In embodiments, RFID tags 102 may be applied to a spatially diverse object, where the RFID tags 102 may be associated with a substantially identical name plate function, and thus may be used to maximize the probability of detection (e.g. allowable read angles). In this instance, user memory may be distributed across the individual RFID tags 102 by means similar to those described herein.

In embodiments, the RFID tags 102A-C comprising the composite multi-tag 2902 may be able to share RFID tag memory 3004A-C contents as a result of communications 3008D-F between the plurality of RFID tags, communications 3008A-C between the RFID tags 102A-C and the reader 140, and the like. In embodiments, the RFID tags 102A-C may contain different amounts of physical memory 3004A-C. For instance, the secondary RFID tags 102B-C may have a larger allotted physical memory 3004B-C than the primary RFID tag 102A because the secondary RFID tags 102B-C have smaller antennas 108B-C, and so have a larger space available for physical memory 108B-C. In embodiments, the physical memory 3004A-C of the composite multi-tag 2902 may be identified as a continuous virtual memory space to the reader 140, such that the reader 140 does not have to be aware that the composite multi-tag 2902 is made up of separate physical memories 3004A-C, separate physical RFID tags 102A-C, and the like. In embodiments, the distributed larger effective memory may allow for user memory space, provide prototyping larger memories before they are available and allowing the swapping of RFID tags 102A-C when they become available, allowing for error correction in the event of a failure of an RFID tag 102A-C, and the like. In embodiments, the user memory from the plurality of RFID tags 102 may be mapped into a logical addressing space to appear as a single RFID tag 102, such as the composite multi-tag 2902. This mapping may be implemented by software in the reader 140, in the computer/server 202, in the application servers 148, in the markets 150, and the like, or implemented in at least one of the RFID tags 102A-C.

In embodiments, memory configurations may utilize encoding within the RFID tags 102, such as in data written into an EPC bank, into user memory, into configuration memory, into program memory, and the like. In embodiments, a system where additional memory resources, including for example, EPC memory banks (including unused memory beyond an EPC code), password memory, other available memory, and the like, may also be mapped into the logical memory space to appear as user memory. In embodiments, a system where the memory from multiple tags may be mapped into memory arrangements other that one contiguous user bank, such as for example into an extended EPC bank, multiple user banks, and the like.

In embodiments, the composite multi-tag 2902 may include any combination of RFID tag 102 capabilities, such as memory, processing, sensor interfaces, antennas, and the like. In embodiments, the information associated with a composite multi-tag 2902 may be associated with processing, such as with compression algorithms, encryption algorithms, authentication algorithms, encoding algorithms, and the like. The composite multi-tag 2902 may utilize these RFID tag 102 capabilities in serial, parallel, and the like, such as processing on one RFID tag 102B and storing information on a second RFID tag 102C, storing the same information on multiple RFID tags 102, simultaneously using multiple long range RFID tags on the composite multi-tag 2902 to enhance communication characteristics with the reader, and the like. In addition, the composite multi-tag 2902 may contain a mixture of different types of RFID tags 102, such as a combination of custom RFID tags 102 and off-the-shelf RFID tags 102, all custom RFID tags 102, all off-the-shelf RFID tags 102, passive RFID tags 102 and active RFID tags 102, and the like, where custom RFID tags 102 may contain any configuration of nodes, chips, antennas, sensors, processing, memory, and the like, as described herein. In embodiments, a system where memory may be mapped using the techniques across multiple devices in combination with redundant encoding techniques, such that the composite multi-tag 2902 may achieve a level of fault tolerance when one or more devices within it fails or degrades.

In embodiments, a user may be enabled to exchange data with an RFID tag through an RFID drive management facility as a seamless extension of a filing system within a computing device such that the RFID tag and associated RFID tag data may be managed in a manner that is logically consistent with other items within the file system, where the computing device may be a server, desktop computer, laptop computer, smart phone, and the like. The RFID drive management facility may provide for management of the RFID tag, managing the identity of an RFID tag, recognizing the presence of an RFID tag, and the like. For instance, the RFID tag may appear to a computer in a similar way as a file folder or flash drive would appear, where the user is able see that the RFID tag is present, to move data to and from the RFID file system element through drop-and-drag actions, change the identity of the RFID tag, and the like, where the presence of the RFID drive management facility may be transparent to the user. In embodiments, the computing device may have software components to convert data structures between the format of an RFID tag memory and that of a computer file system, such as for the Windows operating system, the Apple operating system, Android operating system, iOS, Windows CE/Mobile, and the like. Although this disclosure refers to RFID tags, one skilled in the art will appreciate that the methods and systems of the present invention may be applied to any short range RF identification system, such as for near field communications (NFC) enabled devices.

Figure 31:
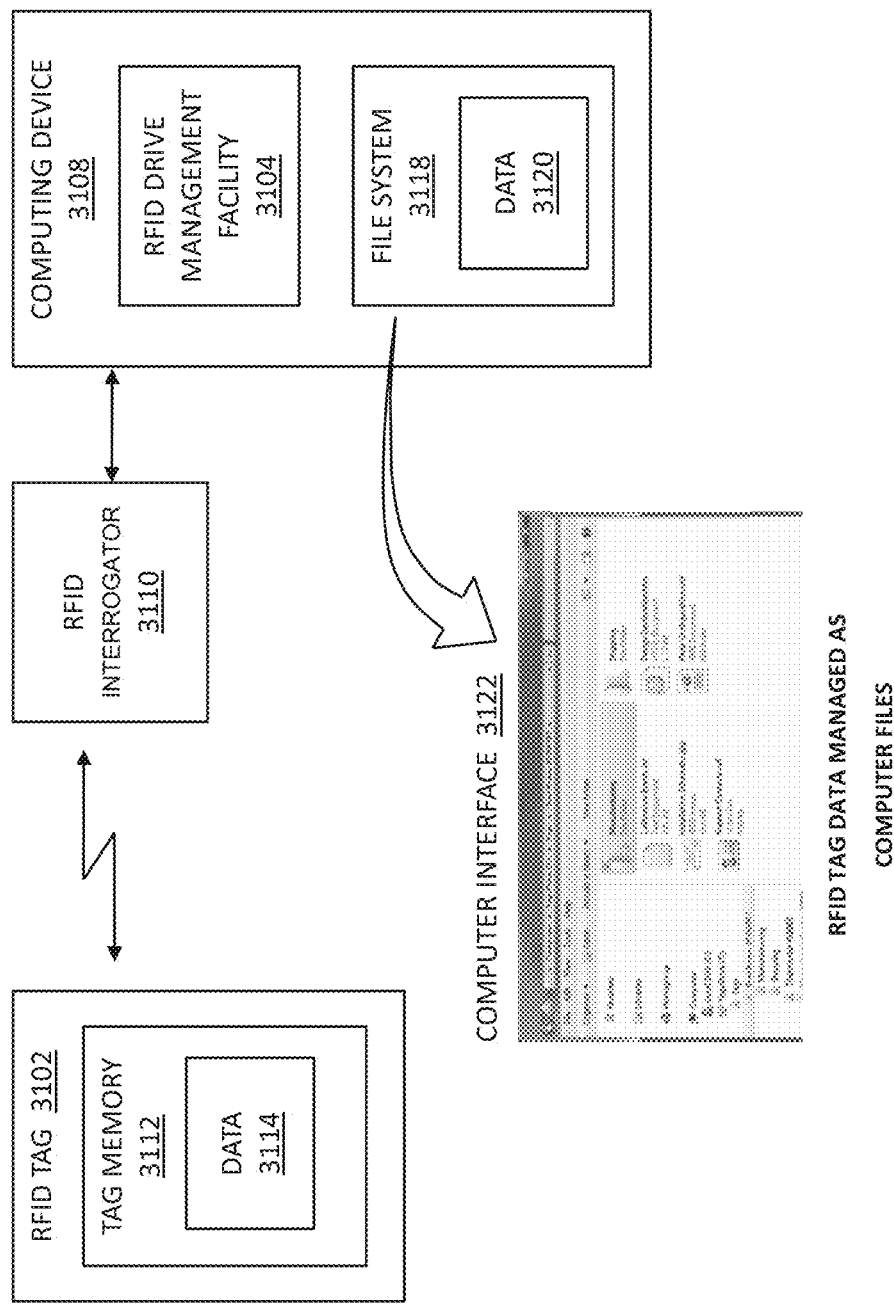
FIG. 31 depicts an embodiment functional block diagram of the RFID drive management facility interfacing with a file system of a computer device.

Referring to FIG. 31, an RFID tag 3102 may be accessed via an RFID drive management facility 3104 resident on a computing device 3108 through an RFID interrogator 3110 (e.g. an RFID reader) connected to, or integrated with the computing device 3108. The RFID drive management system 3104 may provide a means for user and system interaction with an RFID tag 3102, where RFID tag data 3114 stored on the RFID tag's memory 3112 is transferred between the RFID tag memory 3112 and the computing device file system 3118 as data 3120 formatted for display and edit through the computer device's computer interface 3122. The RFID drive management facility may make it much easier to use RFID tags, which may not require special software, consider or implement programming solutions, tag memory layouts, and the like. When the RFID drive management facility is deployed on a computing device with an attached or embedded RFID reader, an RFID tag appearing within range may be mounted within the file system of the computing device. For instance, the RFID tag may be mounted as a dedicated drive (e.g. 'T:\'), as a folder (e.g. 'Computer>Tags>Tag Name' on a conventional Windows based PC), as a directory on a Unix, Linux or Android based system (e.g. '\mnt\tags\tagname'), and the like.

Figure 32:
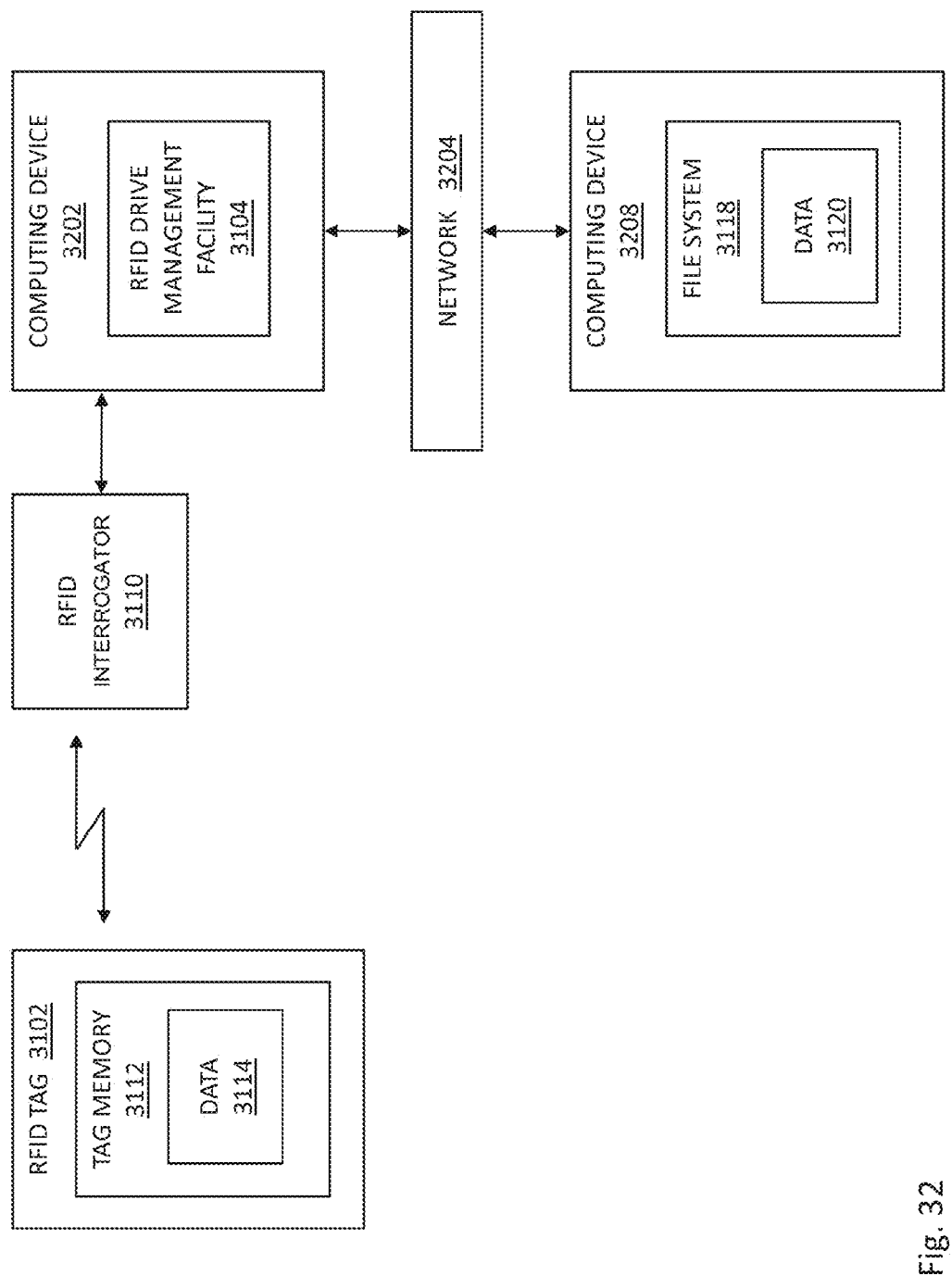
FIG. 32 depicts an embodiment functional block diagram of the RFID drive management facility interfacing with a computer device across a network.

In embodiments, the RFID drive management facility may provide RFID tags and associated RFID data across a networked system, where the processing, RFID readers, and the like, may not be locally resident with the computing device, such as where the file system is perceived by the local user separate from the locally resident capabilities or physical architecture associated with the RFID interrogator and the location of the RFID tag. For instance, and referring to FIG. 32, an RFID interrogator 3110 may interface with a computing device 3202, where the RFID drive management facility 3104 may manage the interface and exchange of data with the RFID tag 3102. The computing device 3202 may interface with at least one of a plurality of computer devices 3208 across a network 3204. In this wider network context, the RFID tags may have uniform resource locations, such as if they were network or web pages/servers in their own right. In such a case, a user might interact with a remote tag via a web browser with RFID drive management facility providing a similar conversion between tag data format and html format.

The RFID drive management facility may enable changing the identity of an RFID tag. For example, changing the EPC on EPCglobal compatible tag may require the user to only have to rename the associated drive or a folder such as through using Windows Explorer, the desktop environment or other conventional tools provided as part of the computer device operating system, with no need for a special application.

The RFID drive management facility may allow records to be stored and recovered from the RFID tag by treating them as conventional files, e.g. they may be dragged and dropped into the RFID tag by dragging and dropping them into the drive or folder representing the RFID tag, and edited in situ by for example double clicking them. The RFID drive management facility may deploy advanced serialization and de-serialization algorithms to convert the files to and from the RFID tag memory format, and a conceptual RFID tag file system, which may allow these files to be held in a manner that maps onto a hierarchical tree paradigm used by modern computer systems. In embodiments, this may be transparent to the user, where all the user may know is that they can see and interact with the RFID tag just like they can a computer device, such as a PC, a portable flash drive, and the like, as described herein.

The RFID drive management facility may transform the user experience when interacting with RFID tags, and greatly simplify system deployment. For example, consider the case where an RFID tagged asset travels through multiple locations adding information to the RFID tag at each stage, such as a document requiring multiple levels of approval. A normal deployment scenario would likely involve writing a special purpose application for this function. By running the RFID drive management facility on each computing device, conventional applications such as Microsoft Excel may be used for this function, changing the file directory to that of the RFID tag.

In embodiments, the RFID drive management facility may map RFID tags onto file system elements, such as disclosed herein. Records on an RFID tag may map onto files with a tag. Using a native file 'rename' command within the operating system may change tag identity and record names. A file name representing the tag may be a hexadecimal conversion of the tag identity, a general purpose string, a human readable form of the data used to encode the tag identity, and the like. For example, a file name may be encoded in a manner similar to the EPC URI defined in the GS1/EPCglobal Tag Data Standard 1.6. Records may be added to the RFID tag by saving, by drag-and-drop, and the like, and edited by techniques such as edit, double click, and the like. Data held on the tag may not be an exact binary match of the mapped file contents, but optimized via techniques such as indexing and compression for efficiency. Techniques used to store data on the tag may comply with a defined tag data format, for example ATA Spec 2000. The RFID drive management facility may interrogate an RFID tag and assign a converter that maps between tag data format and computer file format based on the format of the tag data. Edits to records may be held as changes (e.g. by diff encoding) rather than by overwriting the existing record, such that a full audit trail of changes may be recovered. RFID tag identity, and/or one or more folders or records, may be secured via cryptographic means such as but not limited to encryption, hashing and digital signatures. Cryptographic algorithms used to secure data may operate on and include the unique manufacturing identity of the RFID tag (e.g., as its chip serial number) to prevent genuine data being considered authentic when copied to another (counterfeit) tag. A control menu for the RFID drive management facility may be accessed by clicking or right clicking a status icon (e.g., such as a user would access printer spooling controls). An engineering user interface may show tag memory contents (such as optionally decoded). A secondary application programmer interface may allow RFID tags to interact with special purpose programs while retaining interoperability with the RFID drive management facility. RFID tags may be used without a dedicated tag file system and presented to the user as a raw memory dump, which may be edited (and hence change the tag memory) using conventional tools such as spreadsheets, word processors, text editors, and the like. Free space may be shown as a notional free space file having size equivalent to or representing the free memory on the RFID tag when the tag is mounted as a folder rather than a drive. For example, it may make sense to map RFID tags to folders if more than one tag is present, but folders may inherit free space from the drive rather than having their own free space. With a drive mapping, the drive may show the true free space. Conventionally defined memory layouts may be mapped onto computer application files. For example, a maintenance record in Spec 2000 could be edited within Microsoft Excel with the mapping converting between the Excel binary format and the ASCII name-value pairs format of Spec 2000 in a manner that is transparent to users (i.e. this technique may work with any defined memory format given the right mappings). Multiple layouts may coexist within the same RFID tag and be accessed by the RFID drive management facility (e.g., a public region in ATA Spec 2000 format, and one or more optionally private regions in a different format, such as the 'diffing' file system described herein).

In embodiments, the RFID drive management facility may provide for interfaces within a web-based Internet cloud environment. For instance, interfacing with a cloud environment may addresses needs associated with the fact RFID tags often pass through many locations/organizations collecting data (e.g. maintained aviation parts, where once the RFID tagged part is in the field it is traditionally difficult to get added information back to the organizations needing it until the part returns to their possession). The cloud configuration may be implemented as a trusted third party service (e.g. with an enabling application) where RFID tag information may be automatically synchronized with the back-end systems of organizations having interest in the RFID tag information whenever the tag is read. The system may allow users to specify the data they desire and the data they allow others to have, and may provide means of cryptographically ensuring privacy (e.g. via encryption), and authenticity (e.g. via digital signatures) such that information is securely disseminated. A cloud-based server may be capable of communicating with client software to provide cryptographic credentials such as public/private keys that can be used by the RFID drive management facility. The authentication process may optionally include the RFID tag identity as described herein to prevent counterfeit tags to be created by copying data. In embodiments, the cloud implementation may be considered a 'switchboard' that connects organizations with the data on their RFID tags whenever a tag appears at a read point (i.e. a device running the RFID cloud implementation that has a network connection), as a value added network (VAN) for EDI, and the like.

In embodiments, methods and systems may be provided for managing RFID tags, where an RFID tag and associated RFID tag data are presented to a computing device through an RFID drive management facility as a seamless extension of a logical file system within the computing device such that the RFID tag and associated RFID tag data can be managed in a manner that is consistent with other items within the file system. The computing device, or computer system, may communicate with the RFID tag, such as through a connection to an interrogator, through a network connection, and the like. In embodiments, the system may be implemented as a computer implemented system of managing RFID tags, such as comprising an RFID tag, a memory comprising instructions, a processor receiving data from the RFID tag, and performing the steps of providing a RFID drive management facility on the computer system, the computer system having a logical file system, presenting an RFID tag as an extension of the logical file system, providing the ability to manage data on the RFID tag in the logical file system, and the like.

In embodiments, methods and systems may provide for computer functionality, where the RFID tag may be mounted as a file system element accessible within the local and network file system available to the computing device. The file system element may be a drive, folder, network share, uniform resource location, and the like. The identity of the RFID tag may be changed by changing the name of the drive, folder, network share, uniform resource location (e.g. including both local area and wide area/internet locations), and the like. The name may be in one of a plurality of representations, such as hexadecimal, human readable fields constituting the identity separated by delimiters, general purpose naming string, and the like. The RFID drive management facility may operate autonomously and transparently to the user with minimal interaction, such that the ordinary user interface for reading and writing data is the same as the file system. The RFID drive management facility may be implemented as a process, daemon or other capability within the run-time or operating system; a device driver either in the run-time kernel or application space, an application; a service; a remote procedure call (or equivalent capability), and the like. The computer device may be a server, a desktop computer, a laptop computer, a tablet computing device, a smart phone, and the like.

In embodiments, methods and systems may provide for editing and writing back to the tag where the RFID tag data is edited on the computing device and transferred to the RFID tag. The editing may be provided within an operating system, a user interface environment, and the like. The editing may include copy-and-paste and drag-and-drop techniques. The editing may provide changes to file system elements by an application, run time system, and the like, within the computing device. The editing may comprise copying, renaming, deleting, and the like. The editing may be provided by at least one of a spreadsheet application, database application, word processing application, text editor application, and the like on the computing device. The editing may allow an existing application to read and write data to and from tags through its conventional file handling interface (versus requiring RFID specific functionality). The editing may be provided by a web browser, and the RFID tag presented as if it were a web page or other named resource location.

In embodiments, methods and systems may provide for cloud or local area storage, transferring the RFID tag data from the computer device to a server-based cloud or local area network storage facility, such as where the RFID tag data may be made available to a second computer device. The RFID tag data may be mounted at a uniform resource location, as a network file share, and the like.

In embodiments, methods and systems may provide for RFID tag structures and configurations described herein, including multi-node RFID configurations, single-node RFID configurations, composite RFID tag configurations, usage of one-time programmable (OTP) memory structures on the RFID tag, and the like. For instance, the RFID tag interfacing with the RFID drive management facility may utilize OTP memory configured as emulated multiple-time programmable (eMTP) memory. The RFID drive management facility may then manage reads and/or writes with the RFID tag as if accessing true multiple-time programmable memory, such as available in RAM, flash memory, a hard drive, and the like. In this way, the RFID tag, who's access is managed through the RFID drive management facility, may appear to the user of the computing device as similar to other file system elements on the computing device. For example, the user may access the RFID tag as a storage drive icon on the desktop of the computer device as if the RFID tag was a portable flash memory drive plugged into the computing device, where in reality the memory being accessed is OTP memory on the RFID tag configured as eMTP memory, as described herein. In another example, the RFID tag may be a multi-node RFID tag as described herein, where each RF node for instance is shown as a separate memory storage icon on the desktop of the computing device. Although only a few examples have been provided for how the RFID drive management facility may be utilized in combination with the RFID structures and configurations as described herein, one skilled in the art will recognize the ability of the RFID drive management facility to interface a computing device to other structures and configurations described herein.

In embodiments, methods and systems may provide for file formatting, where the RFID drive management facility provides a mapping of an RFID data format to a computer file format. The RFID drive management facility may simultaneously provide mapping to a plurality of computer file formats, where one of the plurality of computer formats may be a raw file format showing sequential data memory content as the data is stored on the RFID tag. The RFID drive management facility may simultaneously provide mapping to a plurality of tag data formats. The RFID drive management facility may identify an RFID tag data format and assign a converter to translate and convert between the file format within the computer system and the data format within the tag. The RFID drive management facility may provide a mapping of a computer file format to an RFID data format. The data format within the RFID tag may be an exact representation of the file format within the computing system. The RFID drive management facility may provide a data format within the RFID tag with additional processing to convert between the RFID tag data format and the computing system format, where the additional processing may include data compression, delta coding (such that changes to data are stored and resaved unchanged data is not stored), and the like. Changes may be time-stamped so that the exact tag state at a particular date and time may subsequently be recovered. Digital signature information may be added to validate data or tag integrity.

In embodiments, methods and systems may provide for management capabilities, such as where control functionality for the RFID drive management facility may be accessed from a control icon, a status icon, and the like within a user desktop. The status icon of the management capability may be changed to indicate the state of the reader. For instance, animated green arcs within an icon may show that the RFID interrogator is reading, and animated red arcs may show that the RFID interrogator is writing. The RFID drive management facility may be integrated with and managed by network management software or capabilities used to manage network and computing infrastructure.

In embodiments, methods and systems may provide for an RFID interrogator (e.g. an RFID reader, a NFC reader). The RFID interrogator may be interfaced to the RFID drive management facility via a dedicated connection, such as an RS232 connection, a USB connection, and the like. The RFID interrogator may be interfaced via a network. The RFID interrogator may be incorporated within the computing device. For instance, the RFID interrogator may be integrated into a rugged RFID hand-held, an NFC enabled tablet or cell phone, and the like.

While only a few embodiments of the present invention have been shown and described, it will be obvious to those skilled in the art that many changes and modifications may be made thereunto without departing from the spirit and scope of the present invention as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another.

The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A system, comprising:
a radio frequency (RF) tag configured to communicate data stored in a memory of the RF tag to a networked computing device through a wired connection or to an RF interrogator device through a wireless connection, the RF tag comprising (i) an RF and analog block for receiving an RF signal from and transmitting an RF signal to the RF interrogator device, (ii) a data processing and controller block for digital information processing, (iii) a memory store, and (iv) a communication facility, wherein the RF tag is at least in part powered by an external RF signal received by the RF and analog block; and
a sensor communicatively coupled to the communication facility,
wherein the RF tag is adapted to enable the networked computing device to access the memory store through a communication bus connected between the communication facility and the networked computing device when the external RF signal provides power to the RF tag, wherein the network computing device is communicatively connected to a network,
wherein the communication facility transfers data collected from the sensor by the RF tag to the networked computing device.

2. The system of claim 1, wherein the network is one of a local area network, a wide area network, a peer-to-peer network, an intranet, or an internet.

3. The system of claim 1, wherein the communication bus is a serial digital electrical interface.

4. The system of claim 1, wherein the RF tag communicates information to and from the network by transferring data across the networked computing device.

5. The system of claim 4, wherein the RF tag is considered a computing device on the network.

6. The system of claim 1, wherein information from the network is stored on the networked computing device and transferred to the RF tag when the RF tag is powered up by the external RF signal.

7. The system of claim 1, wherein the data collected from the sensor is stored in the memory store of the RF tag.

8. The system of claim 1, further comprising the RF tag communicating with a cellular network connection through the communication facility.

9. The system of claim 8, wherein connection to the network is available through either the networked computing device or the cellular network.

10. A method, comprising:
providing a radio frequency (RF) tag configured to communicate data stored in a memory of the RF tag to a networked computing device through a wired connection or to an RF interrogator device through a wireless connection, the RF tag comprising (i) an RF and analog block for receiving an RF signal from and transmitting an RF signal to the RF interrogator device, (ii) a data processing and controller block for digital information processing, (iii) a memory store, and (iv) a communication facility, wherein the RF tag is at least in part powered by an external RF signal received by the RF and analog block; and
communicatively connecting a sensor to the communication facility,
wherein the RF tag is adapted to enable the networked computing device to access the memory store through a communication bus connected between the communication facility and the networked computing device when the external RF signal provides power to the RF tag, wherein the network computing device is communicatively connected to a network,
wherein the communication facility transfers data collected from the sensor by the RF tag to the networked computing device.

11. The method of claim 10, wherein the network is one of a local area network, a wide area network, a peer-to-peer network, an intranet, or an internet.

12. The method of claim 10, wherein the RF tag communicates information to and from the network by transferring data across the networked computing device.

13. The method of claim 10, wherein the communication bus is a serial digital electrical interface.

14. The method of claim 10, wherein the RF tag communicates information to and from the network by transferring data across the networked computing device.

15. The method of claim 14, wherein the RF tag is considered a computing device on the network.

16. The method of claim 10, wherein information from the network is stored on the networked computing device and transferred to the RF tag when the RF tag is powered up by the external RF signal.

17. The method of claim 10, wherein the data collected from the sensor is stored in the memory store of the RF tag.

18. The method of claim 10, further comprising the RF tag communicating with a cellular network connection through the communication facility.

19. The method of claim 18, wherein connection to the network is available through either the networked computing device or the cellular network.

* * * * *

UNITED STATES PATENT AND TRADEMARK OFFICE
CERTIFICATE OF CORRECTION

PATENT NO. : 10,430,702 B2  
APPLICATION NO. : 15/805724  
DATED : October 1, 2019  
INVENTOR(S) : Timothy P. Butler et al.

Page 1 of 2

It is certified that error appears in the above-identified patent and that said Letters Patent is hereby corrected as shown below:

On the Title Page

On the page 2, in item (63), in Column 1, in "Related U.S. Application Data", Line 6, delete "and" and insert -- which is --, therefor.

On the page 2, in item (63), in Column 1, in "Related U.S. Application Data", Line 8, delete "and" and insert -- which is --, therefor.

On the page 2, in item (63), in Column 1, in "Related U.S. Application Data", Line 10, delete "and" and insert -- which is --, therefor.

In the Drawings

On sheet 4 of 37, in Figure 1C, reference numeral 218, delete "(DATAI" and insert -- (DATA --, therefor.

On sheet 32 of 37, in Figure 27, reference numeral 2702, Line 1, delete "MUNITONS" and insert -- MUNITIONS --, therefor.

In the Specification

In Column 14, Line 43, delete "preformed," and insert -- performed, --, therefor.

In Column 21, Lines 30-31, delete "may derivative from" and insert -- may derive from --, therefor.

In Column 22, Line 4, delete "104" and insert -- 104. --, therefor.

In Column 25, Line 16, delete "MTP emulation (eMTP)," and insert -- emulate MTP (eMTP), --, therefor.

Signed and Sealed this  
Seventeenth Day of December, 2019

Andrei Iancu  
*Director of the United States Patent and Trademark Office*

CERTIFICATE OF CORRECTION (continued)
U.S. Pat. No. 10,430,702 B2

In Column 36, Line 57, delete "MM" and insert -- MRI --, therefor.

In Column 63, Line 30, delete "once\read" and insert -- once/read --, therefor.

In Column 64, Line 31, delete "amoung" and insert -- among --, therefor.

In Column 70, Line 54, delete "inkjet," and insert -- ink jet, --, therefor.

In Column 85, Line 35, delete "N M)." and insert -- N≠M). --, therefor.

In Column 124, Line 10, delete "XRay" and insert -- X-Ray --, therefor.

In Column 124, Line 50, delete "Mill," and insert -- MRI, --, therefor.